US011250604B2

(12) United States Patent
Casella et al.

(10) Patent No.: US 11,250,604 B2
(45) Date of Patent: Feb. 15, 2022

(54) DEVICE, METHOD, AND GRAPHICAL USER INTERFACE FOR PRESENTING CGR FILES

(71) Applicant: Apple Inc., Cupertino, CA (US)

(72) Inventors: Tyler Casella, San Mateo, CA (US); David Lui, San Jose, CA (US); Norman Nuo Wang, Saratoga, CA (US); Xiao Jin Yu, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/892,010

(22) Filed: Jun. 3, 2020

(65) Prior Publication Data

US 2020/0357155 A1 Nov. 12, 2020

Related U.S. Application Data

(63) Continuation of application No. PCT/US2020/027183, filed on Apr. 8, 2020, which is
(Continued)

(51) Int. Cl.
*G06T 11/60* (2006.01)

(52) U.S. Cl.
CPC .......... *G06T 11/60* (2013.01); *G06T 2200/24* (2013.01)

(58) Field of Classification Search
CPC combination set(s) only.
See application file for complete search history.

(56) References Cited

U.S. PATENT DOCUMENTS

| 8,872,852 B2 | 10/2014 | Deffeyes et al. |
| 9,047,698 B2 * | 6/2015 | Maciocci ................ G06F 3/167 |

(Continued)

FOREIGN PATENT DOCUMENTS

| CN | 100594517 C | 3/2010 |
| CN | 102375741 A | 3/2012 |

(Continued)

OTHER PUBLICATIONS

D. Mendes et al., "A Survey on 3D Virtual Object Manipulation: From the Desktop to Immersive Virutal Environments", Computer Graphics Forum, vol. 38 (2019), No. 1, pp. 21-45.
(Continued)

*Primary Examiner* — Motilewa Good Johnson
(74) *Attorney, Agent, or Firm* — Fernando & Partners, LLP

(57) ABSTRACT

In one embodiment, a method of presenting a computer-generated reality (CGR) file includes receiving a user input to present a CGR scene including one or more CGR objects, wherein the CGR scene is associated with a first anchor and a second anchor. The method includes capturing an image of a physical environment and determining that the image of the physical environment lacks a portion corresponding to the first anchor. The method includes detecting a portion of the image of the physical environment corresponding to the second anchor. The method includes, in response to determining that image of the physical environment lacks a portion corresponding to the first anchor and detecting a portion of the image of the physical environment corresponding to the second anchor, displaying the CGR scene at a location of the display corresponding to the second anchor.

20 Claims, 128 Drawing Sheets

Related U.S. Application Data a continuation of application No. 16/403,858, filed on May 6, 2019, now abandoned.

(56) References Cited

U.S. PATENT DOCUMENTS

| | | |
|---|---|---|
| 9,214,137 B2 | 12/2015 | Bala et al. |
| 9,330,478 B2 | 5/2016 | Anderson |
| 9,384,594 B2* | 7/2016 | Maciocci ............. H04N 9/3173 |
| 9,526,587 B2 | 12/2016 | Zhao et al. |
| 9,643,314 B2 | 5/2017 | Guerin et al. |
| 10,139,623 B2 | 11/2018 | Keane et al. |
| 10,672,159 B2* | 6/2020 | Buschbeck ............ G06T 19/006 |
| 10,776,954 B2* | 9/2020 | Bleyer ..................... G06F 3/011 |
| 2011/0018903 A1* | 1/2011 | Lapstun .................. G06F 3/011 |
| | | 345/633 |
| 2012/0069051 A1 | 3/2012 | Hagbi et al. |
| 2012/0249741 A1 | 10/2012 | Maciocci et al. |
| 2014/0267411 A1 | 9/2014 | Fein et al. |
| 2016/0026363 A1 | 1/2016 | Little |
| 2016/0140763 A1 | 5/2016 | Seichter et al. |
| 2016/0179336 A1 | 6/2016 | Ambrus et al. |
| 2016/0210784 A1 | 7/2016 | Ramsby et al. |
| 2016/0314609 A1 | 10/2016 | Taylor et al. |
| 2017/0287218 A1* | 10/2017 | Nuernberger ........... G06T 19/20 |
| 2017/0358140 A1 | 12/2017 | Kohler et al. |
| 2018/0095450 A1 | 4/2018 | Lappas et al. |
| 2018/0114365 A1 | 4/2018 | Egri et al. |
| 2018/0268615 A1* | 9/2018 | Smet ..................... G06T 19/006 |
| 2018/0285052 A1 | 10/2018 | Eade et al. |
| 2018/0293798 A1* | 10/2018 | Energin .................. G06F 3/012 |
| 2018/0307303 A1 | 10/2018 | Powderly et al. |
| 2018/0321894 A1 | 11/2018 | Paulovich et al. |
| 2018/0350145 A1* | 12/2018 | Byl ......................... G06F 3/017 |
| 2019/0034076 A1 | 1/2019 | Vinayak et al. |
| 2019/0066380 A1 | 2/2019 | Berk et al. |
| 2019/0102922 A1 | 4/2019 | Gum |
| 2019/0114038 A1* | 4/2019 | Geiger .................... A63F 13/63 |
| 2019/0114802 A1 | 4/2019 | Lazarow |
| 2019/0213754 A1 | 7/2019 | Lee et al. |
| 2019/0295273 A1 | 9/2019 | Price et al. |
| 2019/0297316 A1 | 9/2019 | Bleyer et al. |
| 2019/0304146 A1 | 10/2019 | Buschbeck et al. |
| 2019/0311544 A1* | 10/2019 | Kayo .................... G06T 19/006 |
| 2019/0391715 A1 | 12/2019 | Joyce et al. |
| 2020/0111256 A1* | 4/2020 | Bleyer ................ G06F 3/04815 |
| 2020/0387289 A1* | 12/2020 | Dunn .................... G06F 3/0484 |
| 2021/0097354 A1* | 4/2021 | Amato ..................... G06T 7/20 |

FOREIGN PATENT DOCUMENTS

| | | |
|---|---|---|
| CN | 103472909 B | 4/2017 |
| WO | 2011109126 A1 | 9/2011 |
| WO | 2018237172 A1 | 12/2018 |

OTHER PUBLICATIONS

International Search Report and Written Opinion for PCT/US2020/027183 dated Jul. 2, 2020.

\* cited by examiner

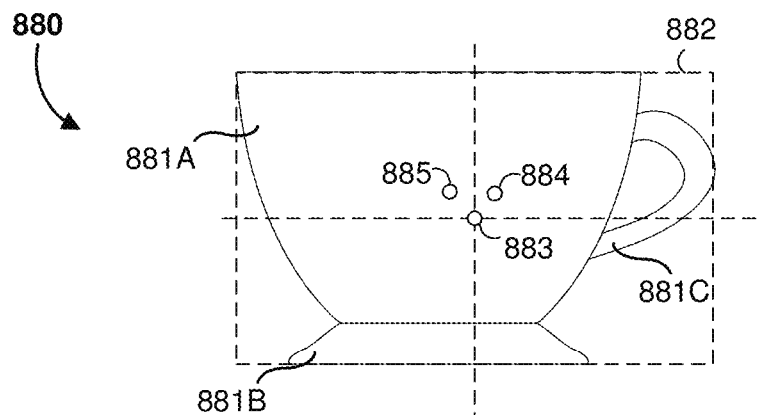
Figure 8AE1
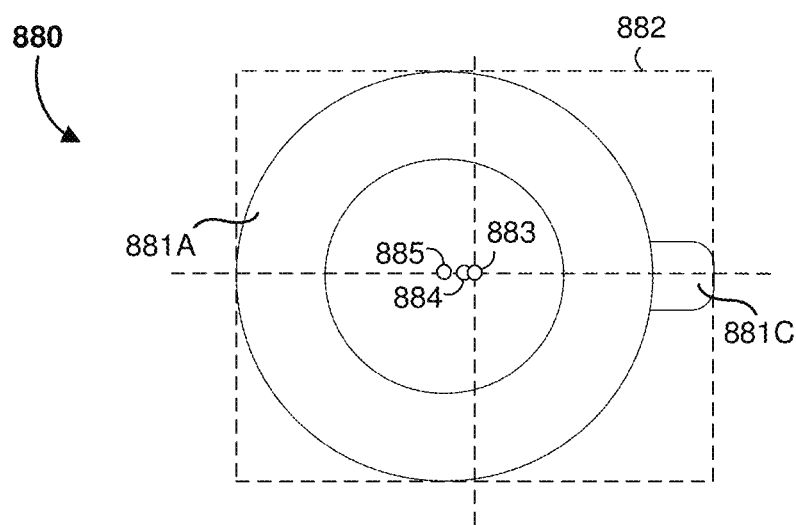
Figure 8AE2

900

```
┌─────────────────────────────────────────────────────────────────┐
│ Receiving, via one or more input devices, a user input to       │
│ present a computer-generated reality (CGR) scene including      │─ 910
│ one or more CGR objects, wherein the CGR scene is associated    │
│ with a first anchor and a second anchor                         │
└─────────────────────────────────────────────────────────────────┘
                                │
                                ▼
┌─────────────────────────────────────────────────────────────────┐
│ Capturing, using a camera, an image of a physical environment   │─ 920
└─────────────────────────────────────────────────────────────────┘
                                │
                                ▼
┌─────────────────────────────────────────────────────────────────┐
│ Determining that the image of the physical environment lacks a  │─ 930
│ portion corresponding to the first anchor                       │
└─────────────────────────────────────────────────────────────────┘
                                │
                                ▼
┌─────────────────────────────────────────────────────────────────┐
│ Detecting a portion of the image of the physical environment    │─ 940
│ corresponding to the second anchor                              │
└─────────────────────────────────────────────────────────────────┘
                                │
                                ▼
┌─────────────────────────────────────────────────────────────────┐
│ In response to determining that image of the physical           │
│ environment lacks a portion corresponding to the first anchor   │
│ and detecting a portion of the image of the physical            │─ 950
│ environment corresponding to the second anchor, displaying, on  │
│ a display, the CGR scene at a location of the display           │
│ corresponding to the second anchor                              │
└─────────────────────────────────────────────────────────────────┘
```

Displaying, on a display, a representation of a computer-generated reality (CGR) object associated with a first parameter and a second parameter, wherein the first parameter has a first one of a plurality of first parameter values and the second parameter has a first one of a plurality of second parameter values ⟶ 1010

Displaying, on the display, a first user interface element for selection of a second one of the plurality of first parameter values ⟶ 1020

Displaying, on the display, a second user interface element for selection of a second one of the plurality of second parameter values, wherein, based on the first one of the plurality of first parameter values and one or more selection rules, a subset of the plurality of second parameter values are presented for selection via the second user interface element ⟶ 1030

Displaying, on a display, a representation of a computer-generated reality (CGR) scene including displaying respective representations of a plurality of CGR objects of the CGR scene — 1110

Determining that two of the plurality of CGR objects overlap in the CGR scene — 1120

Displaying, on the display in association with at least one respective representation of the two of the plurality of CGR objects, an indicator that the two of the plurality of CGR objects overlap in the CGR scene — 1130

Displaying, on a display, a representation of a computer-generated reality (CGR) scene including displaying respective representations of one or more CGR objects of the CGR scene ⟵ 1210

Receiving, via one or more input devices, a user input directed to a particular representation of the one or more CGR objects ⟵ 1220

In response to receiving the user input directed to the particular representation of the one or more CGR objects, providing a first manipulation mode associated with a first set of shape-preserving spatial manipulations of the corresponding CGR object ⟵ 1230

Receiving, via the one or more input devices, a user input switching from the first manipulation mode to a second manipulation mode associated with a second set of shape-preserving spatial manipulations of the corresponding CGR object ⟵ 1240

In receive to receiving the user input switching from the first manipulation mode to a second manipulation mode, providing the second manipulation mode ⟵ 1250

Displaying, on a display, a representation of a computer-generated reality (CGR) scene including displaying respective representations of one or more CGR object of the CGR scene — 1310

Receiving, via one or more input devices, a user input spatially manipulating a particular CGR object of the one or more CGR objects, wherein the particular CGR object is associated with an intuitive spatial manipulation point — 1320

Changing a spatial property of the particular CGR object based on the user input and the intuitive spatial manipulation point — 1330

1410 — Displaying, on a display, a representation of a computer-generated reality (CGR) scene including displaying respective representations of one or more CGR objects of the CGR scene

1420 — Receiving, via one or more input devices, a user input directed to a representation of a particular CGR object of the one or more CGR objects, the particular CGR object associated with a parameter

1430 — Display, on the display from a first perspective, a plurality of a representations of the particular CGR object, wherein each of the plurality of representations of the particular CGR object is associated with a different respective value of the parameter

1440 — Receiving, via the one or more input devices, a user input changing the first perspective to a second perspective

1450 — In response to receiving the user input changing the first perspective to a second perspective, displaying, on the display, the plurality of representations of the particular CGR object from the second perspective

Displaying, on a display, a representation of a computer-generated reality (CGR) scene including displaying a representation of a first CGR object of the CGR scene, wherein displaying the representation of the first CGR object is based on a display mesh associated with the first CGR object ⎯1510

Determining an interaction of the first CGR object with a second CGR object of the CGR scene based on a physics mesh associated with the first CGR object, wherein the physics mesh associated with the first CGR object is different than the display mesh associated with the first CGR object ⎯1520

Displaying, on a display, a representation of a computer-generated reality (CGR) scene including displaying respective representations of one or more CGR objects of the CGR scene —1610

Receiving, via one or more input devices, a user input adding a behavior to the CGR scene —1620

Receiving, via the one or more input devices, a user input defining a trigger for the behavior —1630

Receiving, via the one or more input devices, a user input defining an action for the behavior, wherein, while presenting the CGR scene, the action is performed in response to detecting the trigger —1640

Receiving, via one or more input devices, a user input generating a computer-generated reality (CGR) scene ⎯1710

Receiving, via the one or more input devices, a user input associating an anchor with the CGR scene ⎯1720

Receiving, via the one or more input devices, a user input associating one or more CGR objects with the CGR scene, wherein the one or more CGR objects are to be displayed in association with the anchor ⎯1730

Receiving, via the one or more input devices, a user input associating a behavior with the CGR scene, wherein the behavior includes one or more triggers and one or more actions and wherein the one or more actions are to be performed in response to detecting any of the one or more triggers ⎯1740

Generating a CGR file including data regarding the CGR scene, wherein the CGR file includes data regarding the anchor, the one or more CGR objects, and the behavior ⎯1750

Figure 17

DEVICE, METHOD, AND GRAPHICAL USER INTERFACE FOR PRESENTING CGR FILES

CROSS-REFERENCE TO RELATED APPLICATIONS

This application is a continuation application of International App No. PCT/US2020/027183, filed on Apr. 8, 2020, which is entitled to the benefit of the filing date of U.S. Nonprovisional patent application Ser. No. 16/403,858, filed on May 6, 2019, both of which are hereby incorporated by reference in their entirety.

TECHNICAL FIELD

This relates generally to electronic devices with touch-sensitive surfaces, including but not limited to electronic devices with touch-sensitive surfaces that present computer-generated reality (CGR) files.

BACKGROUND

Programming a CGR application can be a difficult and time-consuming process, requiring expert knowledge in, for example, 3D object design and application coding. This presents a high barrier to the generation of quality CGR applications.

SUMMARY

Accordingly, there is a need for electronic devices with faster, more efficient methods and interfaces for presenting computer-generated reality (CGR) files (such as an executable CGR application or a CGR file that can be read by a CGR application to provide a CGR experience to a user). Such methods and interfaces optionally complement or replace conventional methods for presenting CGR files. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device including one or more processors, non-transitory memory, a camera, a display, and one or more input devices. The method includes, receiving, via the one or more input devices, a user input to present a computer-generated reality (CGR) scene including one or more CGR objects, wherein the CGR scene is associated with a first anchor and a second anchor. The method includes capturing, using the camera, an image of a physical environment. The method includes determining that the image of the physical environment lacks a portion corresponding to the first anchor. The method includes detecting a portion of the image of the physical environment corresponding to the second anchor. The method includes, in response to determining that image of the physical environment lacks a portion corresponding to the first anchor and detecting a portion of the image of the physical environment corresponding to the second anchor, displaying, on a display, the CGR scene at a location of the display corresponding to the second anchor.

In accordance with some embodiments, a method is performed at a device with one or more processors, non-transitory memory, and a display. The method includes displaying, on the display, a representation of a computer-generated reality (CGR) object associated with a first parameter and a second parameter, wherein the first parameter has a first one of a plurality of first parameter values and the second parameter has a first one of a plurality of second parameter values. The method includes displaying, on the display, a first user interface element for selection of a second one of the plurality of first parameter values. The method includes displaying, on the display, a second user interface element for selection of a second one of the plurality of second parameter values, wherein, based on the first one of the plurality of first parameter values and one or more selection rules, a subset of the plurality of second parameters values are presented for selection via the second user interface element.

In accordance with some embodiments, a method is performed at a device with one or more processors, non-transitory memory, and a display. The method includes displaying, on the display, a representation of CGR scene including displaying a representation of a first CGR object of the CGR scene, wherein displaying the representation of the first CGR object is based on a display mesh associated with the first CGR object. The method includes determining an interaction of the first CGR object with a second CGR object of the CGR scene based on a physics mesh associated with the first CGR object, wherein the physics mesh associated with the first CGR object is different than the display mesh associated with the first CGR object.

In accordance with some embodiments, an electronic device includes a display, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and one or more input devices, cause the device to perform or cause performance of the operations of any of the methods described herein. In accordance with some embodiments, a graphical user interface on an electronic device with a display, one or more input devices, a non-transitory memory, and one or more processors configured to execute one or more programs stored in the non-transitory memory, including one or more of the elements displayed in any of the methods described above, which are updated in response to inputs, as described in any of the methods described herein. In accordance with some embodiments, an electronic device includes: a display, one or more input devices; and means for performing or causing performance of the operations of any of the methods described herein. In accordance with some embodiments, an information processing apparatus, for use in an electronic device with a display and one or more input devices, includes means for performing or causing performance of the operations of any of the methods described herein.

Thus, electronic devices with displays and input devices, such as touch-sensitive surfaces are provided with faster, more efficient methods and interfaces for presenting CGR files, thereby increasing the effectiveness, efficiency, and user satisfaction with such devices. Such methods and interfaces may complement or replace conventional methods for presenting CGR files.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 9 is a flowchart representation of a method of presenting a CGR scene using a back-up anchor in accordance with some embodiments.

FIG. 10 is a flowchart representation of a method of configuring a CGR object in accordance with some embodiments.

FIG. 11 is a flowchart representation of a method of resolving overlap of two CGR objects in accordance with some embodiments.

FIG. 12 is a flowchart representation of a method of spatially manipulating a CGR object in different spatial manipulation modes in accordance with some embodiments.

FIG. 13 is a flowchart representation of a method of spatially manipulating a CGR object using an intuitive spatial manipulation point in accordance with some embodiments.

FIG. 14 is a flowchart representation of a method of configuring a CGR object in accordance with some embodiments.

FIG. 15 is a flowchart representation of a method of presenting a CGR scene in accordance with some embodiments.

FIG. 16 is a flowchart representation of a method of associating a behavior with a CGR scene in accordance with some embodiments.

FIG. 17 is a flowchart representation of a method of creating a CGR file in accordance with some embodiments.

DESCRIPTION OF EMBODIMENTS

In accordance with various embodiments, a graphical user interface (GUI) is provided to simplify the generation of a CGR file includes data regarding CGR content and further includes data describing how the CGR content is to be presented.

Figure 5:
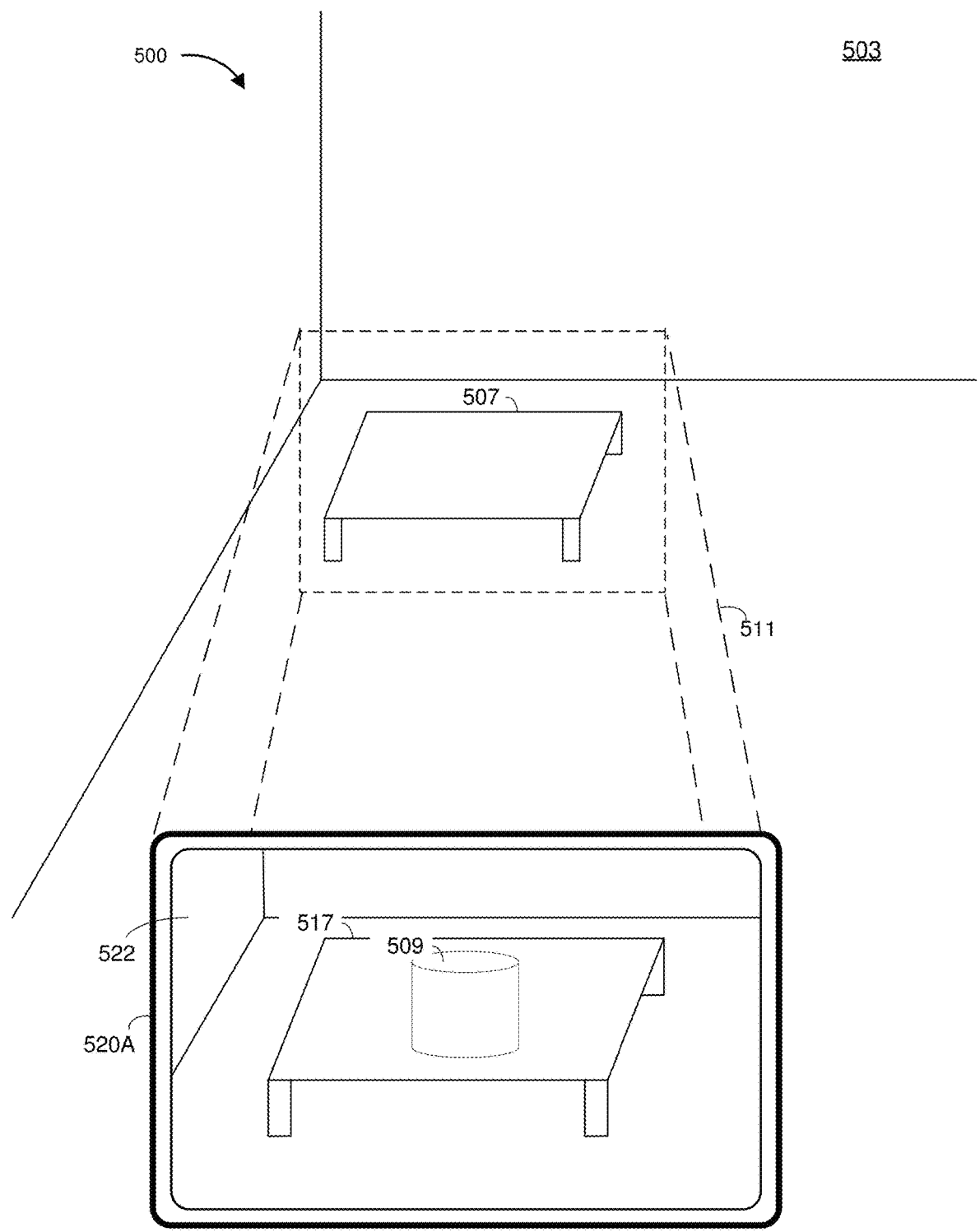
FIG. 5 is a block diagram of an example operating architecture in accordance with some embodiments.
Figure 6:
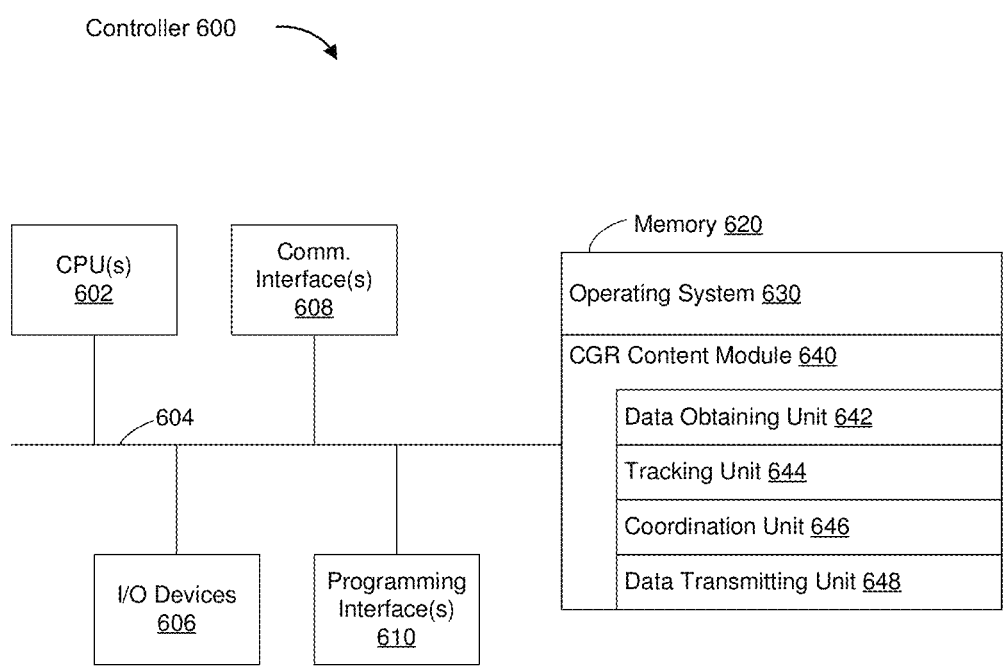
FIG. 6 is a block diagram of an example controller in accordance with some embodiments.
Figure 7:
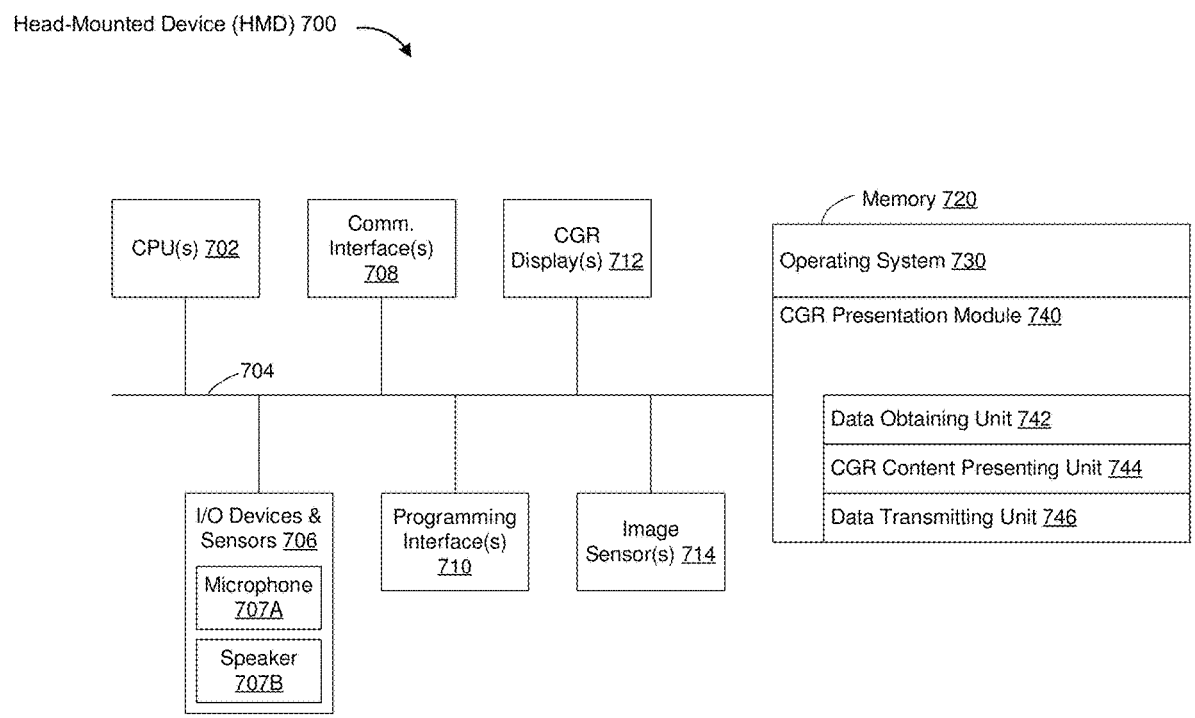
FIG. 7 is a block diagram of an example head-mounted device (HMD) in accordance with some embodiments.

Below, FIGS. 1A-1B, 2-3, and 4A-4B provide a description of example CGR object generating devices. FIGS. 5, 6, and 7 provide a description of example CGR object presenting devices. FIGS. 8A-8DF illustrate example user interfaces for generating CGR files. The user interfaces in FIGS. 8A-8DF are used to illustrate the processes in FIGS. 9-17.

Example CGR File Composing Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
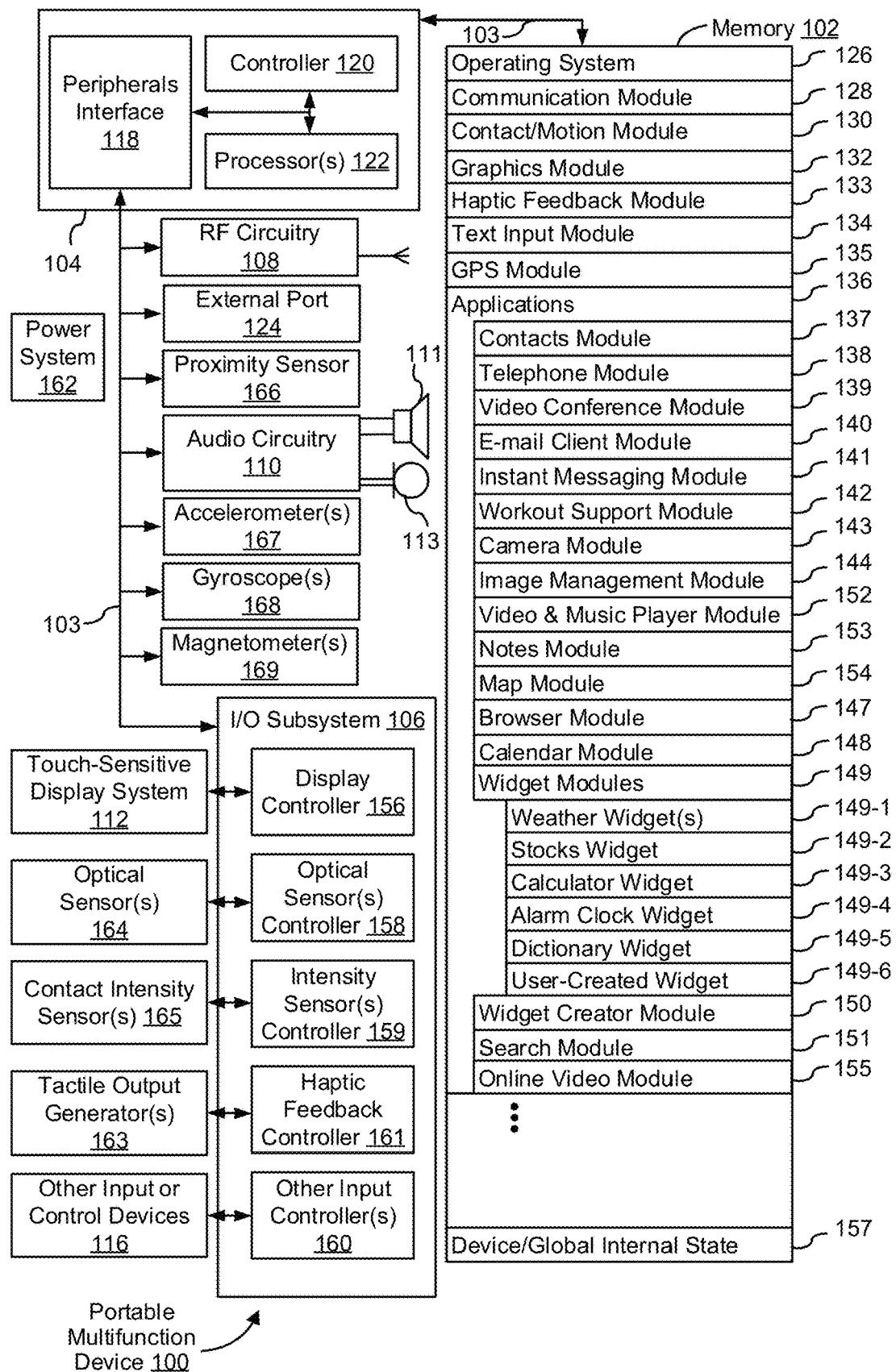
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

Figure 3:
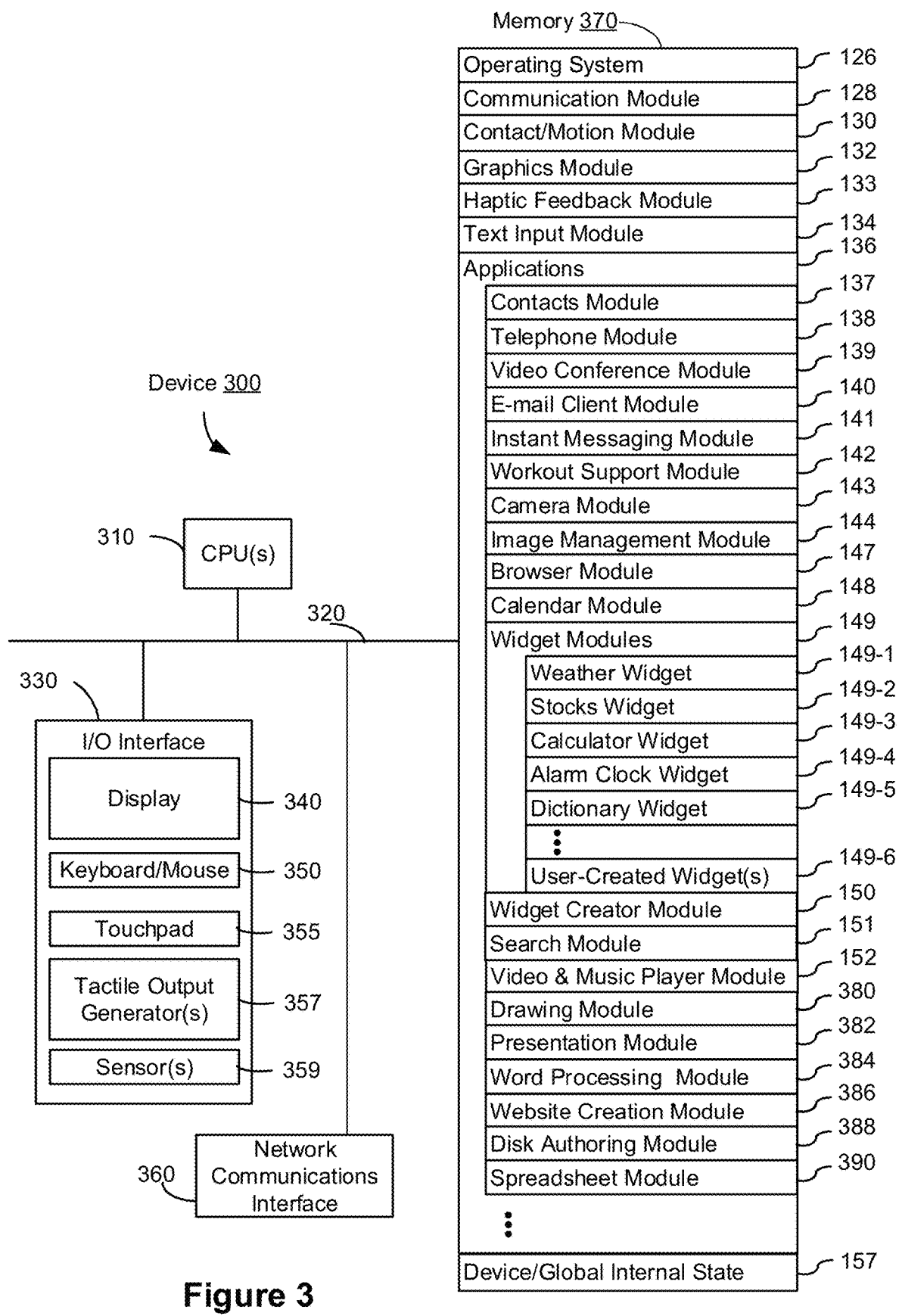
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
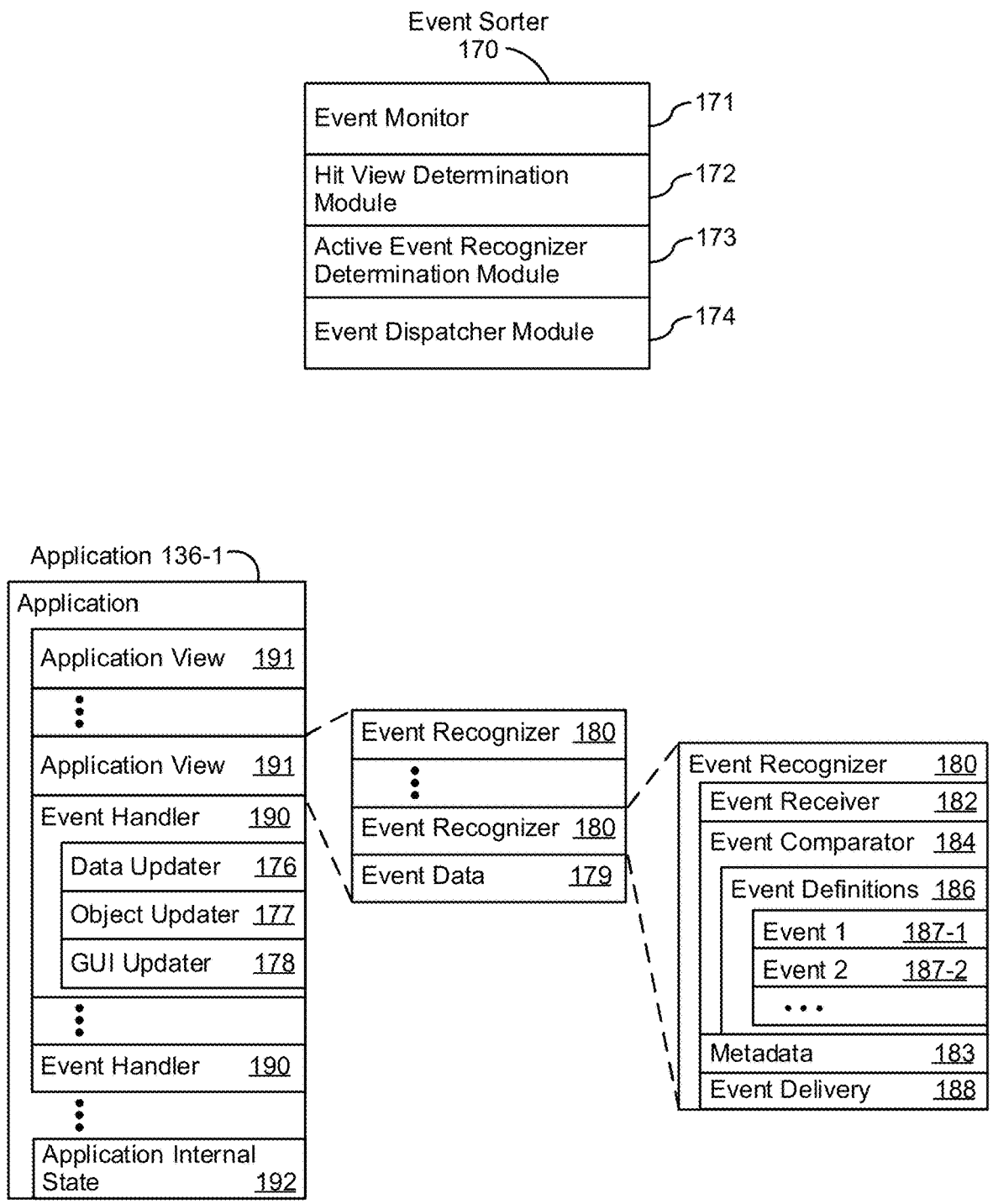
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In some embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
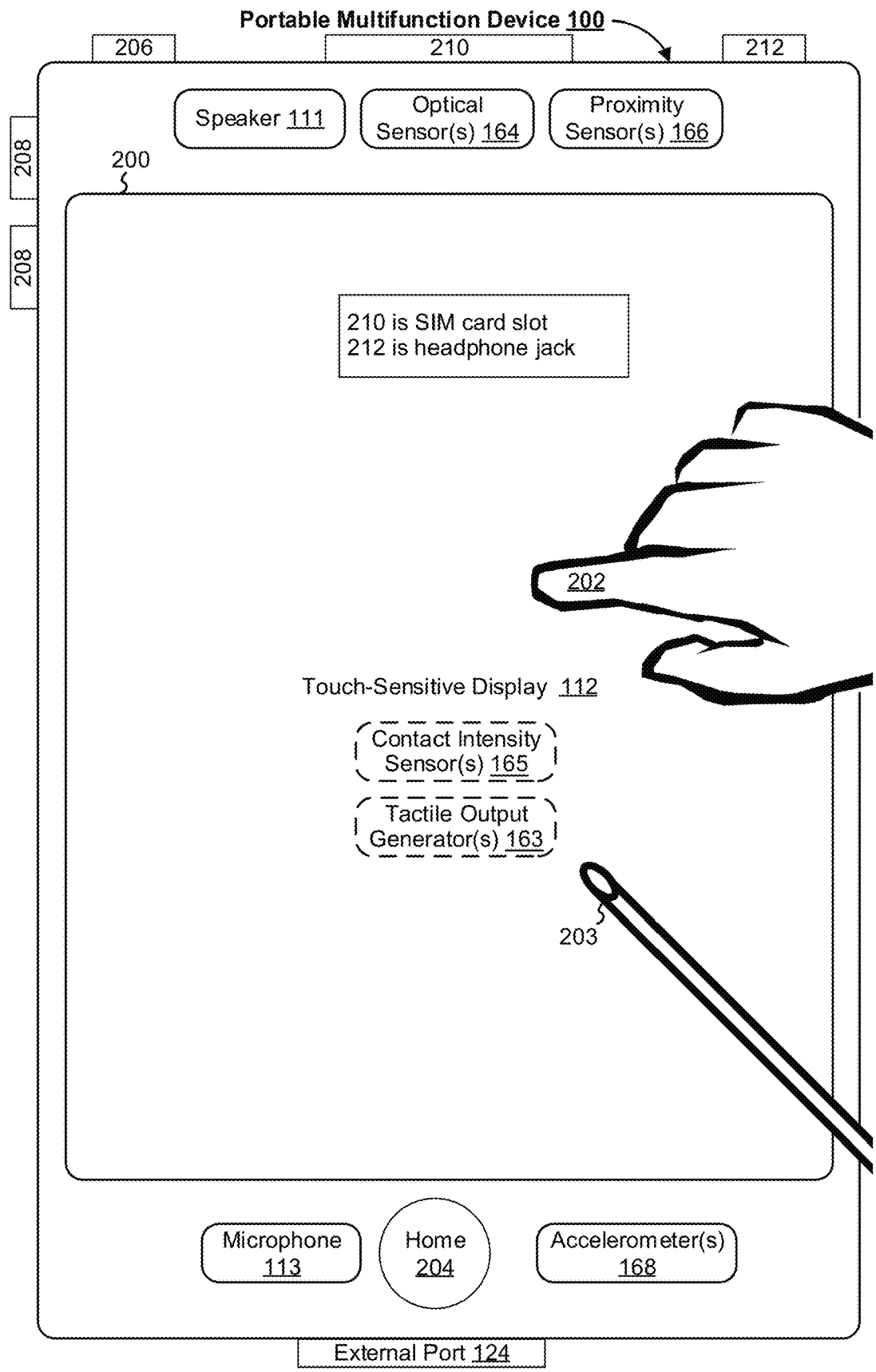
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some embodiments or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
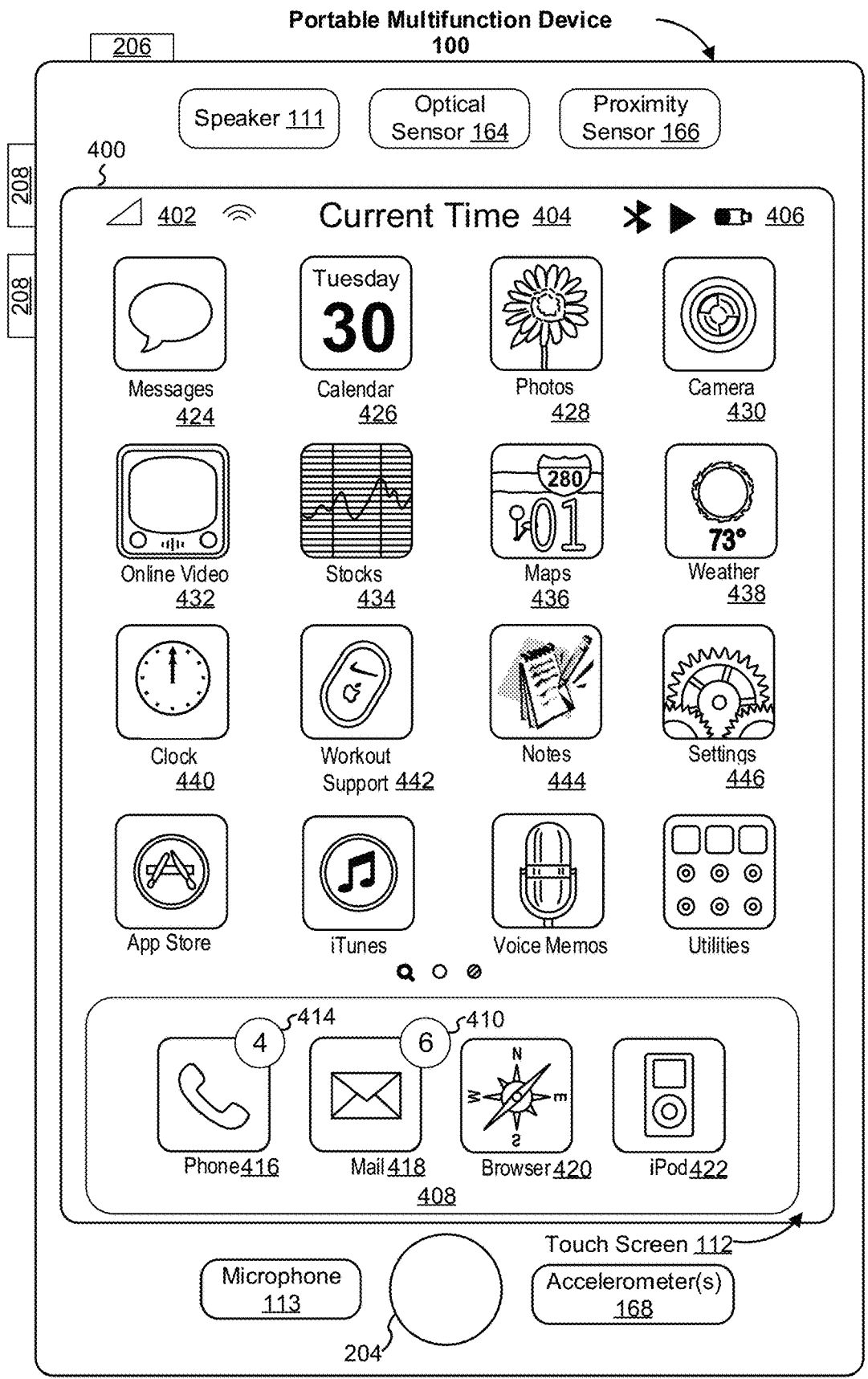
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 169-6, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
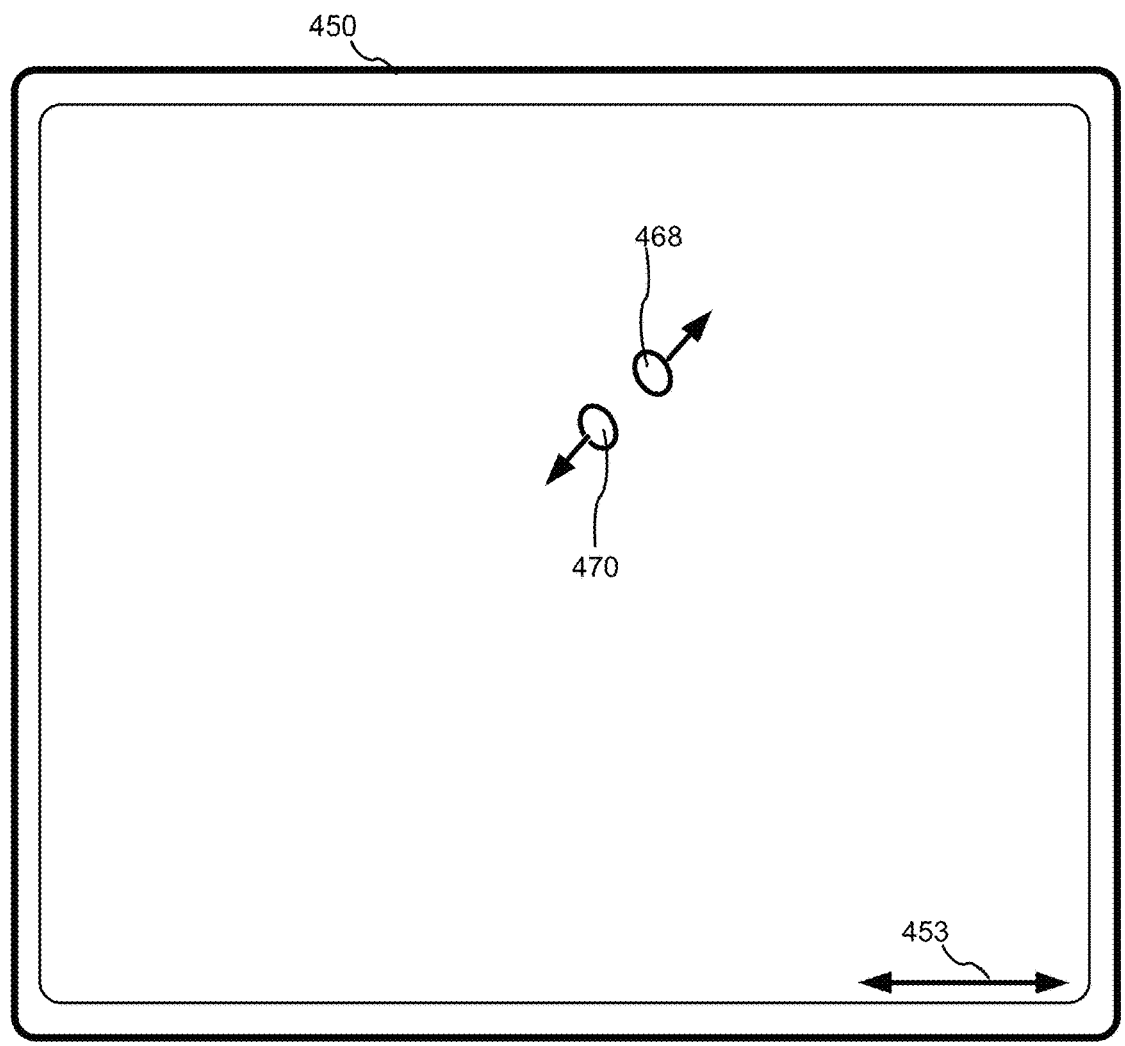
FIG. 4B illustrates an example user interface for a multifunction device with a touch-sensitive surface that is separate from the display in accordance with some embodiments.
Figure 4B:
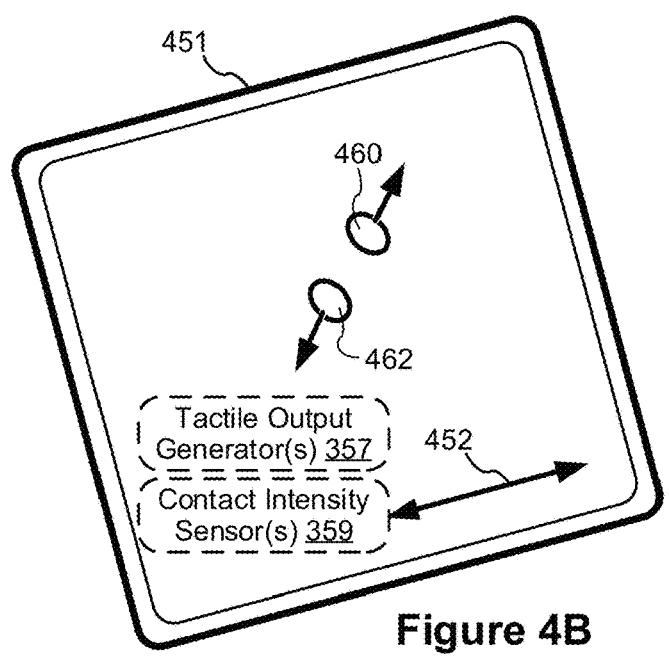

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Example CGR File Presenting Devices

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR Include Virtual Reality and Mixed Reality

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of Mixed Realities Include Augmented Reality and Augmented Virtuality

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 5 is a block diagram of an example operating architecture 500 in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the operating architecture 500 includes an electronic device 520A.

In some embodiments, the electronic device 520A is configured to present CGR content to a user. In some embodiments, the electronic device 520A includes a suitable combination of software, firmware, and/or hardware. According to some embodiments, the electronic device 520A presents, via a display 522, CGR content to the user while the user is physically present within a physical environment 503 that includes a table 507 within the field-of-view 511 of the electronic device 520A. As such, in some embodiments, the user holds the electronic device 520A in his/her hand(s). In some embodiments, while providing CGR content, the electronic device 520A is configured to display a virtual object (e.g., a virtual cylinder 509) and to enable video pass-through of the physical environment 503 (e.g., including a representation 517 of the table 507) on a display 522.

In some embodiments, the electronic device 520A corresponds to a head-mountable device (HMD), and the operating architecture 500 includes a controller (e.g., the controller 600 in FIG. 6) that is configured to manage and coordinate presentation of CGR content for the user. In some embodiments, the controller includes a suitable combination of software, firmware, and/or hardware. The controller is described in greater detail below with respect to FIG. 6. In some embodiments, the controller is a computing device that is local or remote relative to a scene. For example, the controller is a local server located within the scene. In another example, the controller is a remote server located outside of the scene (e.g., a cloud server, central server, etc.). In some embodiments, the controller is communicatively coupled with the HMD via one or more wired or wireless communication channels (e.g., BLUETOOTH, IEEE 802.11x, IEEE 802.16x, IEEE 802.3x, etc.). In another example, the controller is included within the enclosure of the HMD.

In some embodiments, the HMD is configured to present the CGR content to the user. In some embodiments, the HMD includes a suitable combination of software, firmware, and/or hardware. The HMD is described in greater detail below with respect to FIG. 7. In some embodiments, the functionalities of the controller are provided by and/or combined with the HMD.

According to some embodiments, the HMD presents CGR content to the user while the user is virtually and/or physically present within a scene.

In some embodiments, the user wears the HMD on his/her head. As such, the HMD includes one or more CGR displays provided to display CGR content. For example, in various embodiments, the HMD encloses the field-of-view of the user. In some embodiments, the HMD is replaced with a handheld device (such as a smartphone or tablet) configured to present CGR content, and rather than wearing the HMD the user holds the device with a display directed towards the field-of-view of the user and a camera directed towards a scene. In some embodiments, the handheld device can be placed within an enclosure that can be worn on the head of the user. In some embodiments, the HMD is replaced with a CGR chamber, enclosure, or room configured to present CGR content in which the user does not wear or hold the HMD.

FIG. 6 is a block diagram of an example of a controller 600 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the controller 600 includes one or more processing units 602 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 606, one or more communication interfaces 608 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 610, a memory 620, and one or more communication buses 604 for interconnecting these and various other components.

In some embodiments, the one or more communication buses 604 include circuitry that interconnects and controls communications between system components. In some embodiments, the one or more I/O devices 606 include at least one of a keyboard, a mouse, a touchpad, a joystick, one or more microphones, one or more speakers, one or more image sensors, one or more displays, and/or the like.

The memory 620 includes high-speed random-access memory, such as dynamic random-access memory (DRAM), static random-access memory (SRAM), double-data-rate random-access memory (DDR RAM), or other random-access solid-state memory devices. In some embodiments, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some embodiments, the memory 620 or the non-transitory computer readable storage medium of the memory 620 stores the following programs, modules and data structures, or a subset thereof including an optional operating system 630 and a CGR content module 640.

The operating system 630 includes procedures for handling various basic system services and for performing hardware dependent tasks. In some embodiments, the CGR content module 640 is configured to manage and coordinate presentation of CGR content for one or more users (e.g., a single set of CGR content for one or more users, or multiple sets of CGR content for respective groups of one or more users). To that end, in various embodiments, the CGR content module 640 includes a data obtaining unit 642, a tracking unit 644, a coordination unit 646, and a data transmitting unit 648.

In some embodiments, the data obtaining unit 642 is configured to obtain data (e.g., presentation data, interaction data, sensor data, location data, etc.) from at least an HMD. To that end, in various embodiments, the data obtaining unit 642 includes instructions and/or logic therefor, and heuristics and metadata therefor.

In some embodiments, the tracking unit 644 is configured to map a scene and to track the position/location of at least the HMD with respect to the scene. To that end, in various embodiments, the tracking unit 644 includes instructions and/or logic therefor, and heuristics and metadata therefor.

In some embodiments, the coordination unit 646 is configured to manage and coordinate the presentation of CGR content to the user by the HMD. To that end, in various embodiments, the coordination unit 646 includes instructions and/or logic therefor, and heuristics and metadata therefor.

In some embodiments, the data transmitting unit 648 is configured to transmit data (e.g., presentation data, location data, etc.) to at least the HMD. To that end, in various embodiments, the data transmitting unit 648 includes instructions and/or logic therefor, and heuristics and metadata therefor.

Although the data obtaining unit 642, the tracking unit 644, the coordination unit 646, and the data transmitting unit 648 are shown as residing on a single device (e.g., a controller), it should be understood that in other embodiments, any combination of the data obtaining unit 642, the tracking unit 644, the coordination unit 646, and the data transmitting unit 648 may be located in separate computing devices.

Moreover, FIG. 6 is intended more as functional description of the various features that may be present in a particular embodiment as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

FIG. 7 is a block diagram of an example of an HMD 700 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the HMD 700 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 710, one or more CGR displays 712, one or more optional interior- and/or exterior-facing image sensors 714, a memory 720, and one or more communication buses 704 for interconnecting these and various other components.

In some embodiments, the one or more communication buses 704 include circuitry that interconnects and controls communications between system components. In some embodiments, the one or more I/O devices and sensors 706 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 707A, one or more speakers 707B, a haptics engine, one or more depth sensors (e.g., a structured light, a time-of-flight, or the like), and/or the like.

In some embodiments, the one or more CGR displays 712 are configured to display CGR content to the user. In some embodiments, the one or more CGR displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 712 correspond to diffractive, reflective, polarized, holographic, etc. waveguide displays. For example, the HMD 700 includes a single CGR display. In another example, the HMD 700 includes a CGR display for each eye of the user.

In some embodiments, the one or more image sensors 714 are configured to obtain image data that corresponds to at least a portion of the face of the user that includes the eyes of the user (any may be referred to as an eye-tracking camera). In some embodiments, the one or more image sensors 714 are configured to be forward-facing so as to obtain image data that corresponds to the scene as would be viewed by the user if the HMD 700 was not present (and may be referred to as a scene camera). The one or more optional image sensors 714 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 720 includes high-speed random-access memory, such as DRAM, SRAM, DDR RAM, or other random-access solid-state memory devices. In some embodiments, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some embodiments, the memory 720 or the non-transitory computer readable storage medium of the memory 720 stores the following programs, modules and data structures, or a subset thereof including an optional operating system 730 and a CGR presentation module 740.

The operating system 730 includes procedures for handling various basic system services and for performing hardware dependent tasks. In some embodiments, the CGR presentation module 740 is configured to present CGR content to the user via the one or more CGR displays 712 and/or the I/O devices and sensors 706 (such as the one or more speakers 707B). To that end, in various embodiments, the CGR presentation module 740 includes a data obtaining unit 742, a CGR content presenting unit 744, and a data transmitting unit 746.

In some embodiments, the data obtaining unit 742 is configured to obtain data (e.g., presentation data, interaction data, sensor data, location data, etc.) from at least a controller. In various embodiments, the data obtaining unit obtains a CGR file. To that end, in various embodiments, the data obtaining unit 742 includes instructions and/or logic therefor, and heuristics and metadata therefor.

In some embodiments, the CGR content presenting unit 744 is configured to present CGR content to a user. In various embodiments, the CGR content presenting unit 744 presents CGR content of the CGR file according to rules set forth in the CGR file. To that end, in various embodiments, the CGR content presenting unit 744 includes instructions and/or logic therefor, and heuristics and metadata therefor.

In some embodiments, the data transmitting unit 746 is configured to transmit data (e.g., presentation data, location data, etc.) to at least a controller. To that end, in various embodiments, the data transmitting unit 746 includes instructions and/or logic therefor, and heuristics and metadata therefor.

Although the data obtaining unit 742, the CGR content presenting unit 744, and the data transmitting unit 746 are shown as residing on a single device (e.g., an HMD), it should be understood that in other embodiments, any combination of the data obtaining unit 742, the CGR content presenting unit 744, and the data transmitting unit 746 may be located in separate computing devices.

Moreover, FIG. 7 is intended more as a functional description of the various features that could be present in a particular embodiment as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

In various embodiments, CGR content is presented to a user from a CGR file that includes data regarding CGR content and further includes data describing how the CGR content is to presented. In various embodiments, the CGR file includes data regarding one or more CGR scenes. The CGR file further includes data regarding triggers (e.g., detectable events) for presentation of the various CGR scenes. As an example, in various embodiments, the CGR file includes data regarding a CGR scene representing a gameboard and also includes data indicating that the CGR scene representing the gameboard is to be presented when a horizontal planar surface is detected in the field-of-view of a scene camera.

The CGR file further includes data regarding one or more CGR objects associated with a respective CGR scene. The CGR file further includes data regarding triggers regarding actions of the CGR objects. As an example, in various embodiments, the CGR file includes data regarding a plurality of CGR objects associated with the CGR scene representing the gameboard, each of the plurality of CGR objects representing a game piece. The CGR file also includes data indicating actions of the plurality of CGR objects in response to detected triggers, e.g., when the collision of two game pieces is detected, the game pieces cease to be displayed.

Generating such a CGR file can be a difficult and time-consuming process, requiring expert knowledge in, for example, 3D object design and application coding. This presents a high barrier to the generation of quality CGR applications. Accordingly, in various embodiments, a graphical user interface (GUI) is provided to simplify the generation of a CGR file that can be read (or executed) by a user device to present a CGR application including CGR content described by the CGR file.

User Interfaces and Associated Processes

Attention is now directed toward embodiments of user interfaces ("UI") and associated processes that may be implemented on an electronic device, such as a portable multifunction device (PMD) 100 with a display, a touch-sensitive surface, and optionally one or more sensors to detect intensity of contacts with the touch-sensitive surface, or a device 300 with one or more processors, non-transitory memory, a display, and an input device.

FIGS. 8A-8DF illustrate example user interfaces for generating CGR files in accordance with some embodiments. The user interfaces in these figures are used to illustrate the processes described below, including the processes in FIGS. 9-17. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 8A:
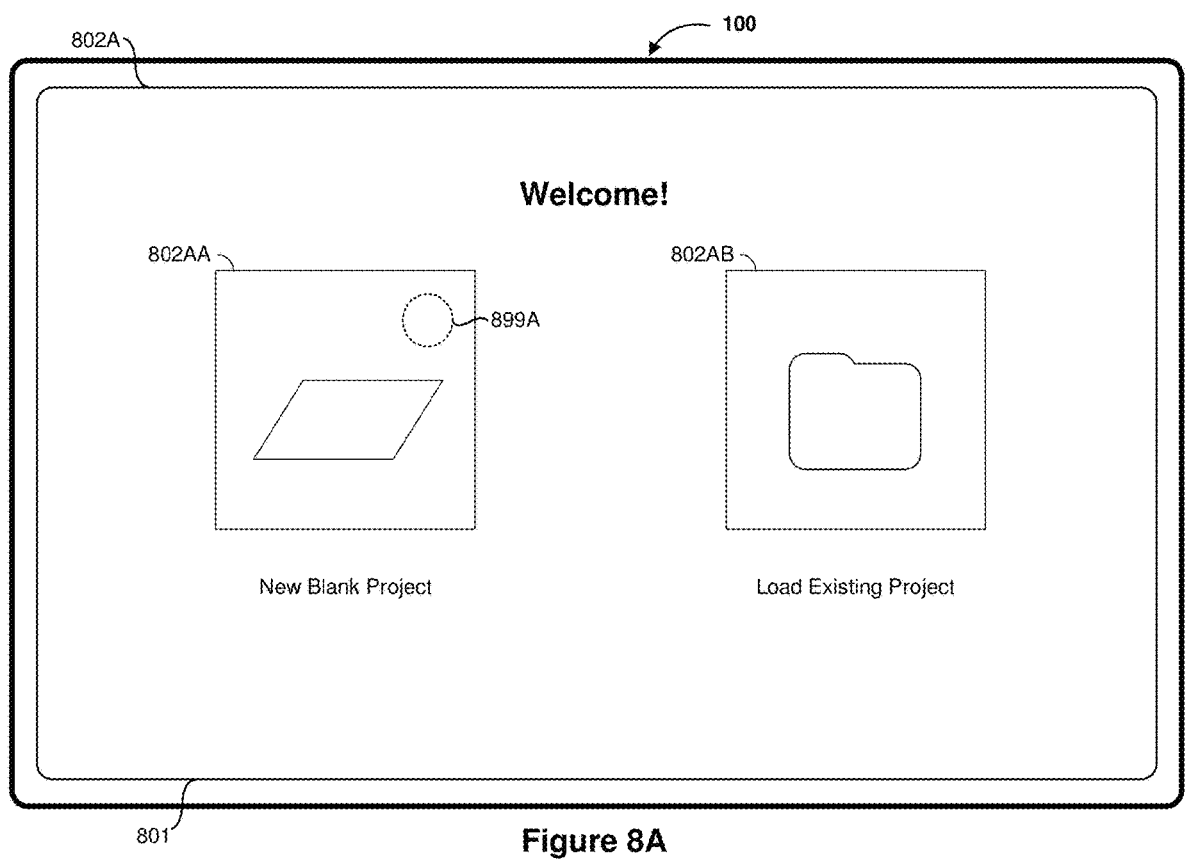
FIGS. 8A-8DF illustrate example user interfaces for generating a CGR file in accordance with some embodiments.

FIG. 8A illustrates a CGR file composing user interface 801 displayed by a portable multifunctional device 100 (hereinafter "device 100"). In various embodiments, the CGR file composing user interface 801 is displayed by a CGR file composing application executed by the device 100.

In FIG. 8A, the CGR file composing user interface 801 includes a welcome user interface 802A with a new-project affordance 802AA for creating a new CGR project (which can be saved as and/or compiled into a CGR file) and a load-project affordance 802AB for loading a CGR project for editing.

FIG. 8A illustrates a user input 899A directed to the new-project affordance 802AA. In various embodiments, the user input 899A corresponds to a contact (e.g., a tap) detected at the location of the new-project affordance 802AA.

Figure 8B:
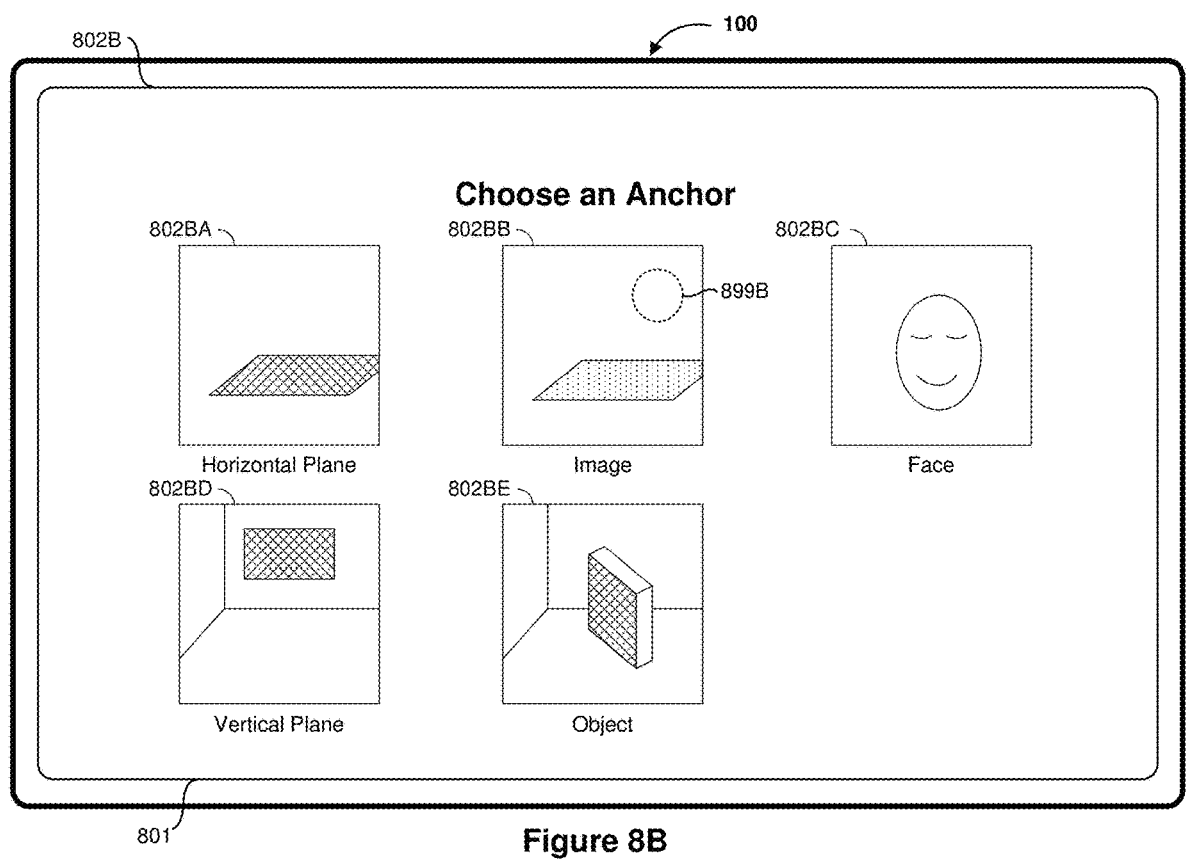

FIG. 8B illustrates the CGR file composing user interface 801 in response to detecting the user input 899A directed to the new-project affordance 802AA. In FIG. 8B, the CGR file composing user interface 801 includes an anchor-select user interface 802B for selecting an anchor of a first CGR scene of the project. When a CGR application corresponding to the project is presented and the anchor is detected in a scene camera image of a real environment, the corresponding CGR scene is presented in association with (e.g., apparently tied or anchored to) the anchor.

The anchor-select user interface 802B includes a plurality of anchor selection affordances 802BA-802BE. The plurality of anchor-select affordances 802BA-802BE includes a horizontal plane anchor selection affordance 802BA for creating a CGR project including a CGR scene anchored to a horizontal plane. The plurality of anchor-select affordances 802BA-802BE includes an image anchor selection affordance 802BB for creating a CGR project including a CGR scene anchored to a selected or captured image. The plurality of anchor-select affordances 802BA-802BE includes a face anchor selection affordance 802BC for creating a CGR project including a CGR scene anchored to a human face. The plurality of anchor-select affordances 802BA-802BE includes a vertical plane anchor selection affordance 802BD for creating a CGR project including a CGR scene anchored to a vertical plane. The plurality of anchor-select affordances 802BA-802BE includes an object anchor selection affordance 802BE for creating a CGR project including a CGR scene anchored to a selected or scanned object.

FIG. 8B illustrates a user input 899B directed to the image anchor selection affordance 802BB. In various embodiments, the user input 899B corresponds to a contact (e.g., a tap) detected at the location of the image anchor selection affordance 802BB.

Figure 8C:
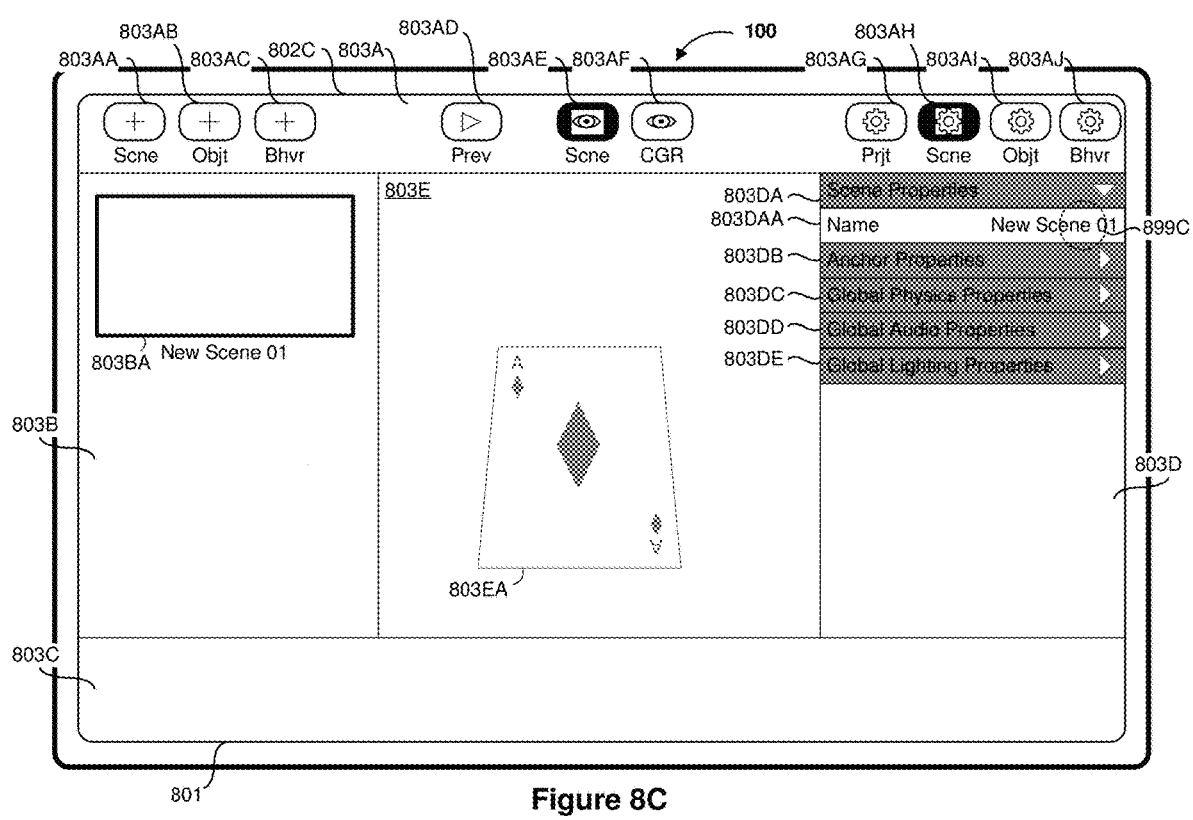

FIG. 8C illustrates the CGR file composing user interface 801 in response to detecting the user input 899B directed to the image anchor selection affordance 802BB (and, possibly, additional user inputs selecting or capturing an image of a playing card). In FIG. 8C, the CGR file composing user interface 801 includes a project management user interface 802C including a plurality of project management user interface regions 803A-803E.

The plurality of project management user interface regions 803A-803E includes a toolbar region 803A. The toolbar region 803A includes a plurality of CGR content addition affordances 803AA-803AC. The plurality of CGR content addition affordances 803AA-803AC includes a CGR scene addition affordance 803AA for adding a CGR scene to the project, a CGR object addition affordance 803AB for adding a CGR object to the currently selected CGR scene, and a behavior addition affordance 803AC for adding a behavior to the currently selected CGR scene.

The toolbar region 803A includes a preview affordance 803AD for presenting a preview of the project in a CGR environment.

The toolbar region 803A includes a plurality of view affordances 803AE-803AF including an object view affordance 803AE for viewing the currently selected CGR scene in a view region 803E (described further below) in a scene mode (in which the user inputs directed to the view region 803E change the perspective of the view of the currently selected CGR scene) and a CGR view affordance 803AF for viewing the currently selected CGR scene in the view region 803A in a CGR mode (in which movement of the device 100 changes the perspective of the view of the currently selected CGR scene).

The toolbar region 803A includes a plurality of settings affordances 803AG-803AJ for presenting different settings in a settings region 803D (described further below). The settings affordances 803AG-803AJ include a project settings affordance 803AG for presenting project settings of the project in the settings region 803D, a scene settings affordance 803AH for presenting scene settings of the currently selected CGR scene in the settings region 803D, an object settings affordance 803AI for presenting object settings of a currently selected CGR object in the settings region 803D, and a behavior settings affordance 803AJ for presenting behavior settings of a currently selected behavior in the settings region 803D.

The plurality of project management user interface regions 803A-803E includes a scene list region 803B that includes respective affordances for each CGR scene of the project. In FIG. 8C, where the project only includes a first CGR scene, the scene list region 803B includes only a first CGR scene affordance 803BA corresponding to a first CGR scene. In various embodiments, the first CGR scene affordance 803BA (and other scene affordances) includes the name of the CGR scene (e.g., "New Scene 01") displayed below a pictorial representation of the CGR scene.

The plurality of project management user interface regions 803A-803E includes a behavior region 803C that includes respective affordances for each behavior of the currently selected CGR scene. In FIG. 8C, where no behaviors have been defined for the first CGR scene, the behavior region 803C is blank.

The plurality of project management user interface regions 803A-803E includes a settings region 803D for presenting a plurality of setting manipulation affordances. In FIG. 8C, as the scene settings affordance 803AH is selected (as indicated by the different display of the scene settings affordance 803AH as compared to the other settings affordances 803AG, 803AI, and 803AJ), the settings region 803D includes a plurality of scene setting manipulation affordances presented via collapsible/expandable scene setting menus 803DA-803DE (of which only a single scene setting manipulation affordance, the scene name manipulation affordance 803DAA for changing a name of the currently selected CGR scene, is shown in FIG. 8C).

The scene settings menus 803DA-803DE include a scene properties menu 803DA including scene settings manipulation affordances for changing scene properties of the currently selected CGR scene, an anchor properties menu 803DB including scene setting manipulation affordances for changing anchor properties of the currently selected CGR scene, a global physics properties menu 803DC including scene setting manipulation affordances for changing physics properties of the currently selected CGR scene (such as whether CGR objects interact and/or a presence and/or strength of gravity), a global audio properties menu 803DD including scene setting manipulation affordances for changing audio properties of the currently selected CGR scene (such as a sound to be played while the CGR scene is presented, e.g., a soundtrack, or audio effects to be applied to real sounds detected while the CGR scene is presented, e.g., a reverb or an attenuation), and a global lighting properties menu 803DE for changing lighting properties of the currently selected CGR scene (such as a directional or omnidirectional light to be rendered when the CGR scene is presented or how real light affects display of CGR objects of the CGR scene).

The plurality of project management user interface regions 803A-803E includes a view region 803E for viewing the currently selected CGR scene, receiving user inputs manipulating the perspective of viewing the currently selected CGR scene (e.g., a virtual camera position) while in an object view mode, and manipulating CGR objects of the currently selected CGR scene.

The view region 803E includes a representation of the anchor 803EA associated with the currently selected CGR scene (in FIG. 8C, a representation of the selected image (e.g., the Ace of Diamonds)), and, as described below, representations of CGR objects associated with the currently selected CGR scene.

FIG. 8C illustrates a user input 899C directed to the scene name manipulation affordance 803DAA. In various embodiments, the user input 899C corresponds to a contact (e.g., a tap) detected at the location of the scene name manipulation affordance 803DAA.

Figure 8D:
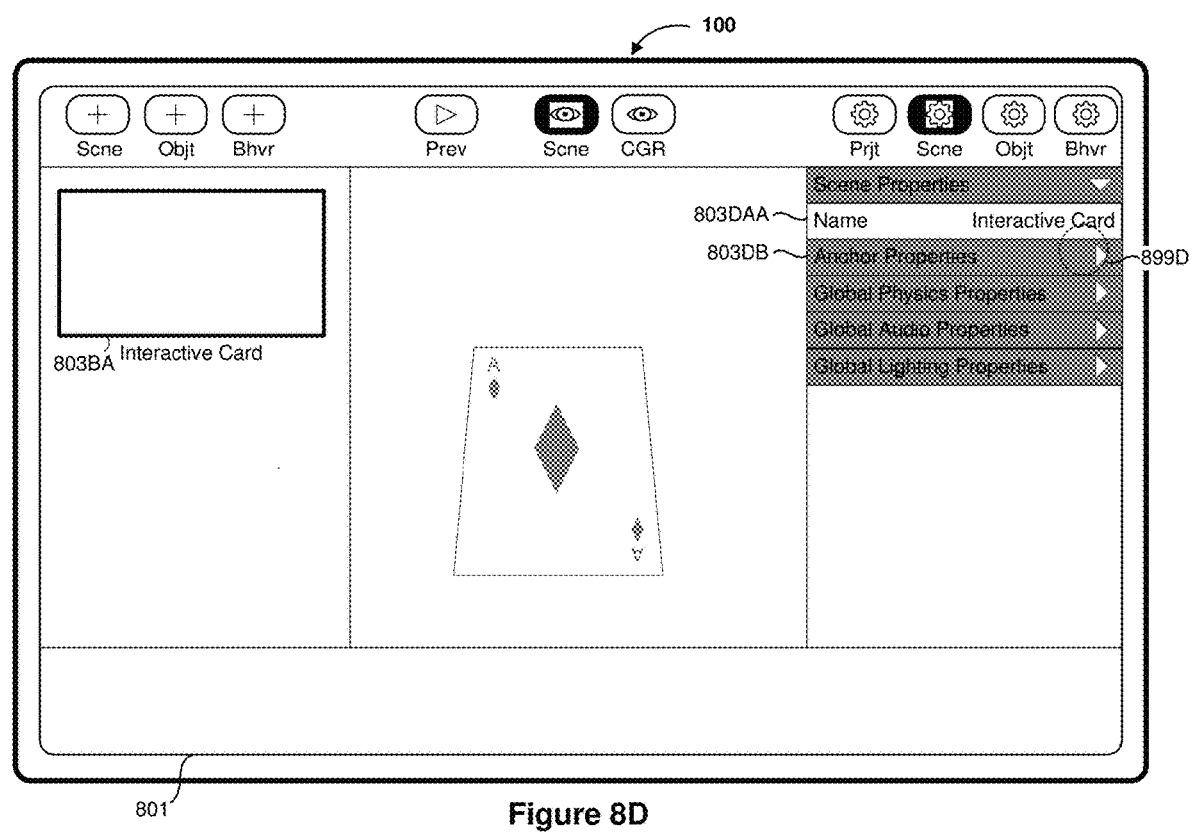

FIG. 8D illustrates the CGR file composing user interface 801 in response to detecting the user input 899C directed to the scene name manipulation affordance 803DAA (and, possibly, additional user inputs defining a new name for the first CGR scene).

In FIG. 8D, the scene name manipulation affordance 803DAA has changed to indicate the new name for the first CGR scene (e.g., "Interactive Card"). Similarly, the first CGR scene affordance 803BA has changed to indicate the new name for the first CGR scene.

FIG. 8D illustrates a user input 899D directed to the anchor properties menu 803DB. In various embodiments, the user input 899D corresponds to a contact (e.g., a tap) detected at the location of the anchor properties menu 803DB.

Figure 8E:
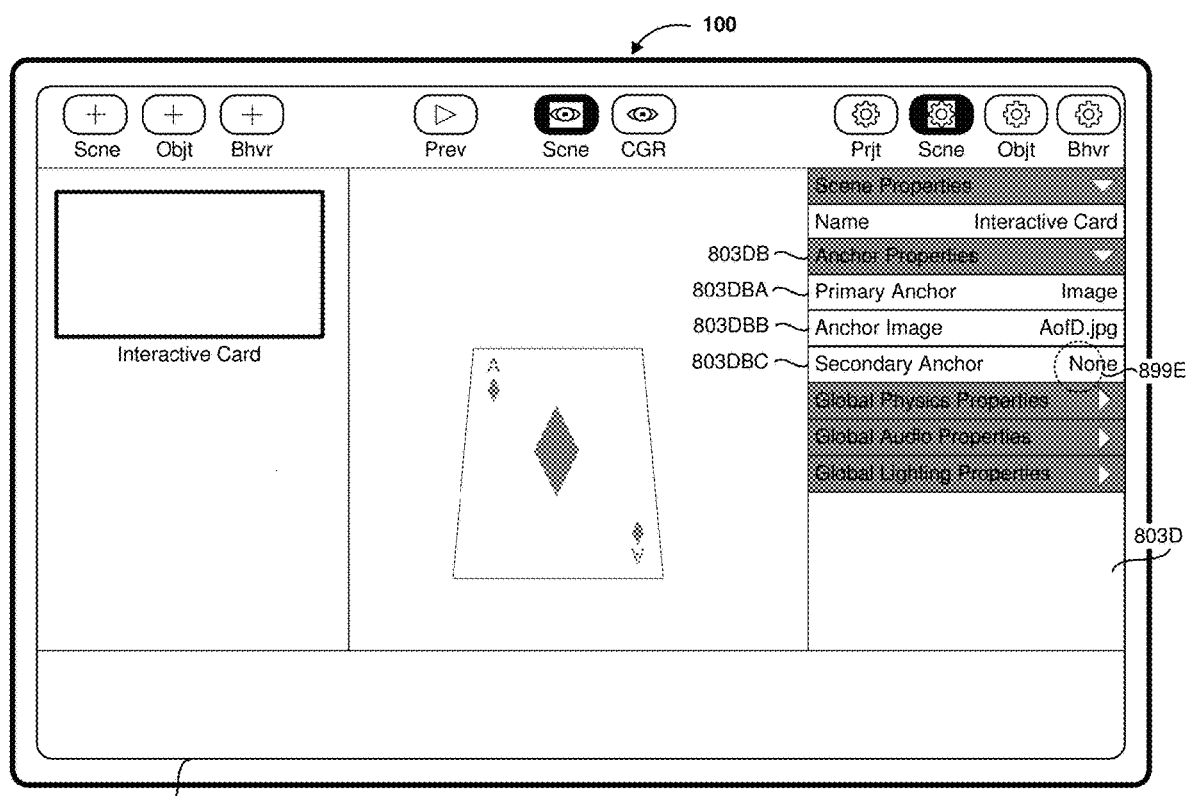

FIG. 8E illustrates the CGR file composing user interface 801 in response to detecting the user input 899D directed to the anchor properties menu 803DB. In FIG. 8E, the anchor properties menu 803DB is expanded (within the settings region 803D) to present a primary anchor affordance 803DBA for changing the primary anchor (selected previously via the anchor selection user interface 802B in FIG. 8D) of the currently selected CGR scene, an anchor image affordance 803DBB (displayed when the primary anchor is an image) for changing the anchor image, and a secondary anchor affordance 803DBC for selecting or changing the secondary anchor.

In various embodiments, when a CGR application corresponding to the project is presented and the primary anchor is not detected in a scene camera image of a real environment, but (optionally after a threshold amount of time failing to detect the primary anchor) the secondary anchor is detected in a scene camera image, the corresponding CGR scene is presented in association with (e.g., apparently tied or anchored to) the secondary anchor.

FIG. 8E illustrates a user input 899E directed to the secondary anchor affordance 803DBC. In various embodiments, the user input 899E corresponds to a contact (e.g., a tap) detected at the location of the secondary anchor affordance 803DBC.

Figure 8F:
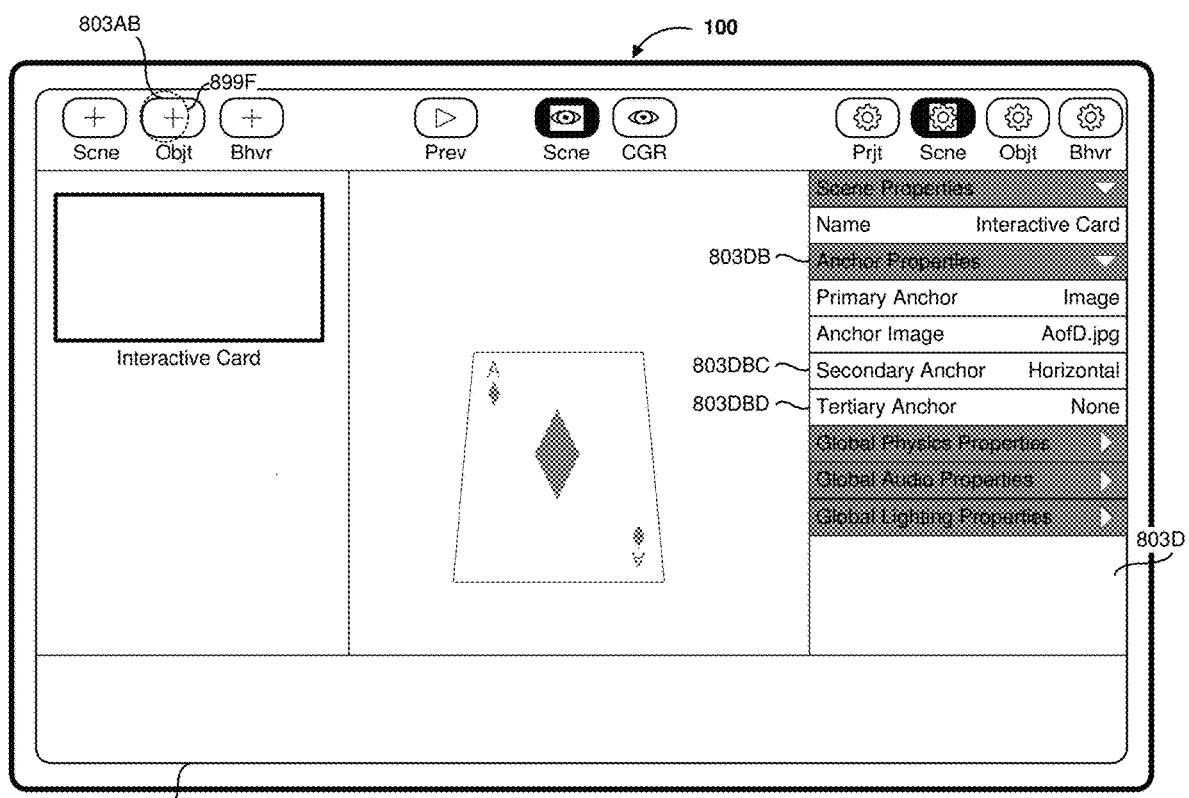

FIG. 8F illustrates the CGR file composing user interface 801 in response to detecting the user input 899E directed to the secondary anchor affordance 803DBC (and, possibly, additional user inputs selecting a horizontal plane as the secondary anchor). In FIG. 8F, the anchor properties menu 803DB is further expanded (within the settings region 803D) to include a tertiary anchor affordance 803DBD for selecting a tertiary anchor.

In various embodiments, when a CGR application corresponding to the project is presented and neither the primary anchor nor the secondary anchor are detected in a scene camera image of a real environment, but (optionally after a threshold amount of time failing to detect the primary anchor and the secondary anchor) the tertiary anchor is detected in a scene camera image, the corresponding CGR scene is presented in association with (e.g., apparently tied or anchored to) the tertiary anchor.

FIG. 8F illustrates a user input 899F directed to the CGR object addition affordance 803AB. In various embodiments, the user input 899F corresponds to a contact (e.g., a tap) detected at the location of the CGR object addition affordance 803AB.

Figure 8G:
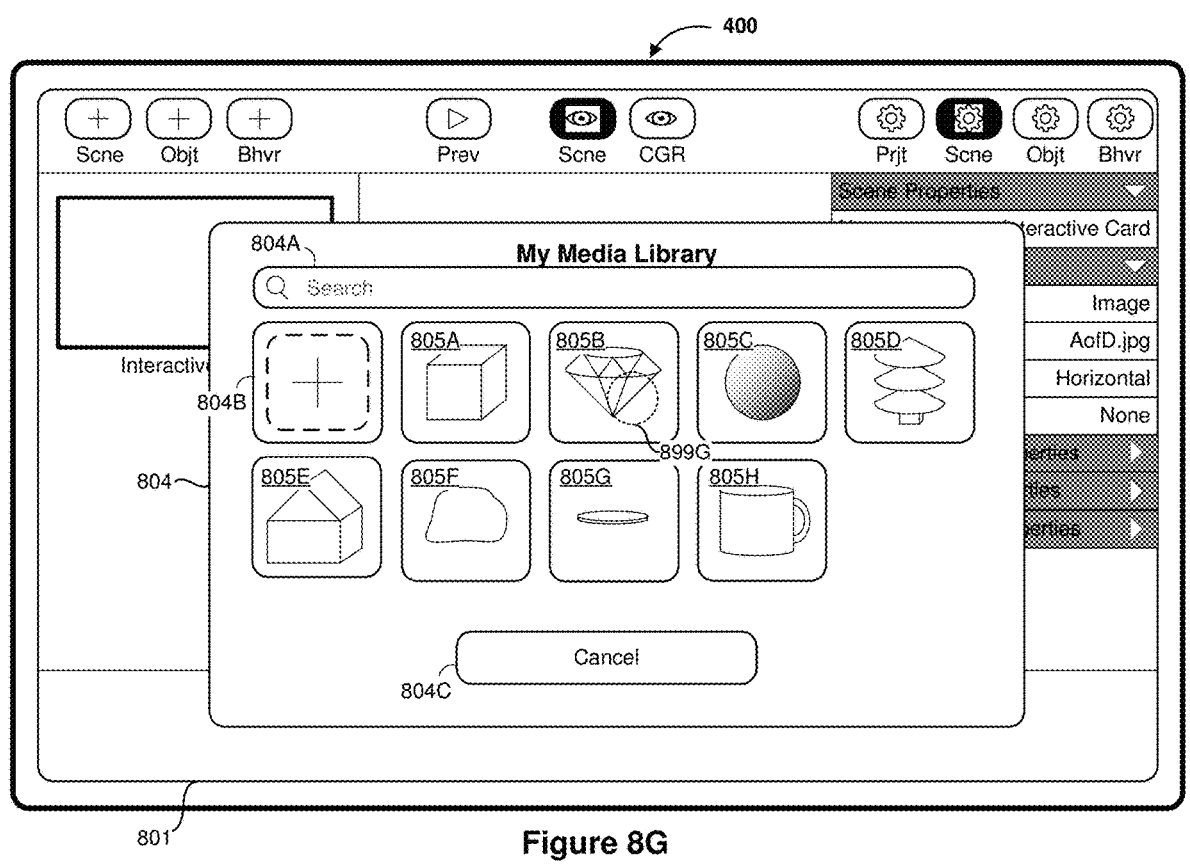

FIG. 8G illustrates the CGR file composing user interface 801 in response to detecting the user input 899F directed to the CGR object addition affordance 803AB. In FIG. 8G, the CGR file composing user interface 801 includes a media library user interface 804 in the form of a pop-up window.

The media library user interface 804 includes a plurality of particular CGR object addition affordances 805A-805H for adding respective CGR objects to the currently selected CGR scene. In various embodiments, each of the plurality of particular CGR object addition affordances 805A-805H corresponds to a particular CGR object. In various embodiments, each of the plurality of particular object addition affordances 805A-805H corresponds to a particular CGR object associated with a particular CGR object file stored in a local or remote media library (e.g., a media library stored on the device 100 or stored at a remote location associated with the device 100, such as in the cloud).

The plurality of particular CGR object addition affordances 805A-805H includes a cube addition affordance 805A for adding a cube to the currently selected CGR scene, a diamond addition affordance 805B for adding a diamond to the currently selected CGR scene, a sphere addition affordance 805C for adding a sphere to the currently selected CGR scene, a tree addition affordance 805D for adding a tree to the currently selected CGR scene, a building addition affordance 805E for adding a building to the currently selected CGR scene, a rock addition affordance 805F for adding a rock to the currently selected CGR scene, a plate addition affordance 805G for adding a plate to the currently selected CGR scene, and a cup addition affordance 805H for adding a cup to the currently selected CGR scene.

The media library user interface 804 includes a search bar 804A for receiving user input comprising text. In various embodiments, the text is compared to keywords or other metadata associated with CGR object files in the media library to present a subset of the particular CGR object addition affordances 805A-805H.

The media library user interface 804 includes an add-to-library affordance 804B for adding CGR object files to the media library. In various embodiments, when a user input directed to the add-to-library affordance 804B is detected, an add-to-library user interface is presented that provides options for searching other CGR object file repositories for a CGR object file (or a plurality of CGR object files) to select and add to the media library.

The media library user interface 804 includes a cancel affordance 804C for dismissing (ceasing to display) the media library user interface 804, returning the CGR file composing user interface 801 to the state illustrated in FIG. 8F.

FIG. 8G illustrates a user input 899G directed to the diamond addition affordance 805B. In various embodiments, the user input 899G corresponds to a contact (e.g., a tap) detected at the location of the diamond addition affordance 805B.

Figure 8H:
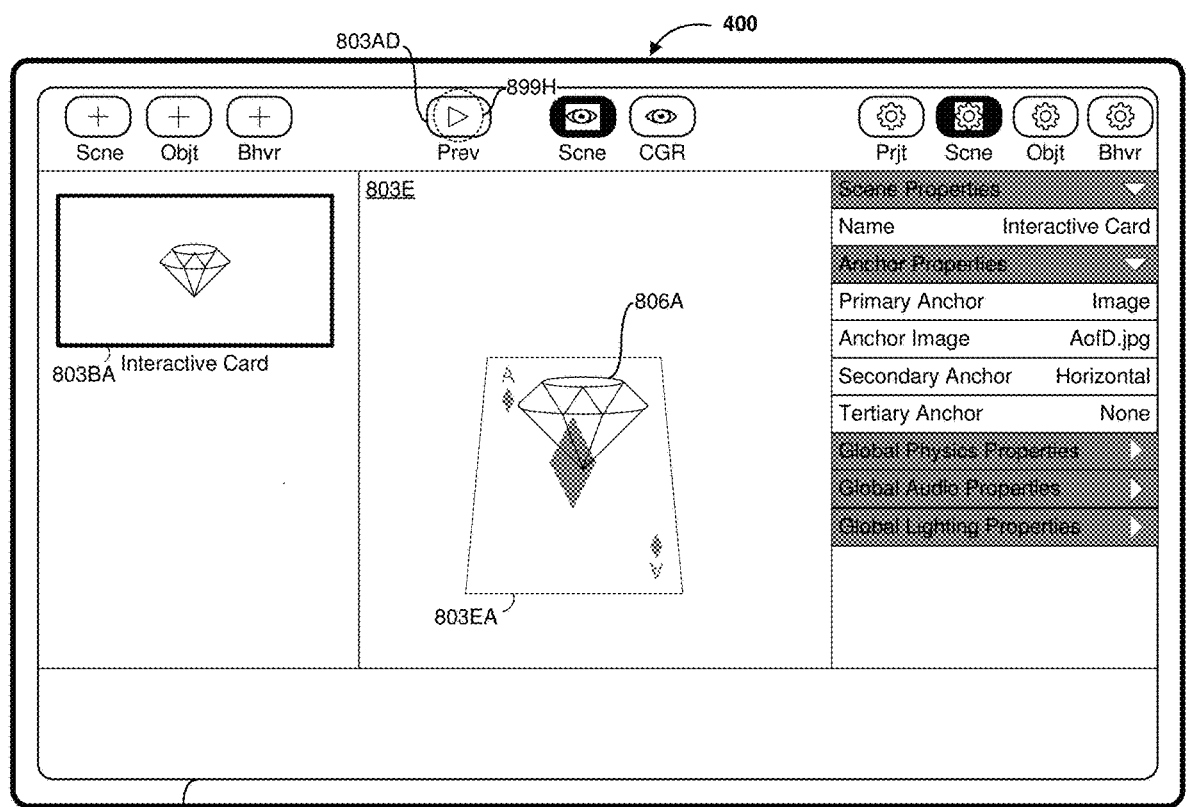

FIG. 8H illustrates the CGR file composing user interface 801 in response to detecting the user input 899G directed to the diamond addition affordance 805B. In FIG. 8H, the media library user interface 804 ceases to be displayed. In FIG. 8H, the view region 803E includes a representation of a diamond CGR object 806A displayed at a particular location over the representation of the anchor 803EA. Relatedly, the first CGR scene affordance 803BA has changed to indicate that the first CGR scene includes a diamond CGR object.

FIG. 8H illustrates a user input 899H directed to the preview affordance 803AD. In various embodiments, the user input 899H corresponds to a contact (e.g., a tap) detected at the location of the preview affordance 803AD.

Figure 8I:
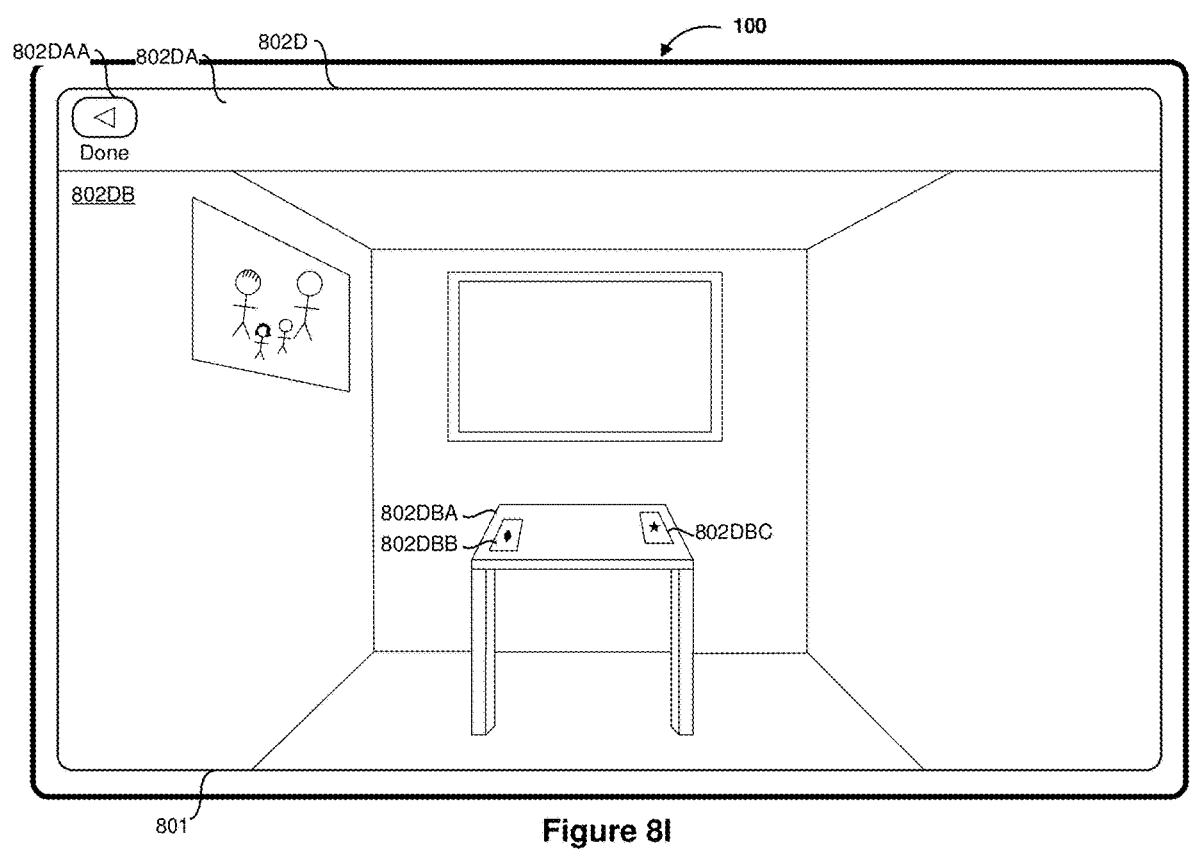

FIG. 8I illustrates the CGR file composing user interface 801 in response to detecting the user input 899H directed to the preview affordance 803AD. In FIG. 8I, the CGR file composing user interface 801 includes a preview user interface 802D. The preview user interface 802D includes a toolbar region 802DA and a preview display region 802DB. The toolbar region 802DA includes a done affordance 802DAA for exiting the preview user interface 802D and returning to the project management user interface 802C (e.g., of FIG. 8H). The preview display region 802DB includes a scene camera image taken by the device 100 in a physical environment (e.g., using a scene camera or a camera disposed on an opposite side of the device 100 than illustrated in FIG. 8I). The physical environment includes, among other things, a table, an Ace of Diamonds playing card, and an Ace of Stars playing card. Accordingly, the scene camera image includes a representation of the table 802DBA, a representation of the Ace of Diamonds playing card 802DBB, and a representation of the Ace of Stars playing card 802DBC.

Figure 8J:
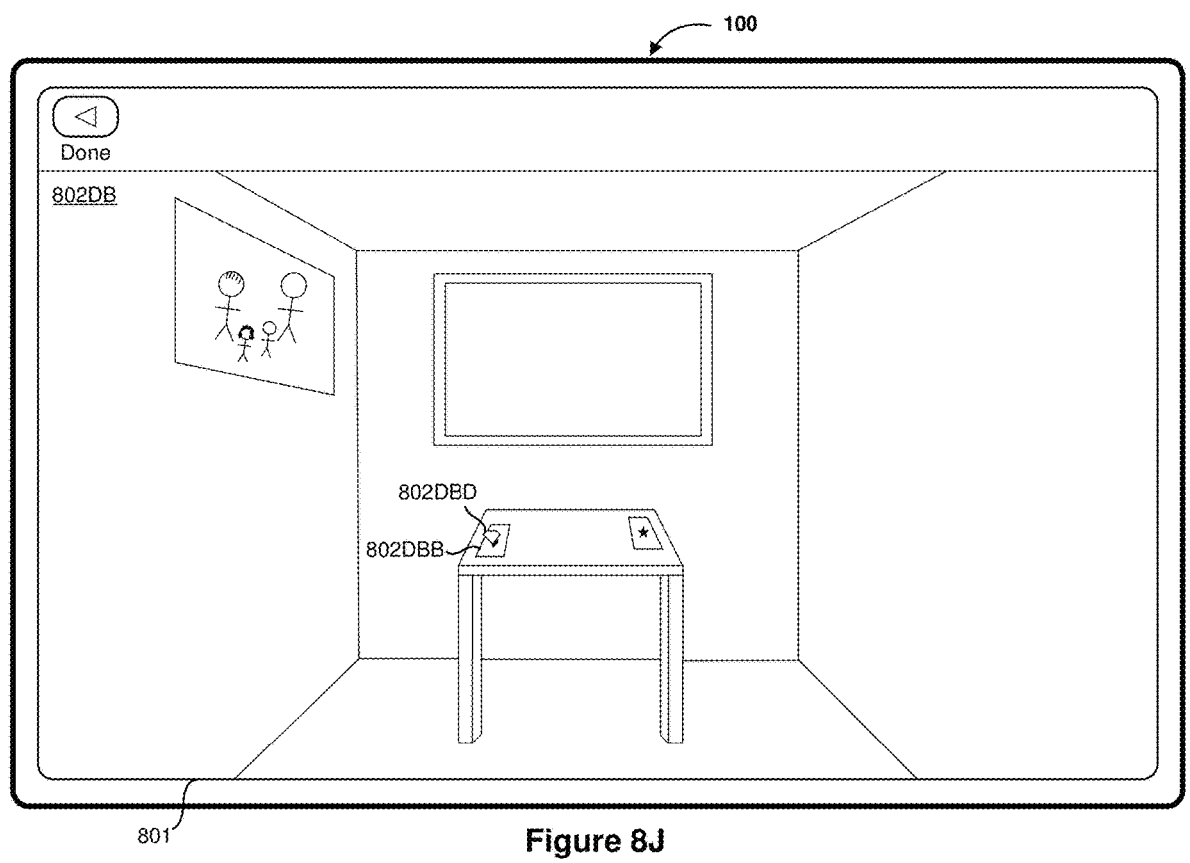

FIG. 8J illustrates the CGR file composing user interface 801 in response to the device 100 detecting a portion of the scene camera image (e.g., the representation of the Ace of Diamonds playing card 802DBB) matching the anchor image (e.g., AofD.jpg). In FIG. 8J, the preview display region 802DB includes the diamond CGR object 802DBD displayed anchored to the representation of the Ace of Diamonds playing card 802DBB. In particular, the diamond CGR object 802DBD is displayed anchored to the representation of the Ace of Diamonds playing card 802DBB at a particular location corresponding to the particular location that the representation of the diamond CGR object 806A is displayed at over the representation of the anchor 803EA in FIG. 8H.

Figure 8K:
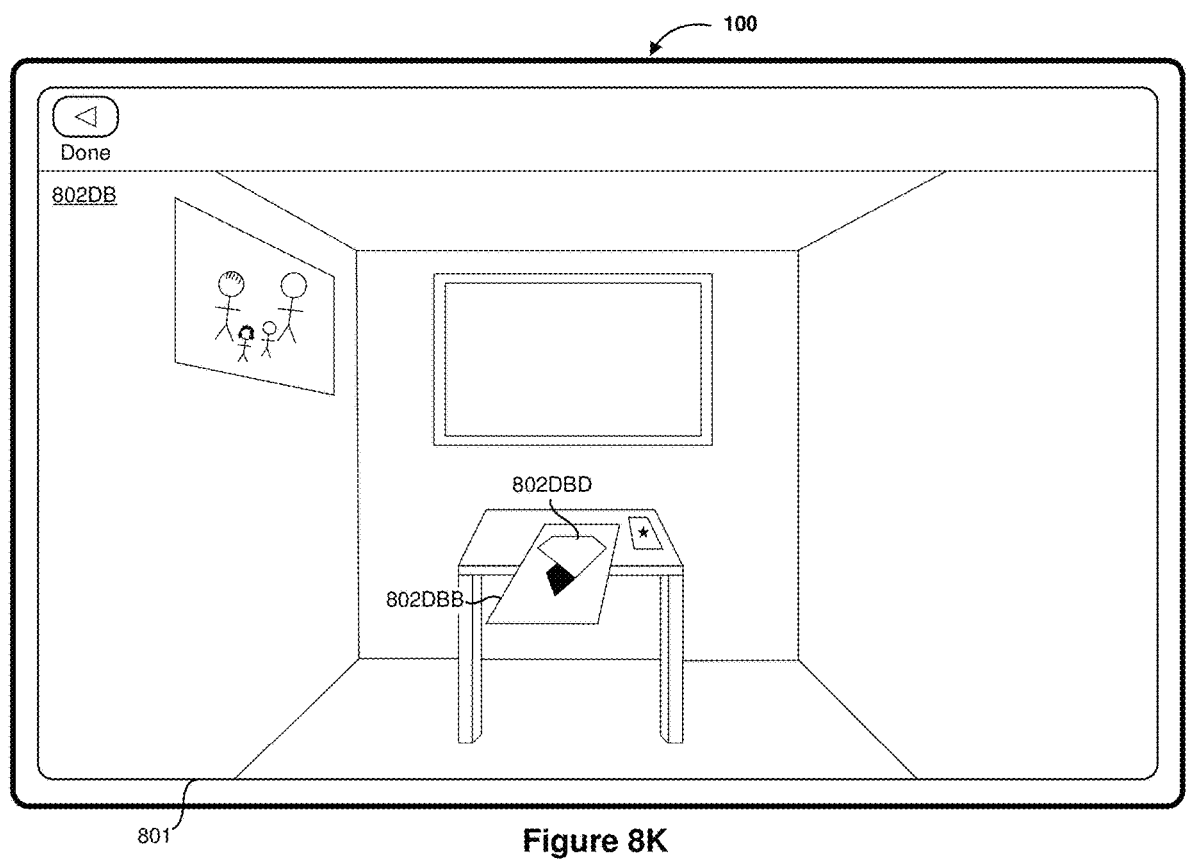

FIG. 8K illustrates the CGR file composing user interface 801 in response to the Ace of Diamonds playing card changing location in the physical environment. In FIG. 8K, the preview display region 802DB includes the representation of the Ace of Diamonds playing card 802DBB displayed at a different location. The preview display region 802DB further includes the diamond CGR object 802DBD at a different location, still displayed anchored to the representation of the Ace of Diamonds playing card 802DBB.

Figure 8L:
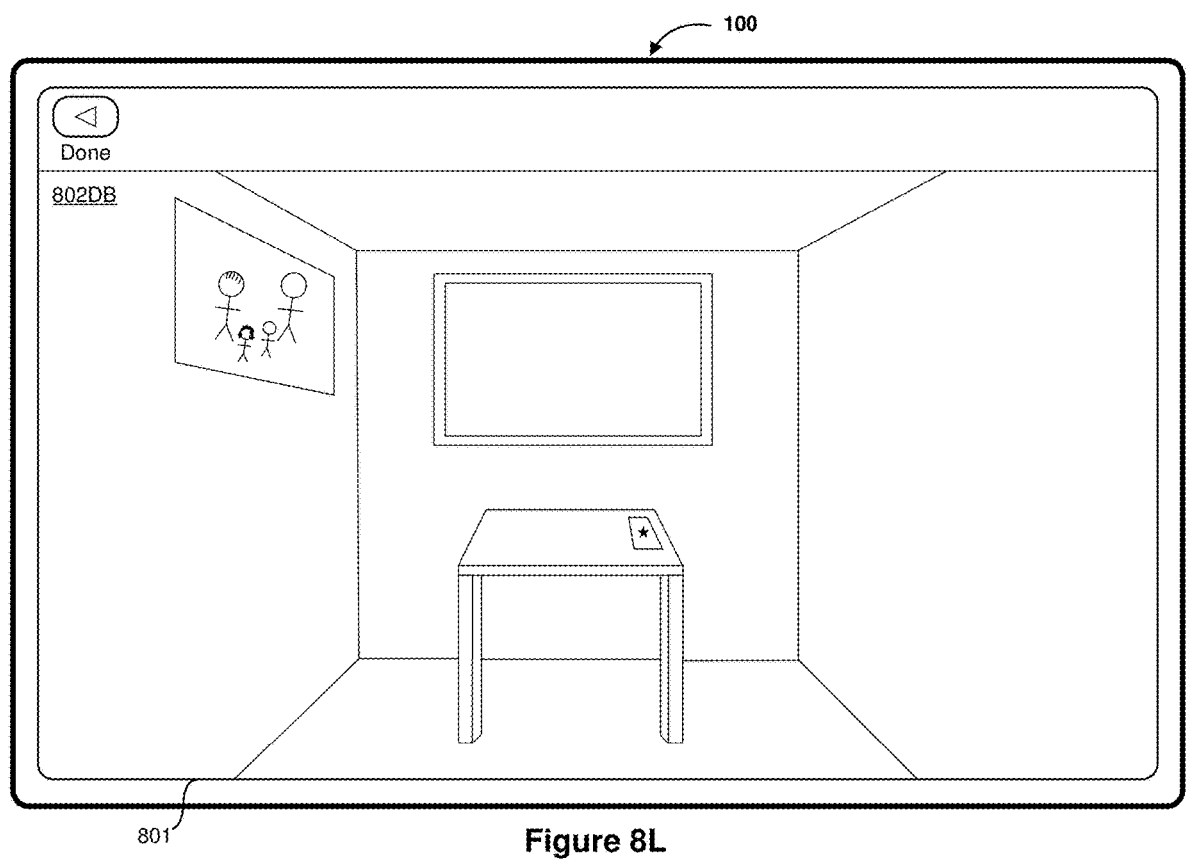

FIG. 8L illustrates the CGR file composing user interface 801 in response to the Ace of Diamonds play card moving out of the field-of-view of the scene camera. In FIG. 8L, the preview display region 802DB does not include the representation of the Ace of Diamonds playing card 802DBB nor the diamond CGR object 802DBD.

Figure 8M:
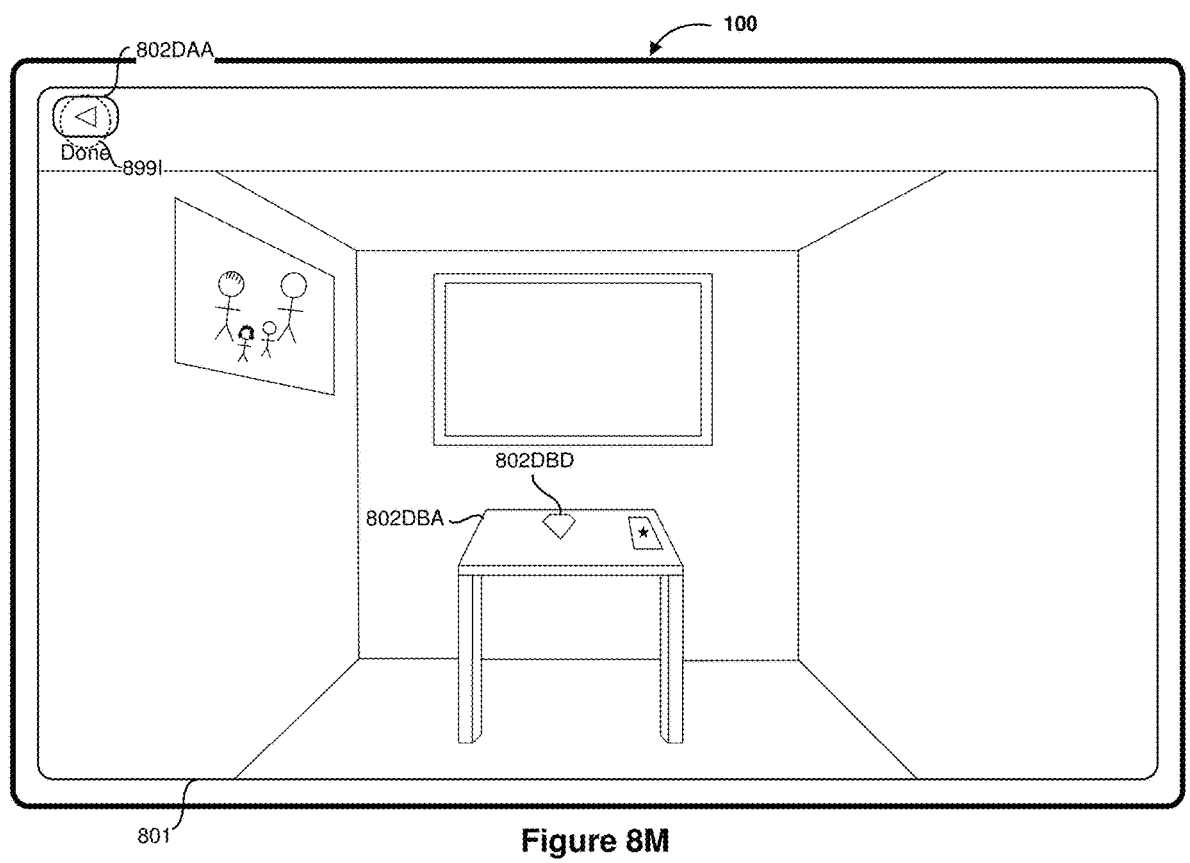

FIG. 8M illustrates the CGR file composing user interface 801 in response to the device 100 detecting a representation of a horizontal plane in a portion of the scene camera image (and, in various embodiments, in response to failing to detect a portion of the scene camera image matching the anchor image for at least a threshold amount of time, e.g., 3 seconds). In FIG. 8M, because the primary anchor, a representation matching the anchor image (e.g., AofD.jpg), is not detected in the scene image, but the secondary anchor, a representation of a horizontal plane is detected, the diamond CGR object 802DBD is displayed anchored to the representation of the horizontal plane (e.g., to the representation of the table 802DBA).

FIG. 8M illustrates a user input 899I directed to the done affordance 803DAA. In various embodiments, the user input 899I corresponds to a contact (e.g., a tap) detected at the location of the done affordance 803DAA.

Figure 8N:
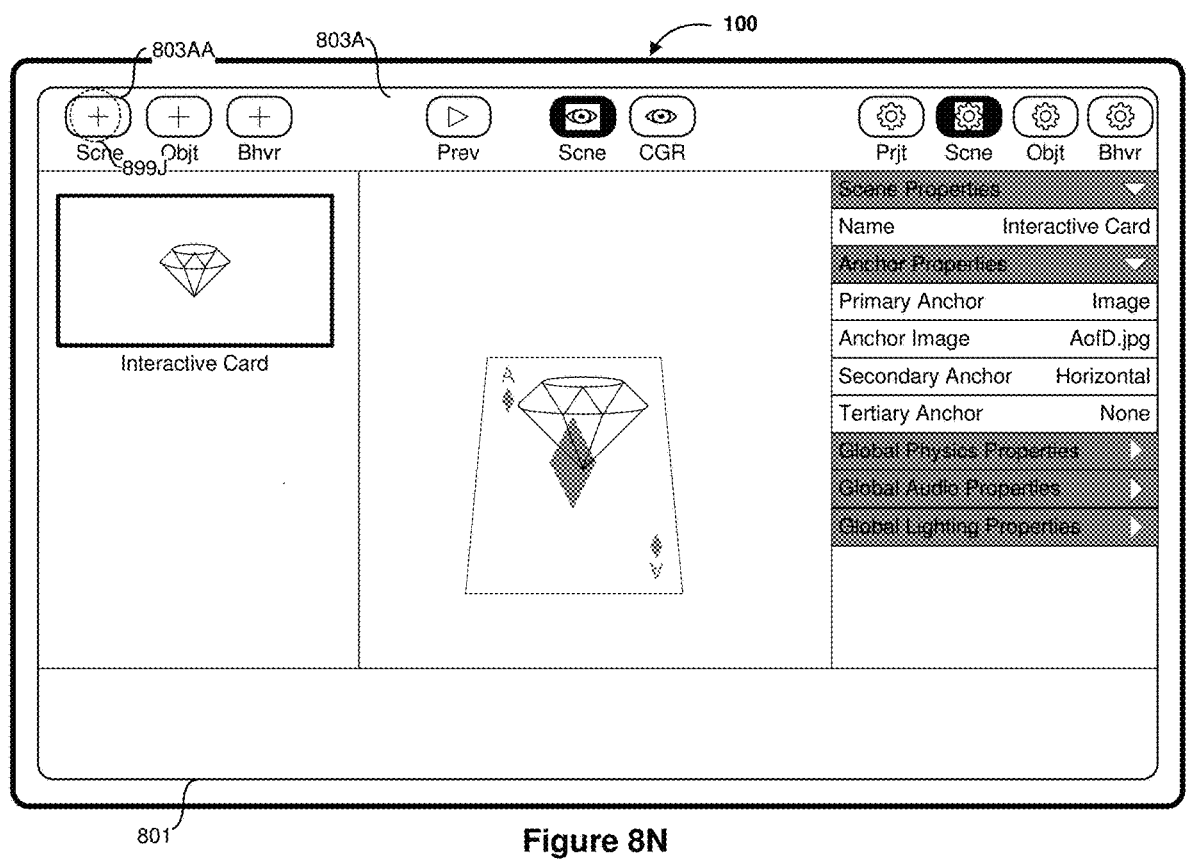

FIG. 8N illustrates the CGR file composing user interface 801 in response to detecting the user input 899I directed to the done affordance 803DAA. In FIG. 8N, the CGR file composing user interface 801 includes a project management user interface 802C (e.g., in the state illustrated in FIG. 8H).

FIG. 8N illustrates a user input 899J directed to the CGR scene addition affordance 803AA. In various embodiments, the user input 899J corresponds to a contact (e.g., a tap) detected at the location of the CGR scene addition affordance 803AA.

Figure 8O:
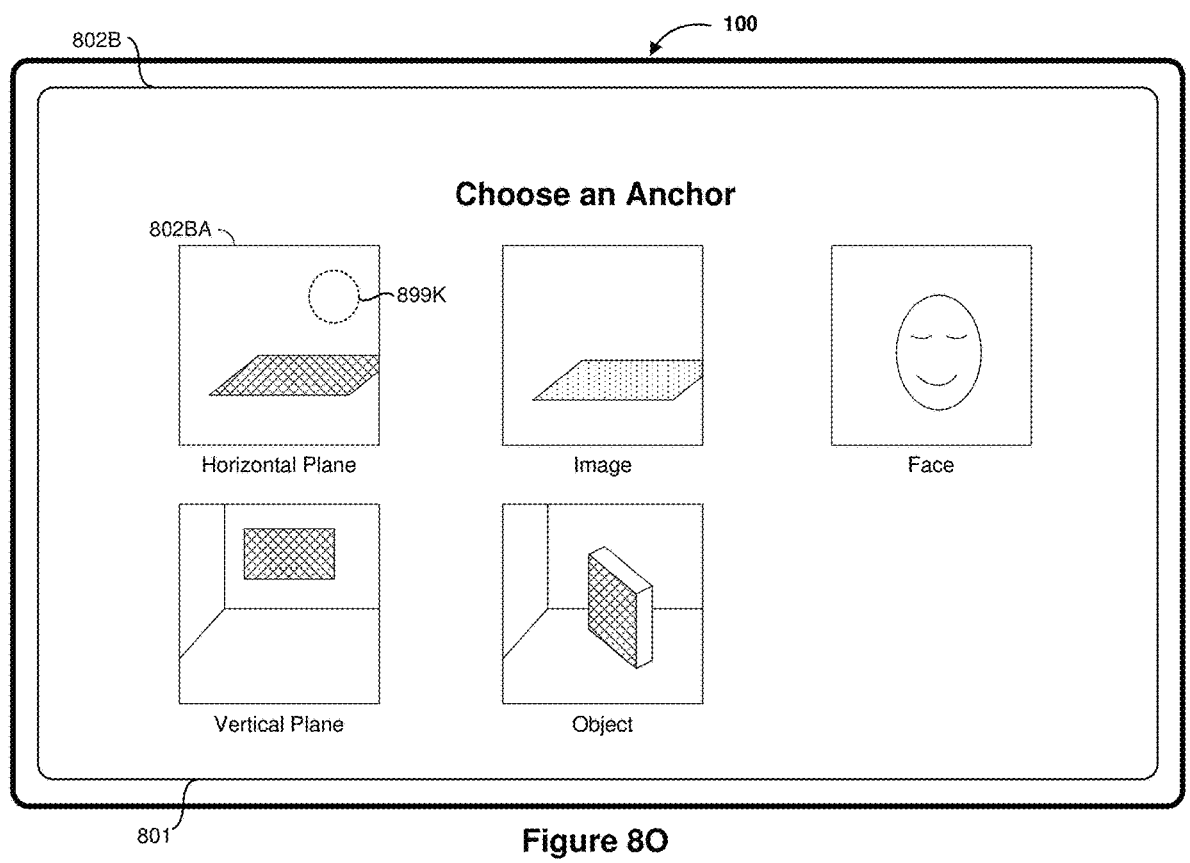

FIG. 8O illustrates the CGR file composing user interface 801 in response to detecting the user input 899J directed to the CGR scene addition affordance 803AA. In FIG. 8O, the CGR file composing user interface 801 includes the anchor-selection user interface 802B.

FIG. 8O illustrates a user input 899K directed to the horizontal plane anchor selection affordance 802BA. In various embodiments, the user input 899K corresponds to a contact (e.g., a tap) detected at the location of the horizontal plane anchor selection affordance 802BA.

Figure 8P:
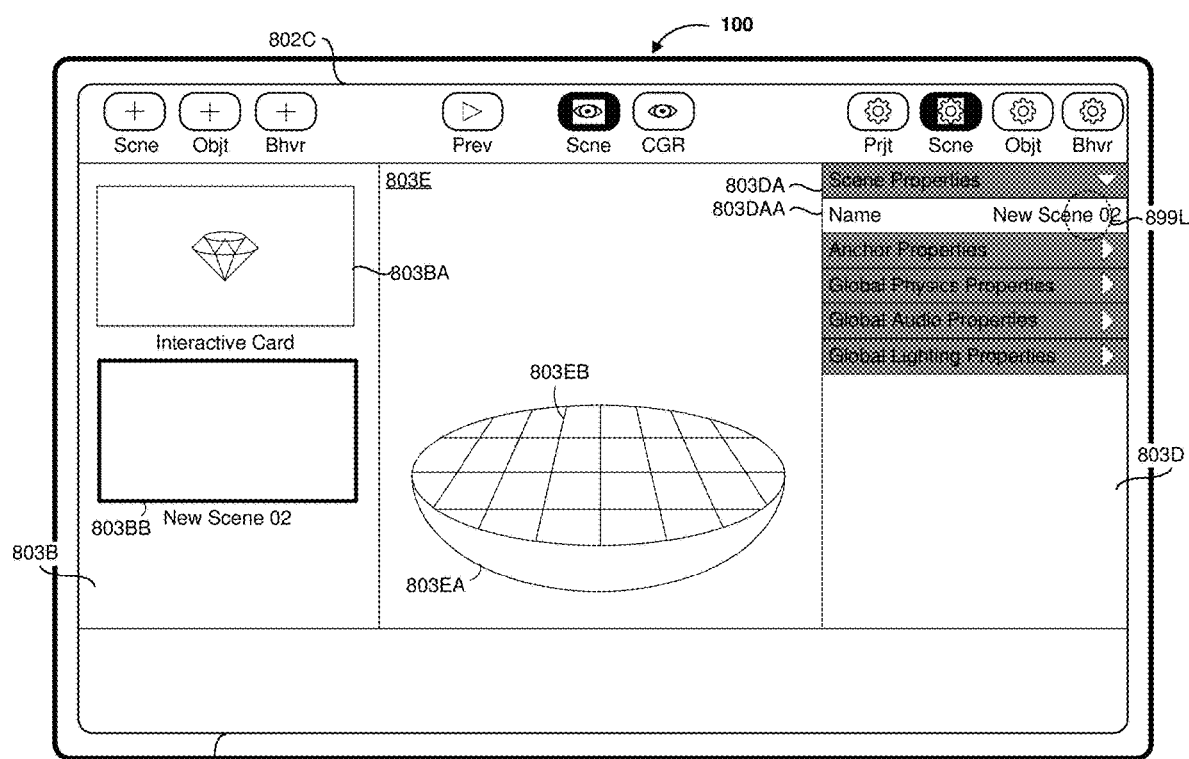

FIG. 8P illustrates the CGR file composing user interface 801 in response to detecting the user input 899K directed to the horizontal plane anchor selection affordance 802BA. In FIG. 8P, the CGR file composing user interface 801 includes the project management user interface 802C. In FIG. 8P, the scene list region 803B includes, in addition to the first CGR scene affordance 803BA, a second CGR scene affordance 803BB corresponding to a second CGR scene.

The second CGR scene affordance 803BB is displayed differently than the first CGR scene affordance 803BA to indicate that the second CGR scene is the currently selected CGR scene. In various embodiments, and in FIG. 8P, the second CGR scene affordance 803BB is displayed with a thicker border than the first CGR scene affordance 803BA.

In various embodiments, the second CGR scene affordance 803BB is displayed with highlighting or another indication that the second CGR scene is the currently selected CGR scene.

In FIG. 8P, the settings region 803D includes, within the scene properties menu 803DA, the scene name manipulation affordance 803DAA indicating the name of the currently selected CGR scene (e.g., "New Scene 02").

In FIG. 8P, the view region 803E includes a representation of the anchor 803EA associated with the currently selected CGR scene (in FIG. 8P, a representation of a horizontal plane) with a grid 803EB overlaid thereon.

FIG. 8P illustrates a user input 899L directed to the scene name manipulation affordance 803DAA. In various embodiments, the user input 899C corresponds to a contact (e.g., a tap) detected at the location of the scene name manipulation affordance 803DAA.

Figure 8Q:
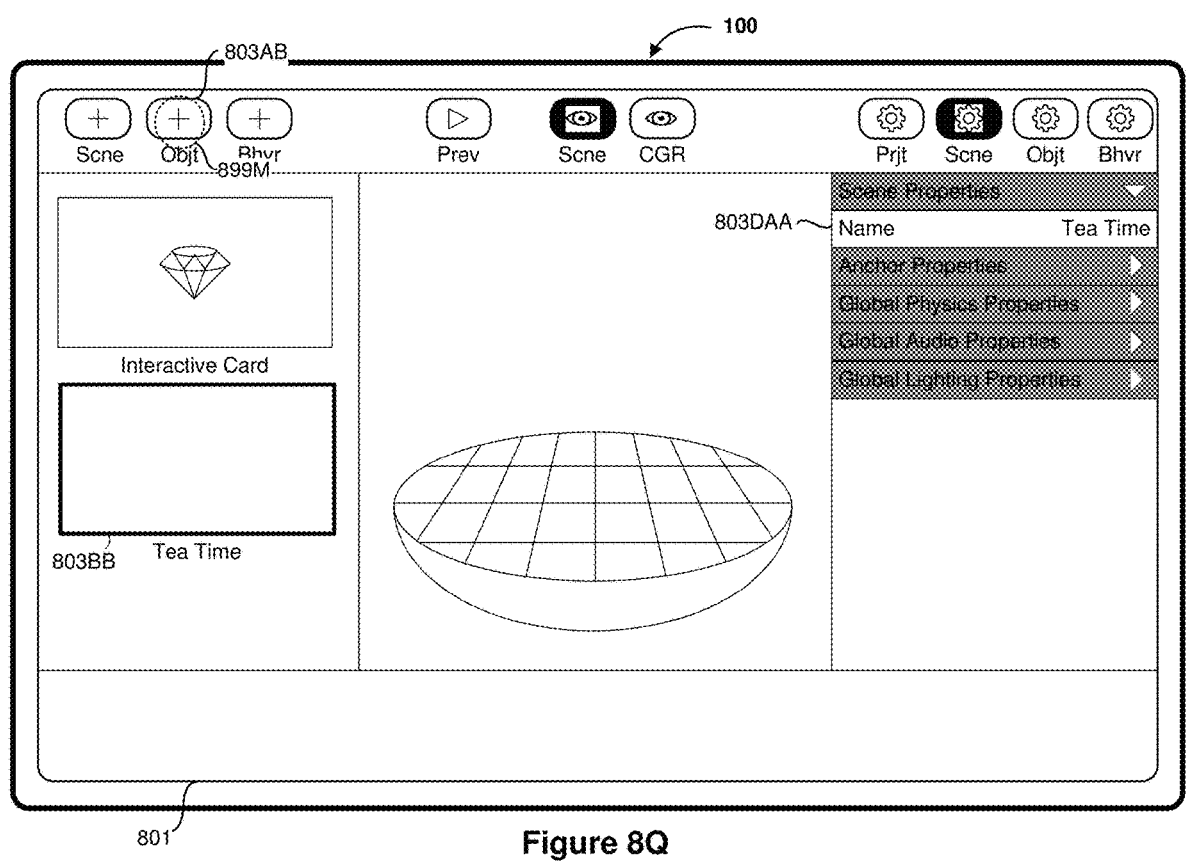

FIG. 8Q illustrates the CGR file composing user interface 801 in response to detecting the user input 899L directed to the scene name manipulation affordance 803DAA (and, possibly, additional user inputs defining a new name for the second CGR scene).

In FIG. 8Q, the scene name manipulation affordance 803DAA has changed to indicate the new name for the second CGR scene (e.g., "Tea Time"). Similarly, the second CGR scene affordance 803BB has changed to indicate the new name for the second CGR scene.

FIG. 8Q illustrates a user input 899M directed to the CGR object addition affordance 803AB. In various embodiments, the user input 899M corresponds to a contact (e.g., a tap) detected at the location of the CGR object addition affordance 803AB.

Figure 8R:
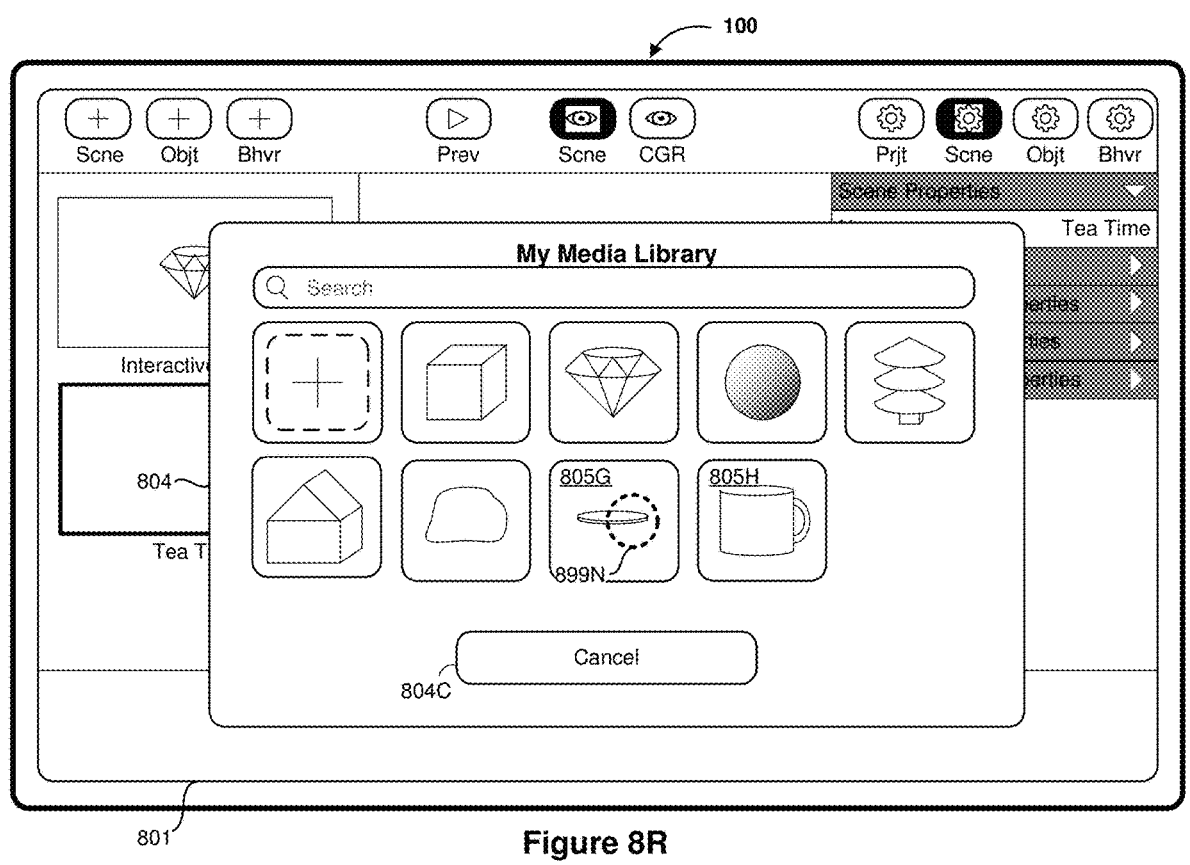

FIG. 8R illustrates the CGR file composing user interface 801 in response to detecting the user input 899M directed to the CGR object addition affordance 803AB. In FIG. 8R, the CGR file composing user interface 801 includes the media library user interface 804 in the form of a pop-up window.

FIG. 8R illustrates a user input 899N (in various embodiments, of a different type than the user input 899G of FIG. 8G) directed to the plate addition affordance 805G. In various embodiments, the user input 899N corresponds to a prolonged and/or intense contact (e.g., a tap-and-hold and/or a force touch) detected at the location of the plate addition affordance 805G.

Figure 8S:
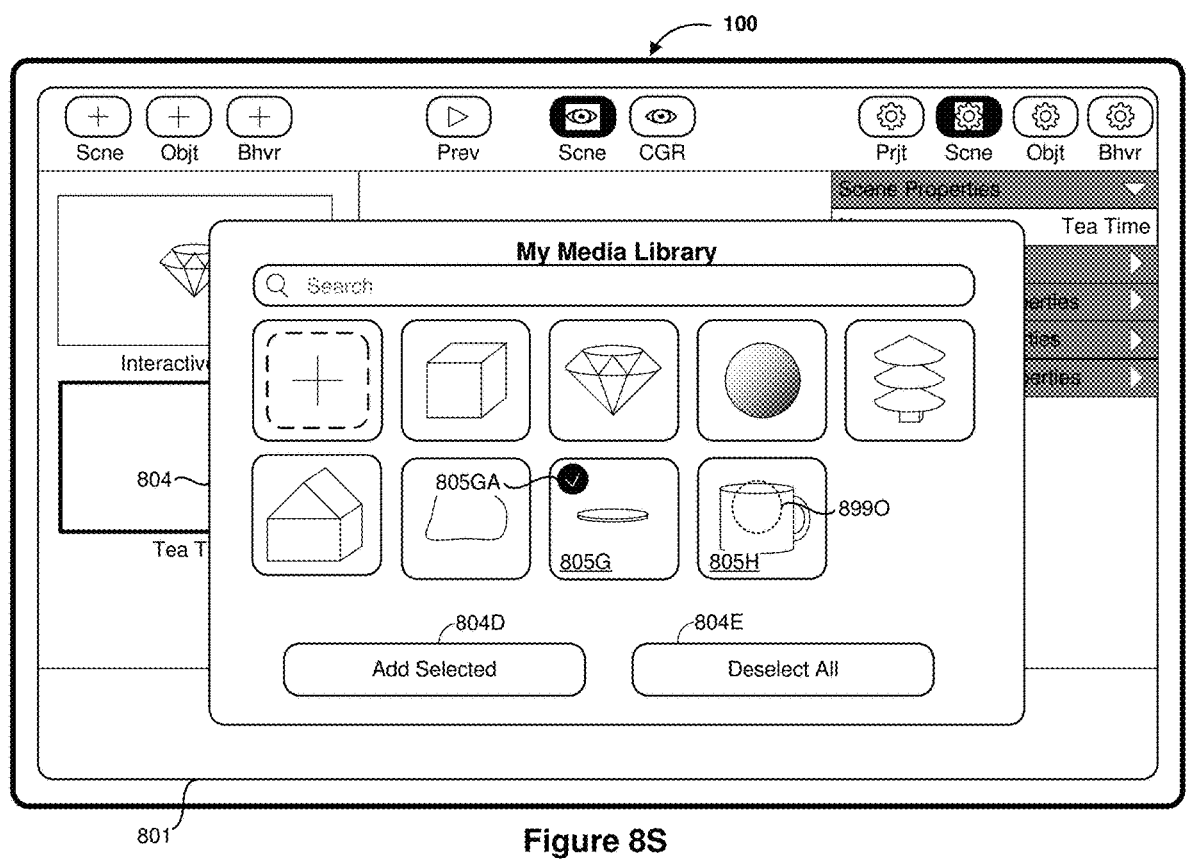

FIG. 8S illustrates the CGR file composing user interface 801 in response to detecting the user input 899N directed to the plate addition user interface 805G. In FIG. 8S, the media library user interface 804 includes an add-selected affordance 804D for adding one or more selected CGR objects to the CGR scene and a deselect-all affordance 804E for deselecting any selected CGR objects. In various embodiments, as illustrated in FIG. 8S, the add-selected affordance 804D and deselect-all affordance 804E replace the cancel affordance 804C (e.g., as shown in FIG. 8R). In various embodiments, the add-selected affordance 804D and deselect-all affordance 804E are displayed simultaneously with the cancel affordance 804C.

In FIG. 8S, the plate addition affordance 805G includes a selection indicator 805GA indicating that a plate CGR object is selected.

As compared to FIGS. 8G and 8H, in which a user input of a first type (e.g., a tap) directed to a particular CGR object addition affordance adds a corresponding CGR object to the scene, in FIGS. 8R and 8S, a user input of a second type (e.g., a tap-and-hold) directed to a particular CGR object addition affordance selects the corresponding object (e.g., as indicated by a selection indicator displayed in conjunction with the particular CGR object addition affordance).

FIG. 8S illustrates a user input 899O directed to the cup addition affordance 805H. In various embodiments, the user input 899O corresponds to a contact (e.g., a tap) detected at the location of the cup addition affordance 805H.

Figure 8T:
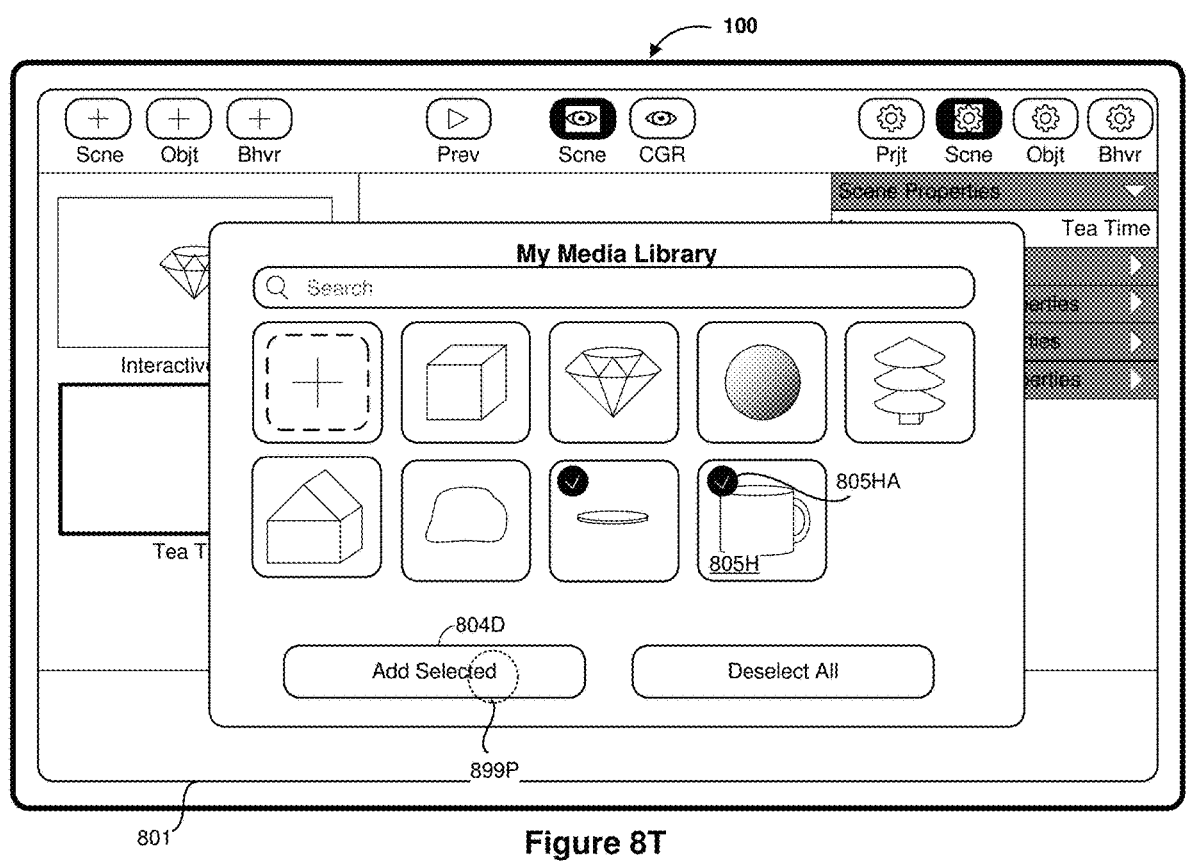

FIG. 8T illustrates the CGR file composing user interface 801 in response to detecting the user input 899O directed to the cup addition user interface 805H. In FIG. 8T, the cup addition affordance 805H includes a selection indicator 805HA indicating that a cup CGR object is selected.

FIG. 8T illustrates a user input 899P directed to the add-selected affordance 804D. In various embodiments, the user input 899P corresponds to a contact (e.g., a tap) detected at the location of the add-selected affordance 804D.

Figure 8U:
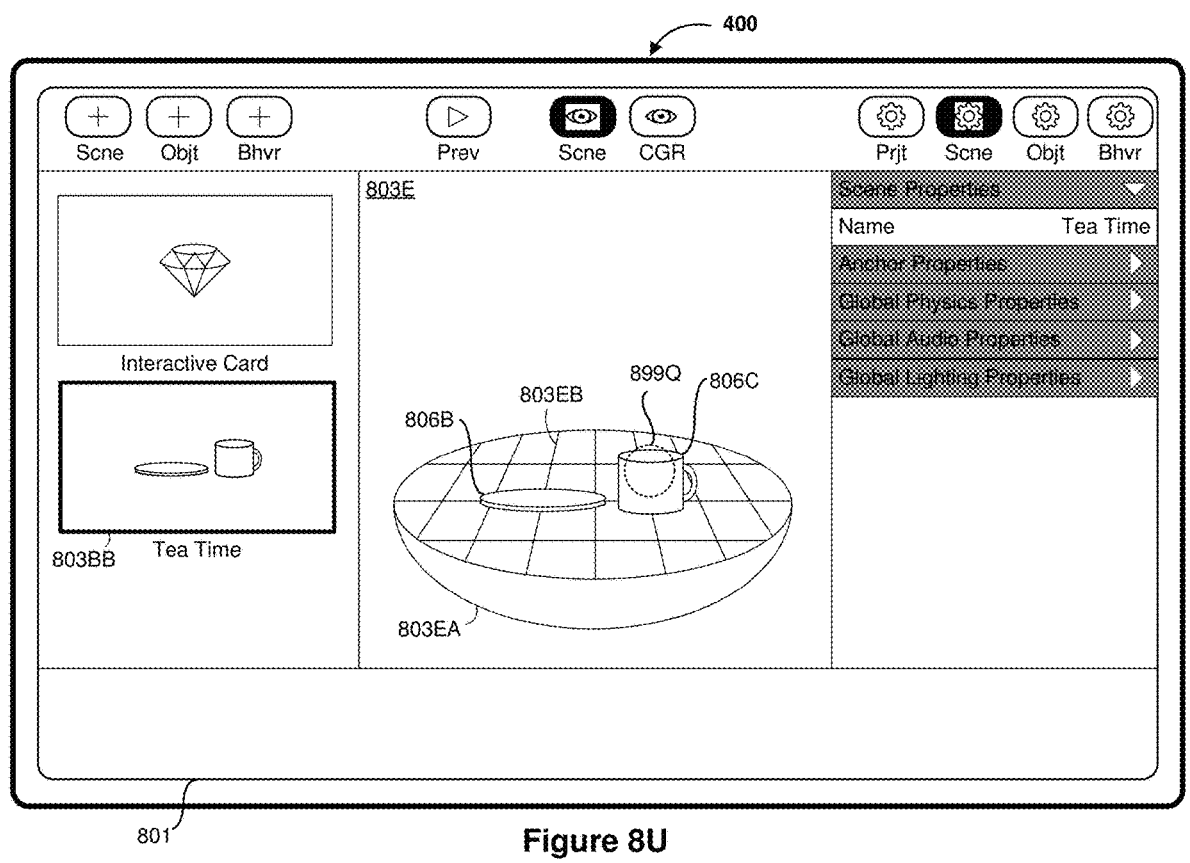

FIG. 8U illustrates the CGR file composing user interface 801 in response to detecting the user input 899P directed to the add-selected affordance 804D. In FIG. 8U, the media library user interface 804 ceases to be displayed. In FIG. 8U, the view region 803E includes a representation of a plate CGR object 806B displayed at a first location over the representation of the anchor 803EA and a representation of a cup CGR object 806C displayed at a second location over the representation of the anchor 803EA. Relatedly, the second CGR scene affordance 803BB has changed to indicate that the second CGR scene includes a plate CGR object and a cup CGR object.

In various embodiments, the first location of the representation of the plate CGR object 806B and the second location of the representation of the cup CGR object 806C are selected such that a bottom of the representation of the plate CGR object 806B abuts the top of the representation of the anchor 803EA and a bottom of the representation of the cup CGR object 806C abuts the top of the representation of the anchor 803EA.

In various embodiments, the first location of the representation of the plate CGR object 806B and the second location of the representation of the cup CGR object 806C are selected to ensure that the representation of the plate CGR object 806B and the representation of the cup CGR object 806C do not intersect.

In various embodiments, the first location of the representation of the plate CGR object 806B and the second location of the representation of the cup CGR object 806C are selected based on the grid 803EB. For example, in various embodiments, the first location is selected such that a spatial manipulation point (e.g., an edge, a midpoint, a center-of-mass, an intuitive spatial manipulation point, or a custom defined spatial manipulation point) of the representation of the plate CGR object 806B is vertically aligned with a first grid point of the grid 803EB and the second location is selected such that a spatial manipulation point of the representation of the cup CGR object 806C is vertically aligned with a second grid point of the grid 803EB.

FIG. 8U illustrates a user input 899Q directed to the representation of the cup CGR object 806C. In various embodiments, the user input 899Q corresponds to a contact (e.g., a tap) detected at the location of the representation of the cup CGR object 806C.

Figure 8V:
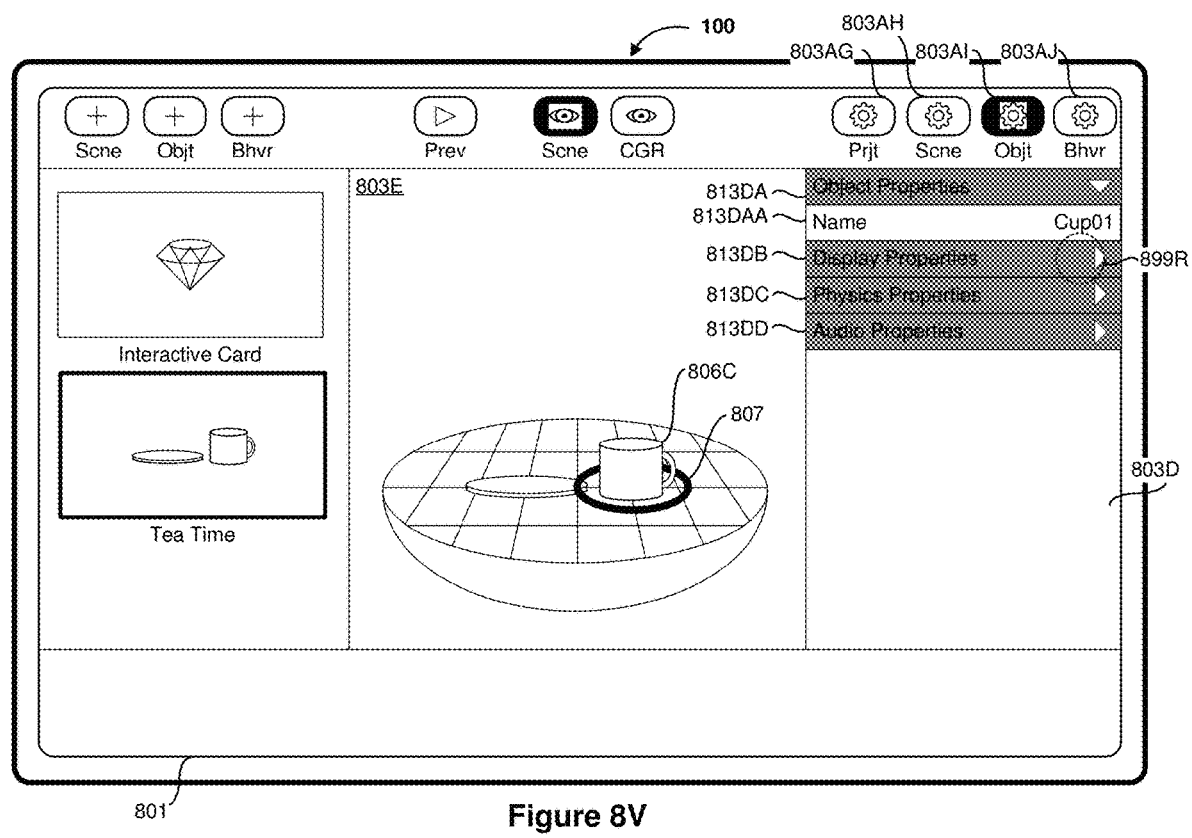

FIG. 8V illustrates the CGR file composing user interface 801 in response to detecting the user input 899Q directed to the representation of the cup CGR object 806C. In FIG. 8V, the view region 803E includes a first type of object selection indicator 807 surrounding the representation of the cup CGR object 806C. The first type of object selection indicator 807 displayed surrounding the representation of the cup CGR object 806C indicates that the cup CGR object is selected.

In FIG. 8V, as the object settings affordance 803AI is selected (as indicated by the different display of the object settings affordance 803AI as compared to the other settings affordances 803AG, 803AH, and 803AJ), the settings region 803D includes a plurality of object setting manipulation affordances presented via collapsible/expandable object setting menus 813DA-813DD (of which only a single object setting manipulation affordance, the object name manipulation affordance 813DAA for changing a name of the currently selected CGR object, is shown in FIG. 8V). Like the first type of object selection indicator 807 displayed surrounding the representation of the cup CGR object 806C, the object name manipulation affordance 813DAA displaying the name of the cup CGR object (e.g., "Cup01") indicates that the cup CGR object is selected.

The object settings menus 813DA-813DD include an object properties menu 813DA including scene settings manipulation affordances for changing scene properties of the currently selected CGR object, a display properties menu 813DB including display setting manipulation affordances for changing display (or rendering) properties of the currently selected CGR object (such as a shape, color, or optical transmission of the CGR object), a physics properties menu 813DC including object setting manipulation affordances for changing physics properties of the currently selected CGR object (such as light reflectivity of the CGR object or elasticity of the CGR object [e.g., how the CGR object interacts with other CGR objects]), and an audio properties menu 813DD including object setting manipulation affordances for changing audio properties of the currently selected CGR object (such as an omnidirectional or ambient sound to be played while the CGR object is presented or a directional sound to be emitted by the CGR object).

FIG. 8V illustrates a user input 899R directed to the display properties menu 813DB. In various embodiments, the user input 899Q corresponds to a contact (e.g., a tap) detected at the location of the representation of the display properties menu 813DB.

Figure 8W:
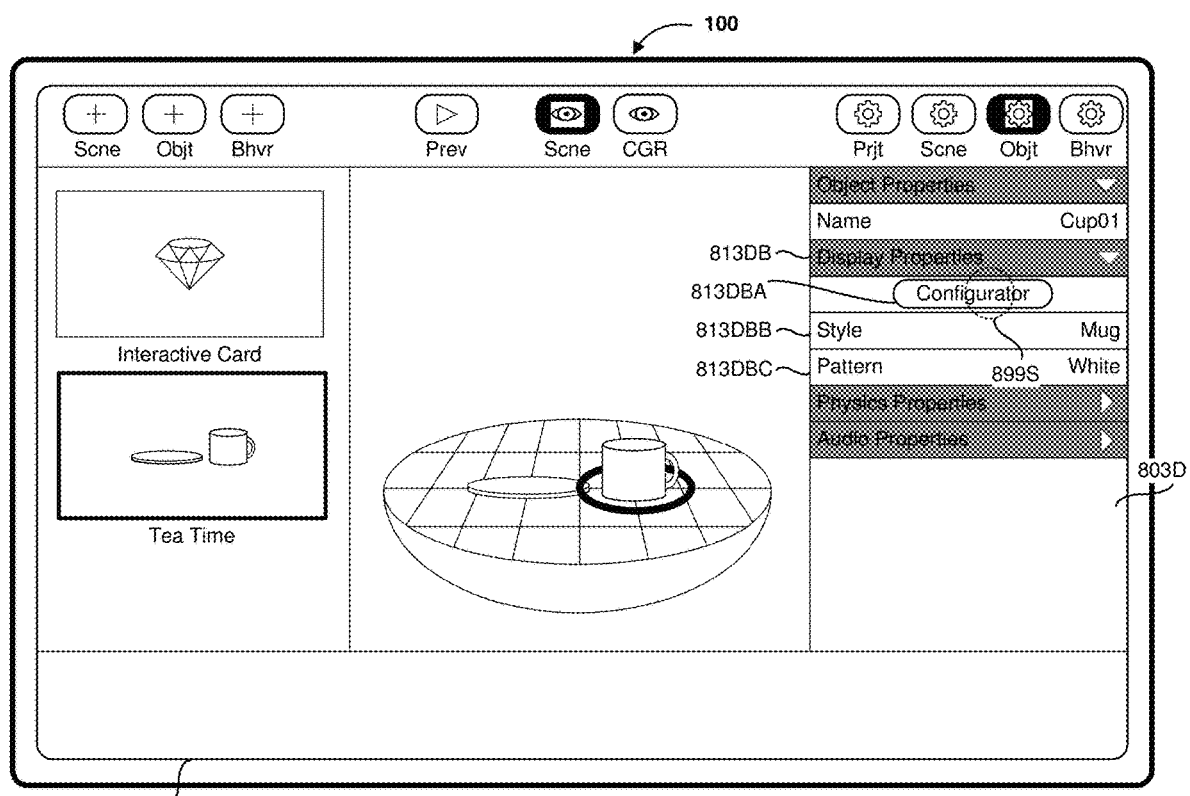

FIG. 8W illustrates the CGR file composing user interface 801 in response to detecting the user input 899R directed to the display properties menu 813DB. In FIG. 8W, the display properties menu 813DB is expanded (within the settings region 803D) to present a configurator affordance 813DBA for presenting a configurator user interface (described below), a style affordance 813DBB for changing a shape, render wireframe, or display mesh of the currently selected CGR object, and a pattern affordance 813DBC for changing a pattern, color, or texture of the currently selected CGR object.

FIG. 8W illustrates a user input 899S directed to the configurator affordance 813DBA. In various embodiments, the user input 899S corresponds to a contact (e.g., a tap) detected at the location of the configurator affordance 813DBA.

Figure 8X:
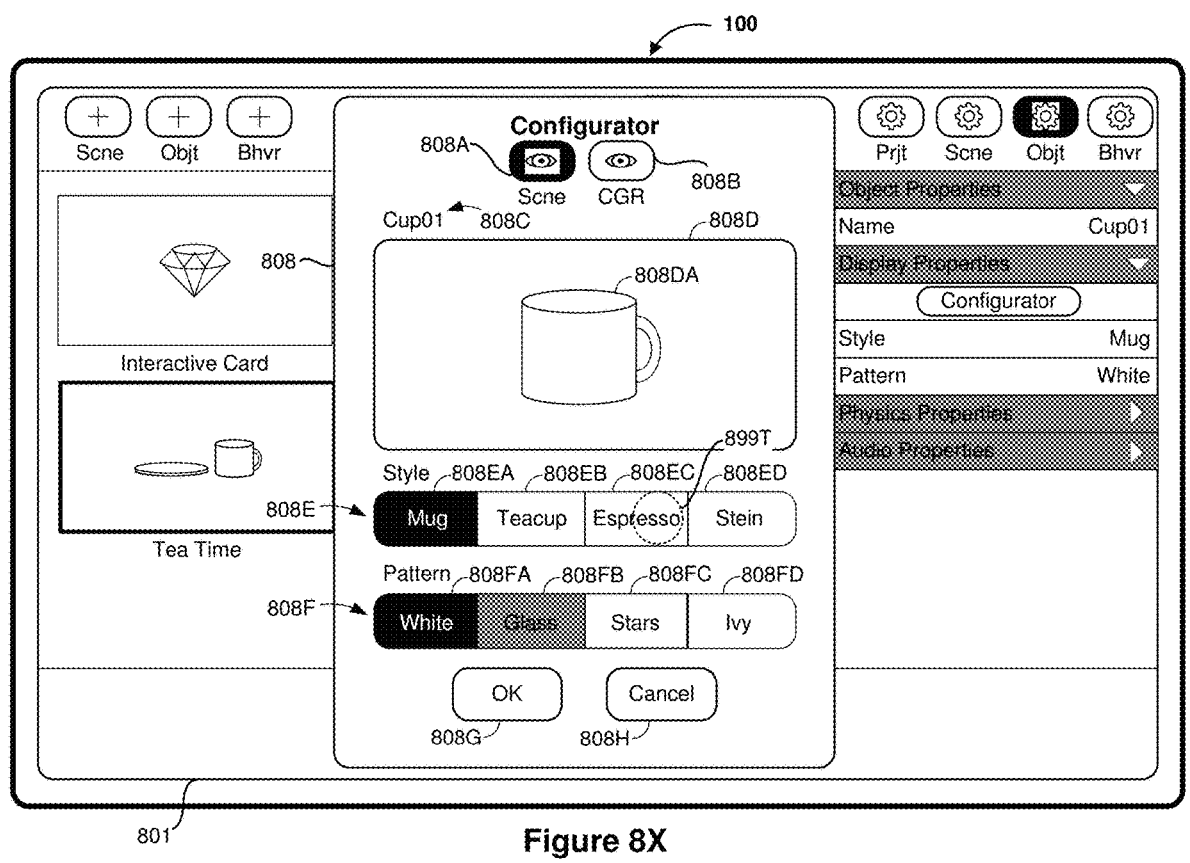

FIG. 8X illustrates the CGR file composing user interface 801 in response to detecting the user input 899S directed to the configurator affordance 813DBA. In FIG. 8X, the CGR file composing user interface 801 includes a configurator user interface 808 in the form of a pop-up window.

The configurator user interface 808 includes a style bar 808E including a plurality of style affordances 808EA-808ED for changing a currently selected style of the style bar 808E and a pattern bar 808F including a plurality of pattern affordances 808FA-808FD for changing a currently selected pattern of the pattern bar 808F. The style bar 808E includes a mug affordance 808EA for changing the currently selected style to a mug style, a teacup affordance 808EB for changing the currently selected style to a teacup style, an espresso affordance 808EC for changing the currently selected style to an espresso style, and a stein affordance 808ED for changing the currently selected style to a stein style. The pattern bar 808F includes a white affordance 808FA for changing the currently selected pattern to a white pattern, a glass affordance 808FB for changing the currently selected pattern to a glass pattern, a stars affordance 808FC for changing the currently selected pattern to an stars pattern, and an ivy affordance 808FD for changing the currently selected pattern to an ivy pattern.

The configurator user interface 808 includes a view window 808D presenting a representation of the currently selected CGR object 808DA with the style currently selected in the style bar 808E and the pattern currently selected in the pattern bar 808F (and a name 808C of the currently selected CGR object over the view window 808D).

The configurator user interface 808 includes a plurality of view affordances 808A-808B including an object view affordance 808A for viewing the currently selected CGR object in the view window 808D in a scene mode (in which the user inputs directed to the view window 808D change the perspective of the view of the currently selected CGR object) and a CGR view affordance 808B for viewing the currently selected CGR object in the view window 808D in a CGR mode (in which movement of the device 100 changes the perspective of the view of the currently selected CGR object).

The configurator user interface 808 includes an OK affordance 808G for changing the style of the currently selected CGR object to the currently selected style in the style bar 808E, changing the pattern of the currently selected CGR object to the currently selected pattern in the pattern bar 808F, and dismissing (ceasing to display) the configurator user interface 808. The configurator user interface 808 includes a cancel affordance 808H for dismissing (ceasing to display) the configurator user interface 808, returning the CGR file composing user interface 801 to the state illustrated in FIG. 8W without changing the style and/or pattern of the currently selected CGR object.

In various embodiments, while a particular style is the currently selected style of the style bar 808E, a corresponding subset of the patterns is presented for selection in the pattern bar 808F. In various embodiments, the corresponding subset is based on one or more selection rules defining how the various styles and patterns can be combined. In various embodiments, the selection rules are stored in a corresponding CGR object file.

For example, in FIG. 8X, the mug style is the currently selected style of the style bar 808E as indicated by a first display style (e.g., black) of the mug affordance 808EA as compared to a second display style (e.g., white) of the other style affordances 808EB-808ED. Further, the white pattern is the currently selected pattern of the pattern bar 808F as indicated by the first display style of the white affordance 808FA. Based on the currently selected style being the mug style, a subset of the pattern affordances 808FA-808FD are presented for selection. In particular, the stars affordance 808FC and the ivy affordance 808FD are presented for selection as indicated by the second display style, whereas the glass affordance 808FB is not presented for selection as indicated by the third display style (e.g., gray).

FIG. 8X illustrates a user input 899T directed to the espresso affordance 808EC. In various embodiments, the user input 899T corresponds to a contact (e.g., a tap) detected at the location of the espresso affordance 808EC.

Figure 8Y:
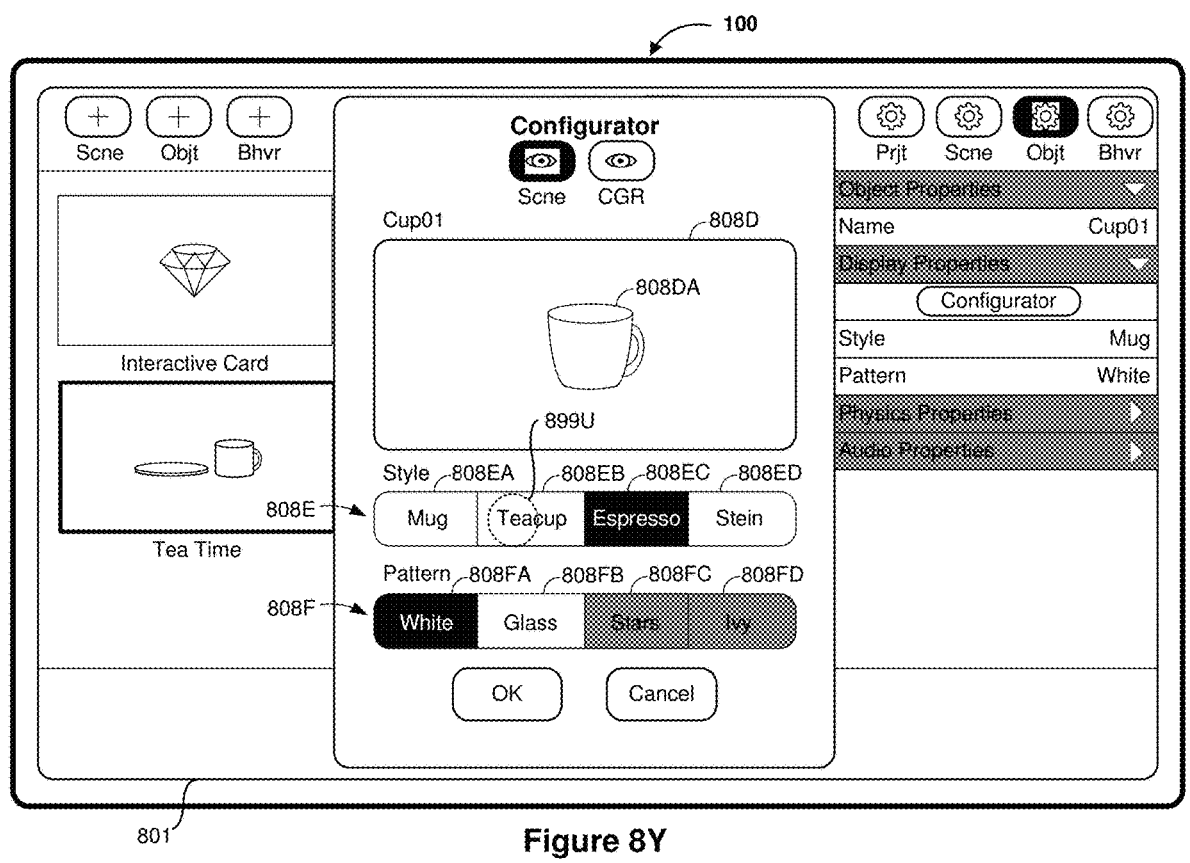

FIG. 8Y illustrates the CGR file composing user interface 801 in response to detecting the user input 899T directed to the espresso affordance 808EC. In FIG. 8Y, the currently selected style is changed to the espresso style as indicated by the first display style of the espresso affordance 808EC as compared to the second display style of the other style affordances 808EA, 808EB, and 808ED. Further, the representation of the currently selected CGR object 808DA in the view window 808D is changed based on the change in the currently selected style.

As noted above, in various embodiments, while a particular style is the currently selected style of the style bar 808E, a corresponding subset of the patterns is presented for selection in the pattern bar 808F. Thus, as another example, in FIG. 8Y, based on the currently selected style being the espresso style, a subset of the pattern affordances 808FA-808FD are presented for selection. In particular, the glass affordance 808FB is presented for selection as indicated by the second display style, whereas the stars affordance 808FC and the ivy affordance 808FD are not presented for selection as indicated by the third display style.

FIG. 8Y illustrates a user input 899U directed to the teacup affordance 808EB. In various embodiments, the user input 899U corresponds to a contact (e.g., a tap) detected at the location of the teacup affordance 808EB.

Figure 8Z:
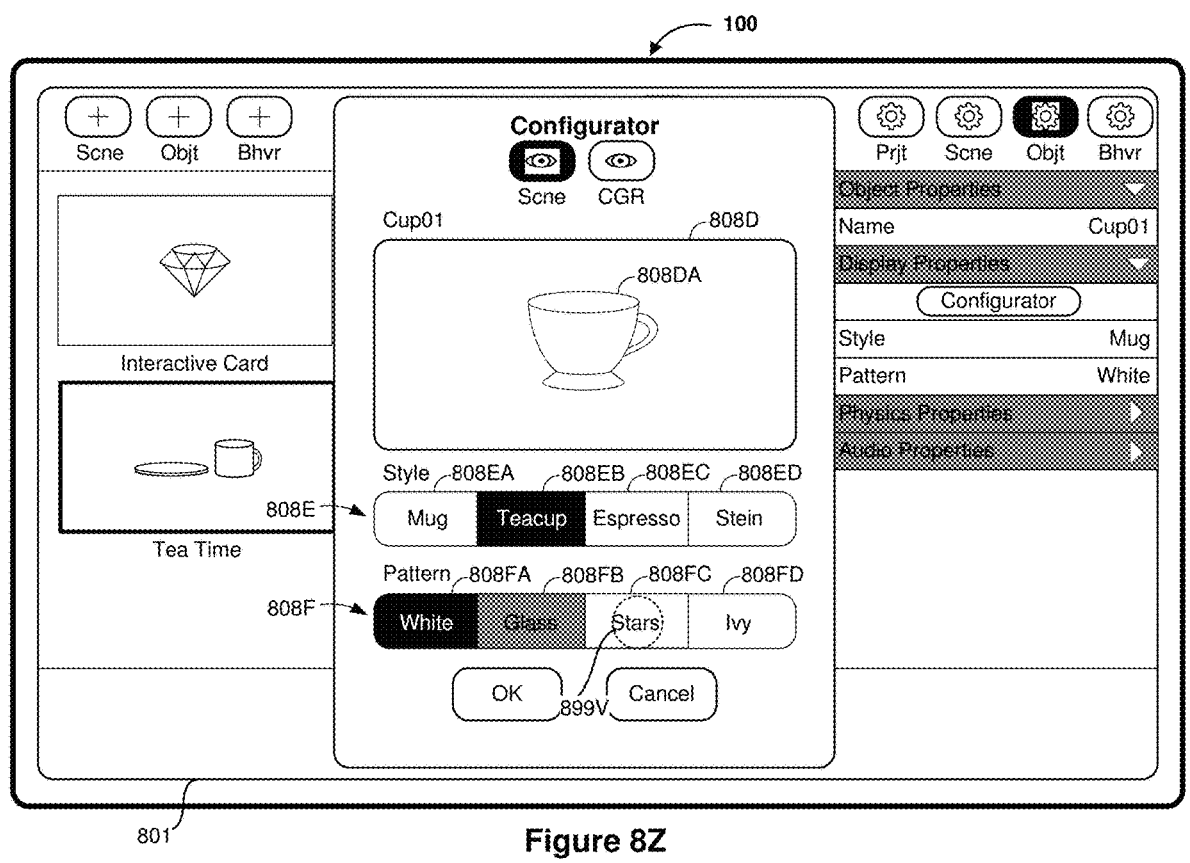
Figure 8A:
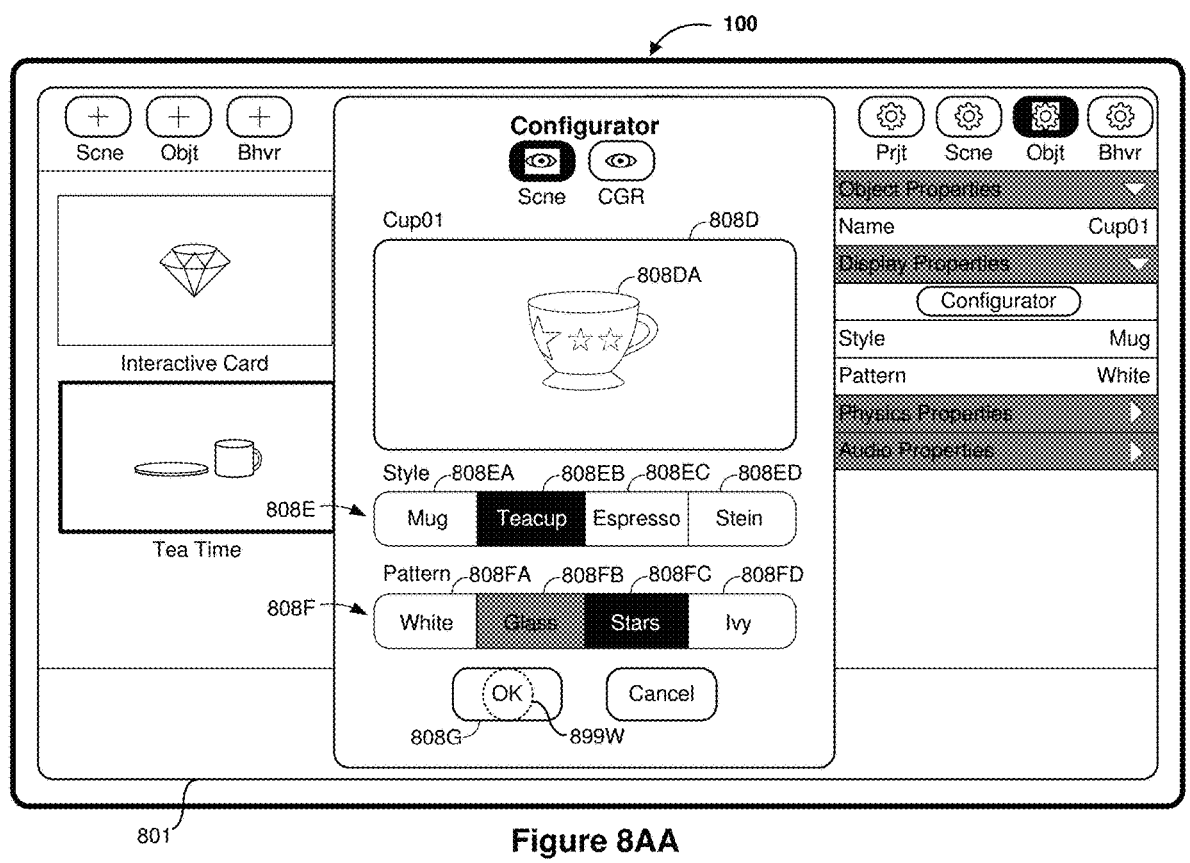
Figure 8A:
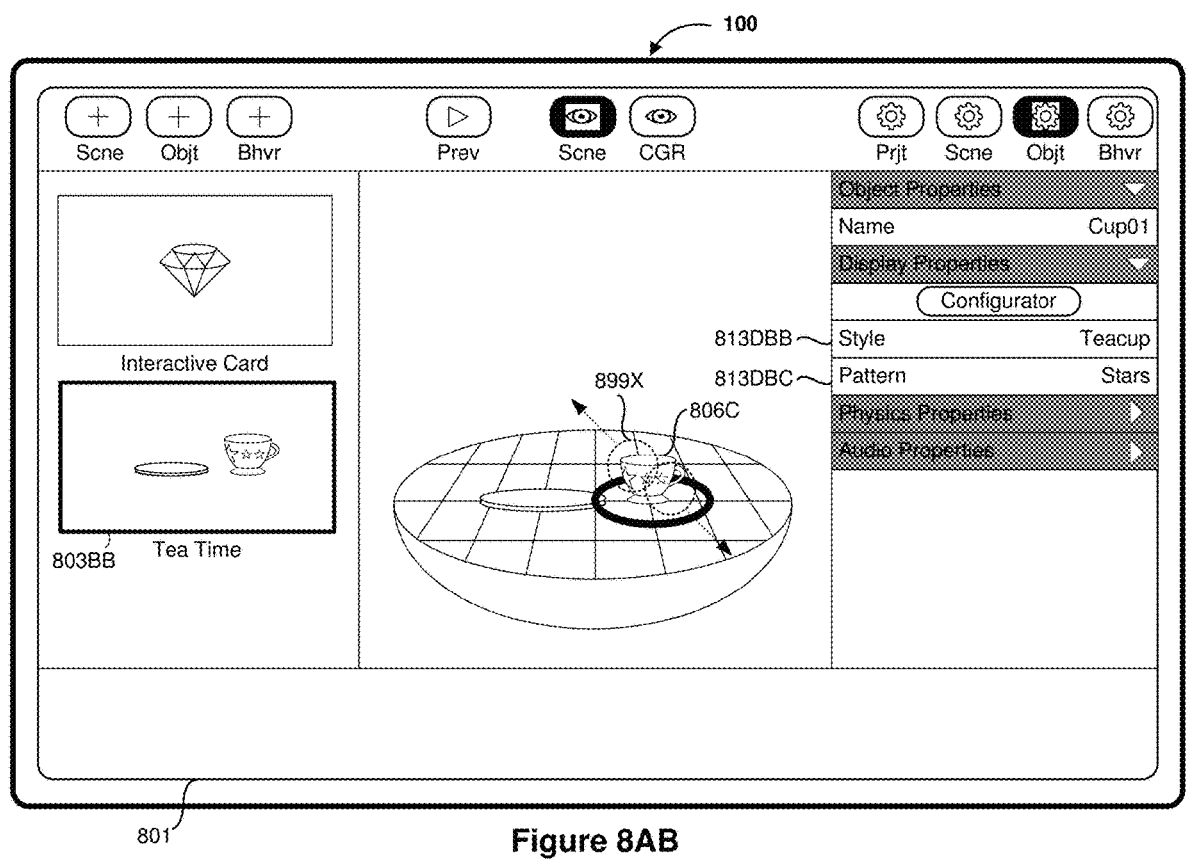
Figure 8A:
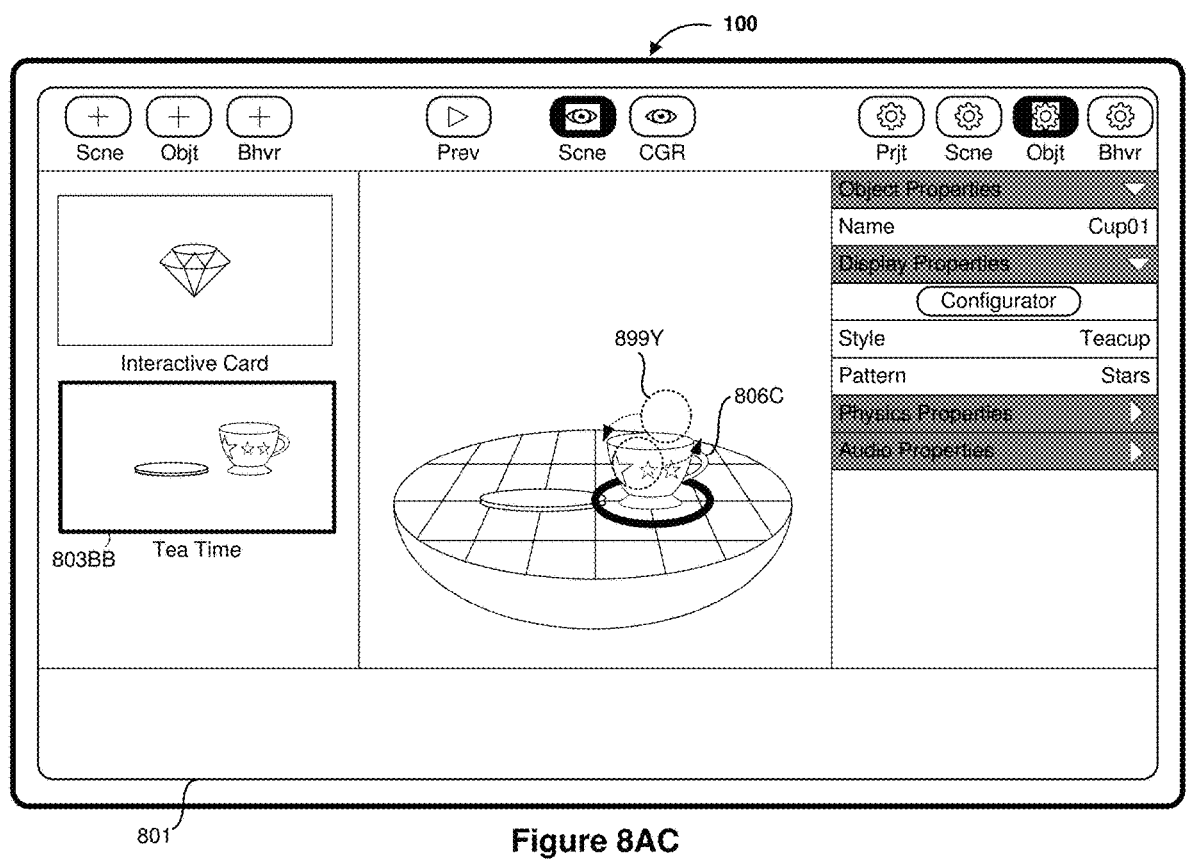
Figure 8A:
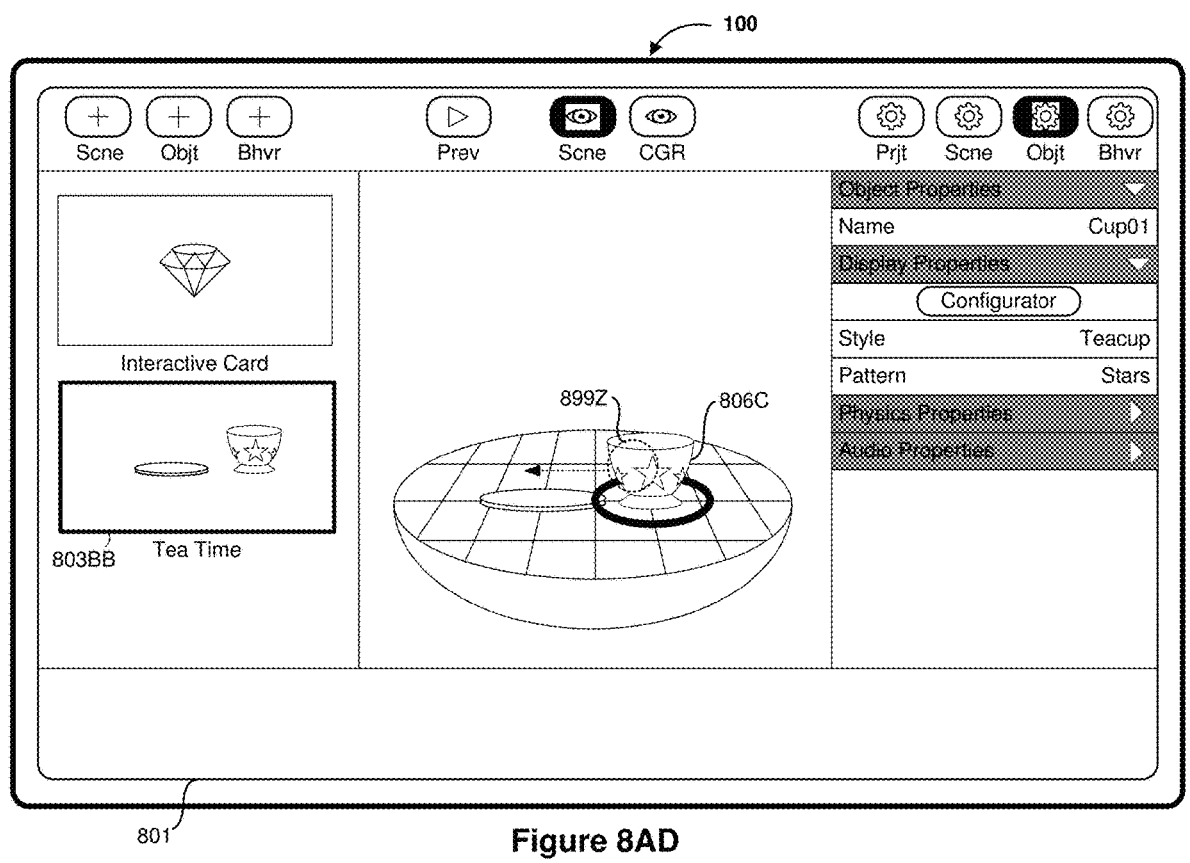
Figure 8A:
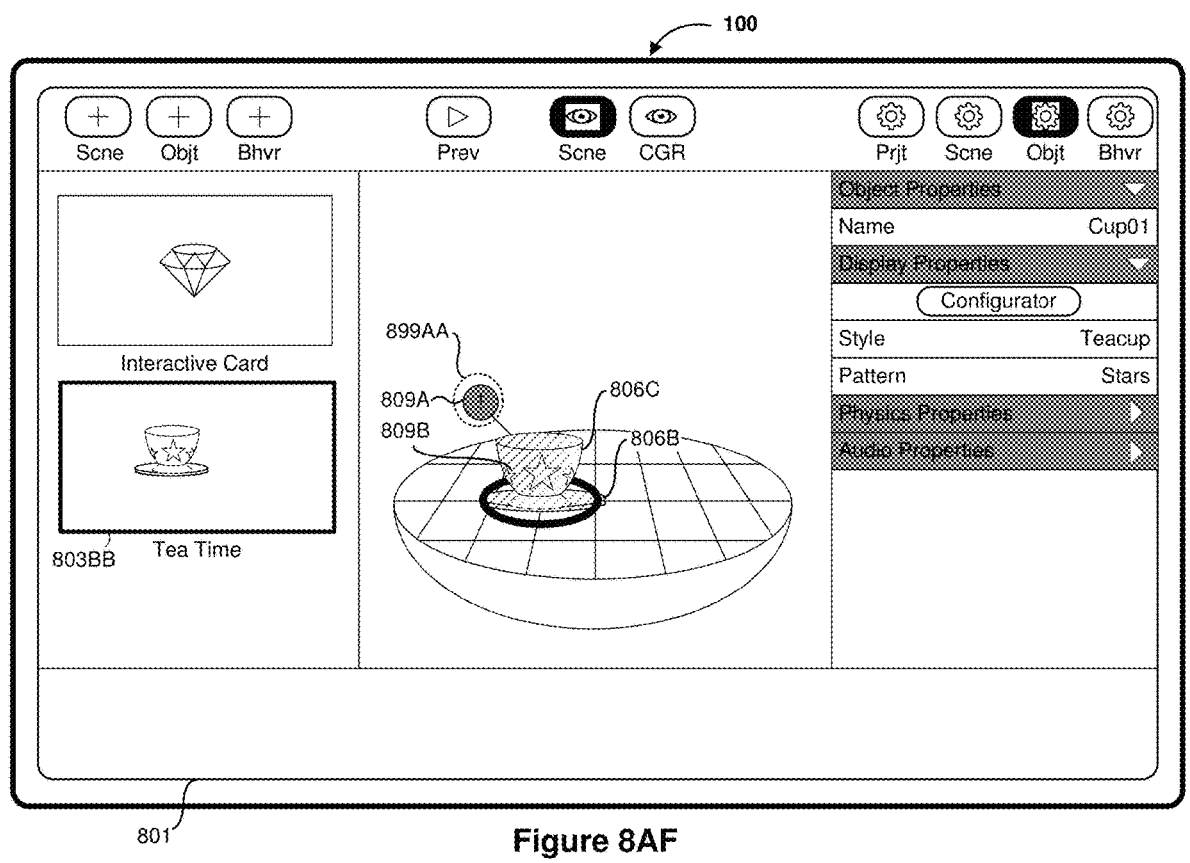
Figure 8A:
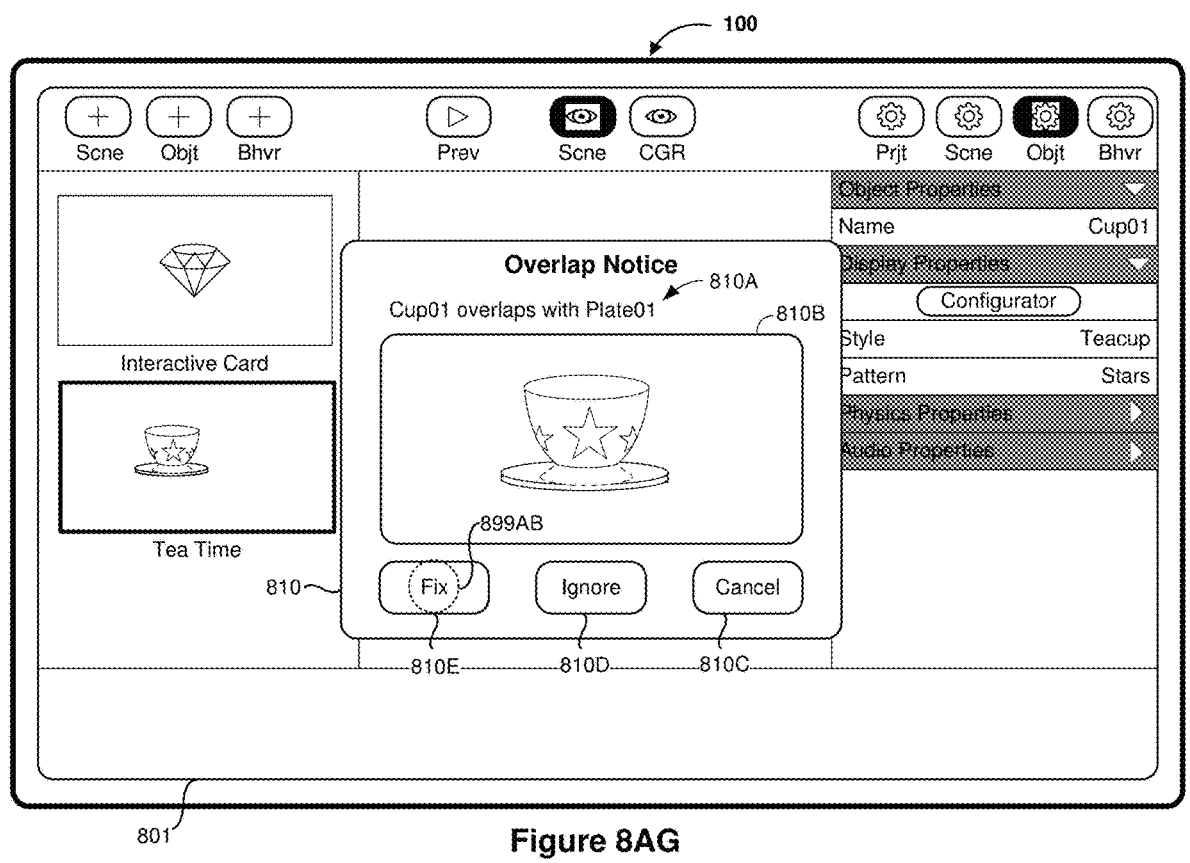
Figure 8A:
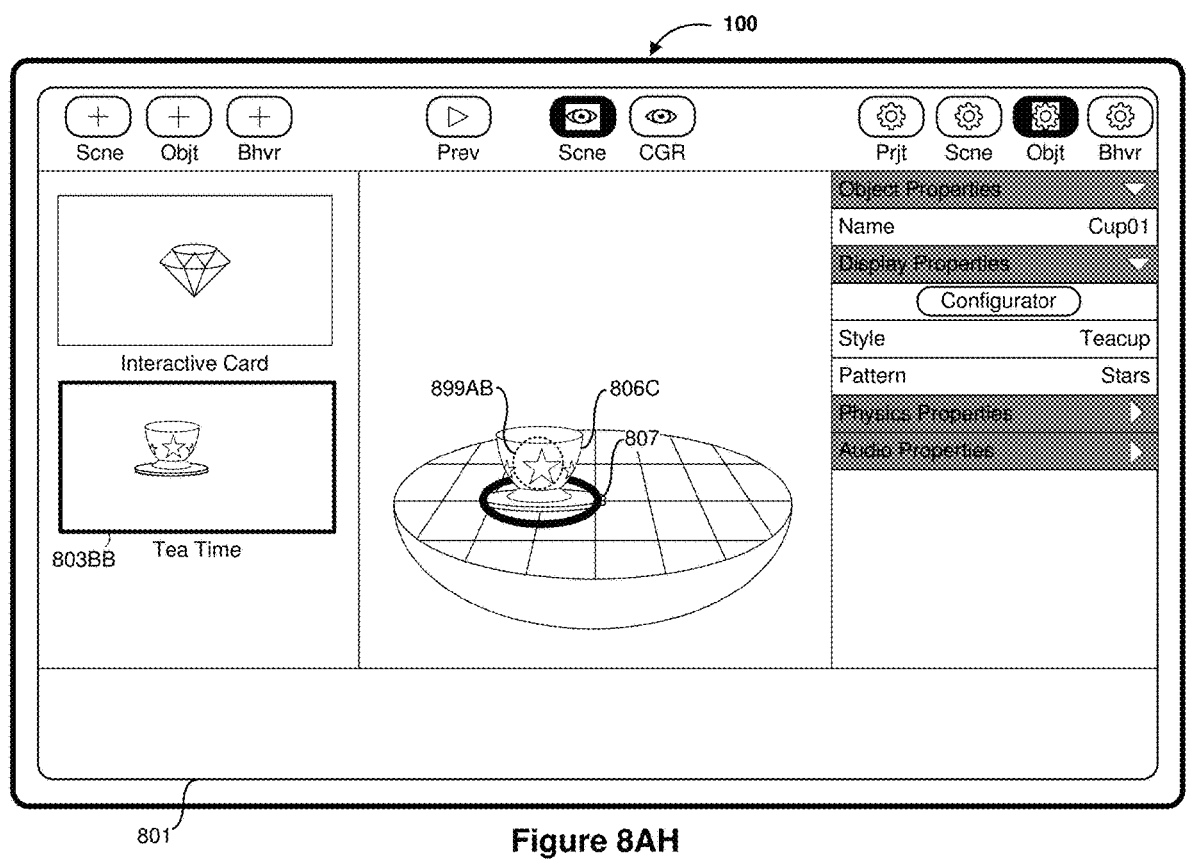
Figure 8A:
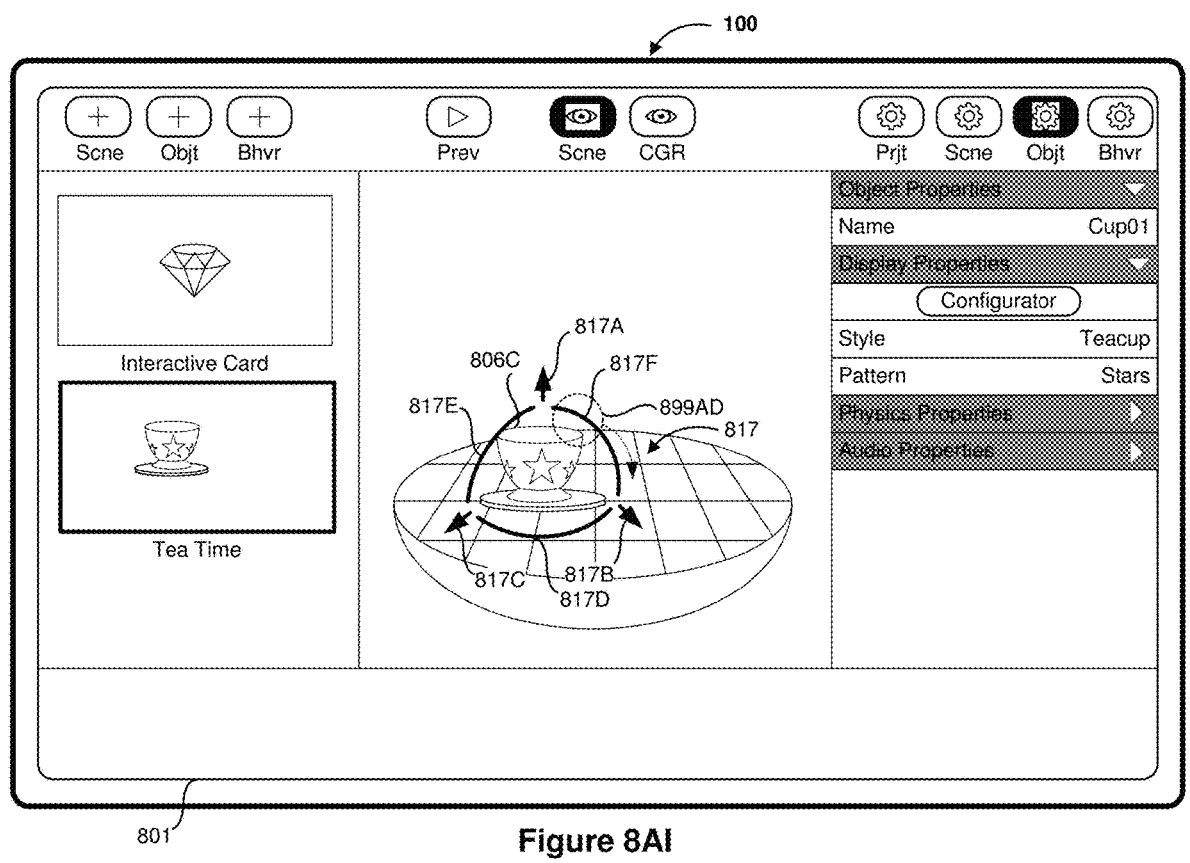
Figure 8A:
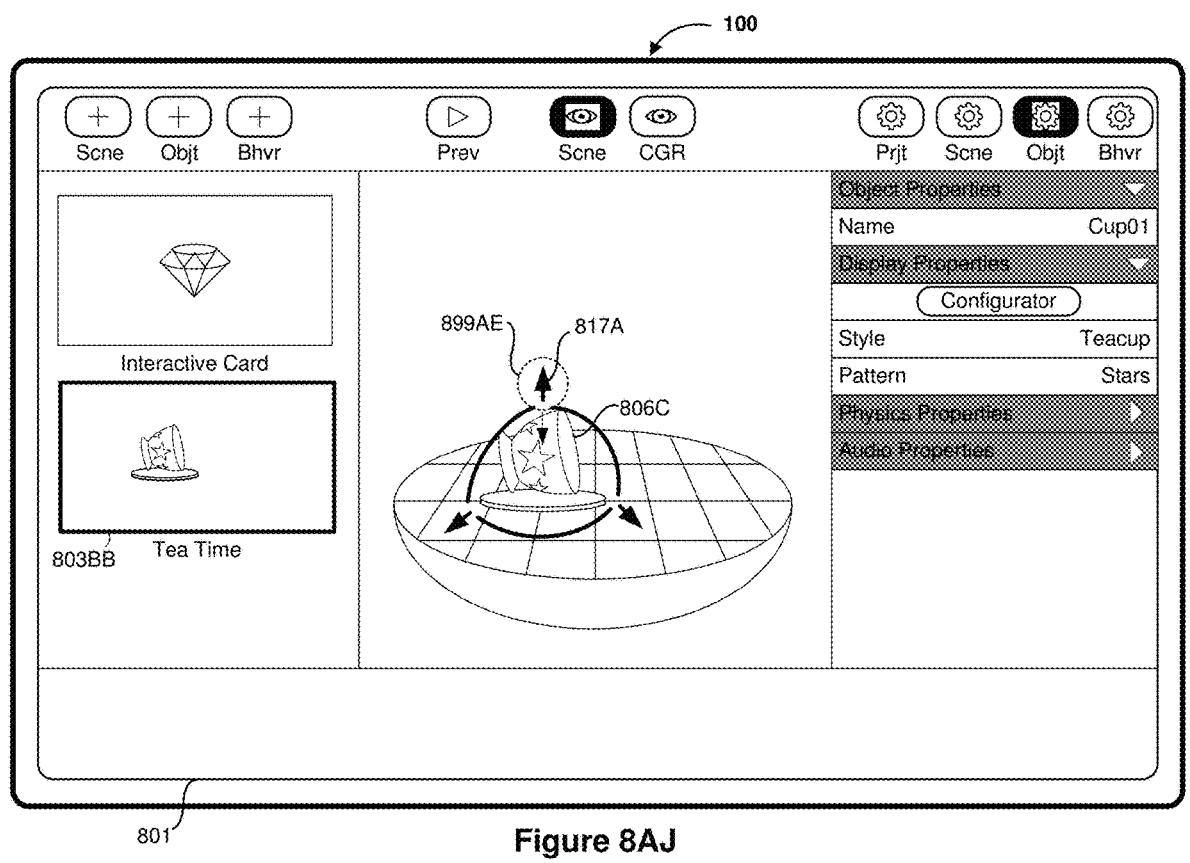
Figure 8A:
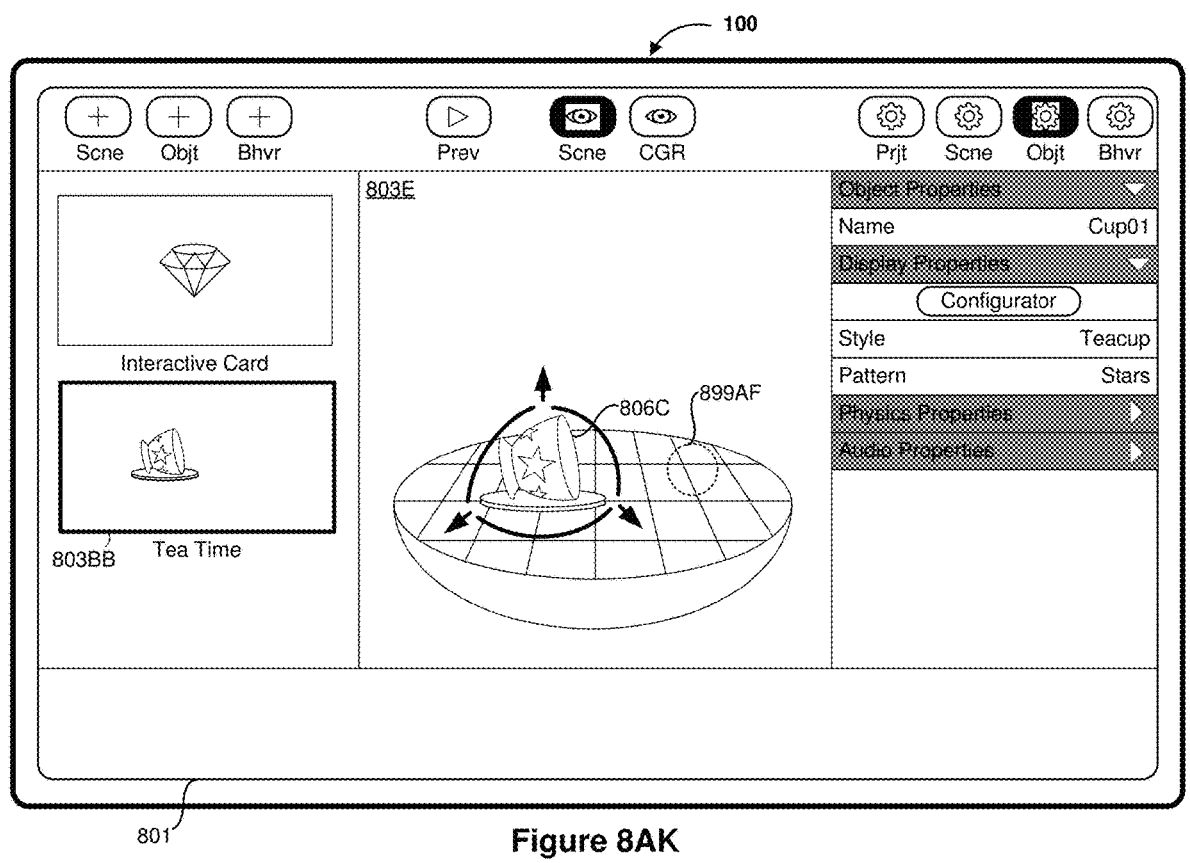
Figure 8A:
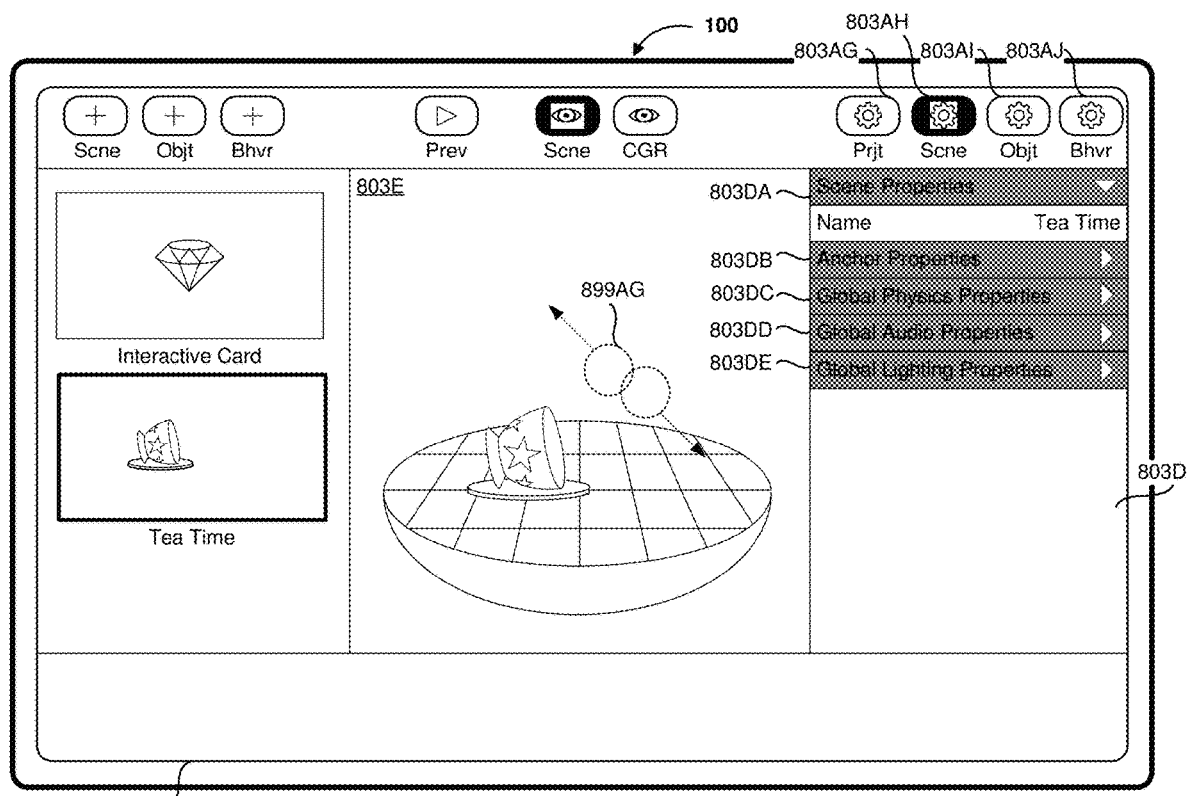
Figure 8A:
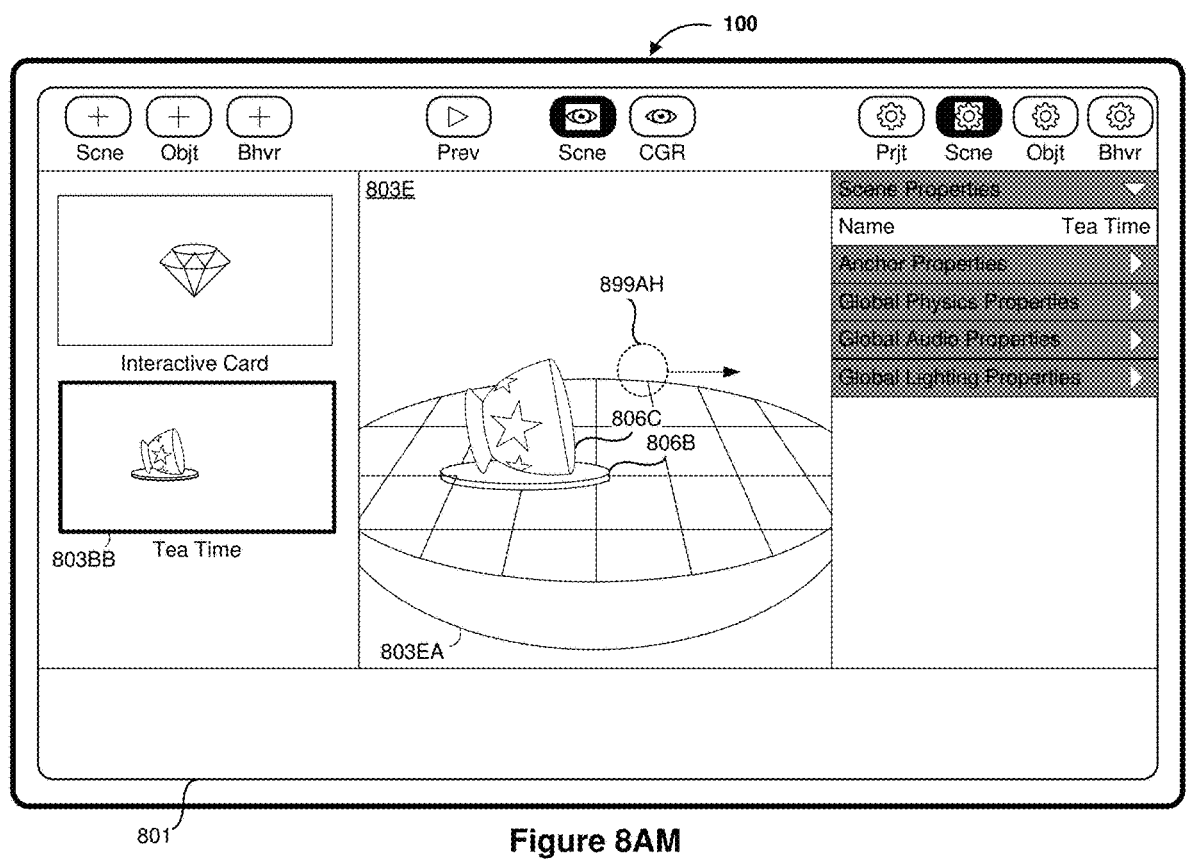
Figure 8A:
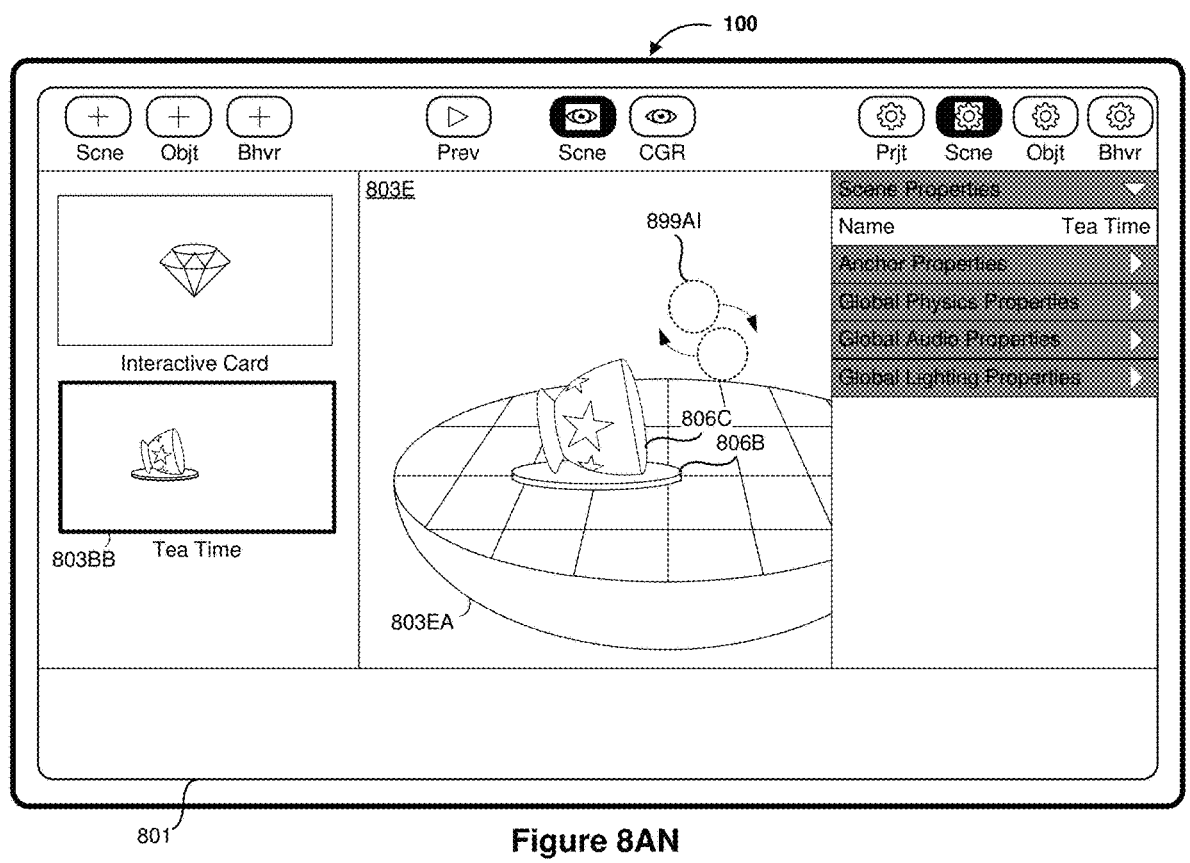
Figure 8A:
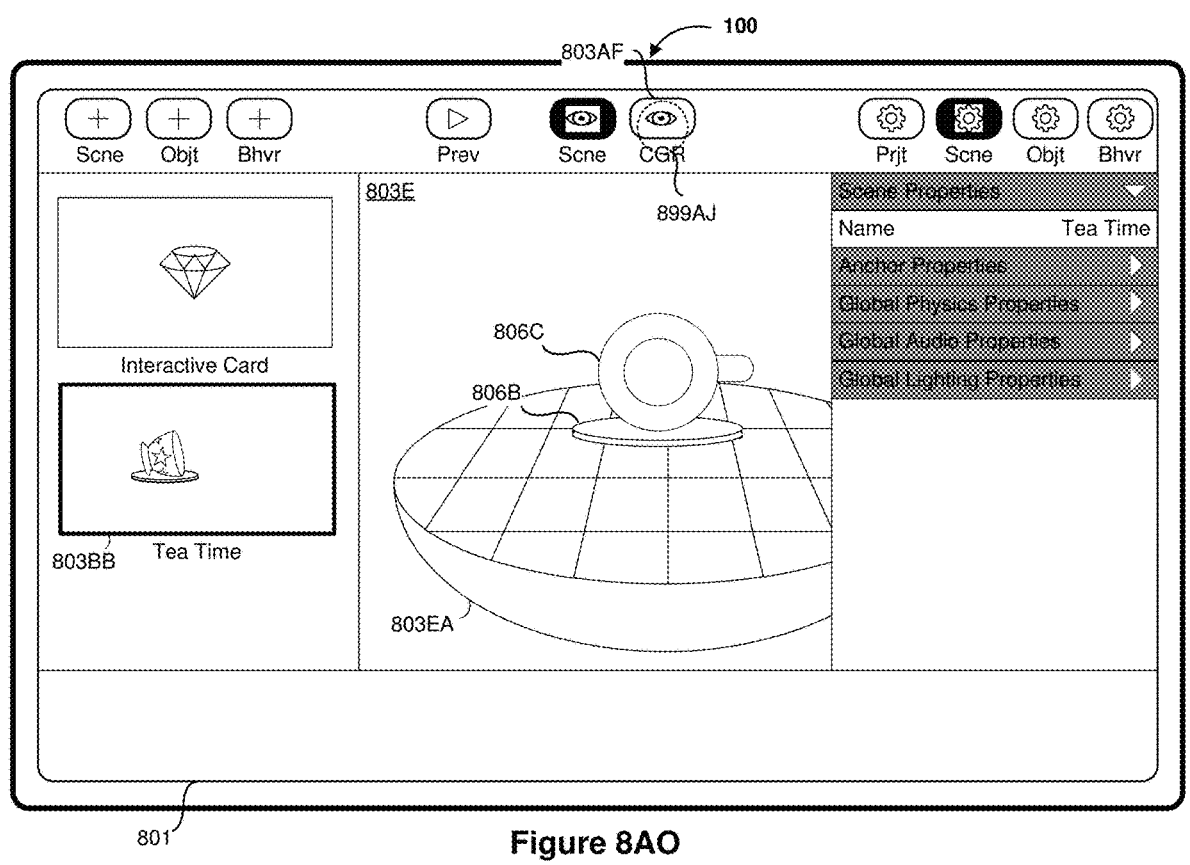
Figure 8A:
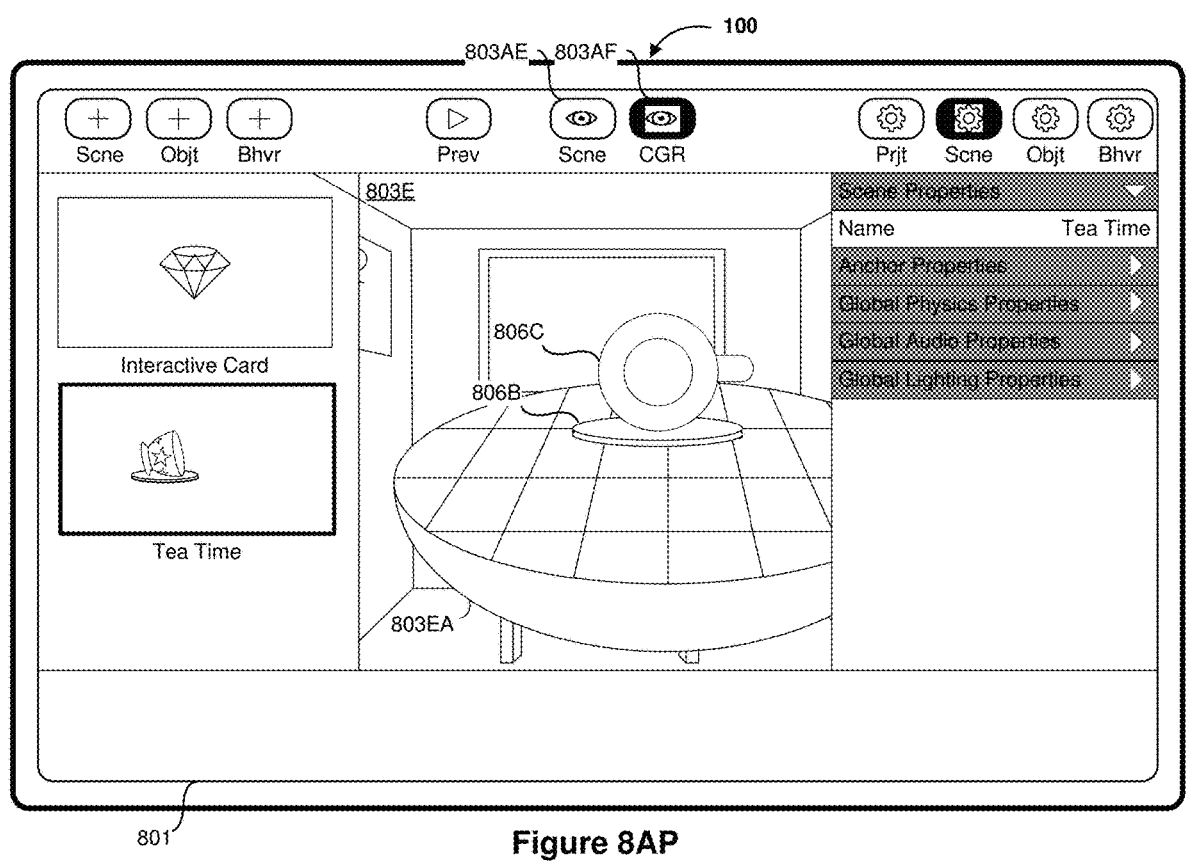
Figure 8A:
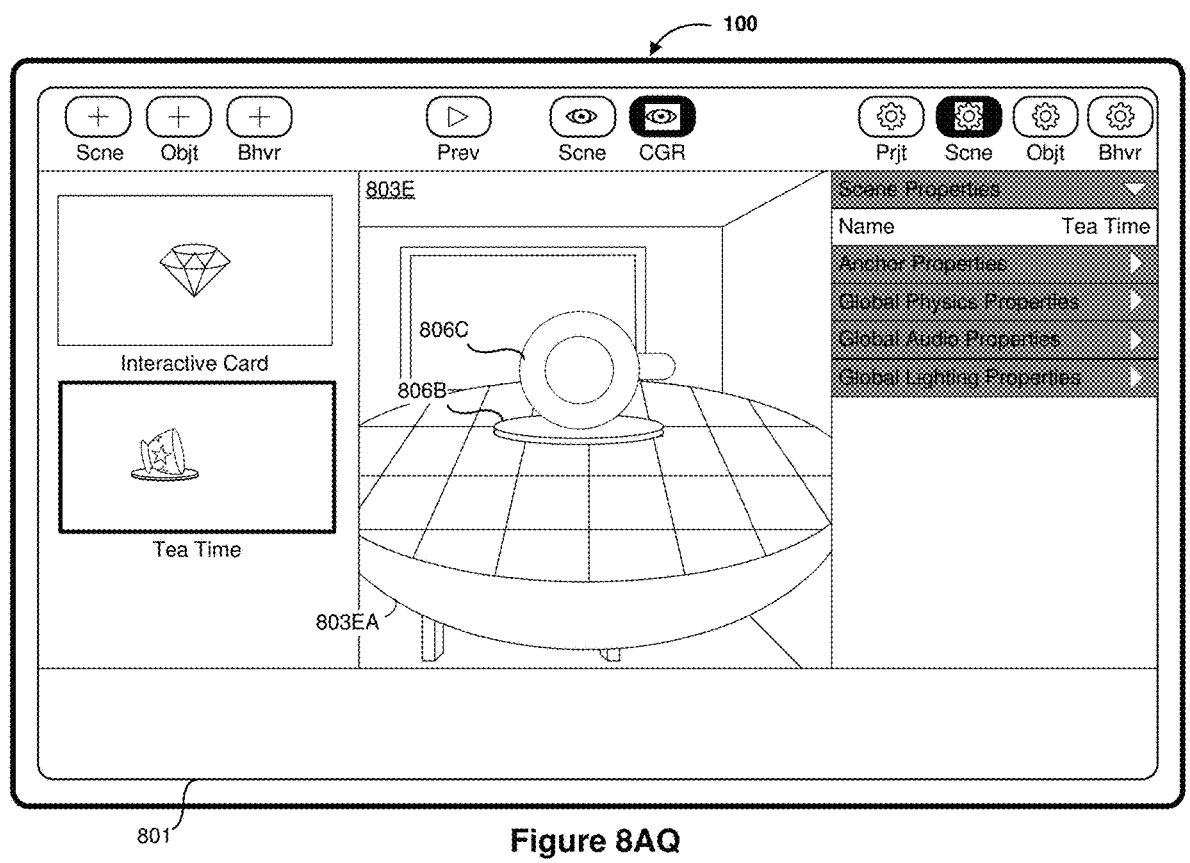
Figure 8A:
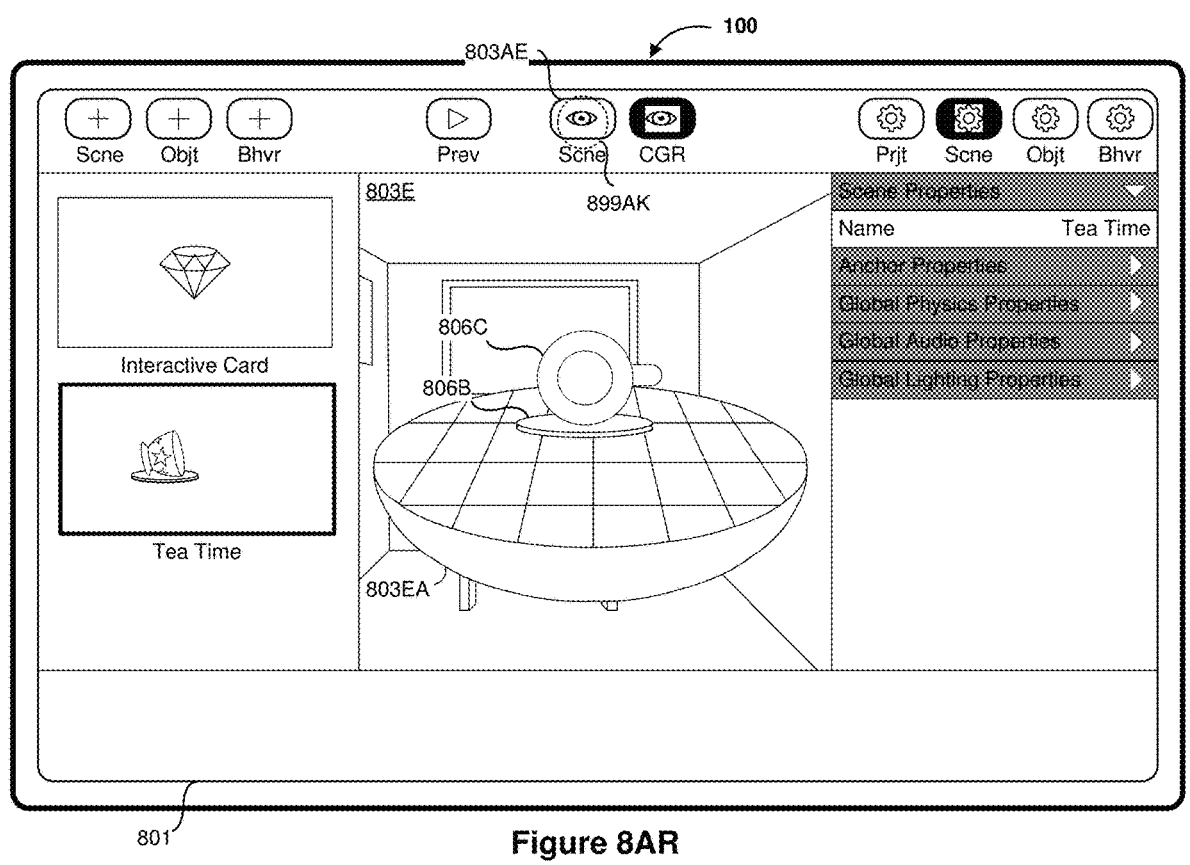
Figure 8A:
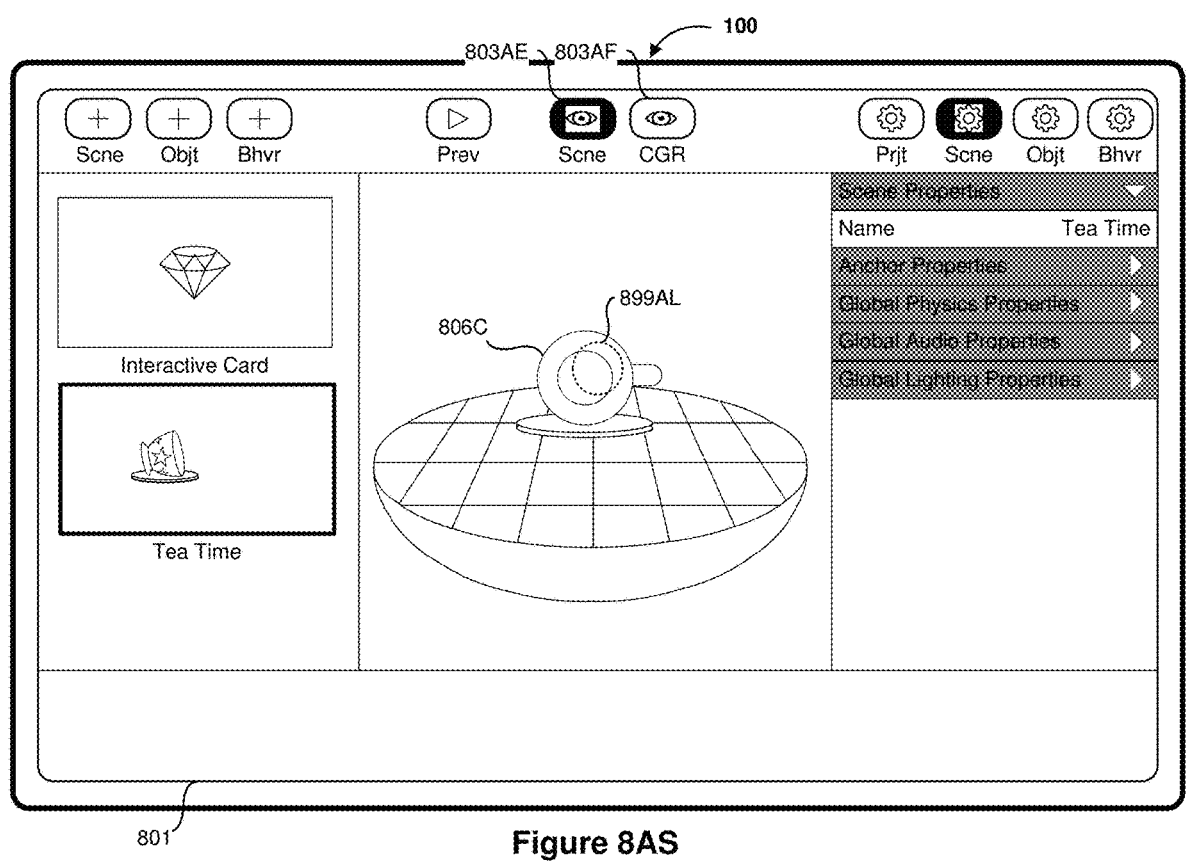
Figure 8A:
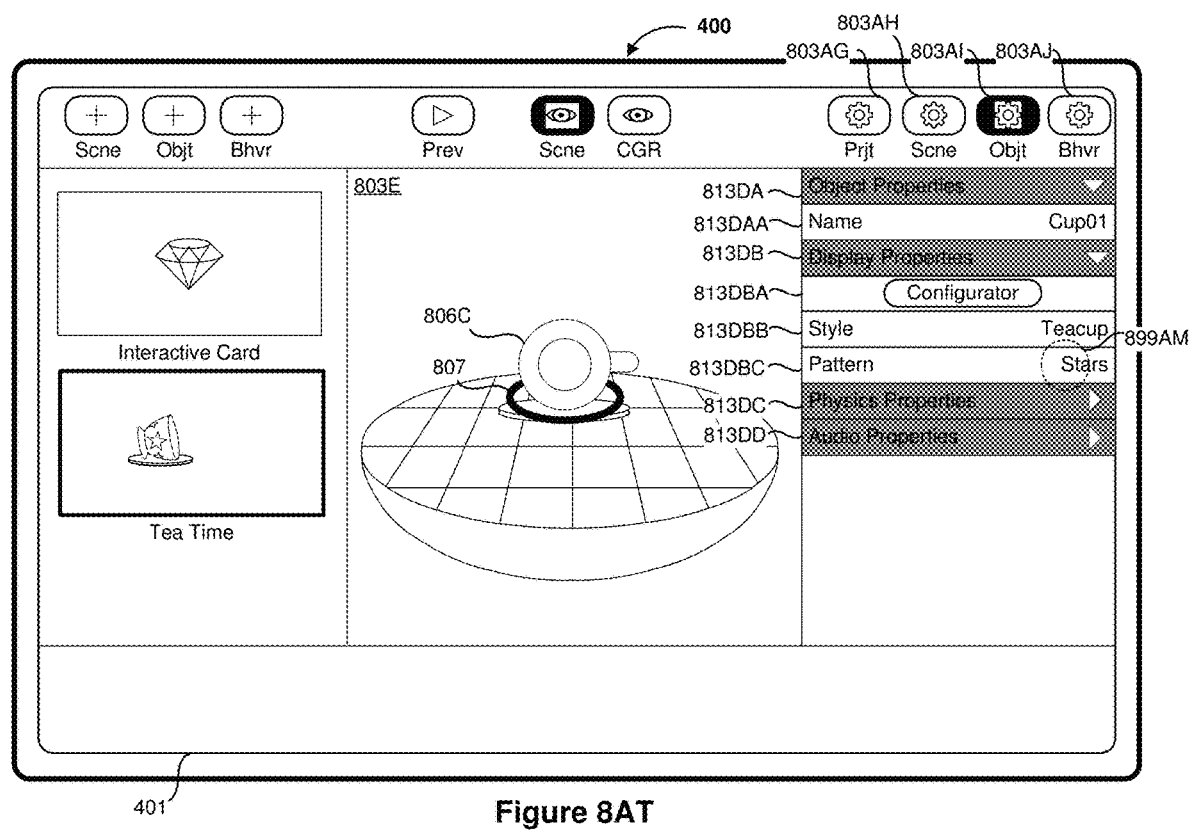
Figure 8A:
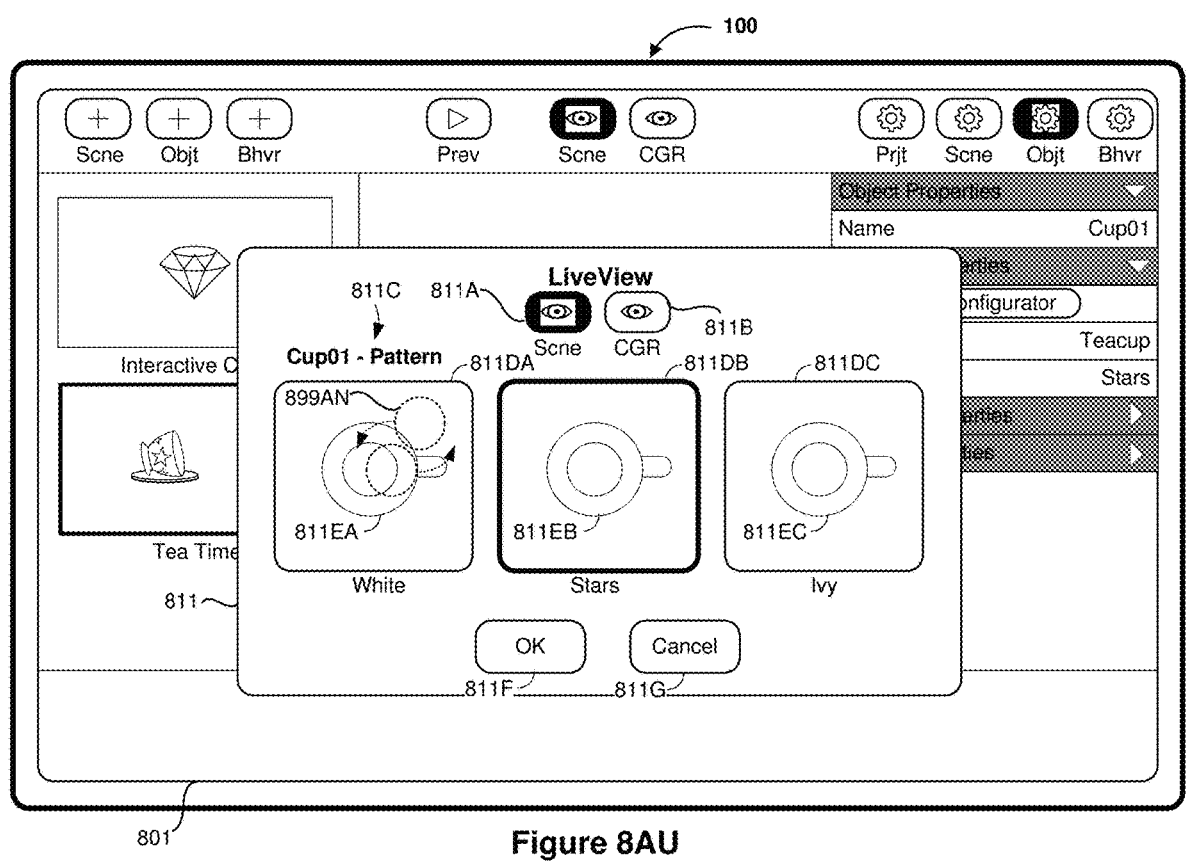
Figure 8A:
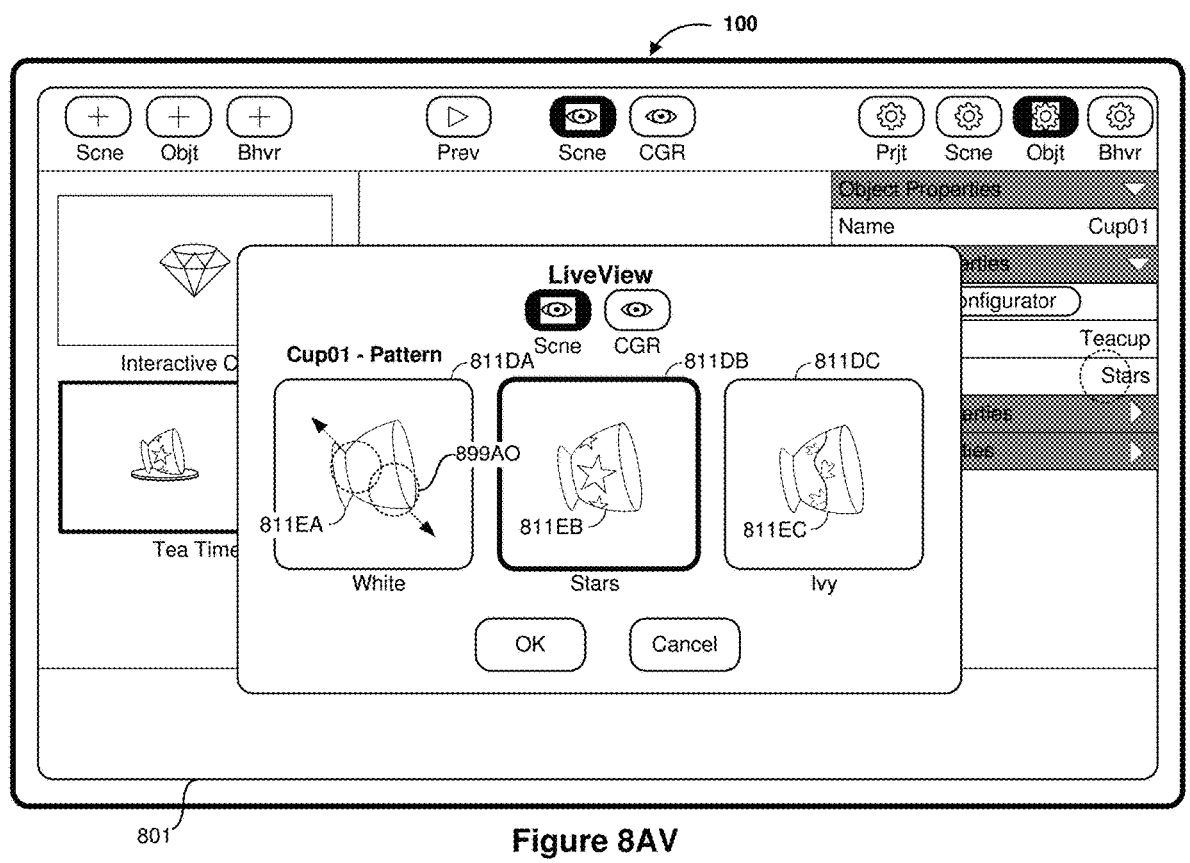
Figure 8A:
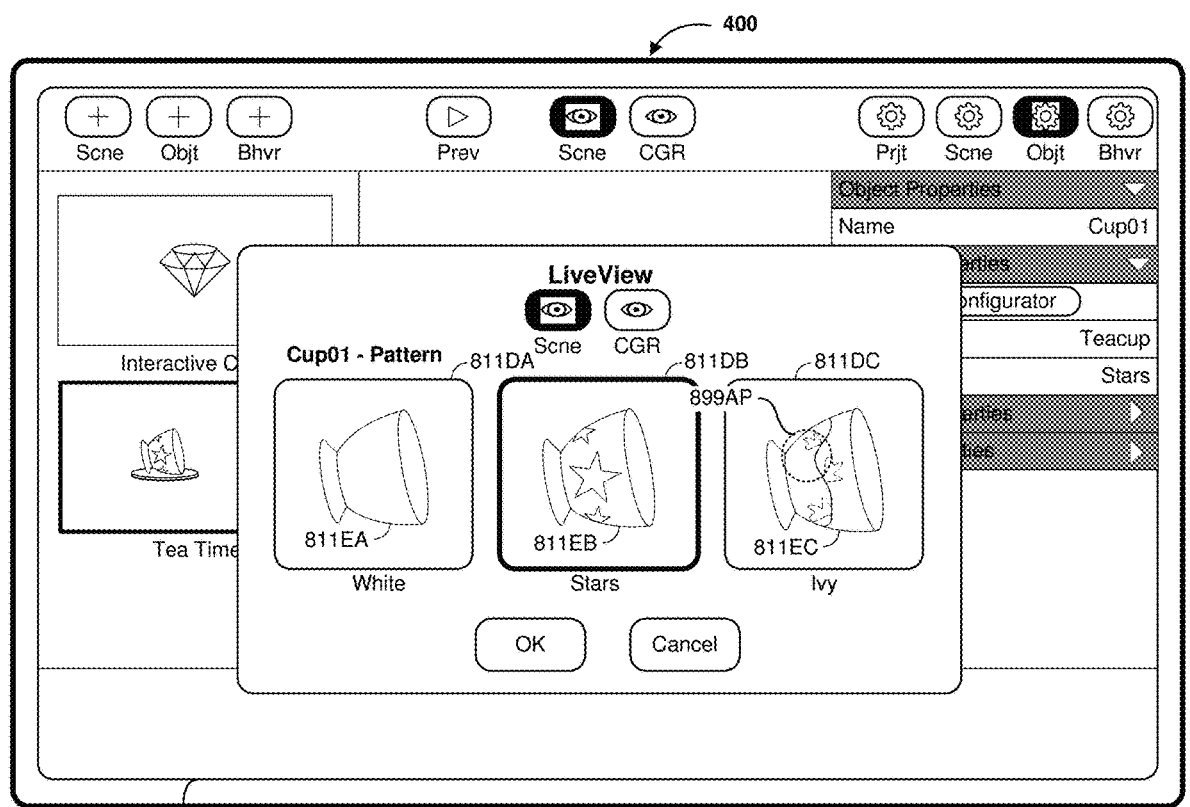
Figure 8A:
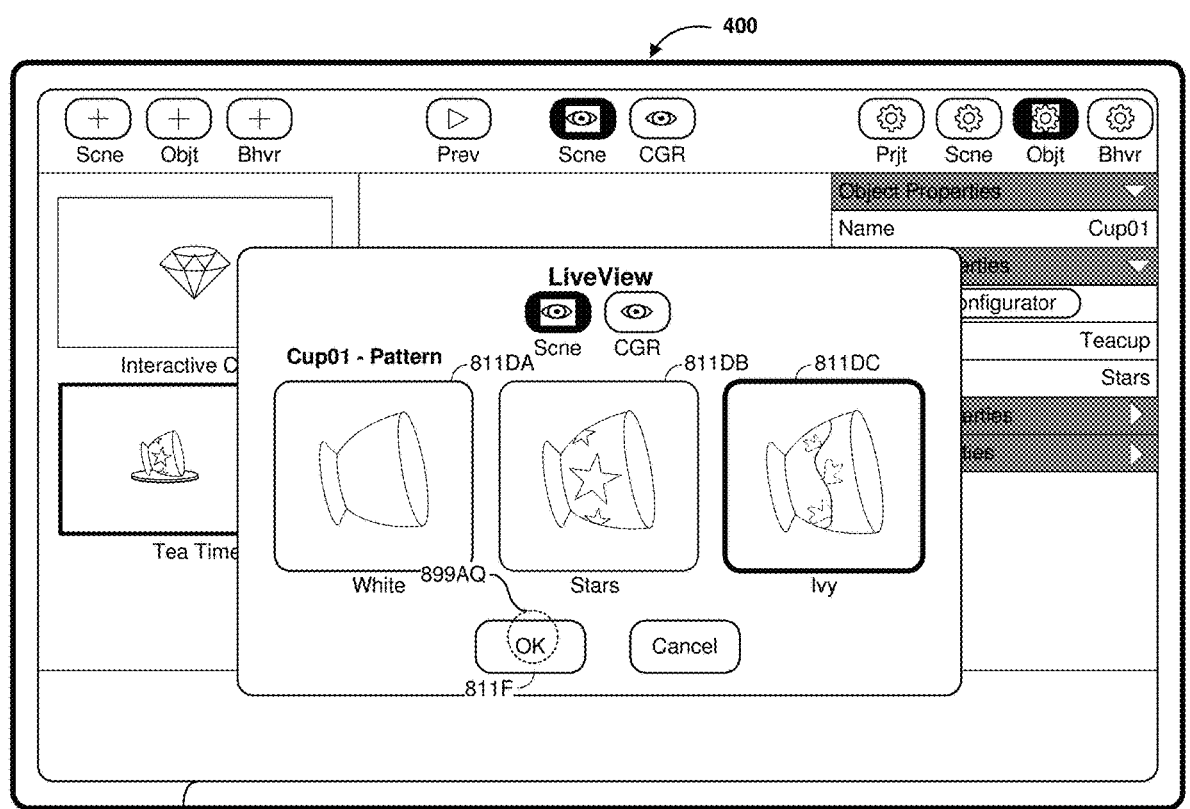
Figure 8A:
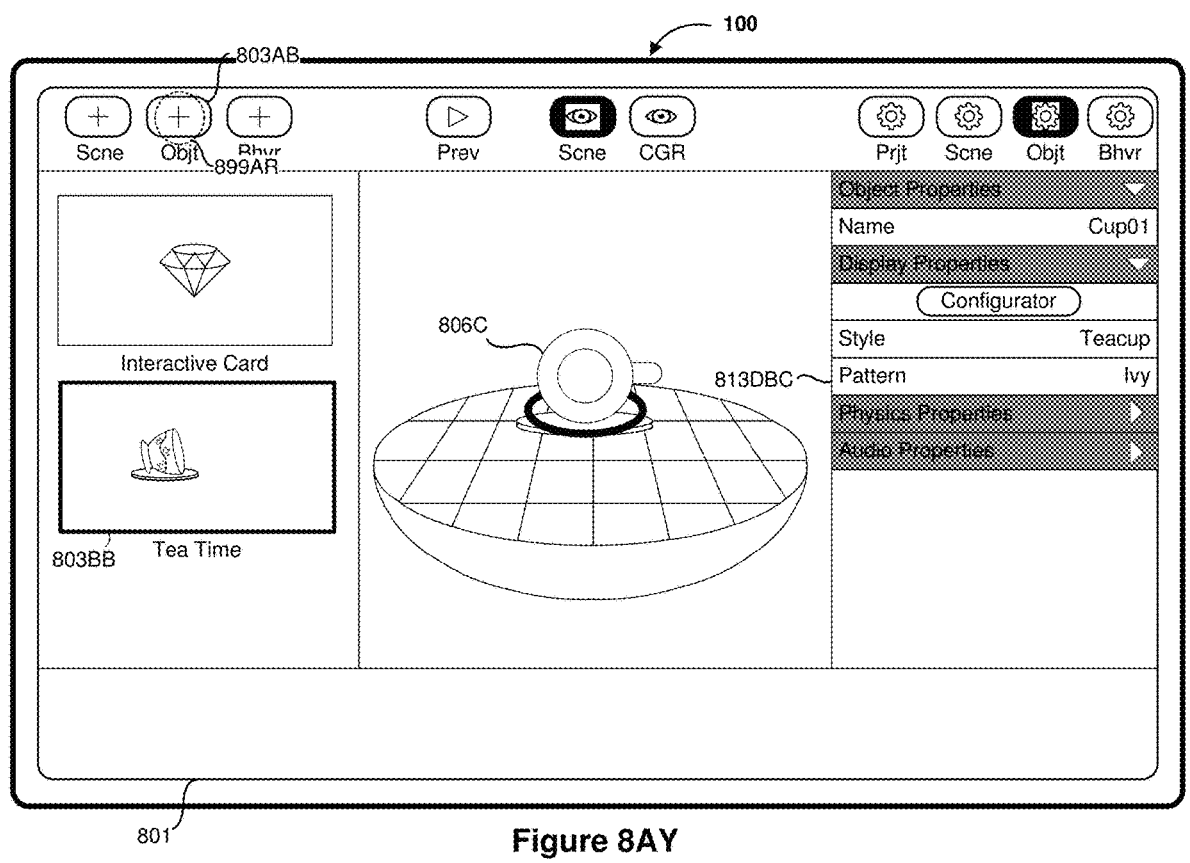
Figure 8A:
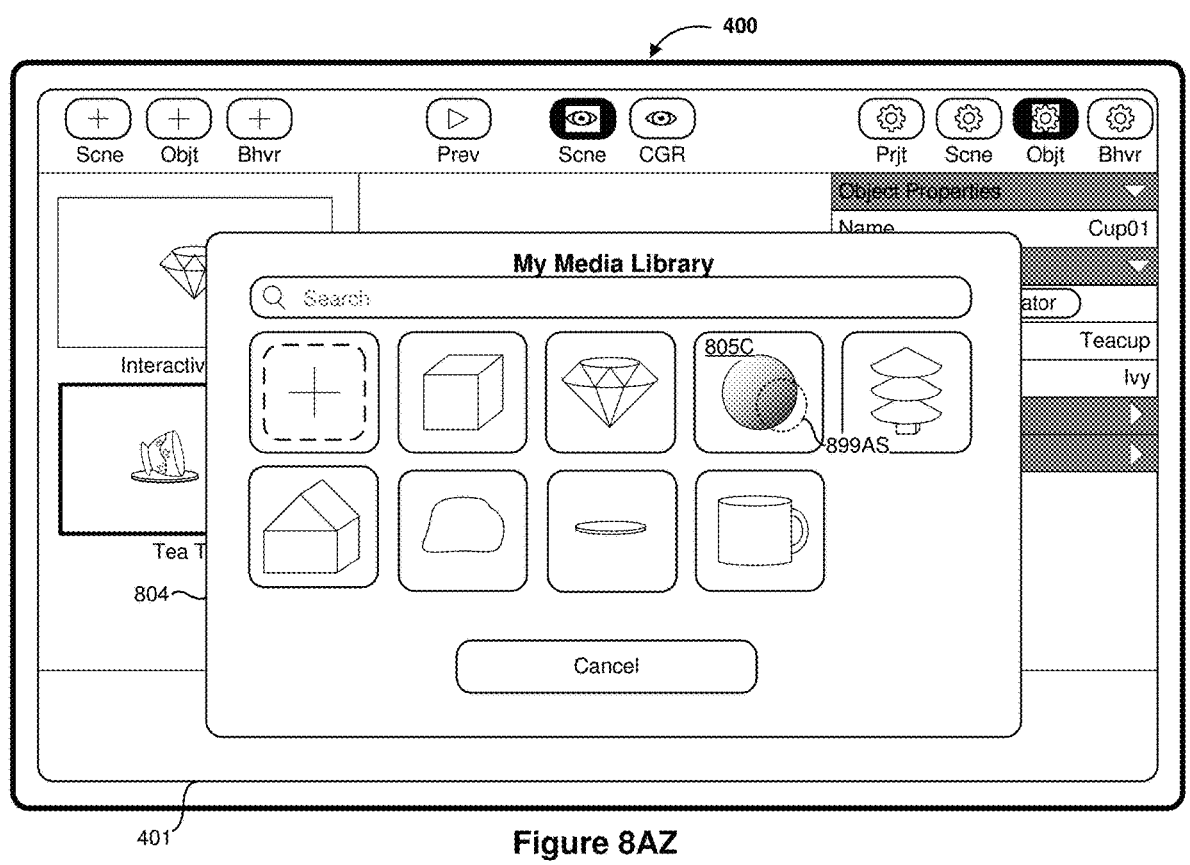
Figure 8B:
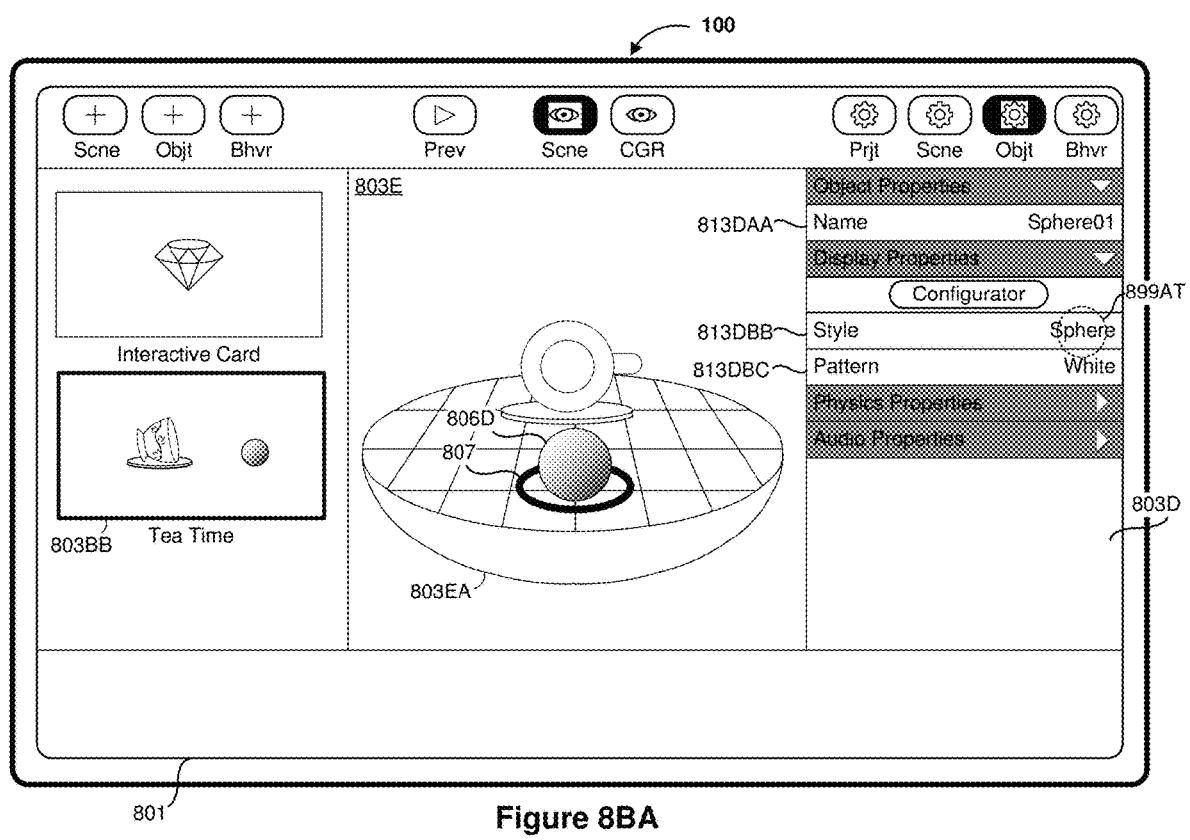
Figure 8B:
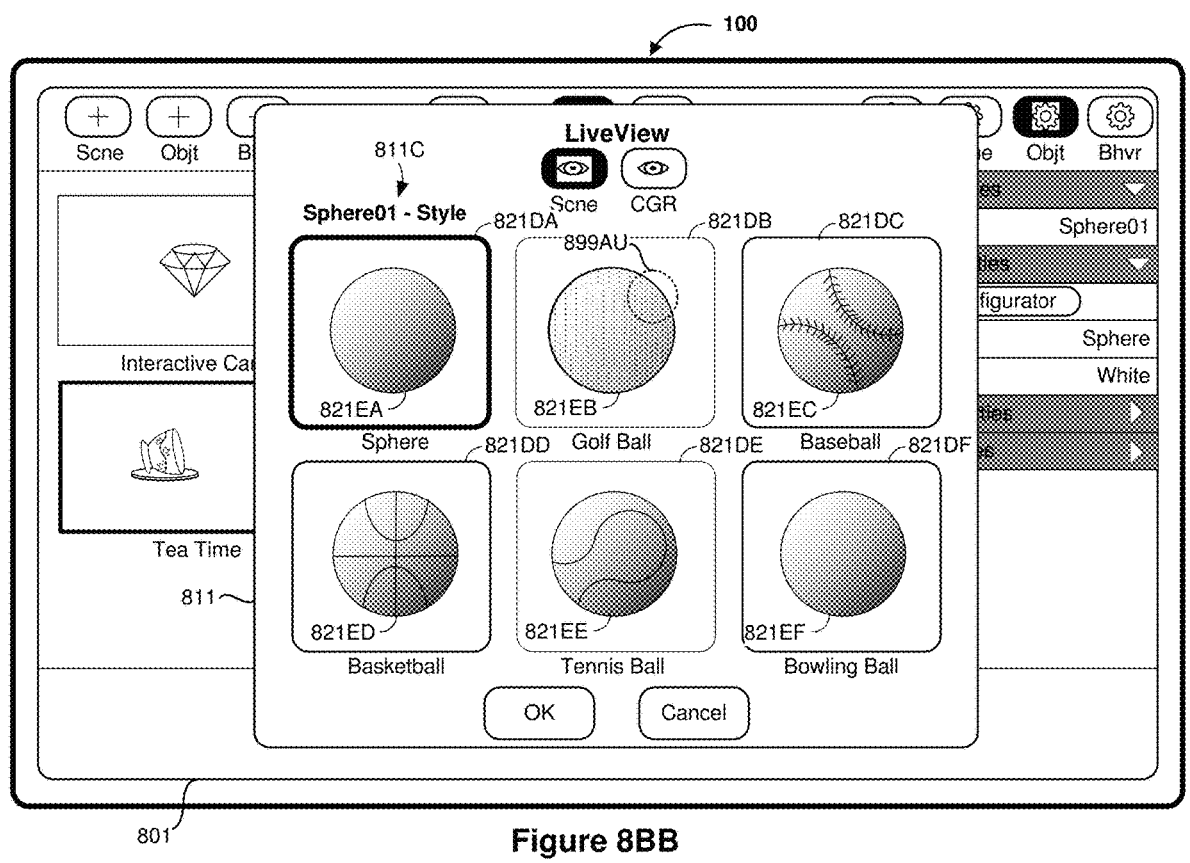
Figure 8B:
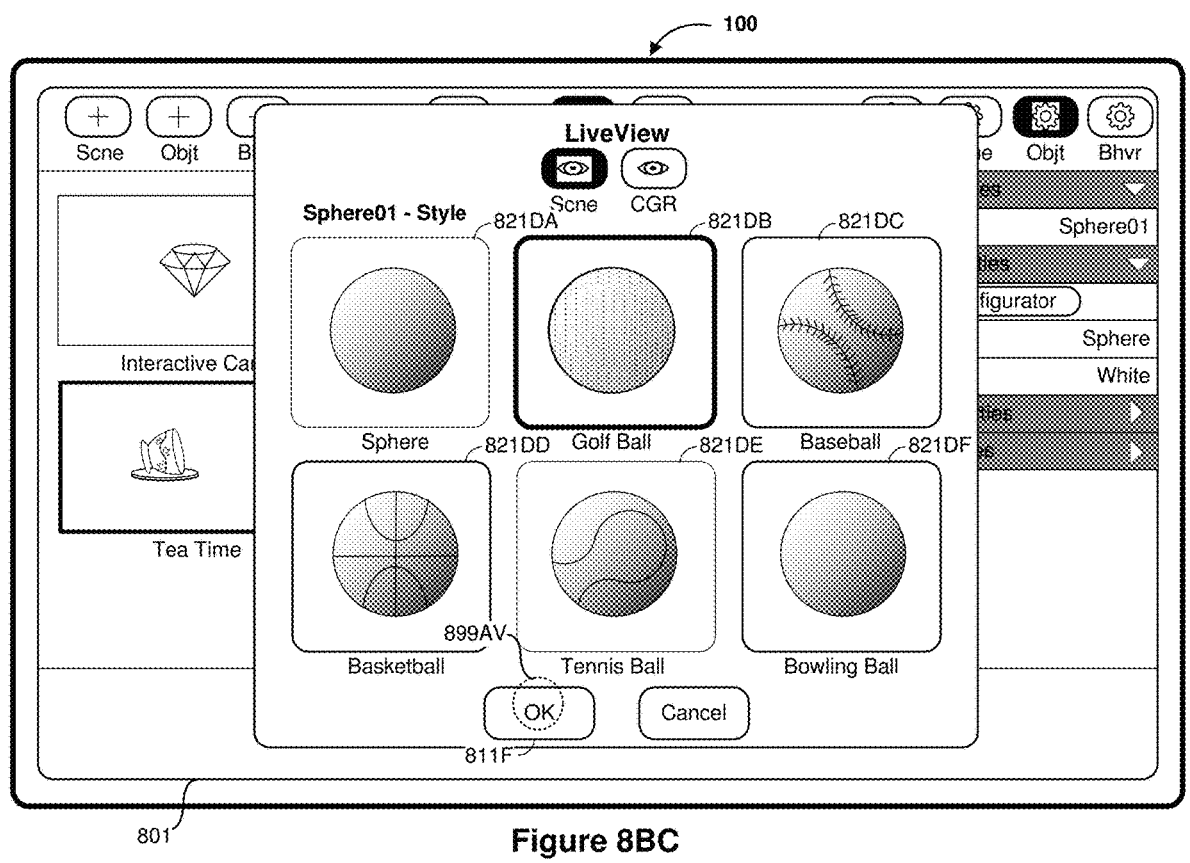
Figure 8B:
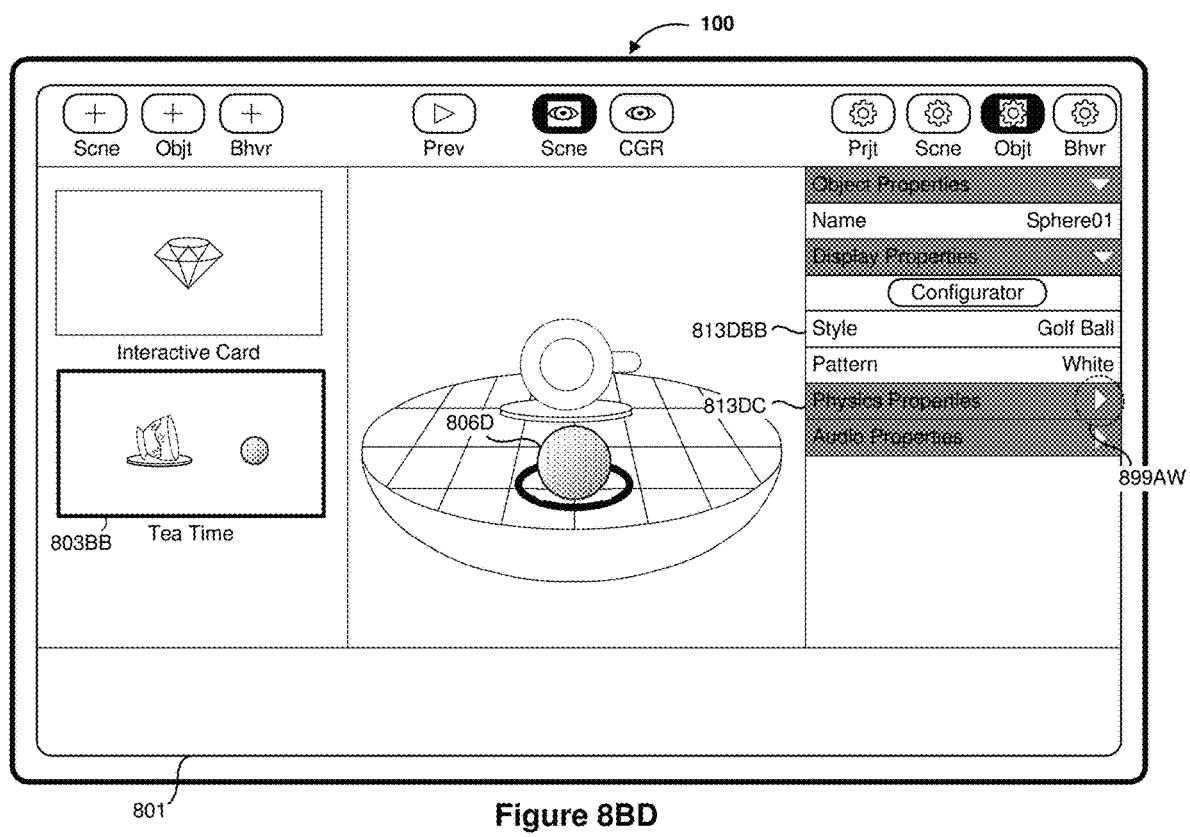
Figure 8B:
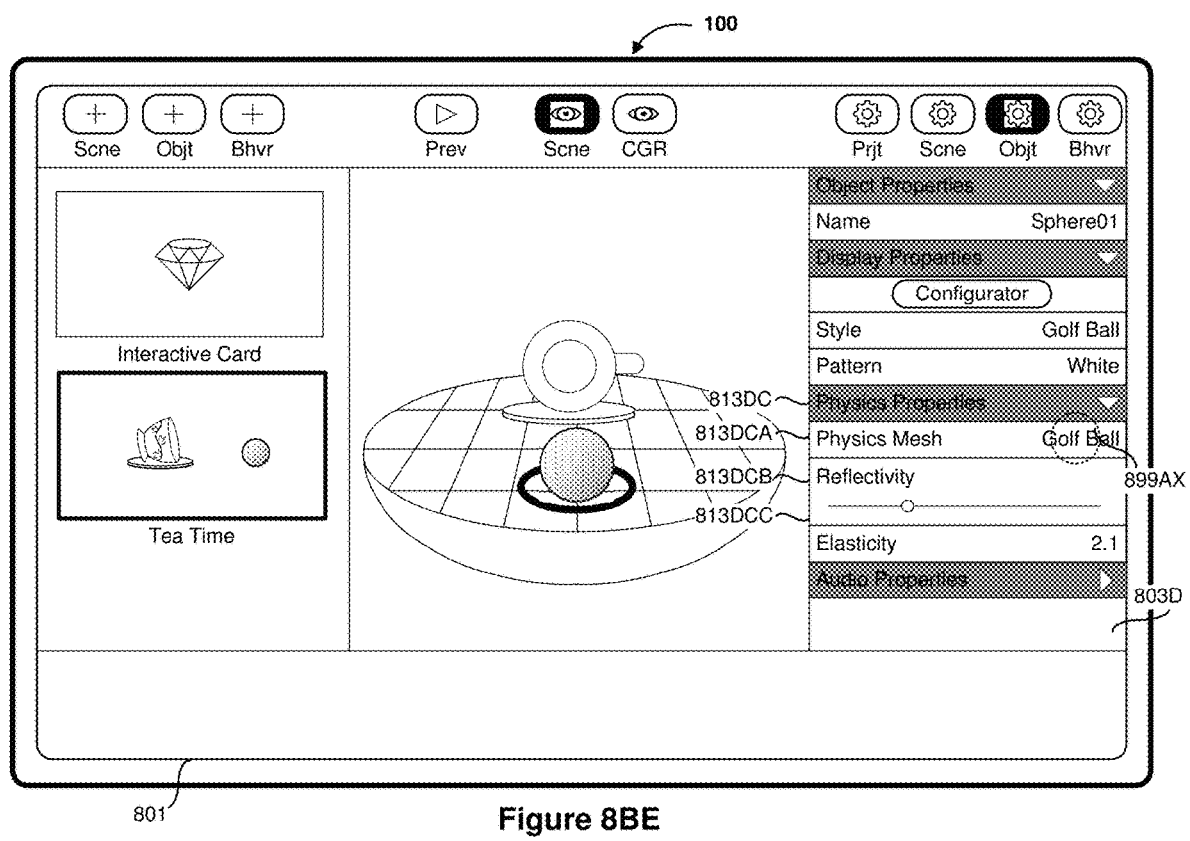
Figure 8B:
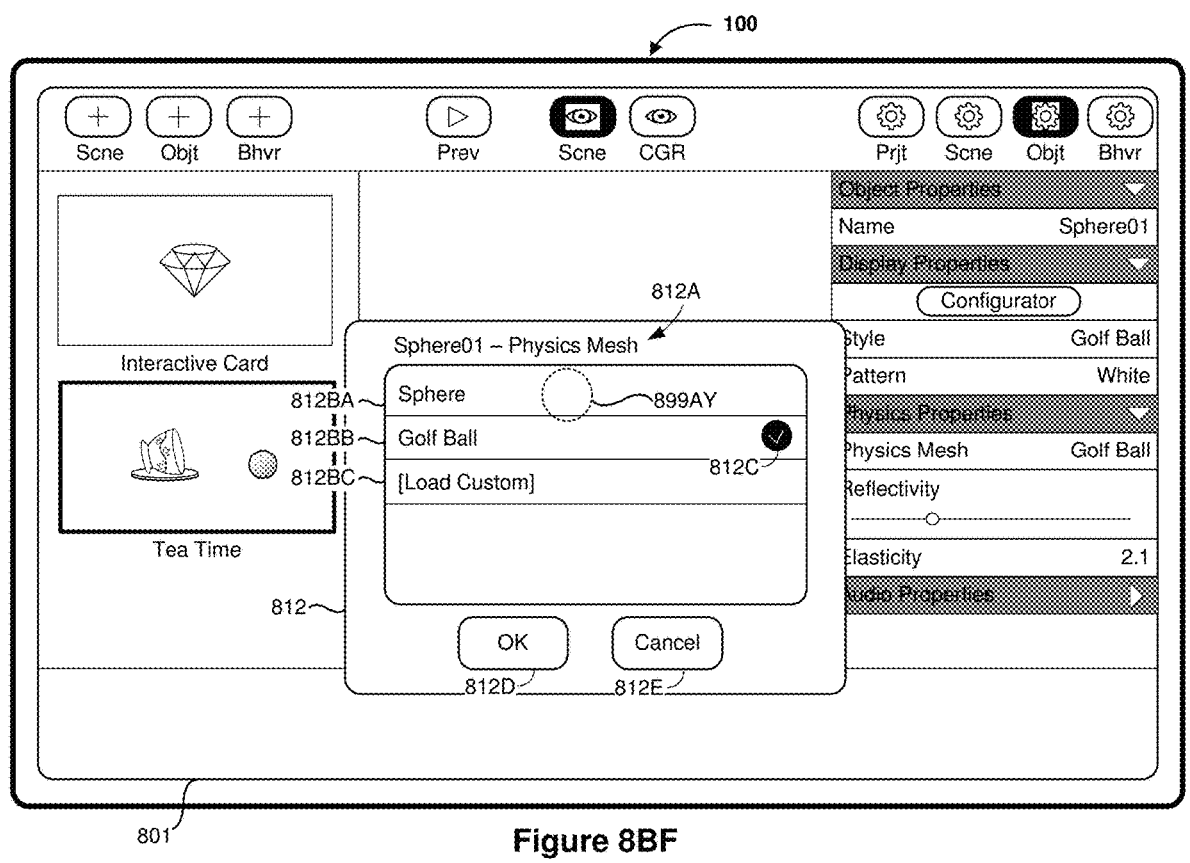
Figure 8B:
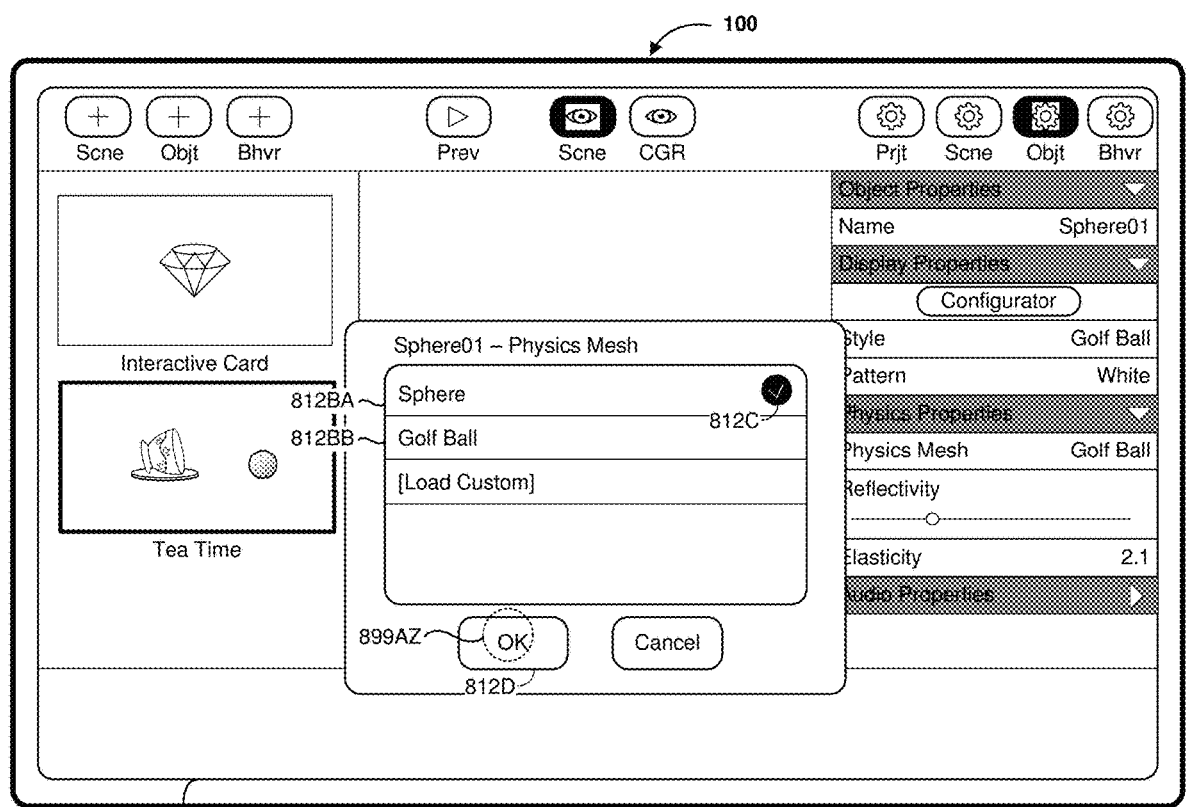
Figure 8B:
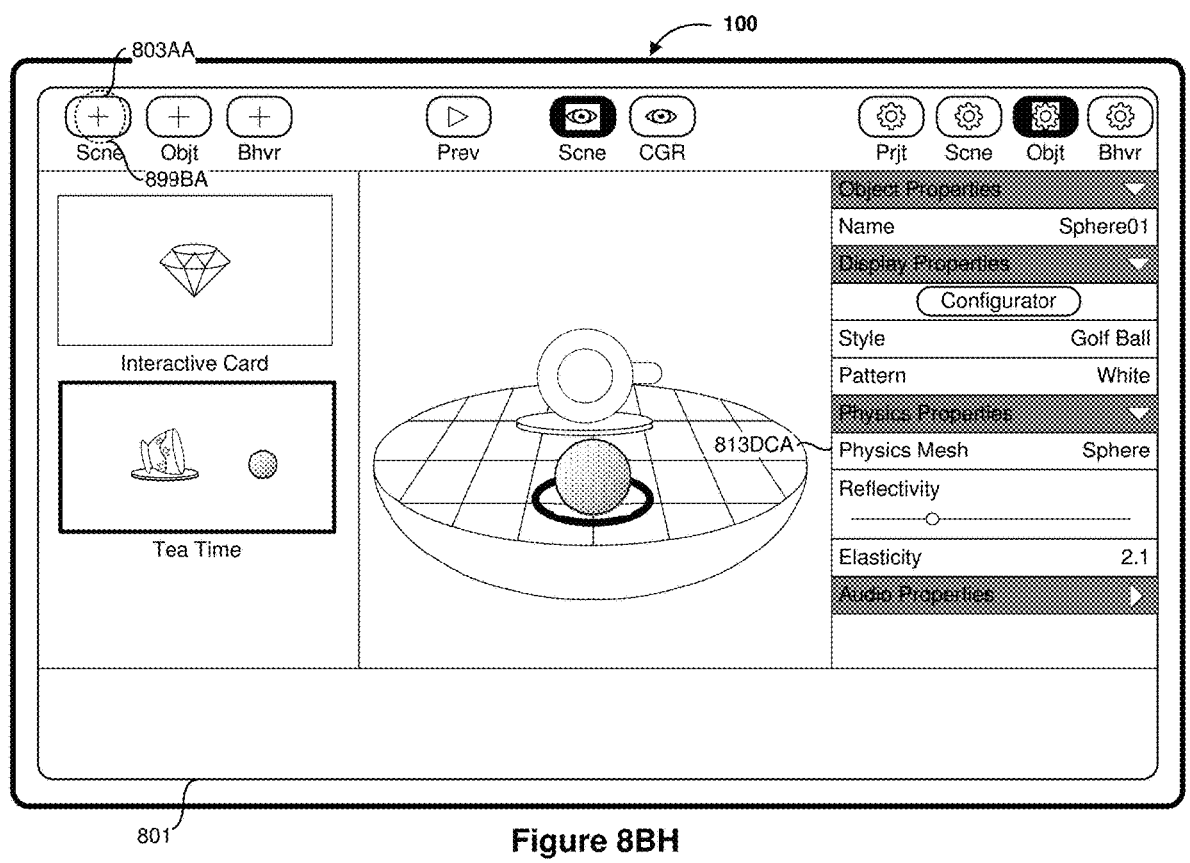
Figure 8B:
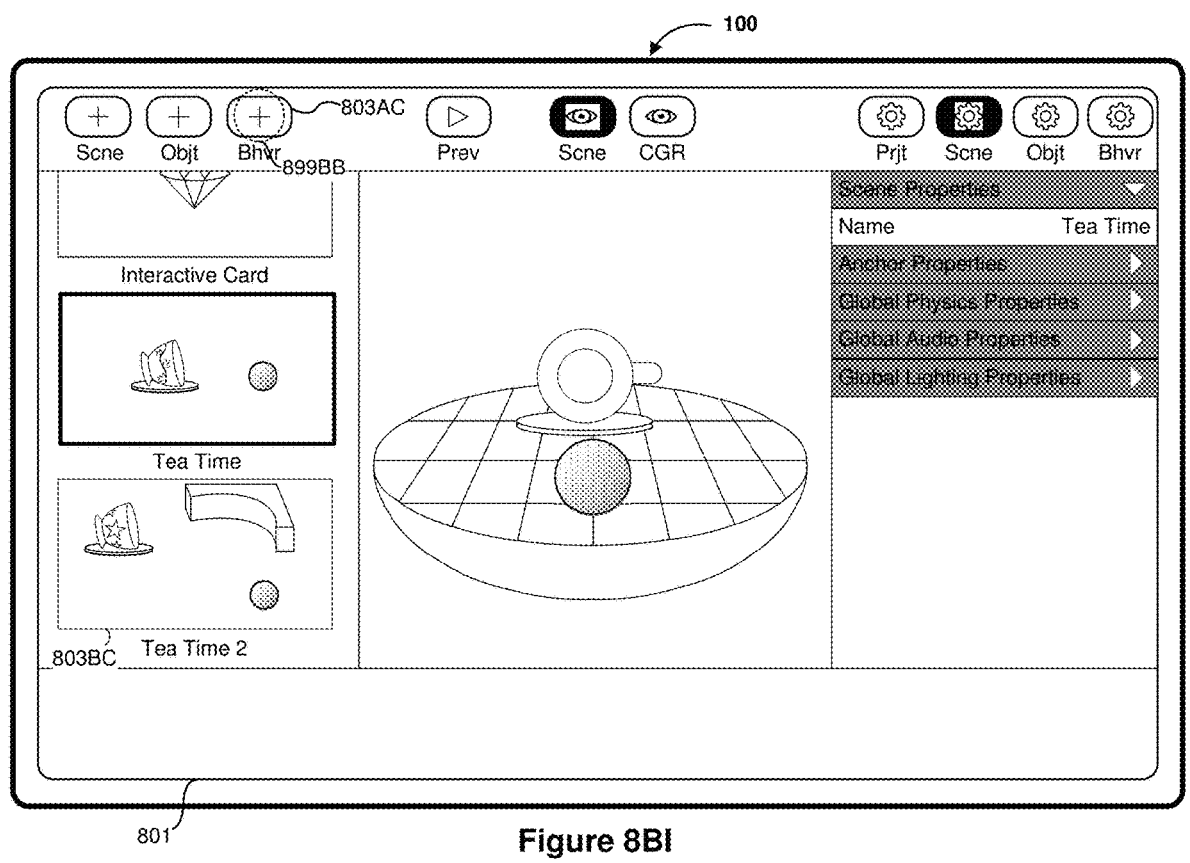
Figure 8B:
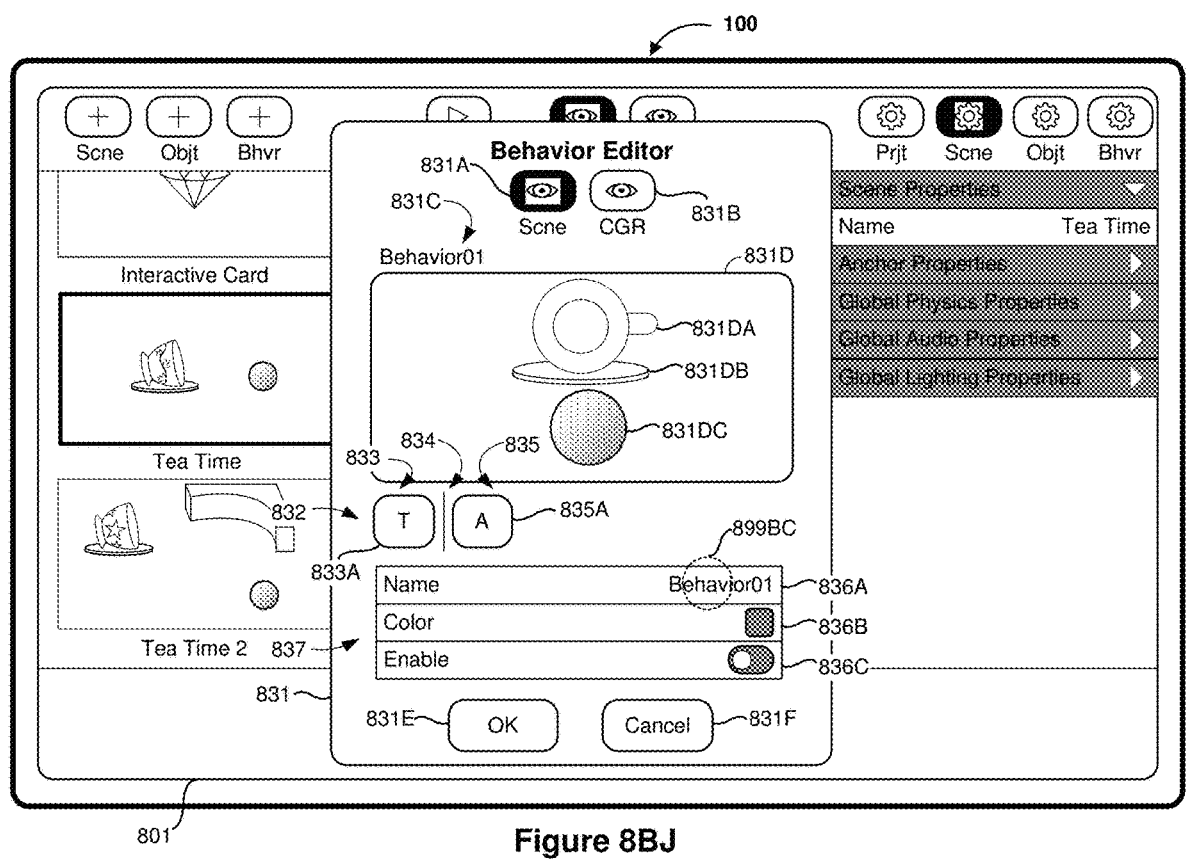
Figure 8B:
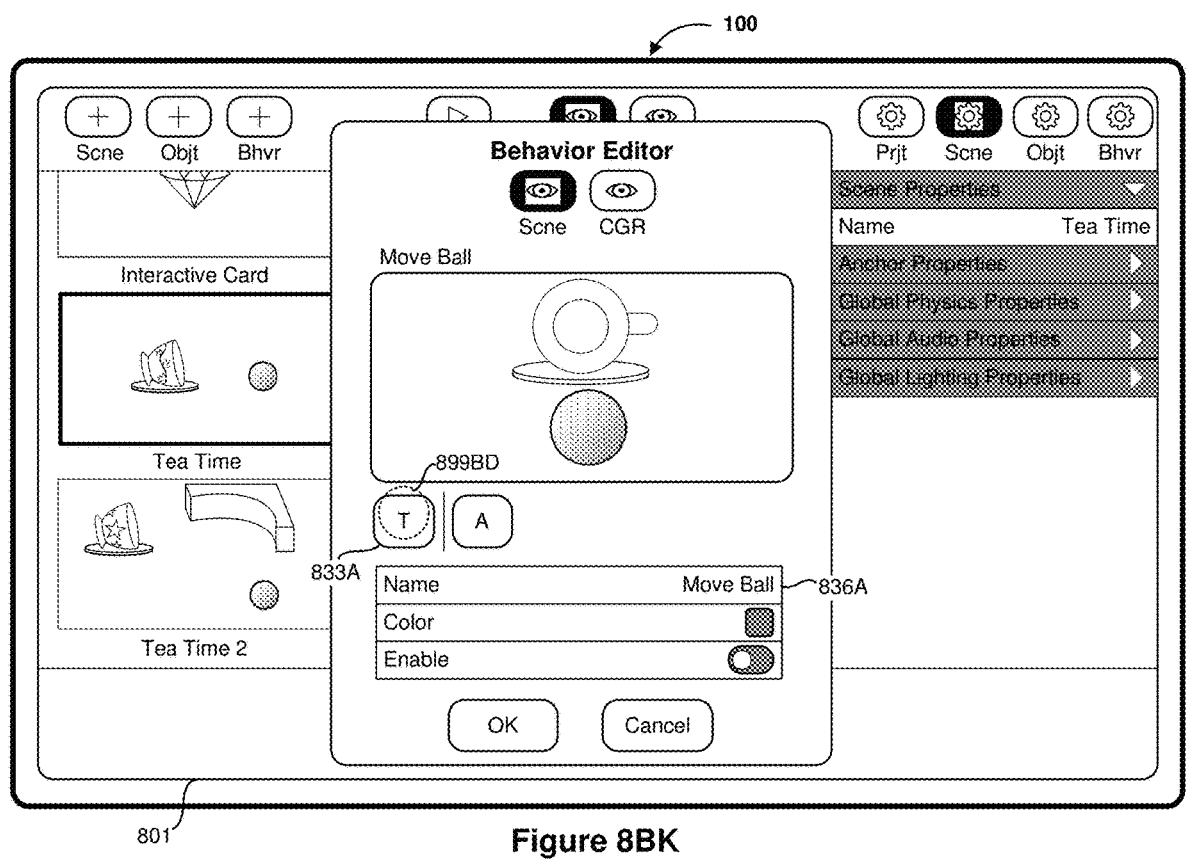
Figure 8B:
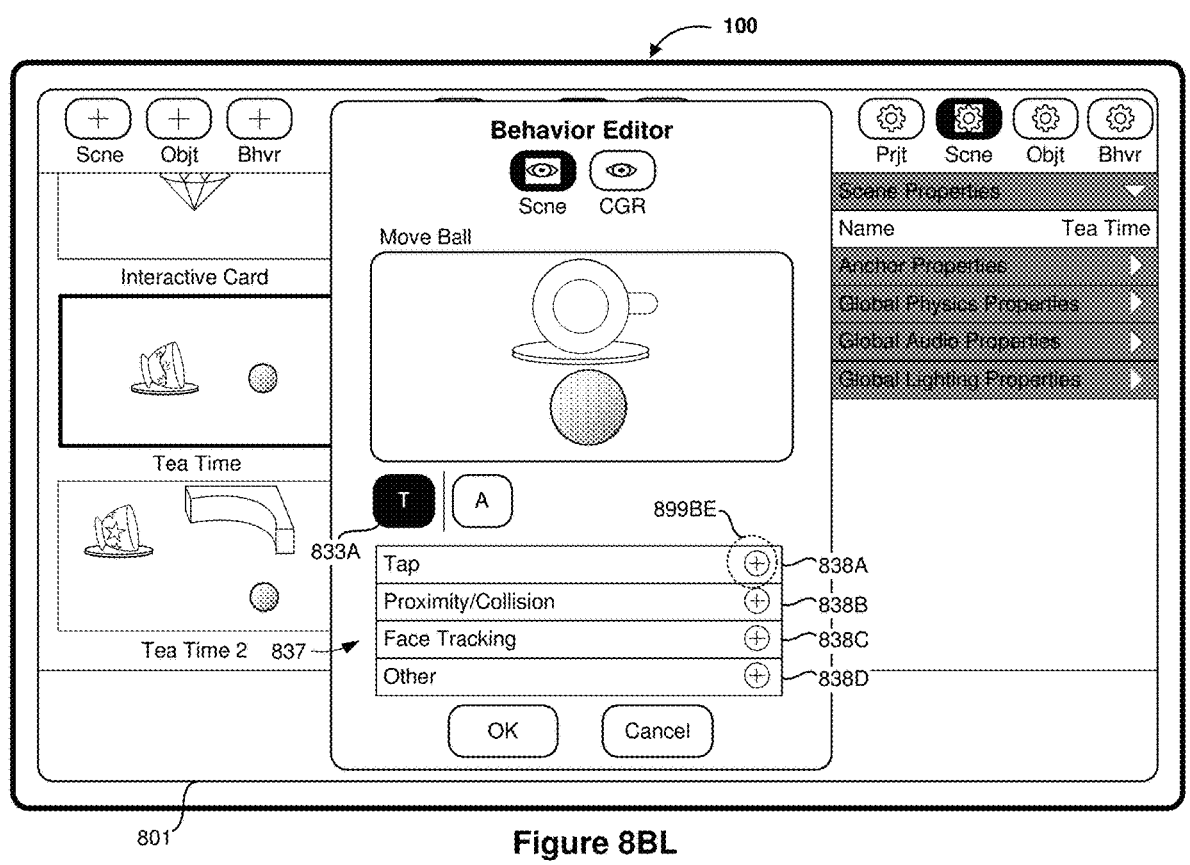
Figure 8B:
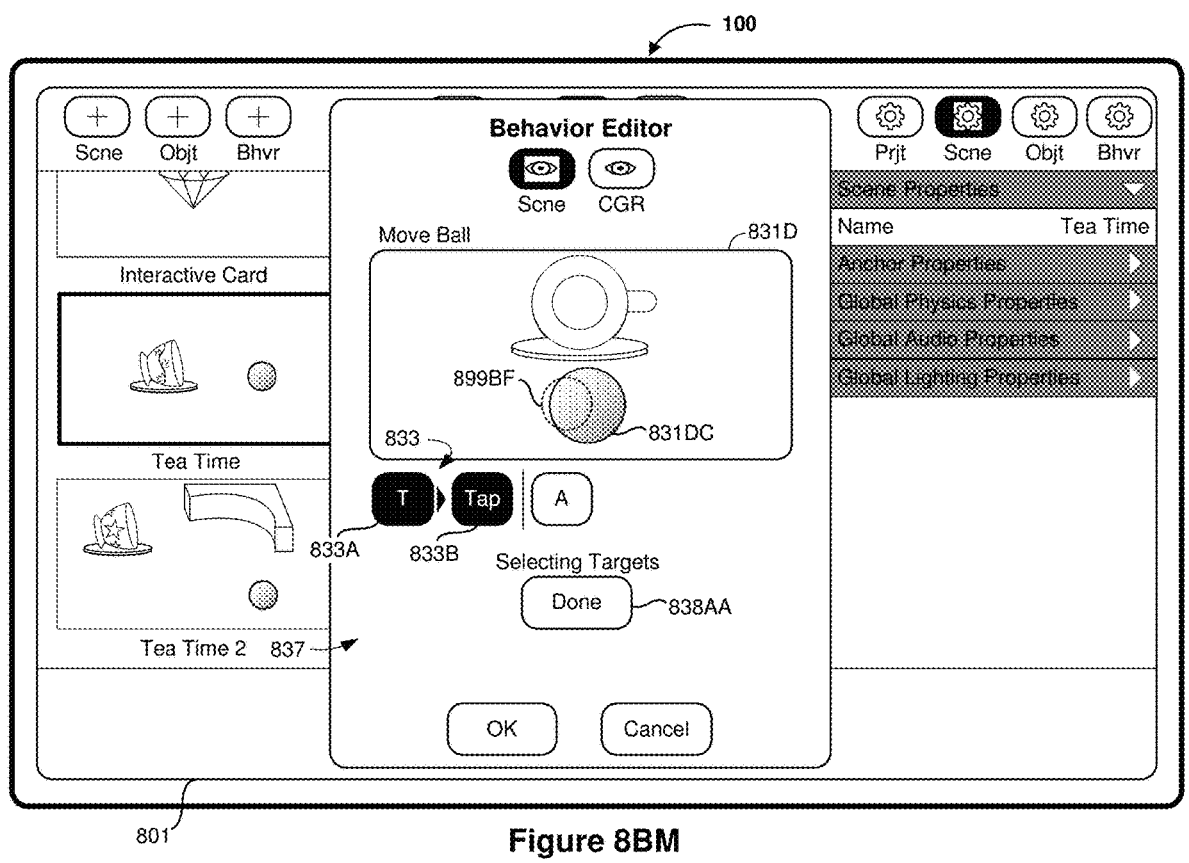
Figure 8B:
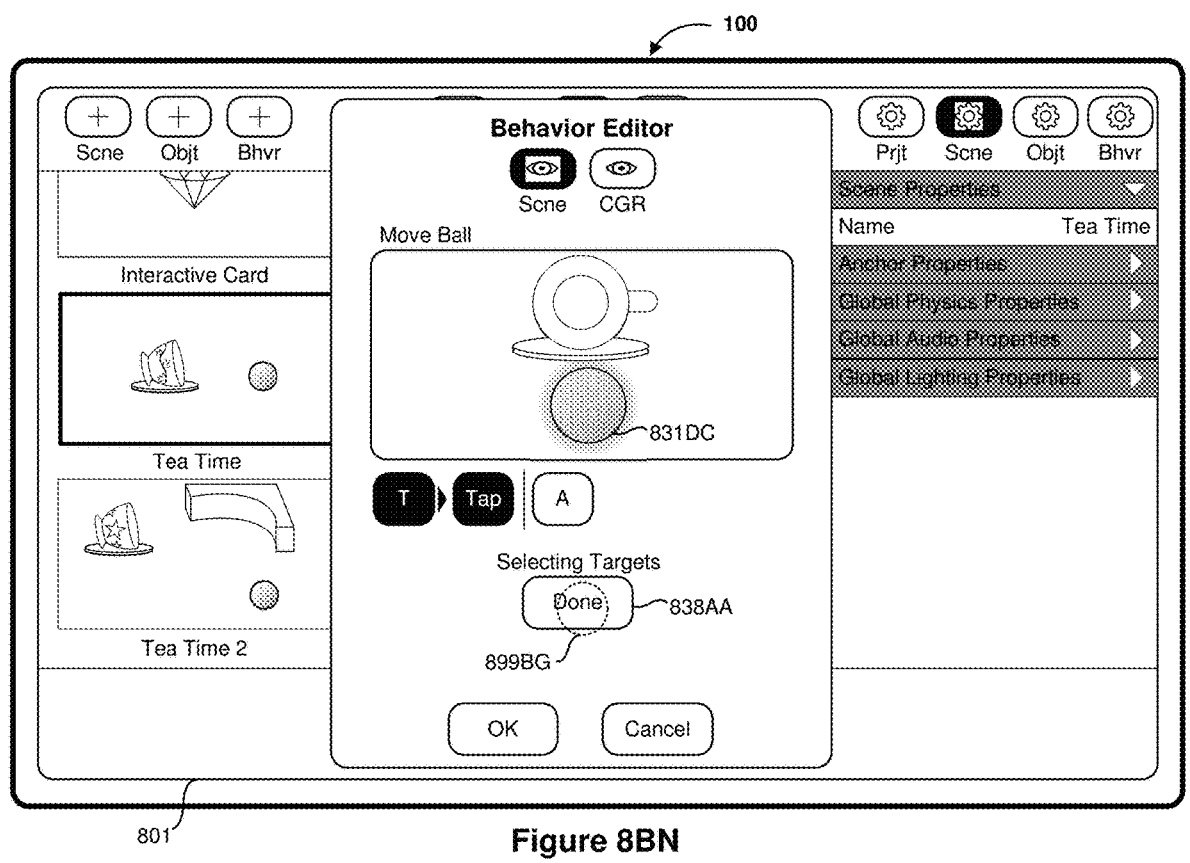
Figure 8B:
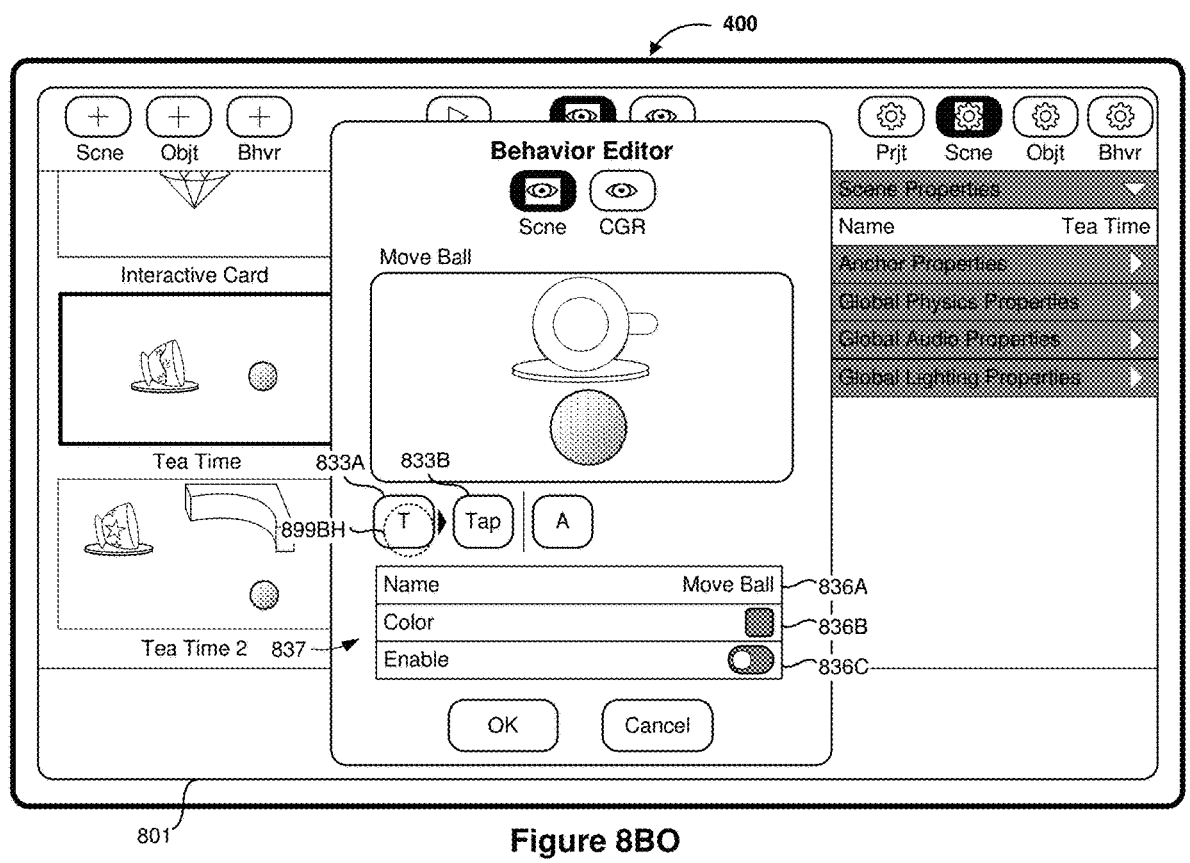
Figure 8B:
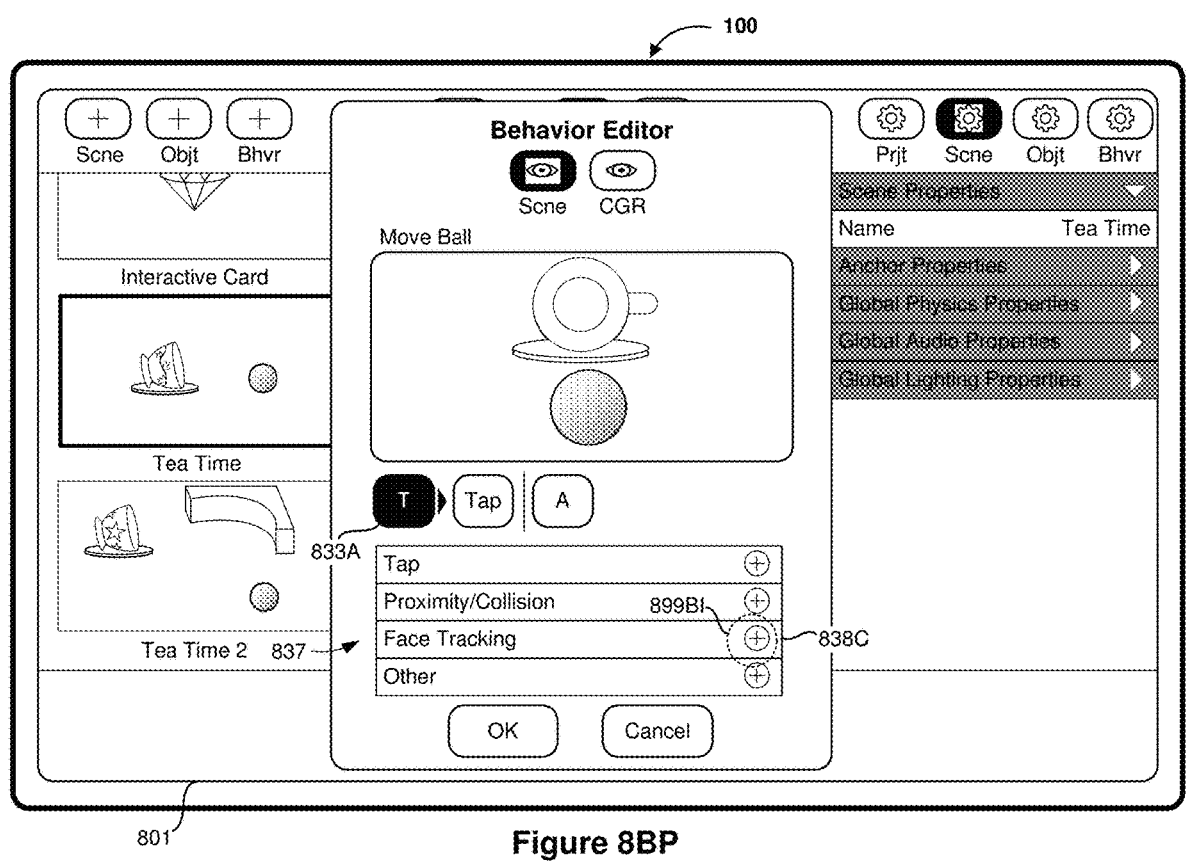
Figure 8B:
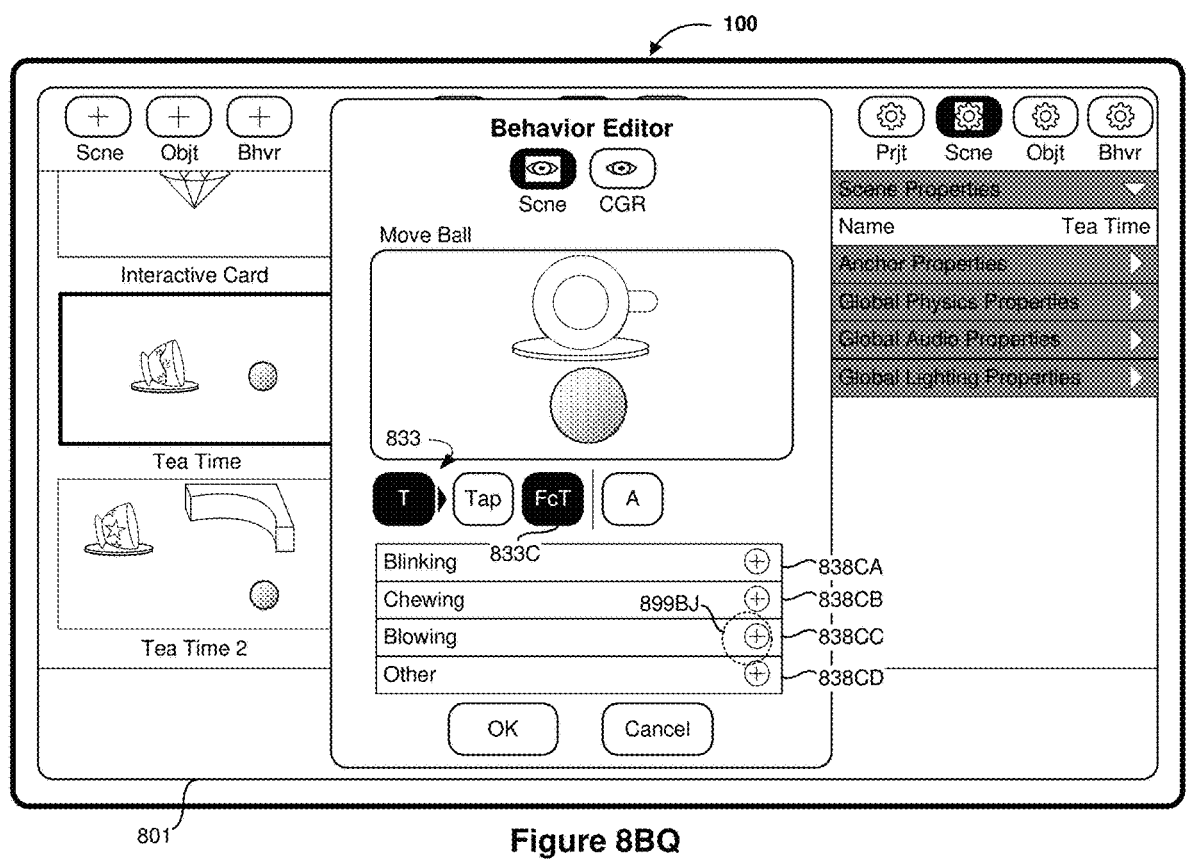
Figure 8B:
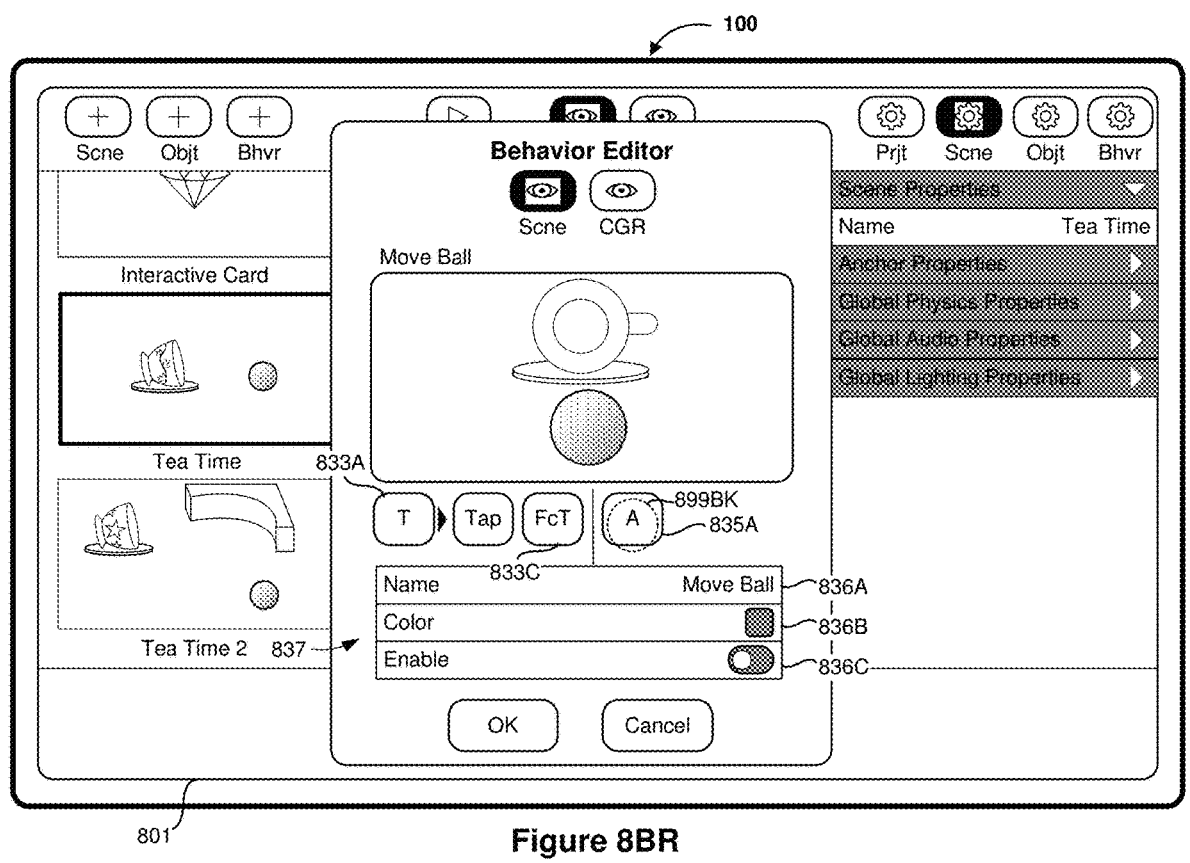
Figure 8B:
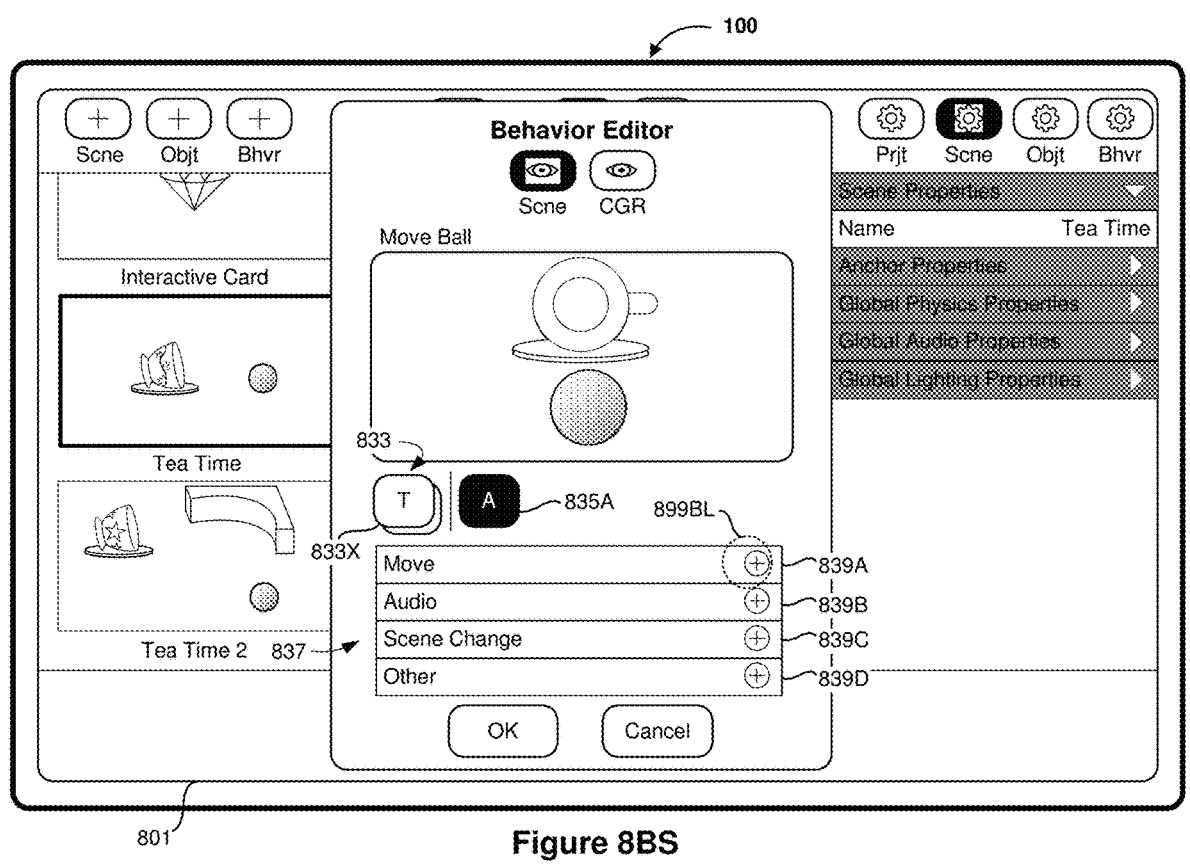
Figure 8B:
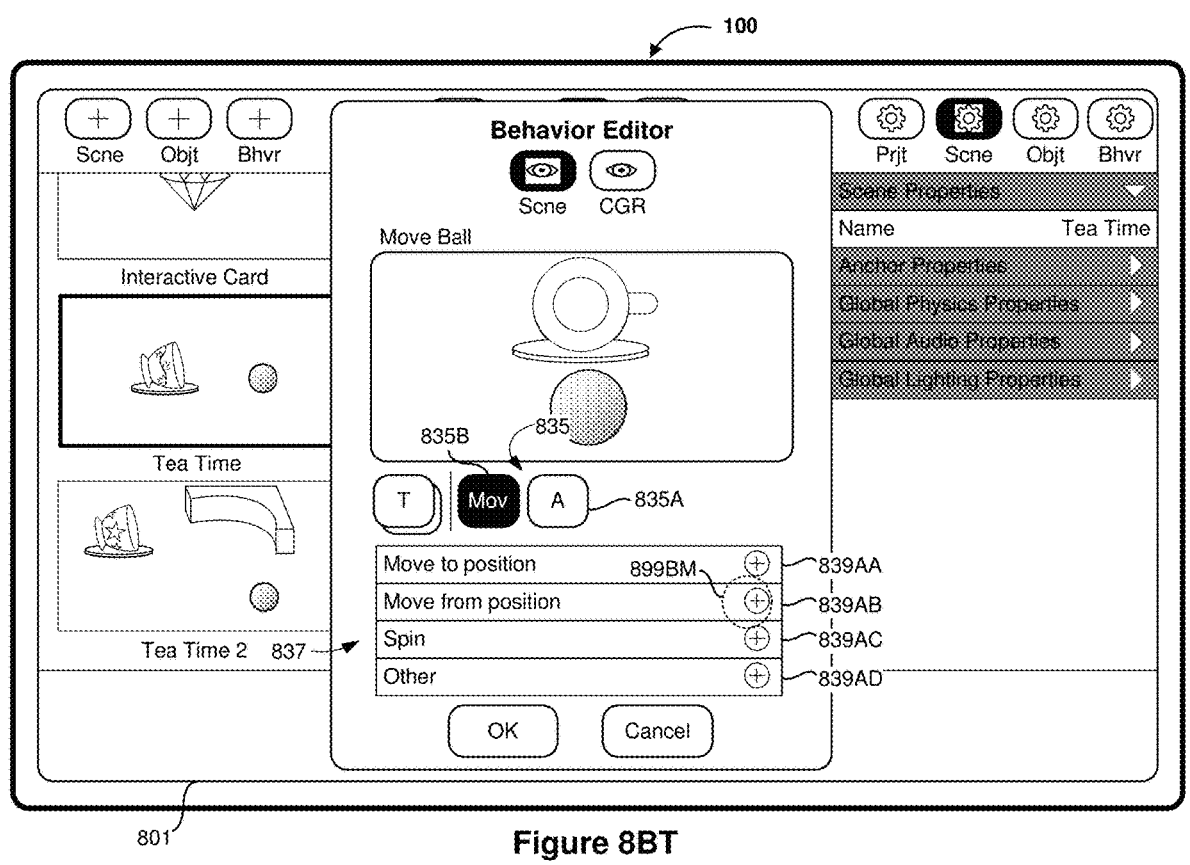
Figure 8B:
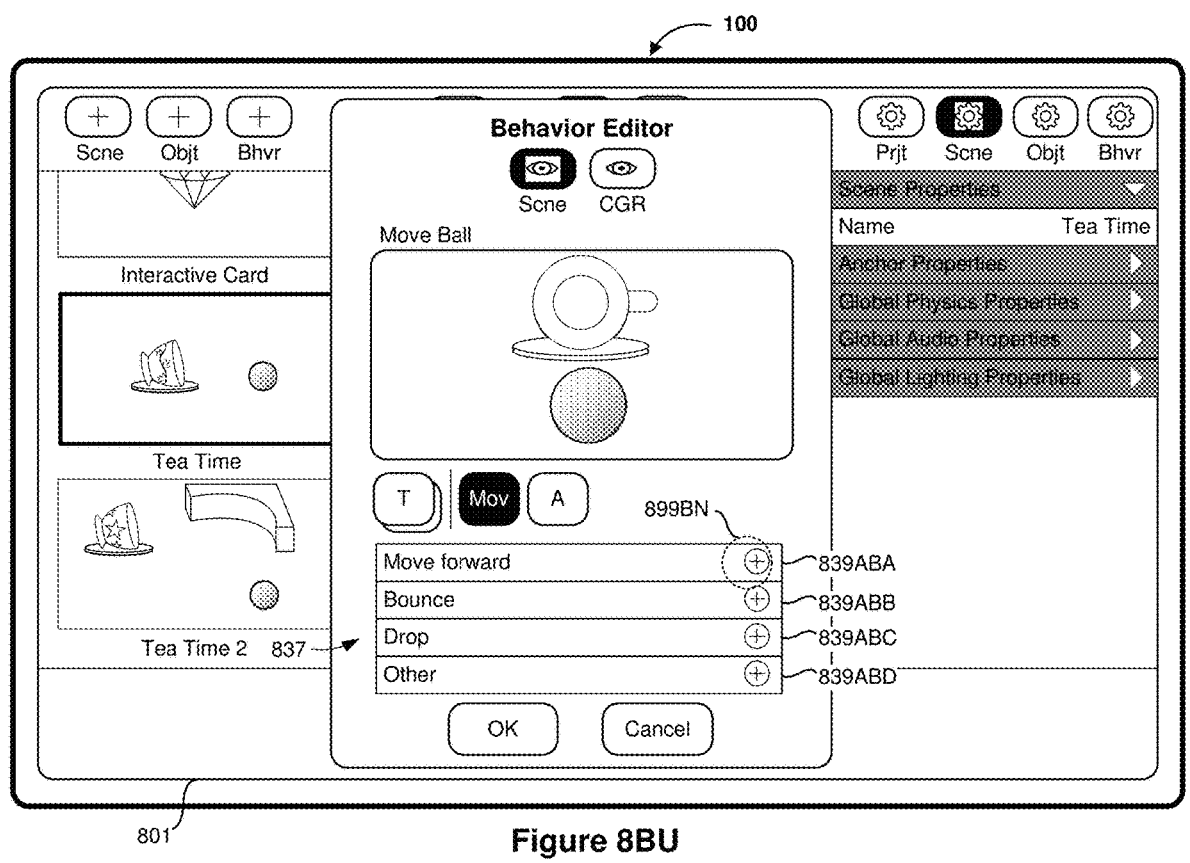
Figure 8B:
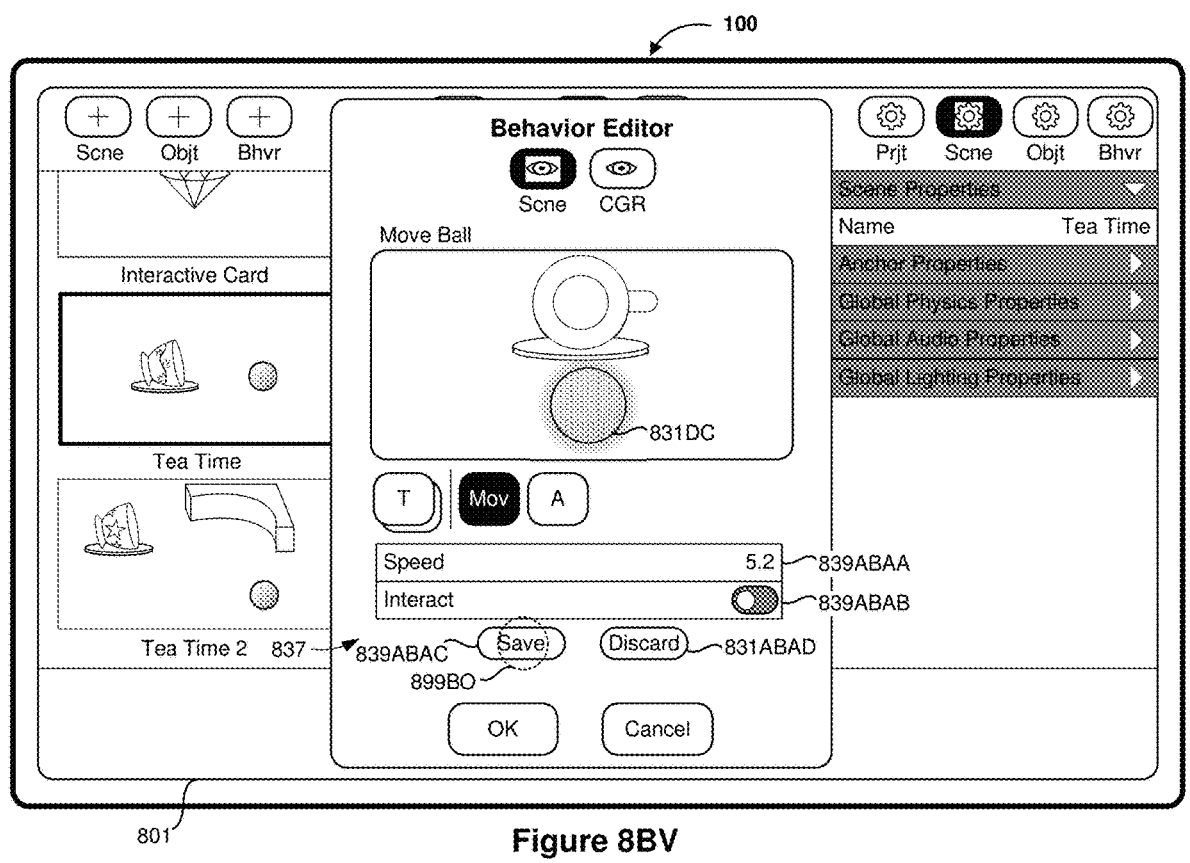
Figure 8B:
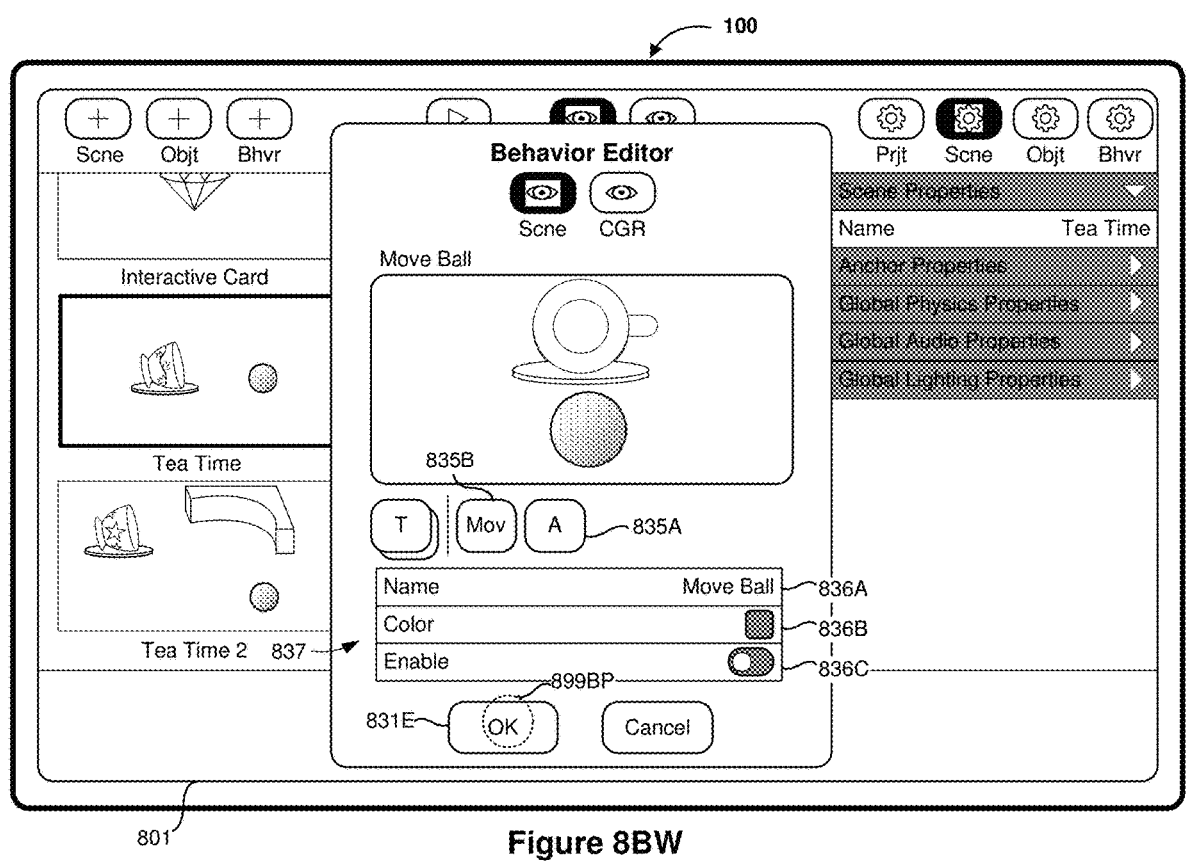
Figure 8B:
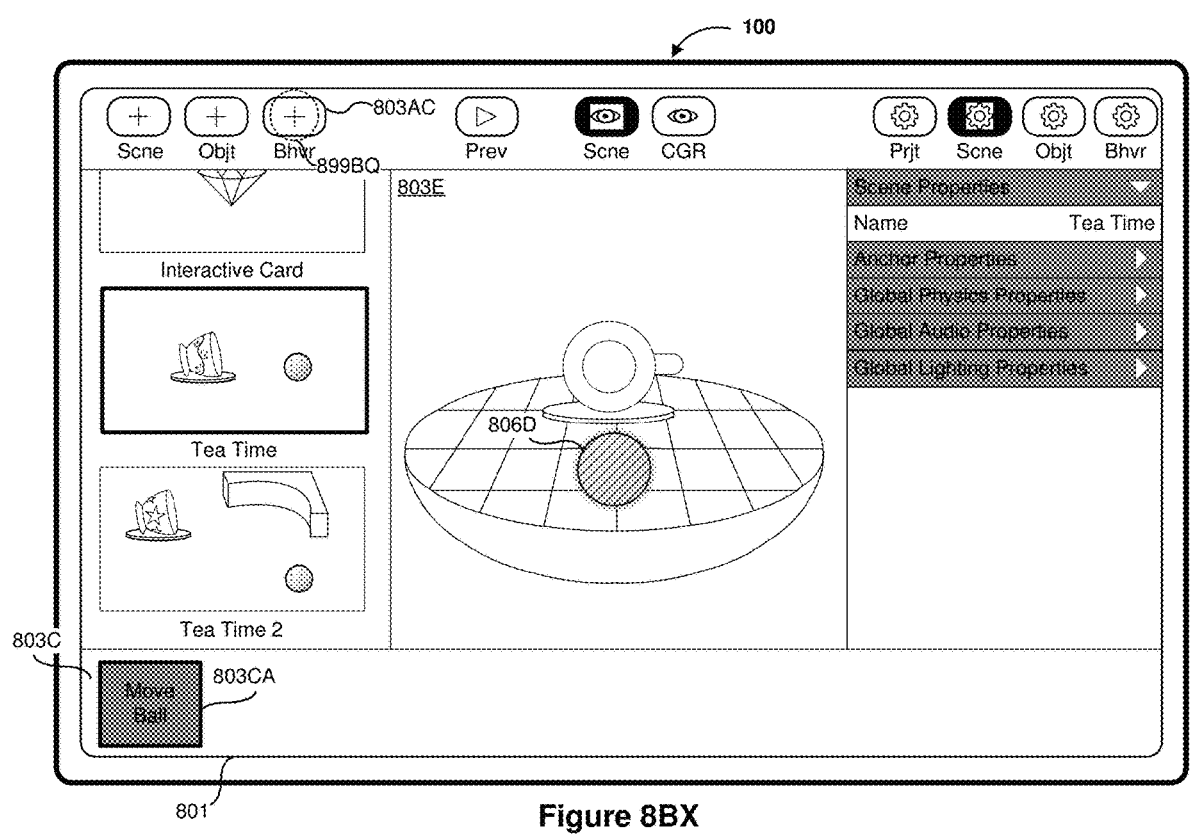
Figure 8B:
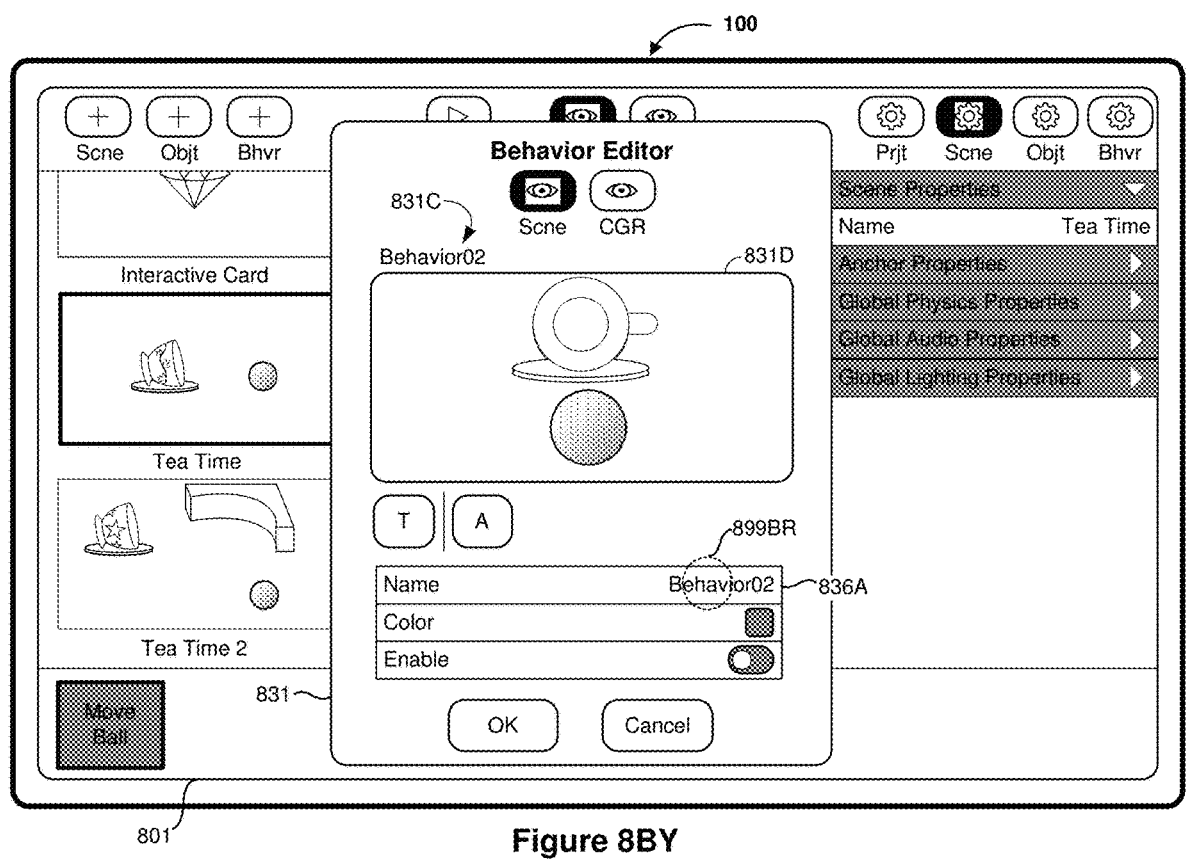
Figure 8B:
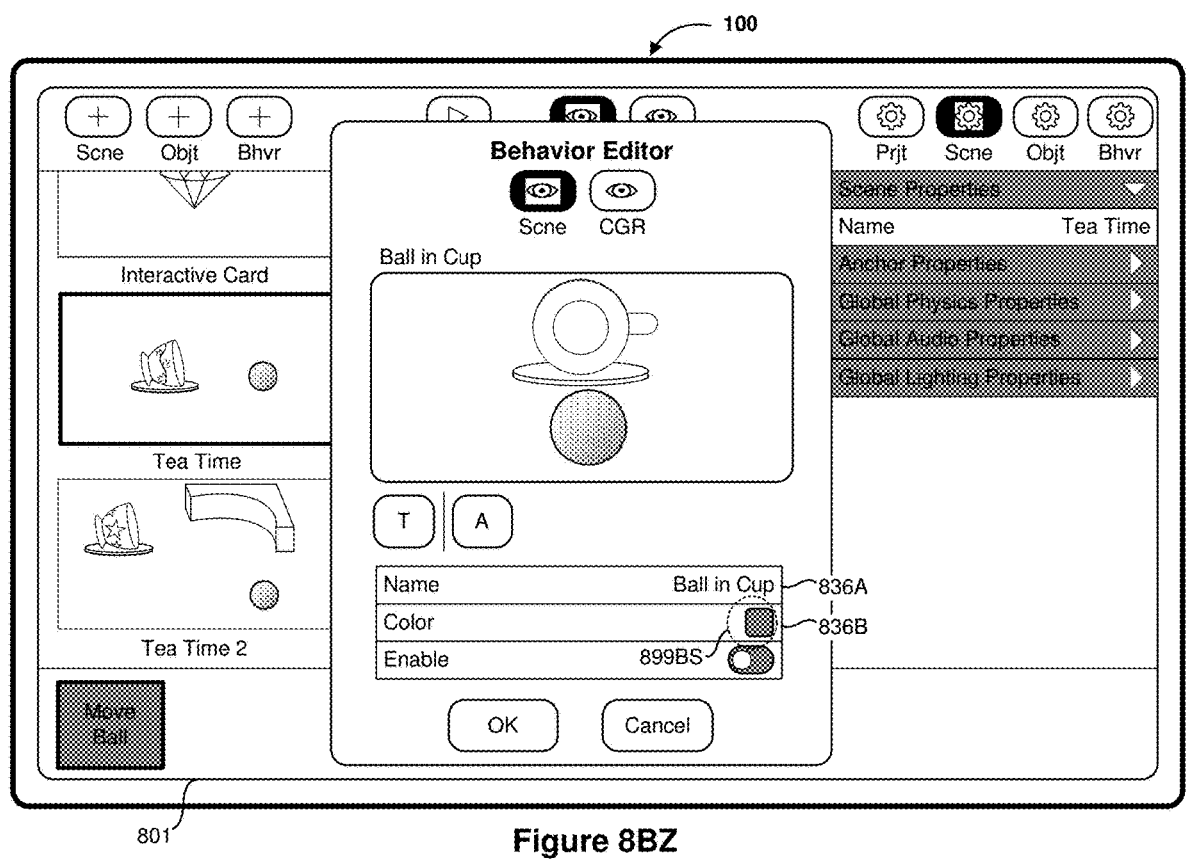
Figure 8C:
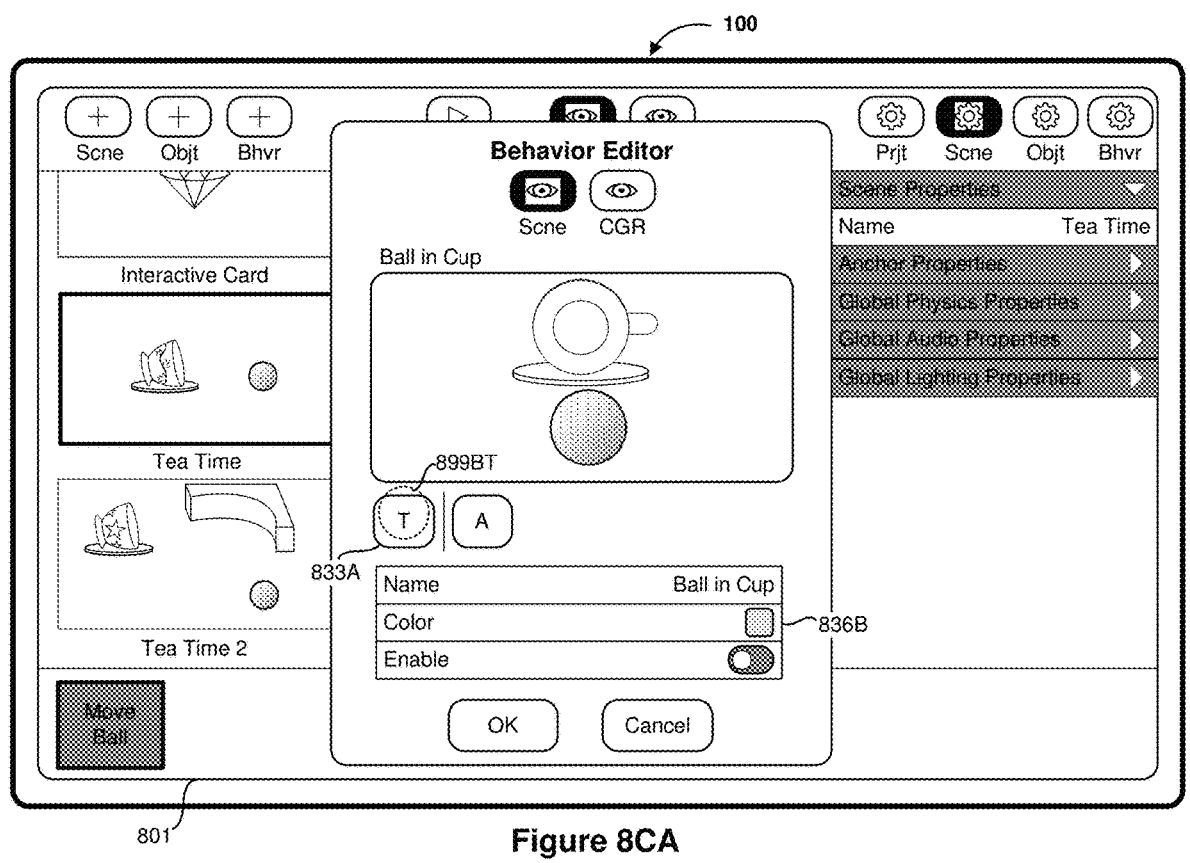
Figure 8C:
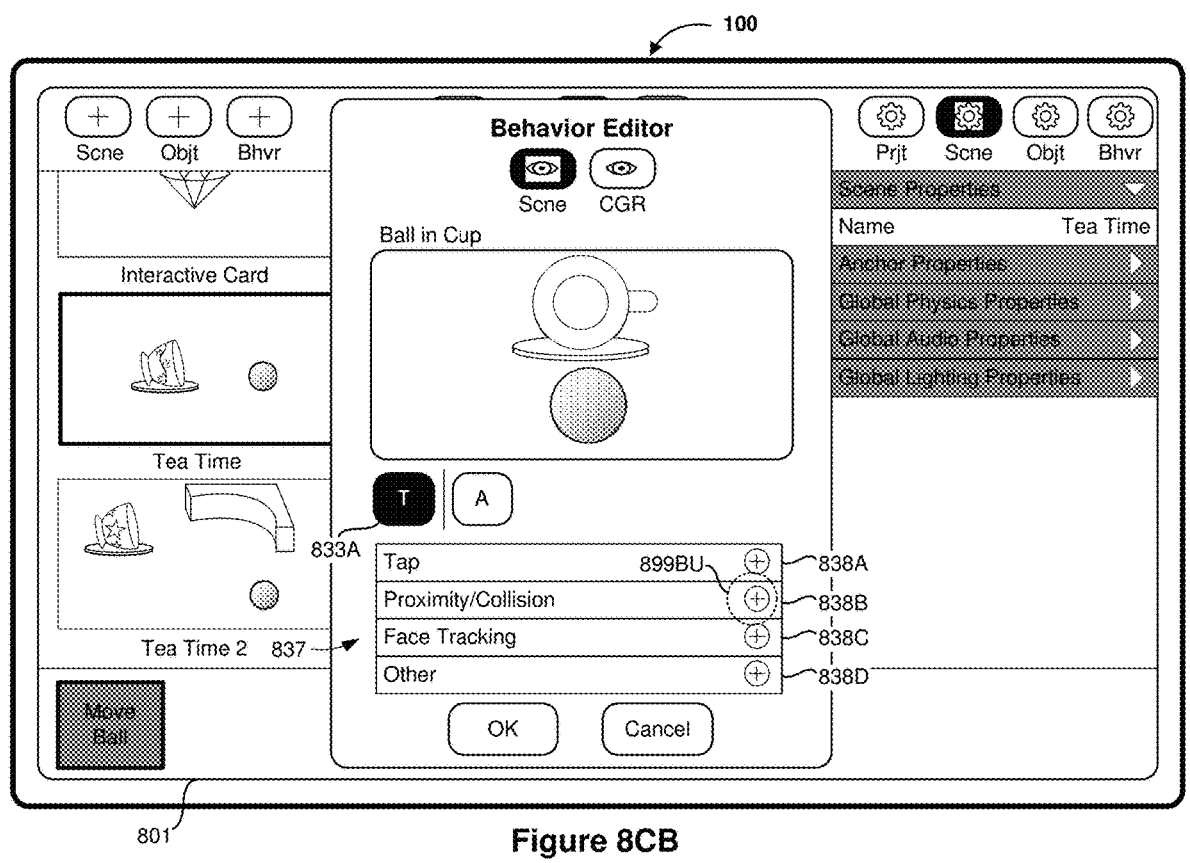
Figure 8C:
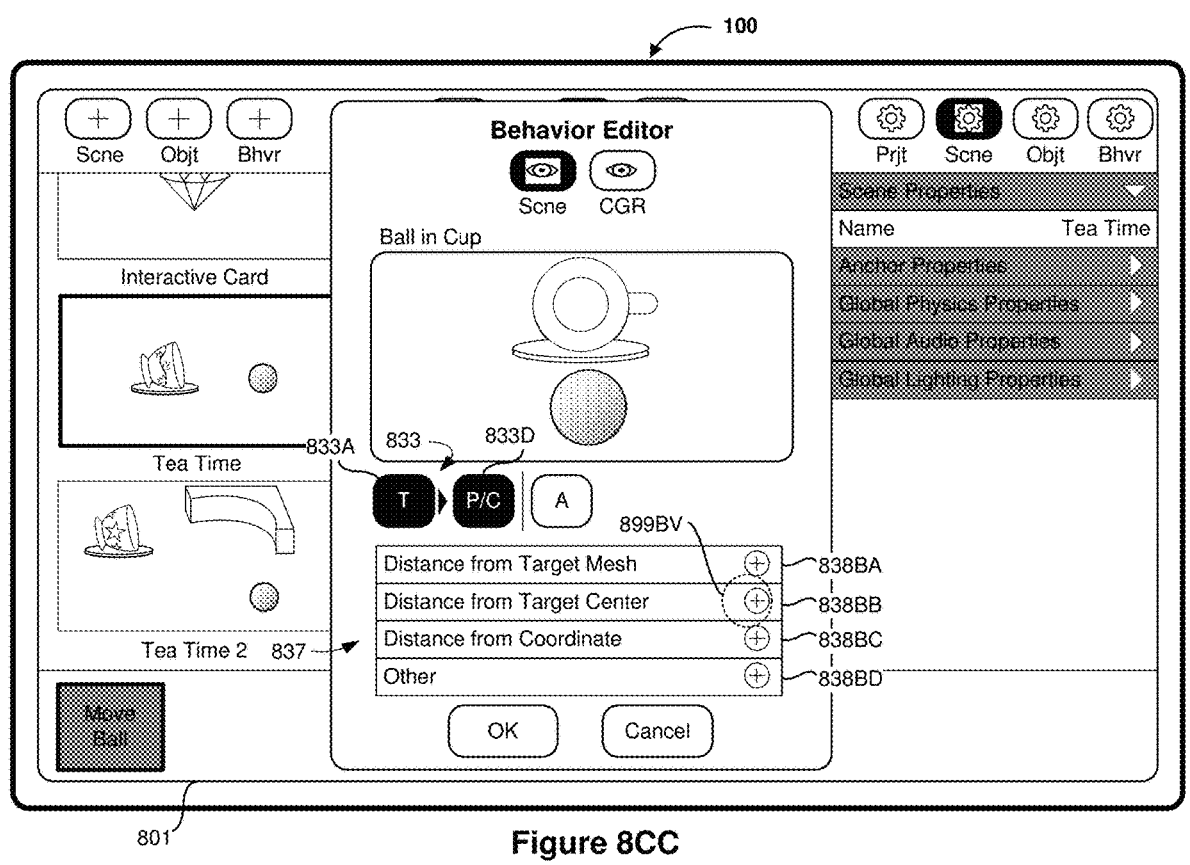
Figure 8C:
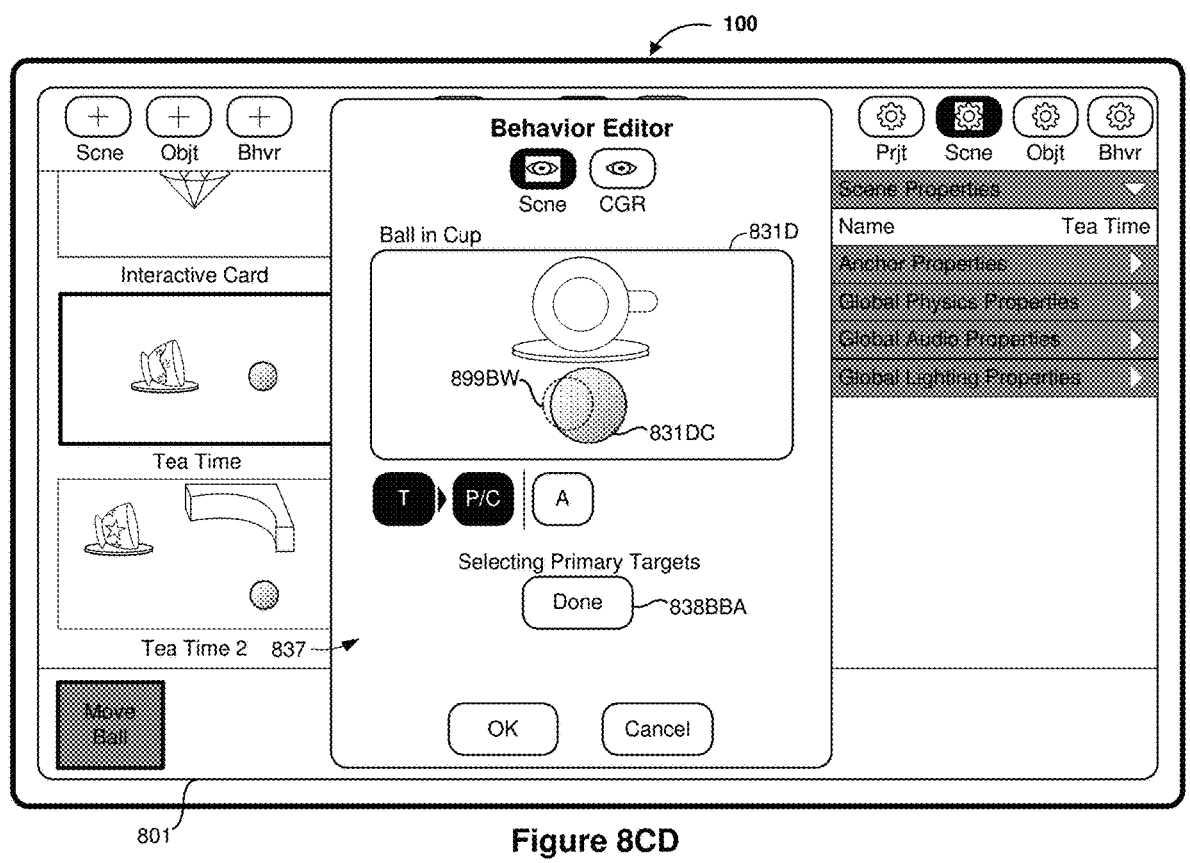
Figure 8C:
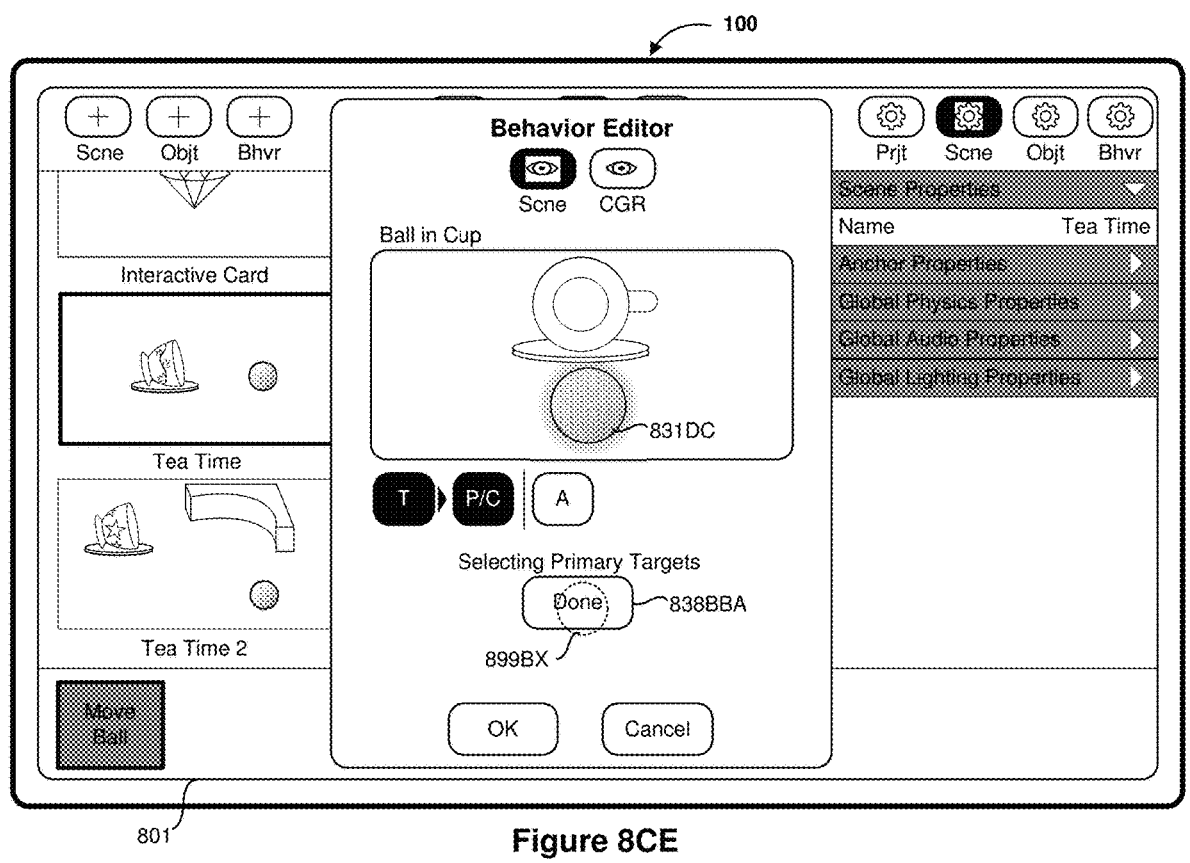
Figure 8C:
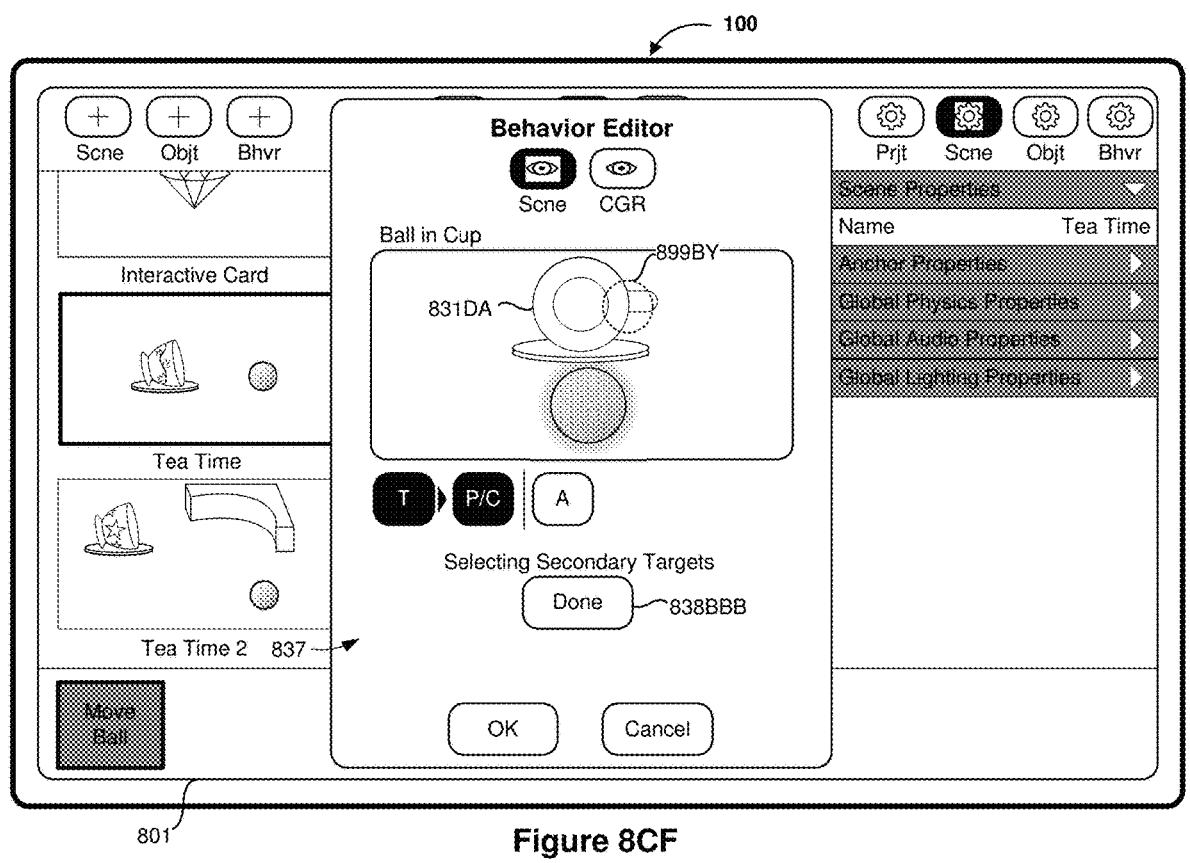
Figure 8C:
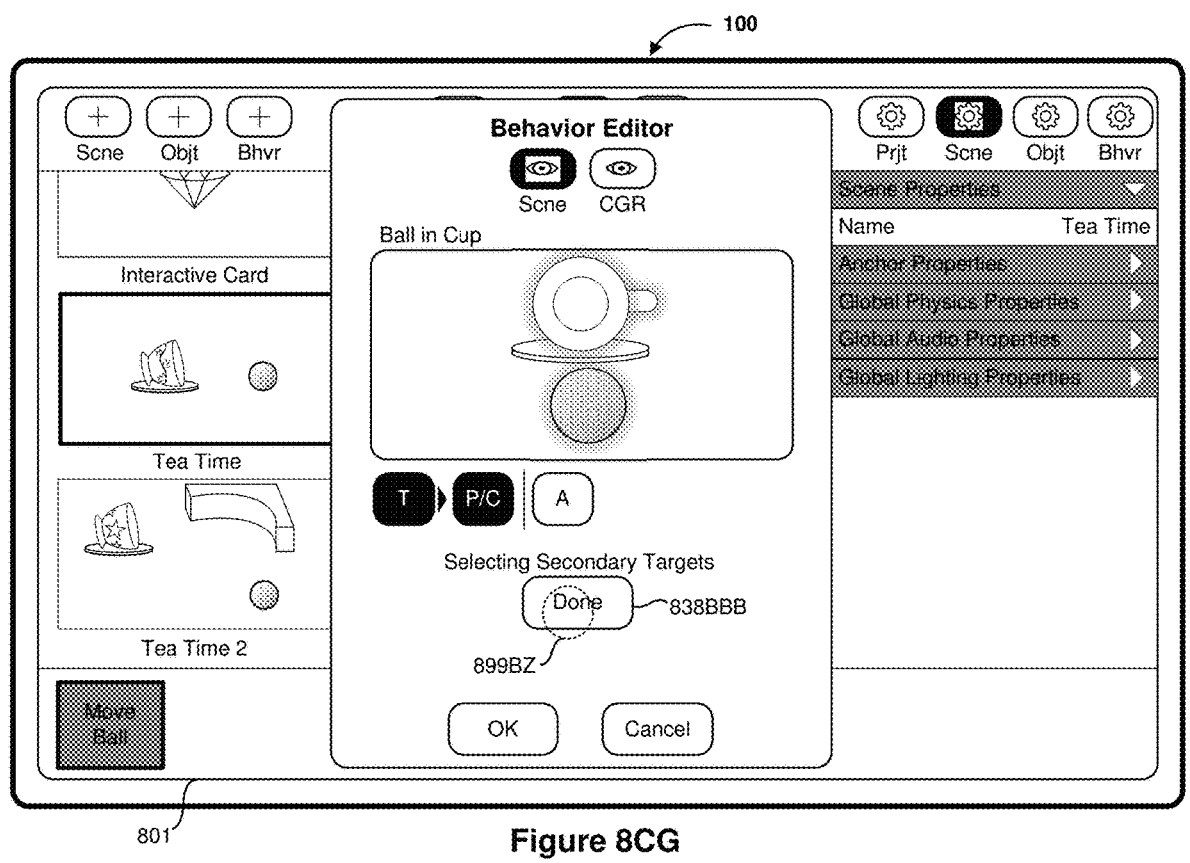
Figure 8C:
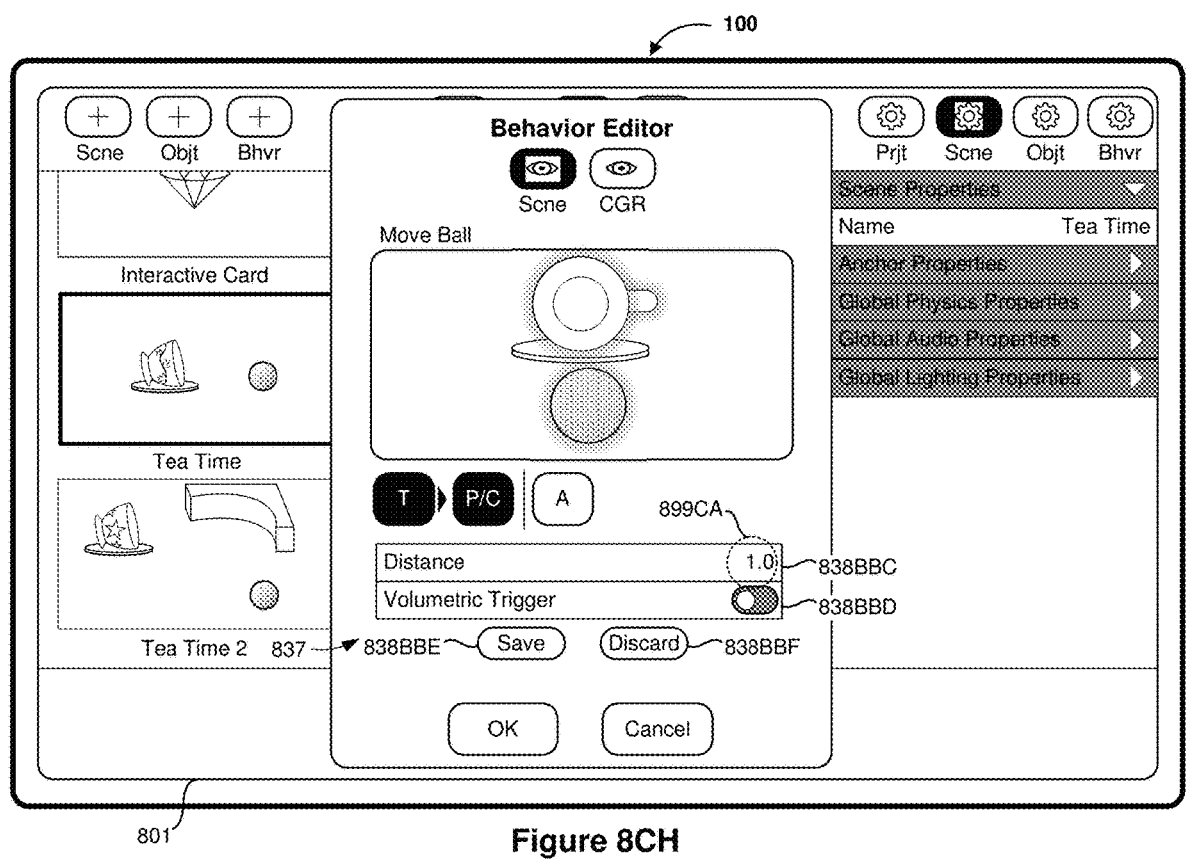
Figure 8C:
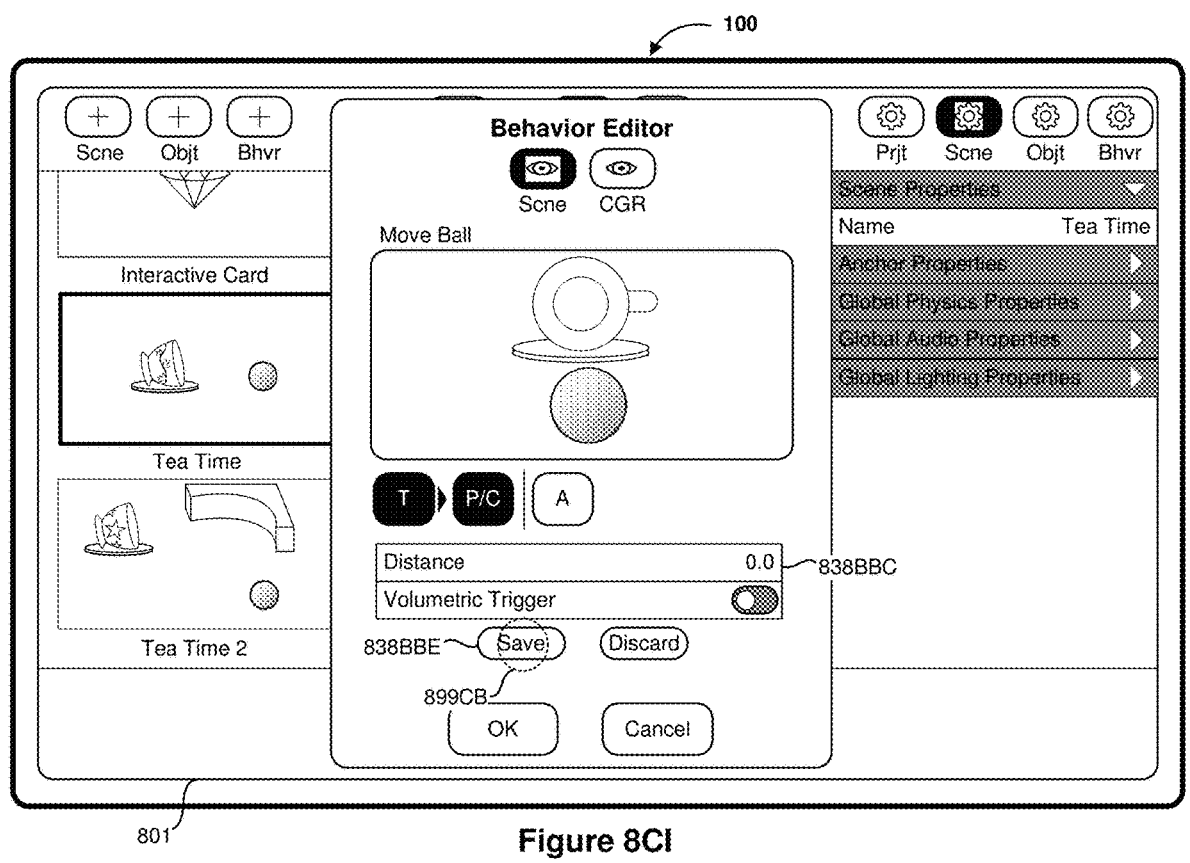
Figure 8C:
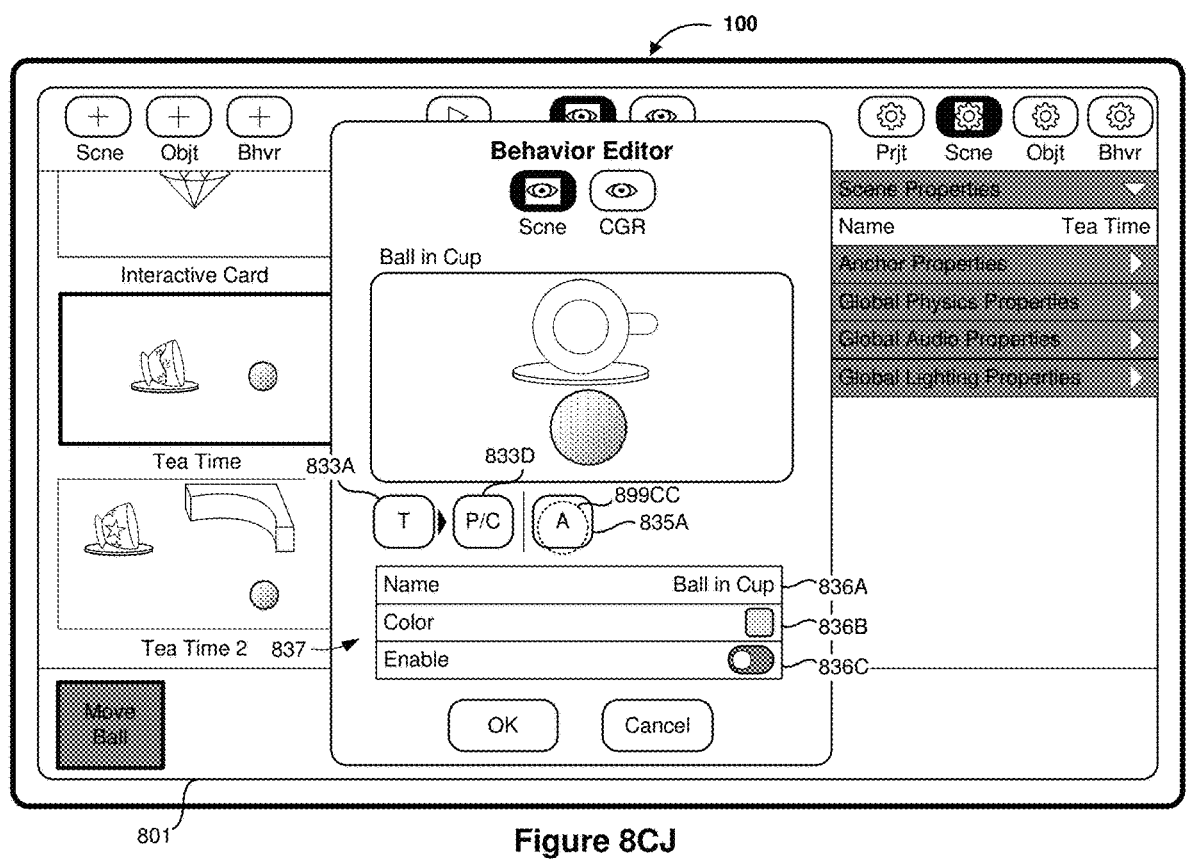
Figure 8C:
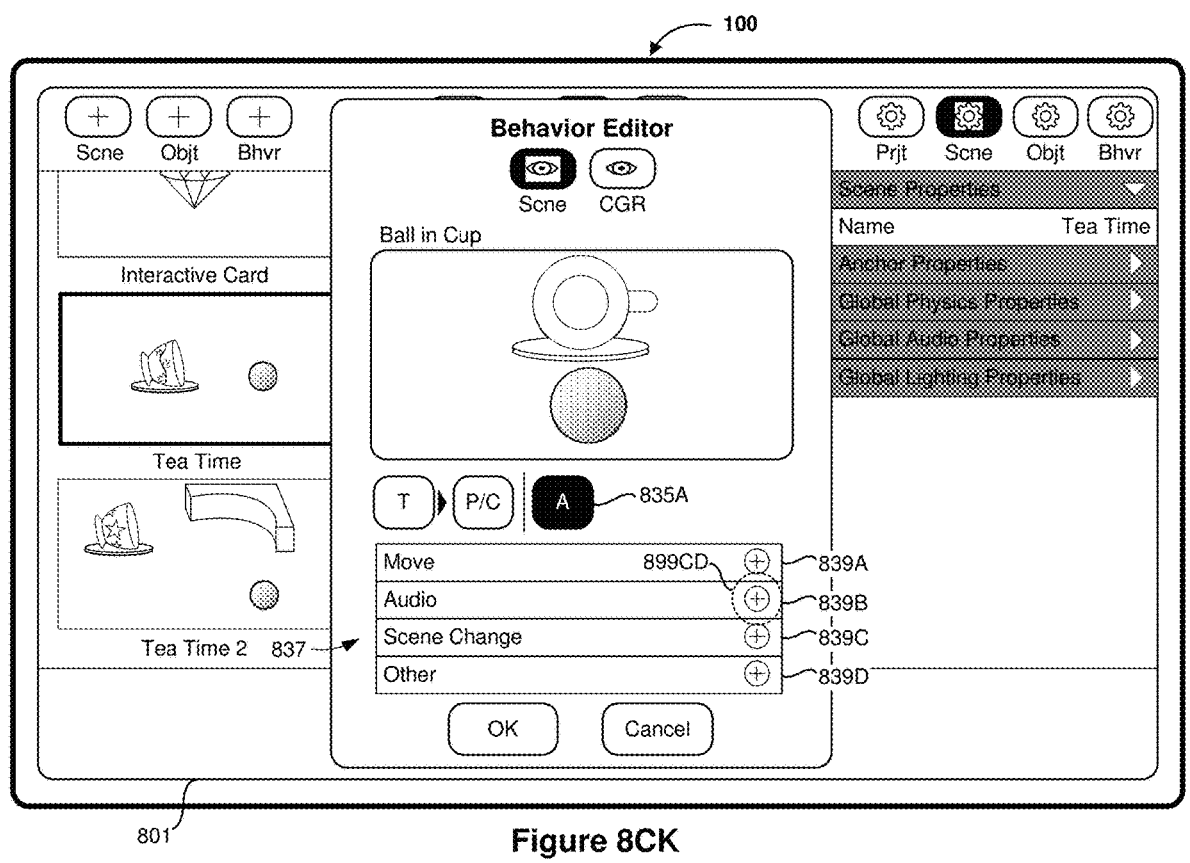
Figure 8C:
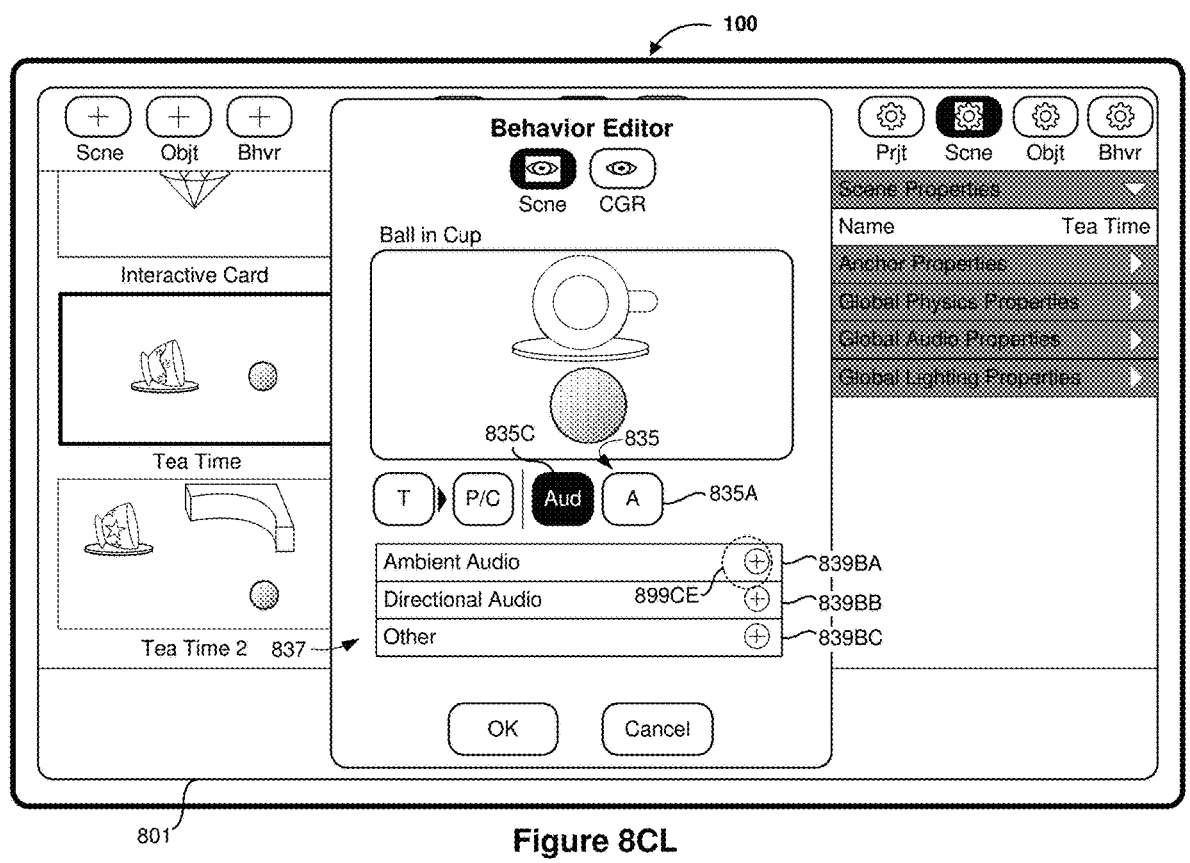
Figure 8C:
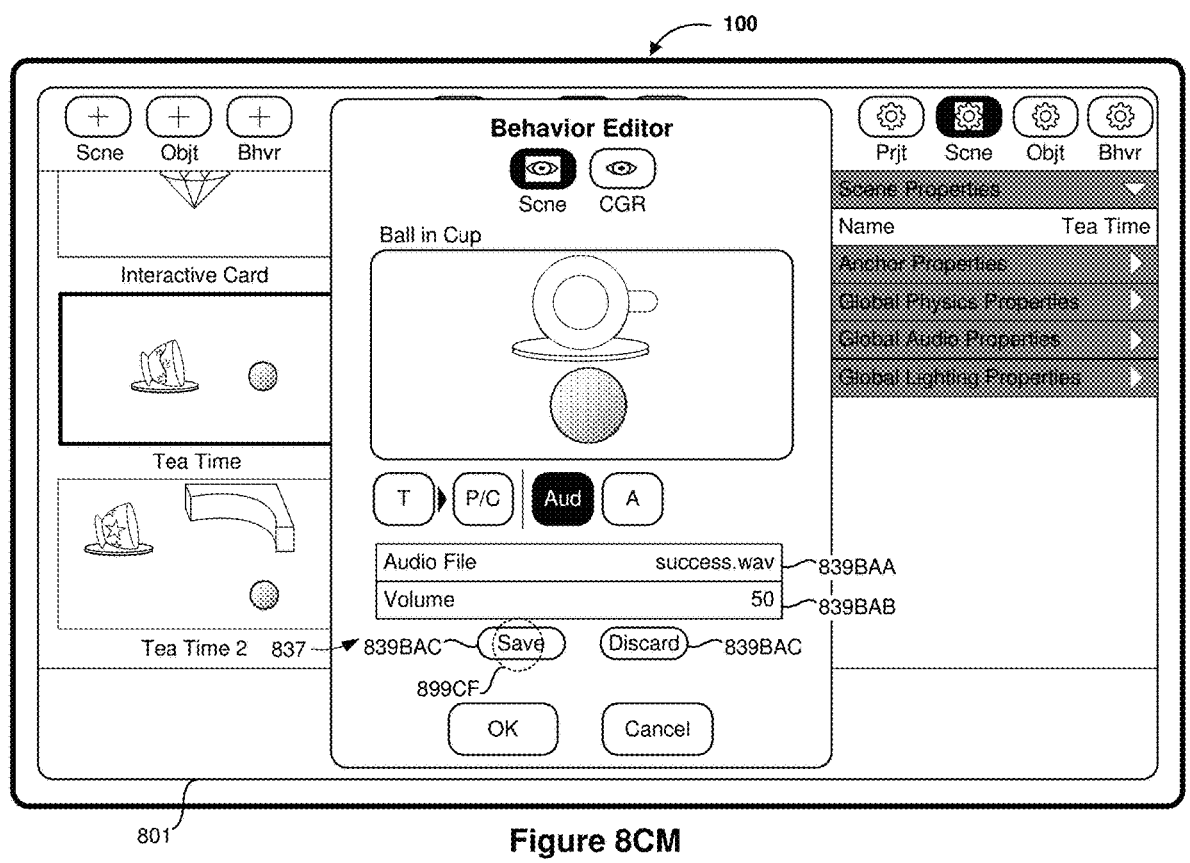
Figure 8C:
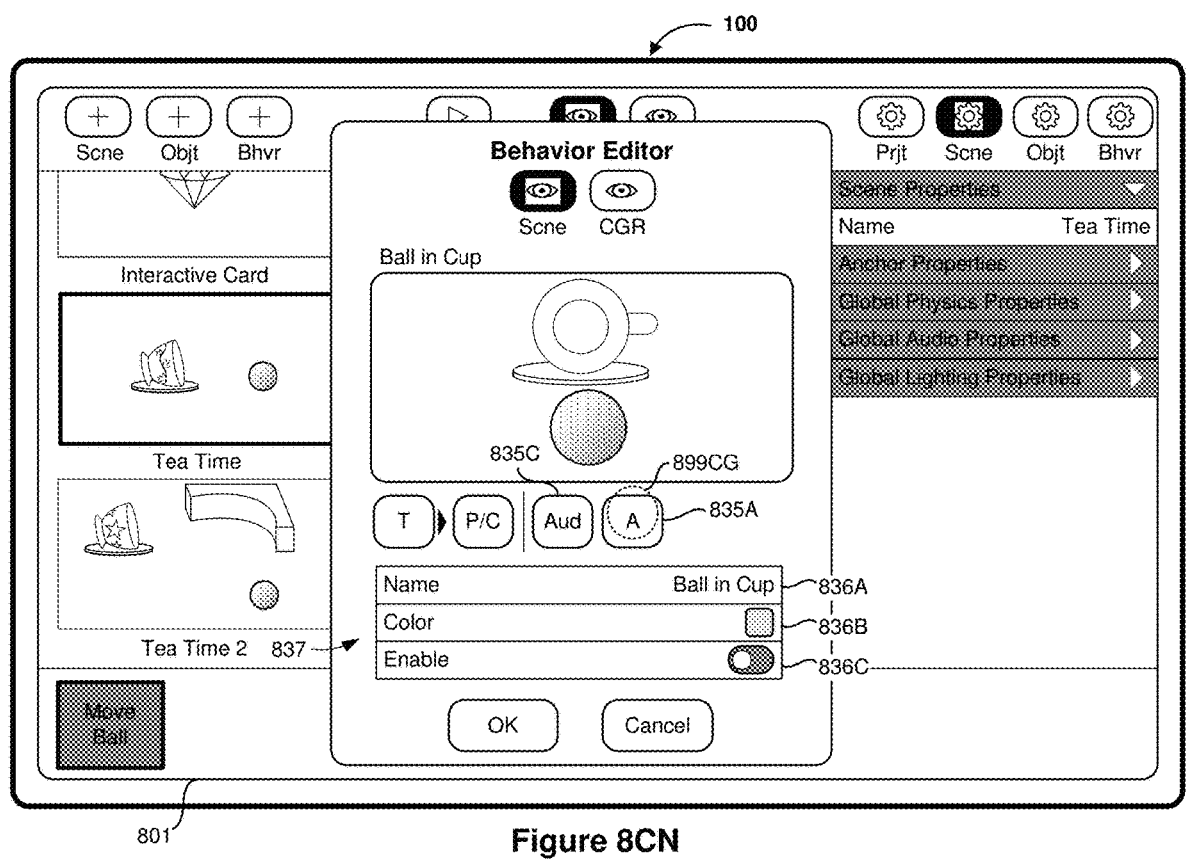
Figure 8C:
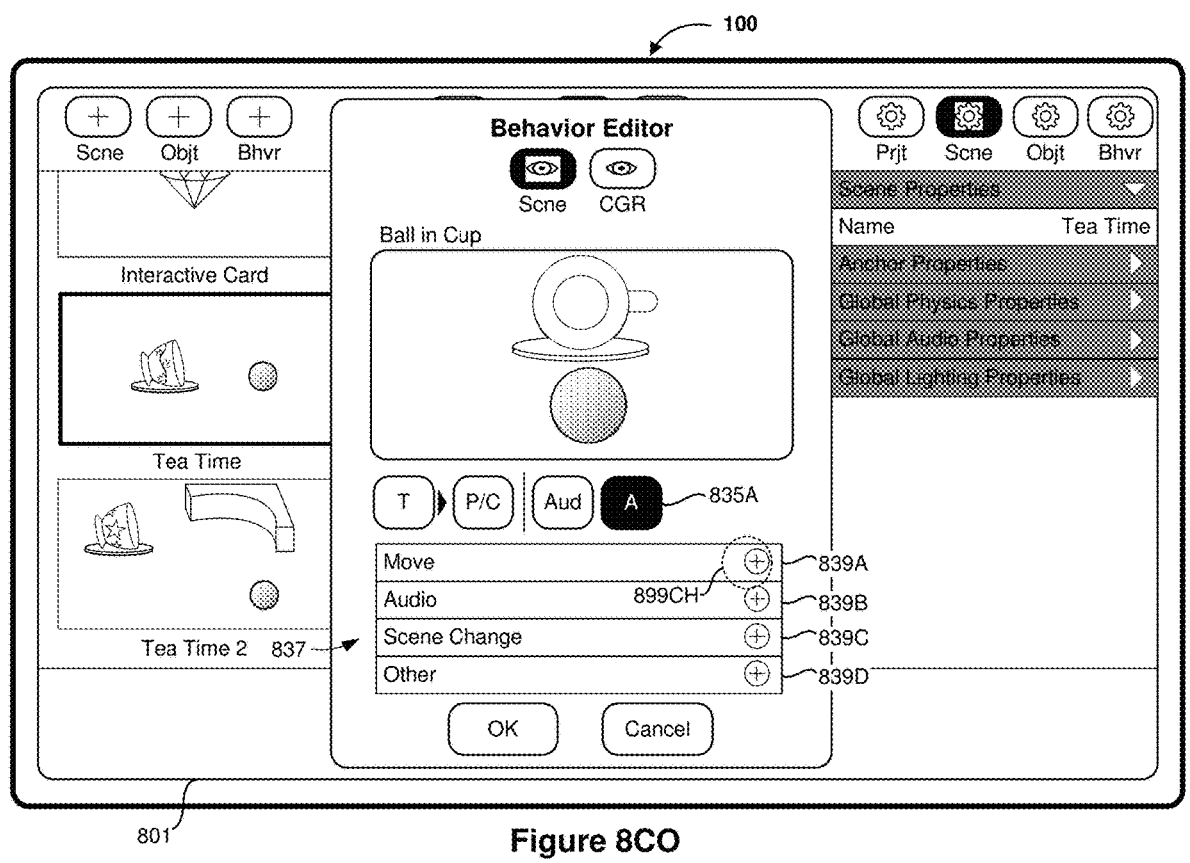
Figure 8C:
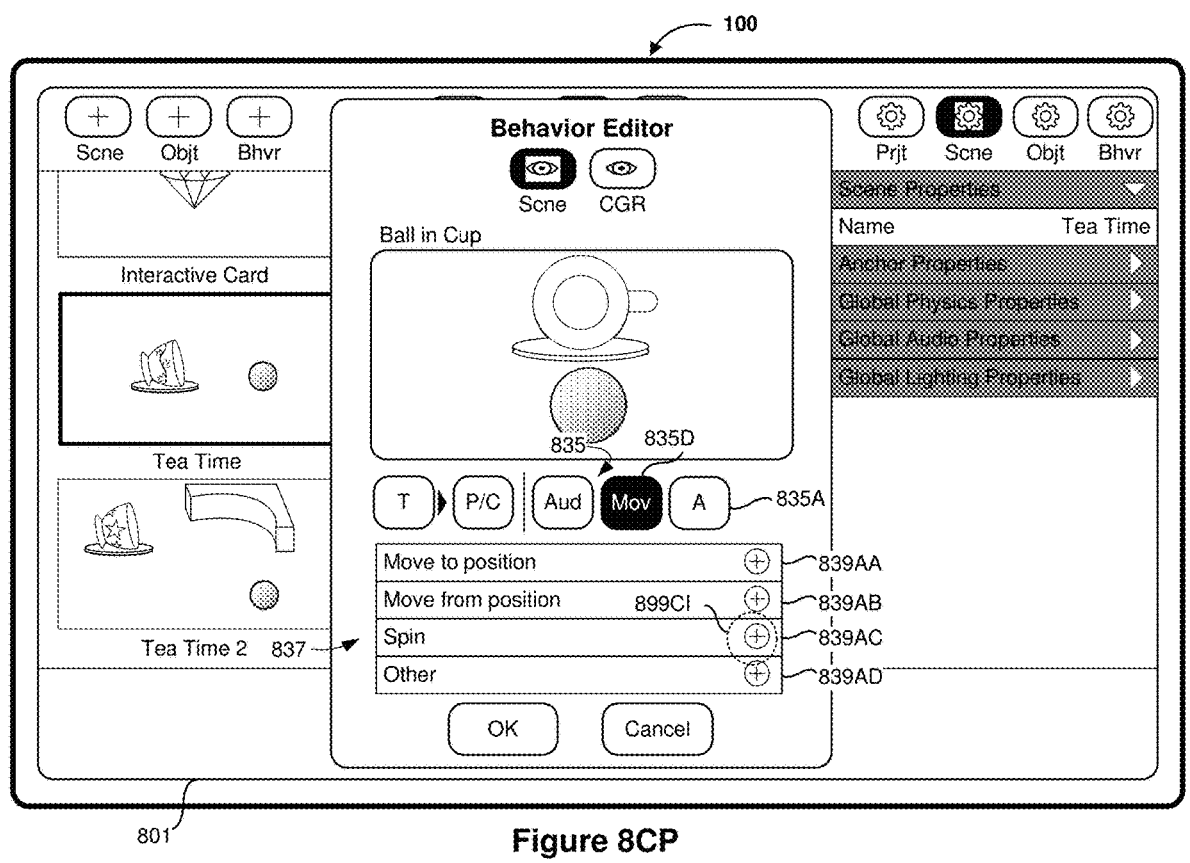
Figure 8C:
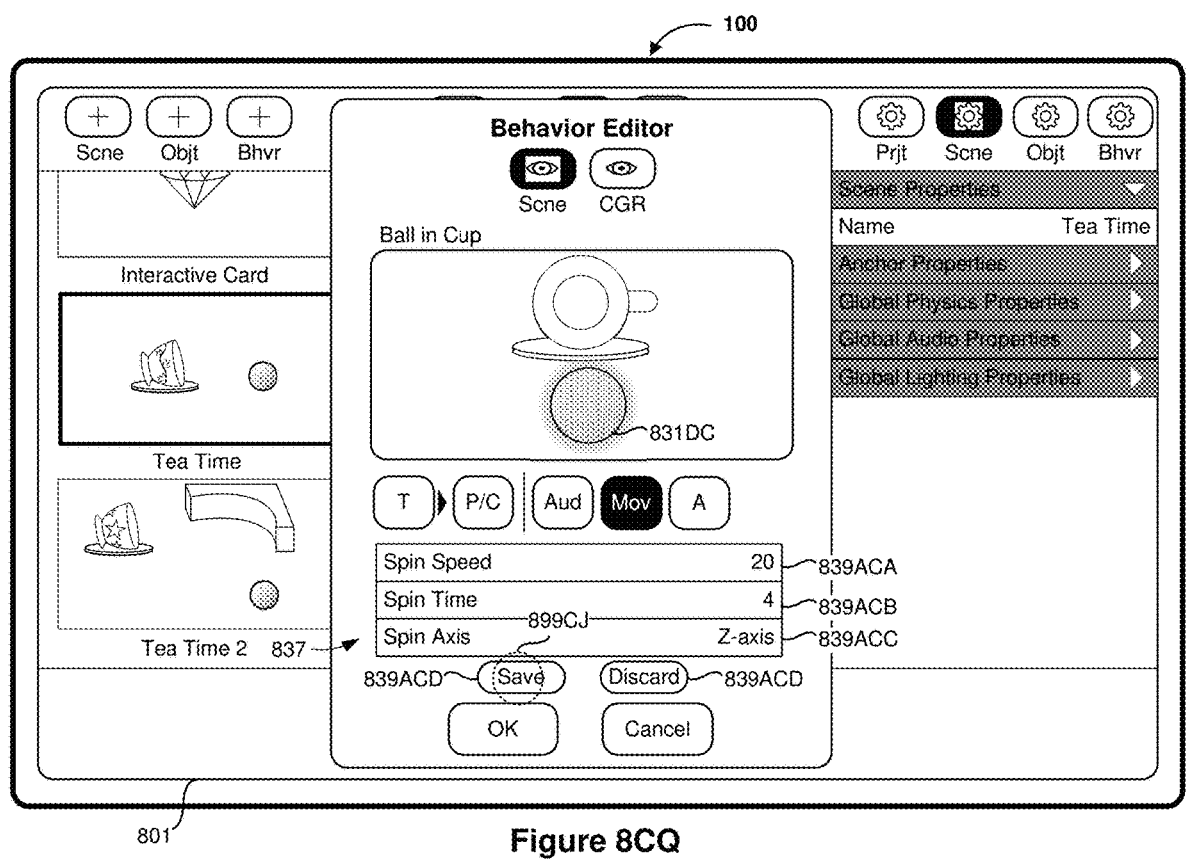
Figure 8C:
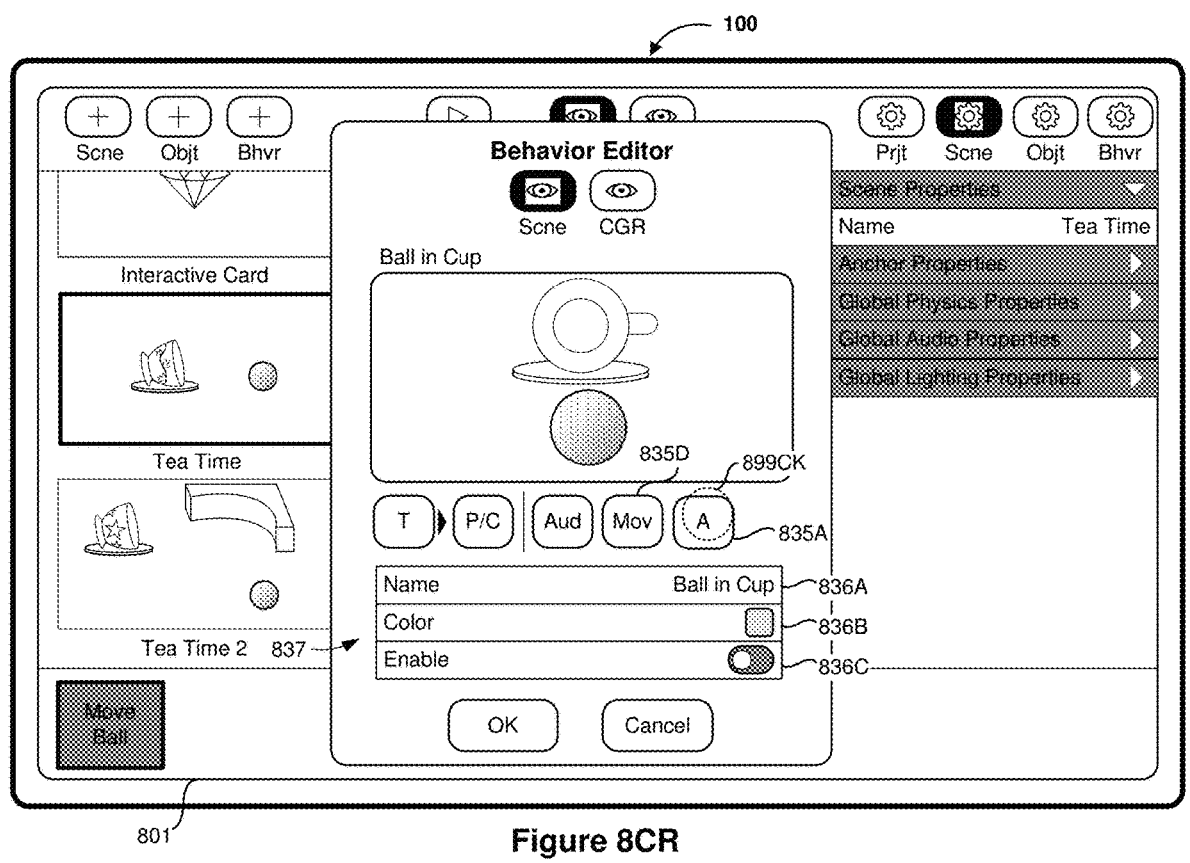
Figure 8C:
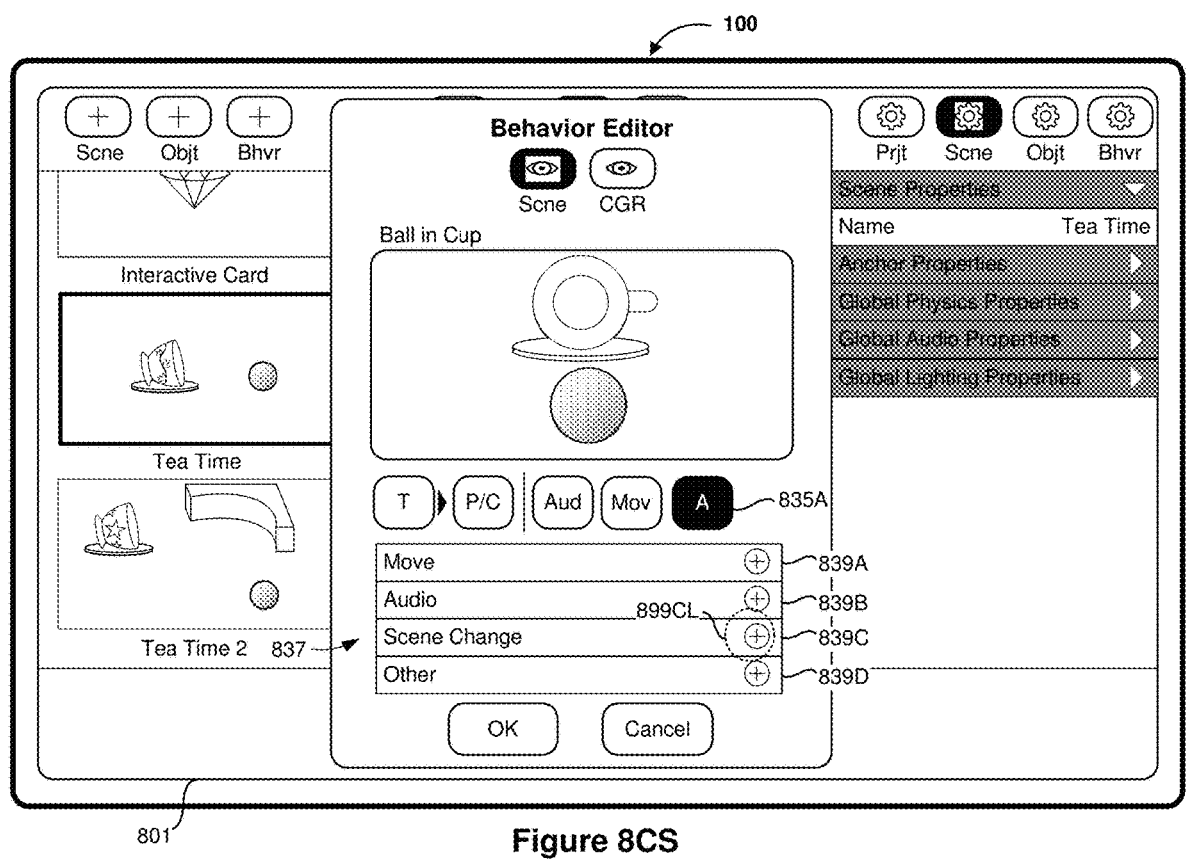
Figure 8C:
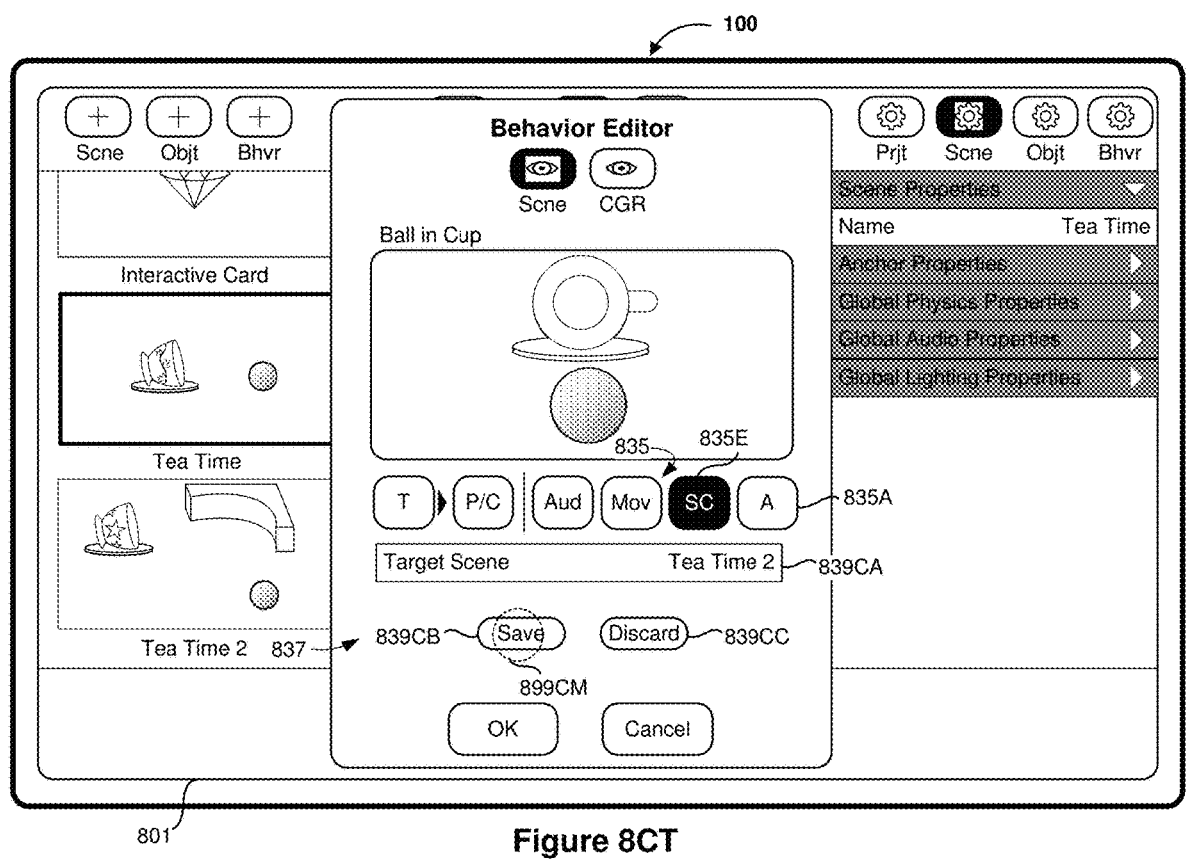
Figure 8C:
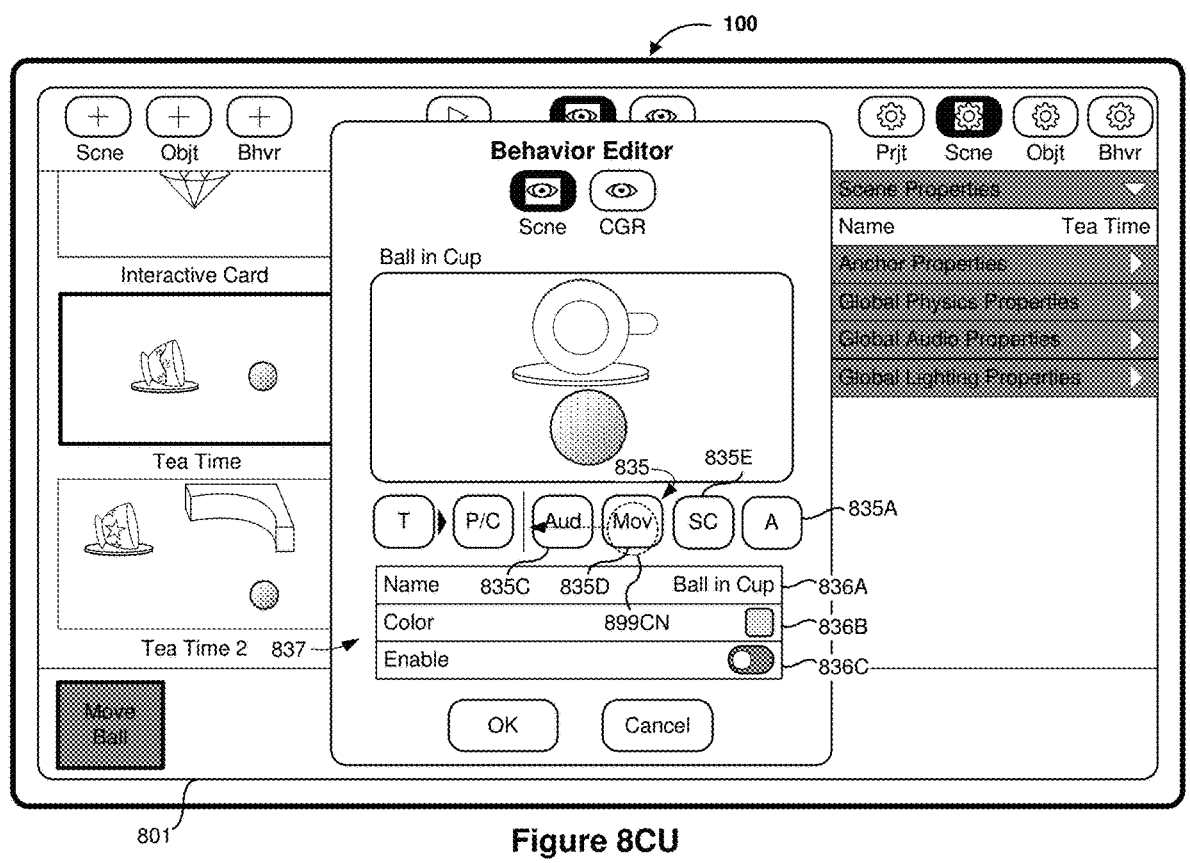
Figure 8C:
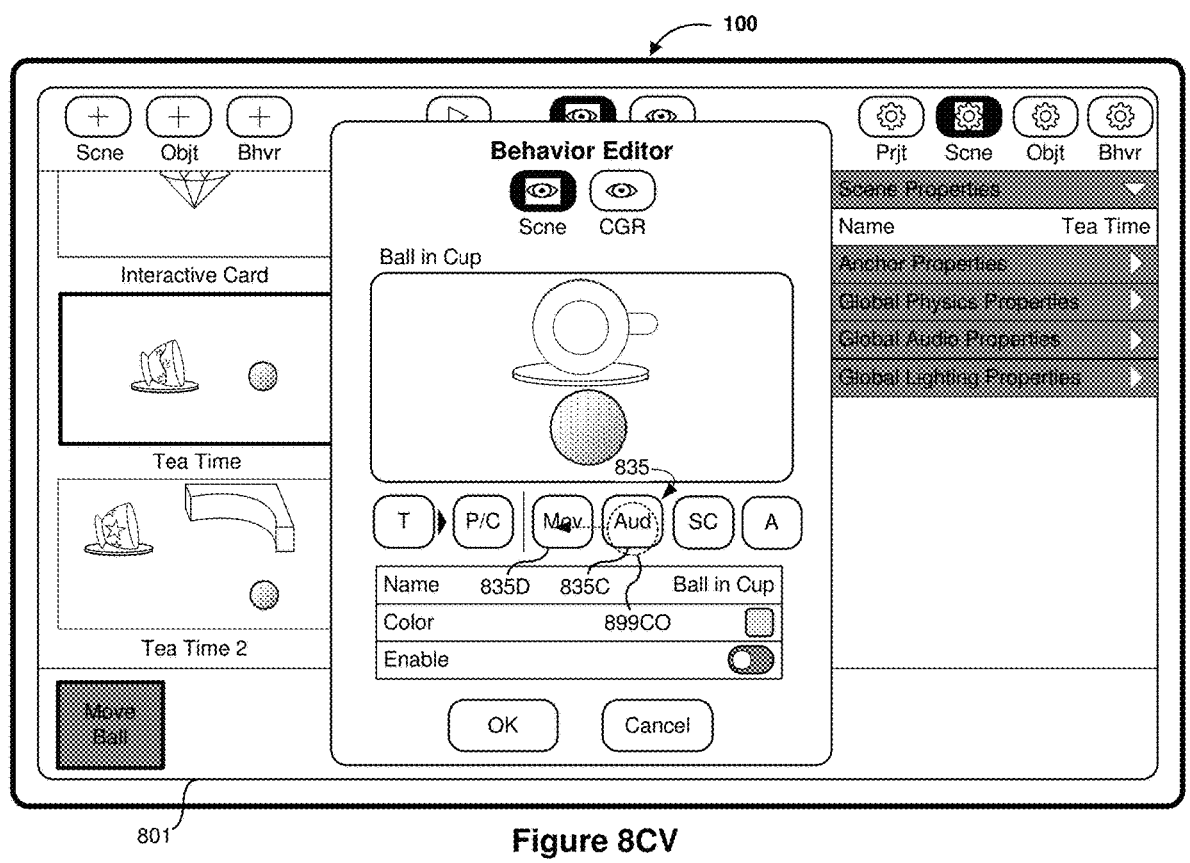
Figure 8C:
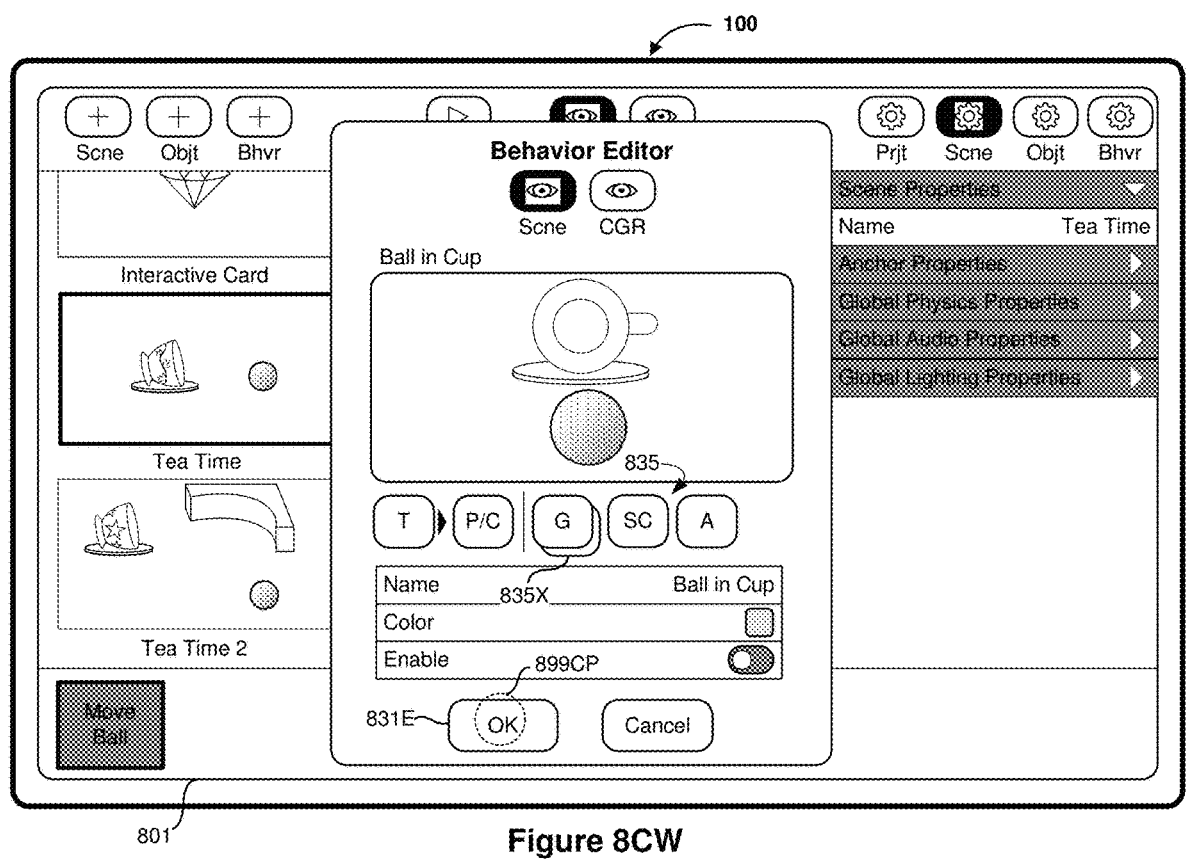
Figure 8C:
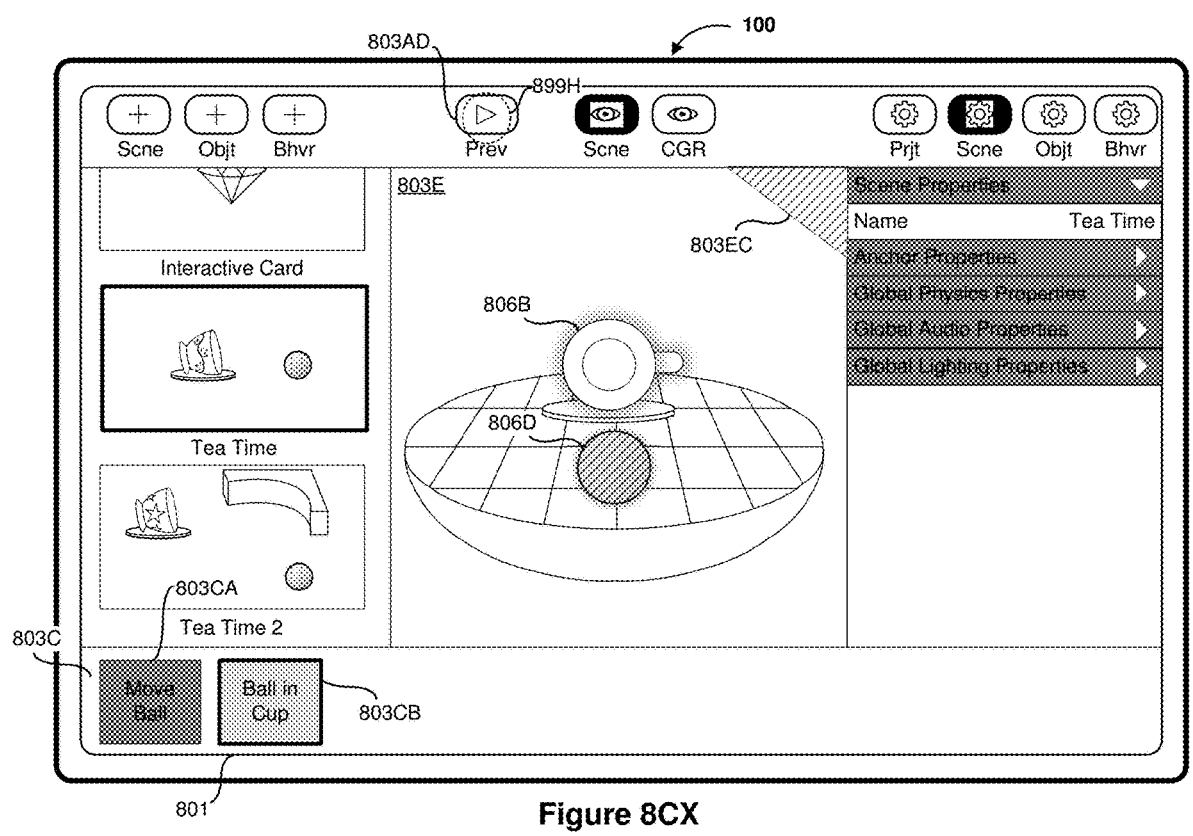
Figure 8C:
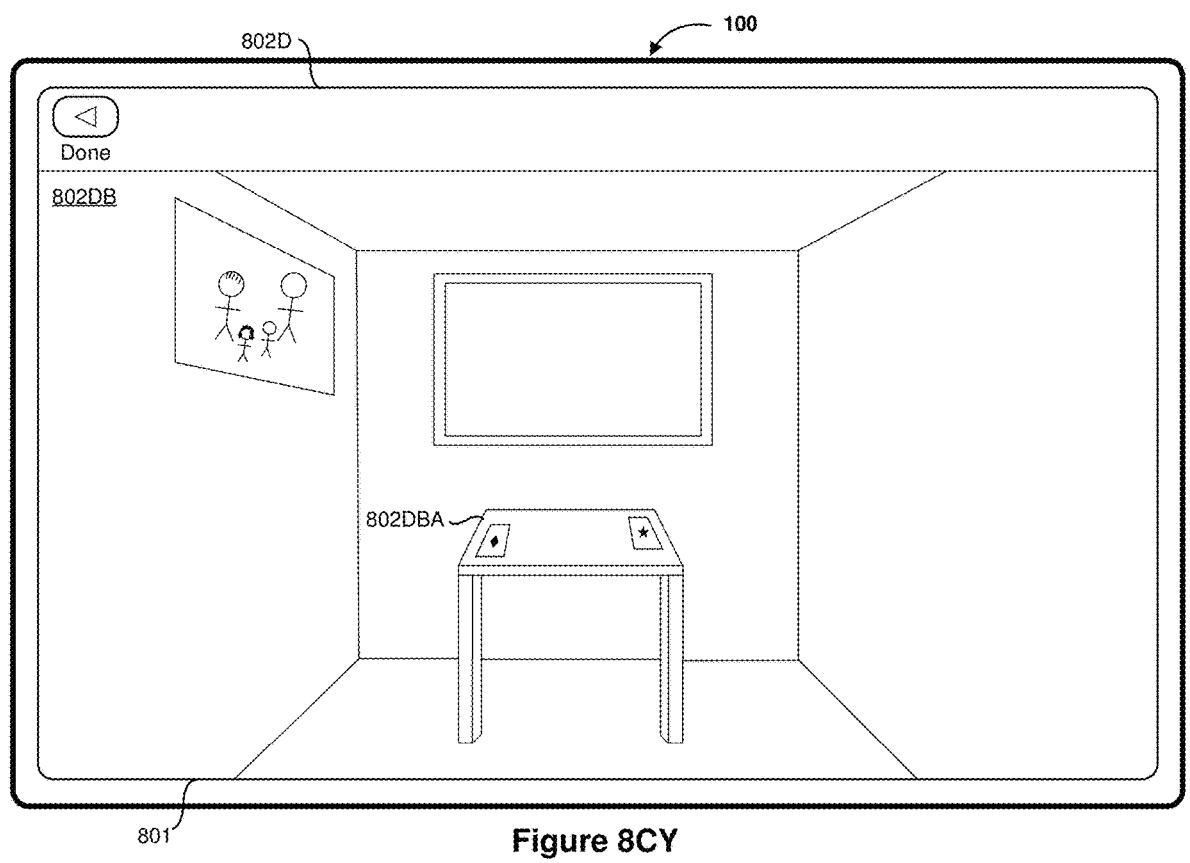
Figure 8C:
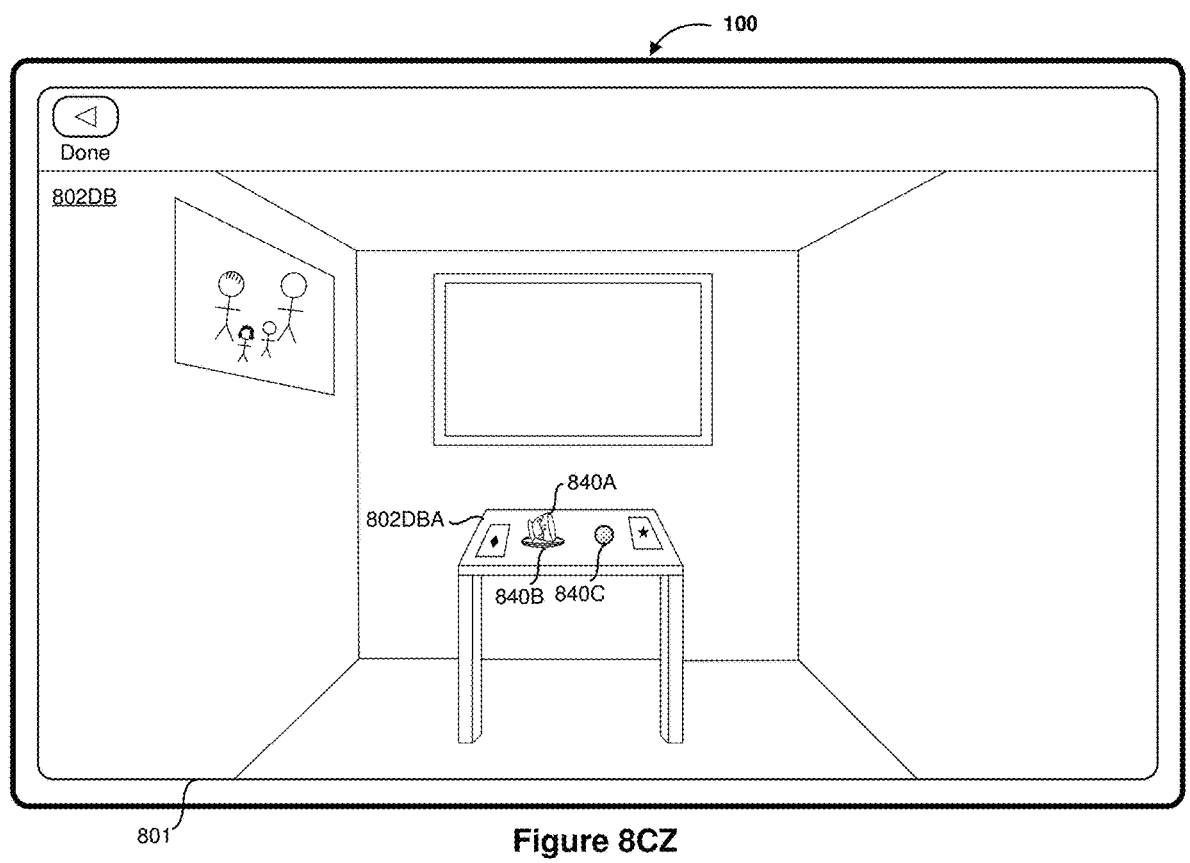
Figure 8D:
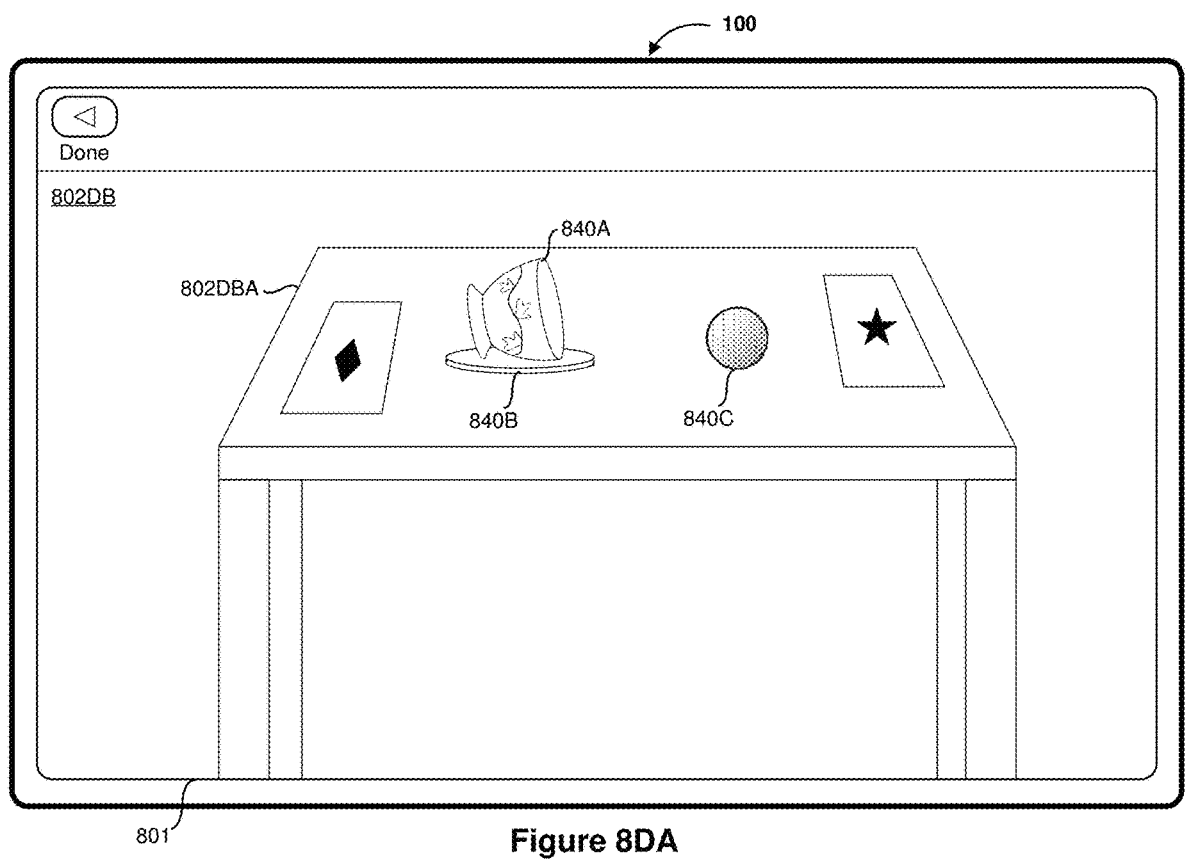
Figure 8D:
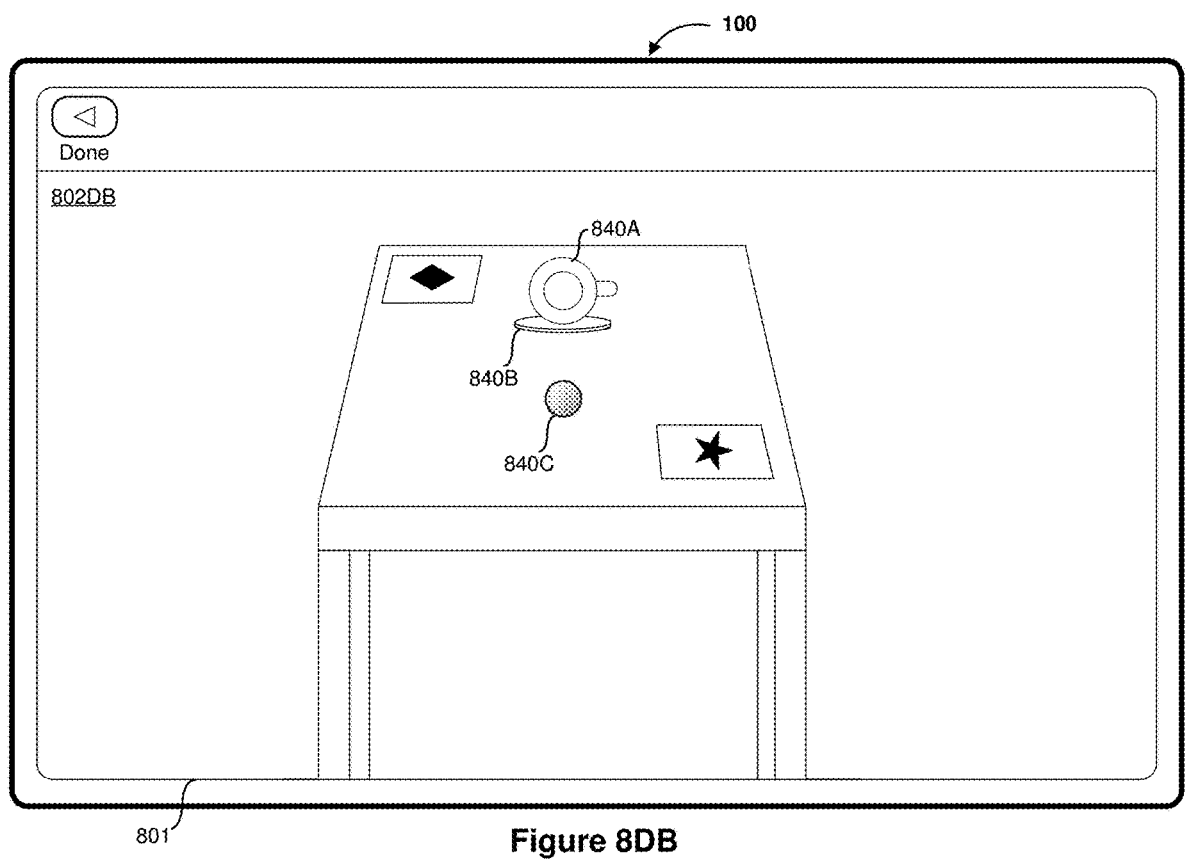
Figure 8D:
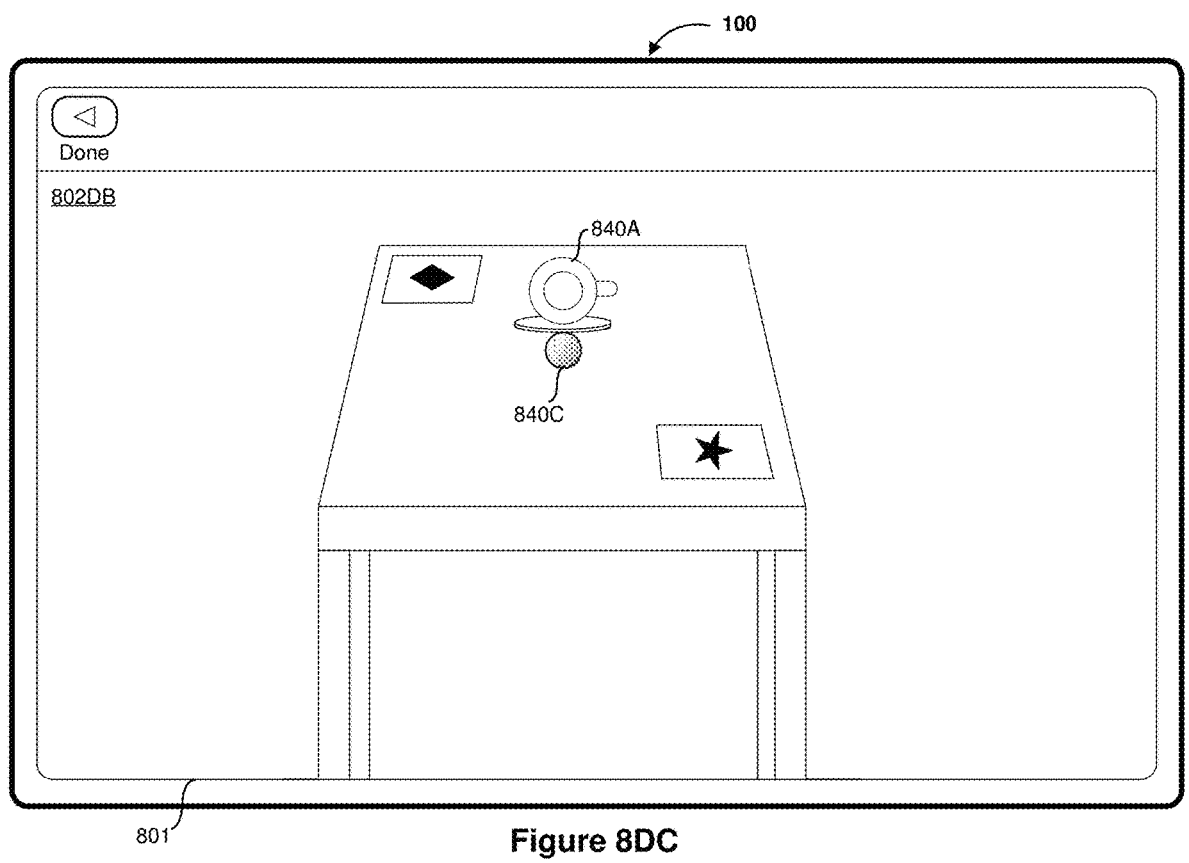
Figure 8D:
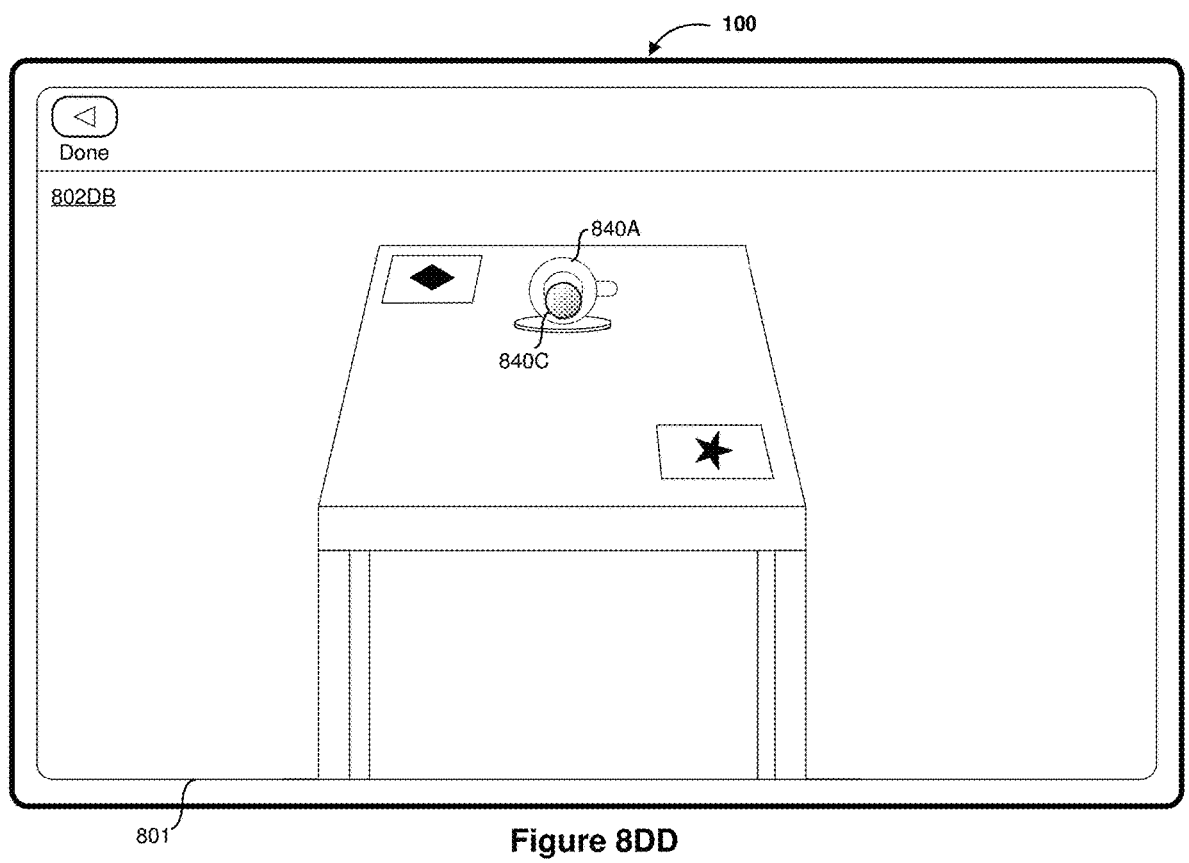
Figure 8D:
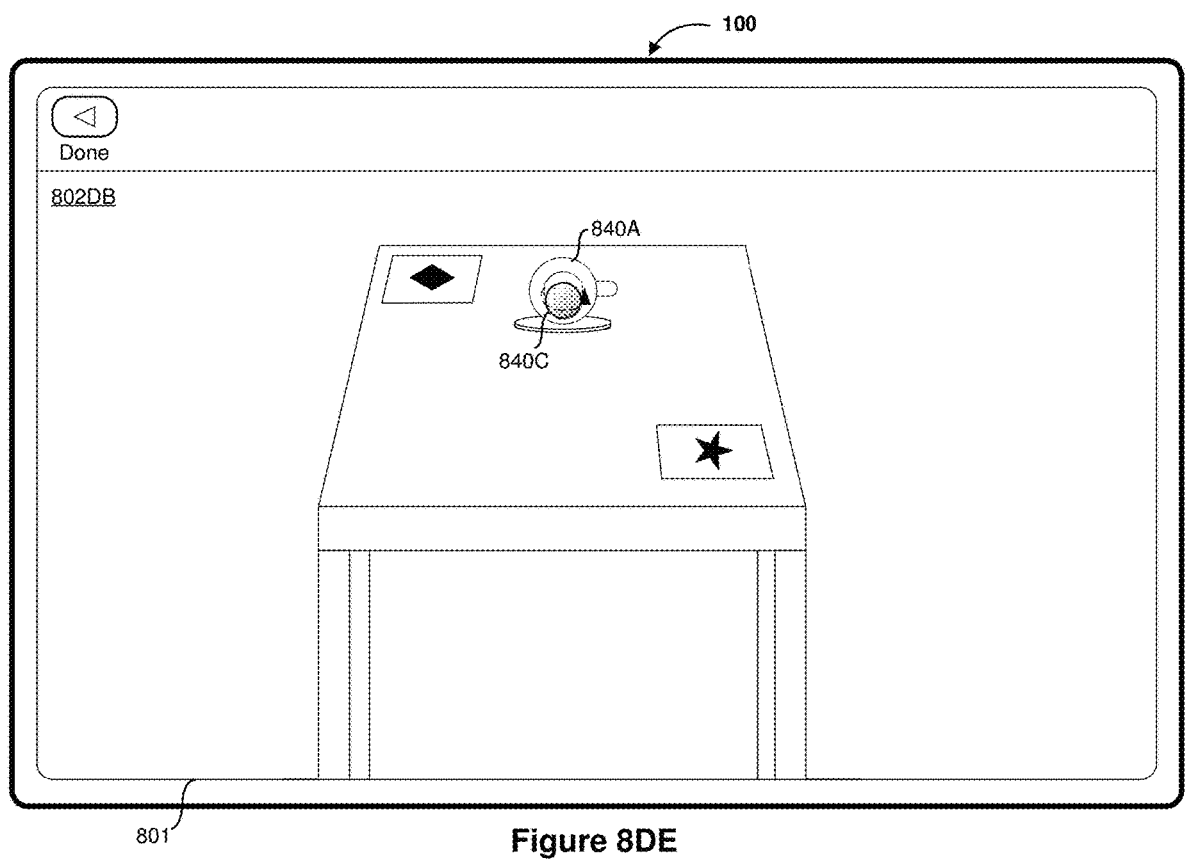
Figure 8D:
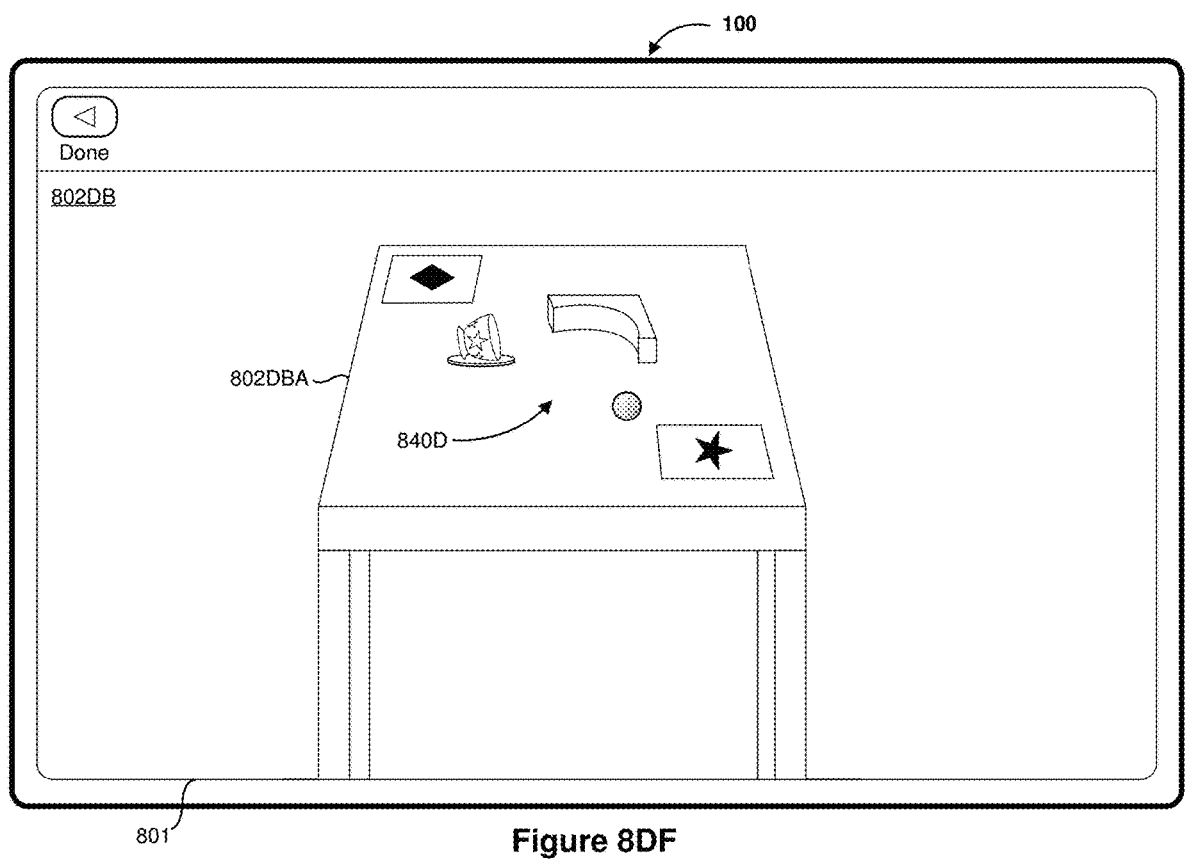

FIG. 8Z illustrates the CGR file composing user interface 801 in response to detecting the user input 899U directed to the teacup affordance 808EB. In FIG. 8Z, the currently selected style is changed to the teacup style as indicated by the first display style of the teacup affordance 808EB as compared to the second display style of the other style affordances 808EA, 808EC, and 808ED. Further, the representation of the currently selected CGR object 808DA in the view window 808D is changed based on the change in the currently selected style.

As noted above, in various embodiments, while a particular style is the currently selected style of the style bar 808E, a corresponding subset of the patterns is presented for selection in the pattern bar 808F. Thus, as another example, in FIG. 8Z, based on the currently selected style being the teacup style, a subset of the pattern affordances 808FA-808FD are presented for selection. In particular, the stars affordance 808FC and the ivy affordance 808FD are presented for selection as indicated by the second display style, whereas the glass affordance 808FB is not presented for selection as indicated by the third display style.

FIG. 8Z illustrates a user input 899V directed to the stars affordance 808FC. In various embodiments, the user input 899V corresponds to a contact (e.g., a tap) detected at the location of the stars affordance 808FC.

FIG. 8AA illustrates the CGR file composing user interface 801 in response to detecting the user input 899V directed to the stars affordance 808FC. In FIG. 8AA, the currently selected pattern is changed to the stars style as indicated by the first display style of the stars affordance 808FC as compared to the second display style or third display style of the other pattern affordances 808FA, 808FB, and 808FD. Further, the representation of the currently selected CGR object 808DA in the view window 808D is changed based on the change in the currently selected pattern.

As noted above, in various embodiments, while a particular style is the currently selected style of the style bar 808E, a corresponding subset of the patterns is presented for selection in the pattern bar 808F. Thus, as another example, in FIG. 8AA, based on the currently selected style being the teacup style, a subset of the pattern affordances 808FA-808FD are presented for selection. In particular, the white affordance 808FA and the ivy affordance 808FD are presented for selection as indicated by the second display style, whereas the glass affordance 808FB is not presented for selection as indicated by the third display style.

FIG. 8AA illustrates a user input 899W directed to the OK affordance 808G. In various embodiments, the user input 899W corresponds to a contact (e.g., a tap) detected at the location of the OK affordance 808G.

FIG. 8AB illustrates the CGR file composing user interface 801 in response to detecting the user input 899W directed to the OK affordance 808G. In FIG. 8AB, the configurator user interface 808 is dismissed, the style of the currently selected CGR object is changed to the teacup style as indicated by the change in appearance of the representation of the cup CGR object 806C and the change in the style affordance 813DBB, and the pattern of the currently selected CGR object is changed to the stars pattern as indicated by the change in appearance of the cup CGR object 806C and the change in the pattern affordance 813DBC.

FIG. 8AB illustrates a user input 899X directed to the representation of the cup CGR object 806C. In various embodiments, the user input 899X corresponds to two contacts moving closer to or further away from each other (e.g., a pinch or de-pinch gesture) detected at the location of the representation of the cup CGR object 806C.

FIG. 8AC illustrates the CGR file composing user interface 801 in response to detecting the user input 899X directed to the representation of the cup CGR object 806C. In FIG. 8AC, the size of the cup CGR object is increased as indicated by the increased display size of the representation of the cup CGR object 806C (and, similarly, the change in the second CGR scene affordance 803BB). In various embodiments, the change in size of the cup CGR object is proportional to a change in distance between the two contacts of the user input 899X.

FIG. 8AC illustrates a user input 899Y directed to the representation of the cup CGR object 806C. In various embodiments, the user input 899Y corresponds to two contacts moving around a common center (e.g., a rotate gesture) detected at the location of the representation of the cup CGR object 806C.

FIG. 8AD illustrates the CGR file composing user interface 801 in response to detecting the user input 899Y directed to the representation of the cup CGR object 806C. In FIG. 8AD, the orientation of the cup CGR object is changed as indicated by the changed orientation of the representation of the cup CGR object 806C (and, similarly, the change in the second CGR scene affordance 803BB). In various embodiments, the cup CGR object (and its corresponding representation 806C) are rotated about a z-axis perpendicular to the horizontal plane and passing through a spatial manipulation point (e.g., an edge, a midpoint, a center-of-mass, an intuitive spatial manipulation point, or a custom defined spatial manipulation point) of the cup CGR object.

In various embodiments, rotation about an axis passing through a midpoint or an unweighted center-of-mass of a CGR object (or snapping a midpoint or unweighted center-of-mass of the CGR object to a target point, e.g., treating a distance between the midpoint or unweighted center-of-mass of the CGR object and the target point as zero when the distance is less than a threshold amount) results in non-intuitive spatial manipulation of the CGR object. FIG. 8AE1 illustrates a side view of a cup CGR object 880. FIG. 8AE2 illustrates a top view of the cup CGR object 880. The cup CGR object 880 includes a body 881A, a foot 881B, and a handle 881C. FIG. 8AE1 illustrates a side view of a bounding box 882 surrounding the cup CGR object 880. FIG. 8AE2 illustrates a top view of the bounding box 882 surround the cup CGR object 880.

FIGS. 8AE1 and 8AE2 illustrate a first spatial manipulation point 883 that is a midpoint of the bounding box 882. Thus, the perpendicular lines that pass through the first spatial manipulation point 883 bisect the edges of the bounding box 882. However, in various circumstances, performing spatial manipulation of the cup CGR object 880 using the first spatial manipulation point 883 can lead to non-intuitive results, in particular because the first spatial manipulation point 883 is off-center as compared to the center of the body 881A (due to the cup CGR object 880 including the handle 881C). For example, rotating the cup CGR object 880 about a z-axis passing through the first spatial manipulation point 883 would appear to also move the cup CGR object 880. As another example, snapping the cup CGR object 880 by aligning the first spatial manipulation point 883 to the center of a plate CGR object (or a grid point) would make the cup CGR object 880 appear to be offset with respect to the plate CGR object (or the grid point).

Similarly, a second spatial manipulation point 884 at the center-of-mass of the CGR object 880 is non-intuitively offset from the center of the body 881A, leading to similar non-intuitive results when rotating or moving the cup CGR object when using the second spatial manipulation point 884.

Accordingly, in various embodiments, an intuitive spatial manipulation point 885 is used when performing spatial manipulation of the cup CGR object 880. In various embodiments, the intuitive spatial manipulation point 885 is stored with the CGR object file defining the cup CGR object. The intuitive spatial manipulation point 885 may be defined, for example, by a designer of the CGR object file. In various embodiments, the intuitive spatial manipulation point 885 is set by a user of the CGR file composing user interface 801.

In various embodiments, the intuitive spatial manipulation point 885 is determined by the device 100. For example, in various embodiments, the device 100 determines a plurality of segments the cup CGR object 880 (e.g., the body 881A, the foot 881B, and the handle 881C) and determines the intuitive spatial manipulation point 885 as a center-of-mass of the cup CGR object with different segments weighted differently (e.g., assigning more weight to the body 881A than the handle 881C). In various embodiments, the weight assigned to one or more of the segments is zero, e.g., the segments are ignored in determining the intuitive spatial manipulation point 885.

Returning to FIG. 8AD, FIG. 8AD illustrates a user input 899Z directed to the representation of the cup CGR object 806C. In various embodiments, the user input 899Z corresponds to a moving contact (e.g., a drag or touch-and-drag) detected with a start location at the location of the representation of the cup CGR object 806C.

FIG. 8AF illustrates the CGR file composing user interface 801 in response to detecting the user input 899Z directed to the representation of the cup CGR object 806C. In FIG. 8AF, the location of the cup CGR object is changed as indicated by the changed location of the representation of the cup CGR object 806C (and, similarly, the change in the second CGR scene affordance 803BB). In various embodiments, the cup CGR object (and its corresponding representation 806C) are moved in an xy-plane parallel to the horizontal plane. In various embodiments, the change in location of the cup CGR object is proportional to a distance of movement the contacts of the user input 899Z.

Based on the change in location of the cup CGR object (as represented by the location of the representation of the cup CGR object 806C and the location of the plate CGR object (as represented by the location of the representation of the plate CGR object 806B), the cup CGR object and the plate CGR object overlap.

In various embodiments, the device 100 determines whether two or more CGR objects overlap at an overlap location in a CGR scene. In various embodiments, the device 100 performs the determination periodically. In various embodiments, the device 100 performs the determination whenever an object is spatially manipulated (e.g., rotated, moved, or sized). In various embodiments, the device 100 performs the determination in response to a user input requesting an overlap check.

In various embodiments, in response to determining that two or more CGR objects overlap at an overlap location in a CGR scene, an overlap indication is presented. In various embodiments, the overlap indication is displayed in association with at least one of the two or more CGR objects. In various embodiments, the overlap indication is displayed in association with the overlap location.

FIG. 8AF illustrates a first overlap indicator 809A in the form of a notification bubble coupled to the representation of the cup CGR object 806C and a second overlap indicator 809B in the form of a shading, glowing, hatching, or other highlighting overlaid over the representation of the cup CGR object 806C and the representation of the plate CGR object 806B.

FIG. 8AF illustrates a user input 899AA directed to the first overlap indicator 809A. In various embodiments, the user input 899AA corresponds to a contact (e.g., a tap) detected at the location of the first overlap indicator 809A.

FIG. 8AG illustrates the CGR file composing user interface 801 in response to detecting the user input 899AA directed to the first overlap indicator 809A. In FIG. 8AG, the CGR file composing user interface 801 includes an overlap notice user interface 810 in the form of a pop-up window.

The overlap notice user interface 810 includes an overlap text description 810A describing the detected overlap of CGR objects and an overlap graphical view 810B that illustrates the overlapping CGR object.

The overlap notice user interface 810 includes a cancel affordance 810C for dismissing (ceasing to display) the overlap notice user interface 810, returning the CGR file composing user interface 801 to the state illustrated in FIG. 8AG.

The overlap notice user interface 810 includes an ignore affordance 810D for dismissing the overlap notice user interface 810 and the corresponding overlap indicators (without moving any of the overlapping CGR objects), returning the CGR file composing user interface 801 to the state illustrated in FIG. 8AG without the first overlap indicator 809A and the second overlap indicator 809B.

The overlap notice user interface 810 includes a fix affordance 810E for automatically changing a location of at least one of the CGR objects such that the overlapping CGR objects no longer overlap.

In various embodiments, the CGR object of the two more overlapping CGR objects that was spatially manipulated most recently is selected for movement. In various embodiments, the selected CGR object is moved in a direction such that minimal movement is performed to fix the overlap.

FIG. 8AG illustrates a user input 899AB directed to the fix affordance 810E. In various embodiments, the user input 899AB corresponds to a contact (e.g., a tap) detected at the location of the fix affordance 810E.

FIG. 8AH illustrates the CGR file composing user interface 801 in response to detecting the user input 899AB directed to the fix affordance 810E. In FIG. 8AH, the overlap notice user interface 810 is dismissed and the cup CGR object has been moved (upwards) to no longer overlap with the plate CGR object as indicated by the movement of the representation of the cup CGR object 806C (and the corresponding change in the second CGR scene affordance 803BB).

FIG. 8AH illustrates a user input 899AC directed to the representation of the cup CGR object 806C. In various embodiments, the user input 899AC corresponds to a contact (e.g., a tap) detected at the location of the representation of the cup CGR object 806C. In various embodiments, the user input 899AC corresponds to a contact (e.g., a tap) detected at the location of the first type of object selection indicator 807 surrounding the representation of the cup CGR object 806C.

FIG. 8AI illustrates the CGR file composing user interface 801 in response to detecting the user input 899AC directed to the representation of the cup CGR object 806C. In FIG. 8AI, the first type of object selection indicator 807 is replaced with a second type of object selection indicator 817 surrounding the representation of the cup CGR object 806C.

Thus, while a CGR object is selected (and the first type of object selection indicator 807 is displayed), different types of user input directed to the representation of the CGR object results in different changes to spatial properties of the CGR object. For example, in FIGS. 8AB and 8AC, the user input 899X of a first type (e.g., a pinch) directed to the representation of the cup CGR object 806C changes a size of the cup CGR object. As another example, in FIGS. 8AC and 8AD, the user input 899Y of a second type (e.g., a rotate) directed to the representation of the cup CGR object 806C changes an orientation around a z-axis of the cup CGR object. As another example, in FIGS. 8AD and 8AF, the user input 899Z of a third type (e.g., a drag) directed to the representation of the cup CGR object 806C changes a location in an xy-plane of the cup CGR object. As another example, in FIGS. 8AH and 8AI, a user input 899AB of a fourth type (e.g., a tap) directed to the representation of the cup CGR object 806C changes the first type of object selection indicator 807 to a second type of object selection indicator 817, allowing various additional spatial manipulations as described below.

Congruent (or isometric) spatial manipulations of a CGR object are spatial manipulations in which the size and shape of the CGR object is not changed. Congruent spatial manipulations include translation, rotation, and reflection. Similar (or shape-preserving) spatial manipulations of a CGR object are spatial manipulations in which the shape of the CGR object is not changed. Similar spatial manipulations include scaling, translation, rotation, and reflection.

As described above, while a CGR object is selected (and the first type of object selection indicator 807 is displayed), various user inputs perform a first set of similar spatial manipulations. For example, in various embodiments, the first set of similar spatial manipulations includes scaling (as shown in FIGS. 8AB and 8AC), rotation about a first axis (as shown in FIGS. 8AC and 8AD), and two-dimensional translation within a first plane (as shown in FIGS. 8AD and 8AF).

As described below, while a CGR object is selected (and the second type of object selection indicator 817 is displayed), various user inputs perform a second set of similar spatial manipulations different than the first set of similar spatial manipulations. In various embodiments, the second set of similar spatial manipulations includes one or more or all of the first set of similar spatial manipulations. For example, in various embodiments, the second set of similar spatial manipulations includes rotation about the first axis, rotation about a second axis, rotation about a third axis, and three-dimensional translation.

The second type of object selection indicator 817 includes a first translation affordance 817A for moving the currently selected CGR object along a first axis (e.g., the z-axis, moving the currently selected CGR object up and down), a second translation affordance 817B for moving the currently selected CGR object along a second axis (e.g., within the xy-plane), and a third translation affordance 817C for moving the currently selected CGR object along a third axis (e.g., perpendicular to the second axis within the xy-plane). The second type of object selection indicator 817 includes a first rotation affordance 817D for rotating the currently selected CGR object about the first axis, a second rotation affordance 817E for rotating the currently selected CGR object about the second axis, and a third rotation affordance 817F for rotating the currently selected CGR object about the third axis.

FIG. 8AI illustrates a user input 899AD directed to the third rotation affordance 817F. In various embodiments, the user input 899AD corresponds to a moving contact (e.g., a drag or touch-and-drag) detected with a start location at the location of the third rotation affordance 817F.

FIG. 8AJ illustrates the CGR file composing user interface 801 in response to detecting the user input 899AD directed to the third rotation affordance 817F. In FIG. 8AI, the cup CGR object is rotated about the third axis as indicated by the rotation of the representation of the cup CGR object 806C (and the corresponding change in the second CGR scene affordance 803BB).

FIG. 8AJ illustrates a user input 899AE directed to the first translation affordance 817A. In various embodiments, the user input 899AE corresponds to a moving contact (e.g., a drag or touch-and-drag) detected with a start location at the location of the first translation affordance 817A.

FIG. 8AK illustrates the CGR file composing user interface 801 in response to detecting the user input 899AE directed to the first translation affordance 817F. In FIG. 8AJ, the cup CGR object is moved downward along the first axis as indicated by the movement of the representation of the cup CGR object 806C (and the corresponding change in the second CGR scene affordance 803BB).

FIG. 8AK illustrates a user input 899AF directed to a location in the view region 803E away from any representation of a CGR object. In various embodiments, the user input 899AF corresponds to a contact (e.g., a tap) detected at a location in the view region 803E away from any representation of a CGR object.

FIG. 8AL illustrates the CGR file composing user interface 801 in response to detecting the user input 899AF directed to the location in the view region 803E. In FIG. 8AL, no CGR object is selected as indicated by the lack of an object selection (e.g., the first type of object selection indicator 807 or the second type of object selection indicator 817). With no CGR object selected, the scene settings affordance 803AH is selected (as indicated by the different display of the scene settings affordance 803AH as compared to the other settings affordances 803AG, 803AI, and 803AJ) and the settings region 803D includes the plurality of scene setting manipulation affordances presented via collapsible/expandable scene setting menus 803DA-803DE.

FIG. 8AL illustrates a user input 899AG directed to a location in the view region 803E. In various embodiments, the user input 899AG corresponds to two contacts moving closer to or further away from each other (e.g., a pinch or de-pinch gesture) detected at a location in the view region 803E. In various embodiments, the location in the view region 803E is away from any representation of a CGR object (while a CGR object is selected or no CGR object is selected). In various embodiments, the location is at the location of a representation of a CGR object that is not selected.

FIG. 8AM illustrates the CGR file composing user interface 801 in response to detecting the user input 899AG directed to the location in the view region 803E. In FIG. 8AM, the perspective of a virtual camera of the view region 803E is moved closer to the anchor representation 803EA and the view region 803E is zoomed in, resulting in an increase in size of the anchor representation 803EA, the representation of the plate CGR object 806B, and the representation of the cup CGR object 806C. The size of the plate CGR object and the cup CGR object (as opposed to their representations in the view region 803E) is not changed, as indicated by lack of change to the second CGR scene affordance 803BB.

FIG. 8AM illustrates a user input 899AH directed to a location in the view region 803E. In various embodiments, the user input 899AH corresponds to moving contact (e.g., a drag or touch-and-drag gesture) detected at a location in the view region 803E. In various embodiments, the location in the view region 803E is away from any representation of a CGR object (while a CGR object is selected or no CGR object is selected). In various embodiments, the location is at the location of a representation of a CGR object that is not selected.

FIG. 8AN illustrates the CGR file composing user interface 801 in response to detecting the user input 899AH directed to the location in the view region 803E. In FIG. 8AN, the perspective of a virtual camera of the view region 803E is moved to one side (e.g., perpendicular to a line from the virtual camera to the center of the anchor representation 803EA) and the view region 803E is moved, resulting in a sideways movement of the anchor representation 803EA, the representation of the plate CGR object 806B, and the representation of the cup CGR object 806C. The location of the plate CGR object and the cup CGR object (as opposed to their representations in the view region 803E) is not changed, as indicated by lack of change to the second CGR scene affordance 803BB.

FIG. 8AN illustrates a user input 899AI directed to a location in the view region 803E. In various embodiments, the user input 899AI corresponds to two contacts moving around a common center (e.g., a rotate gesture) detected at a location in the view region 803E. In various embodiments, the location in the view region 803E is away from any representation of a CGR object (while a CGR object is selected or no CGR object is selected). In various embodiments, the location is at the location of a representation of a CGR object that is not selected.

FIG. 8AO illustrates the CGR file composing user interface 801 in response to detecting the user input 899AI directed to the location in the view region 803E. In FIG. 8AO, the perspective of a virtual camera of the view region 803E is rotated around the center of the anchor representation 803EA and the view region 803E is rotated, resulting in a rotation of the anchor representation 803EA, the representation of the plate CGR object 806B, and the representation of the cup CGR object 806C. The location and orientation of the plate CGR object and the cup CGR object (as opposed to their representations in the view region 803E) is not changed, as indicated by lack of change to the second CGR scene affordance 803BB.

FIG. 8AO illustrates a user input 899AJ directed to the CGR view affordance 803AF. In various embodiments, the user input 899AJ corresponds to a contact (e.g., a tap) detected at the location of the CGR view affordance 803AF.

FIG. 8AP illustrates the CGR file composing user interface 801 in response to detecting the user input 899AJ directed to the location in the CGR view affordance 803AF. In FIG. 8AP, the CGR view affordance 803AF is selected and the object view affordance 803AE is deselected (as indicated by their differing display styles). In FIG. 8AP, the view region 803A includes a representation of the second CGR scene (including the anchor representation 803EA, the representation of the plate CGR object 806B, and the representation of the cup CGR object 806C) displayed over a scene camera image taken by the device 100.

FIG. 8AQ illustrates the CGR file composing user interface 801 in response to movement of the device 100 to the right. In FIG. 8AQ, the perspective of the scene camera image changes and, correspondingly, the perspective of a virtual camera used to render the representation of the second CGR scene (including the anchor representation 803EA, the representation of the plate CGR object 806B, and the representation of the cup CGR object 806C) is similarly changed. Thus, the representation of the second CGR scene is moved to the left (in addition to other perspective effects) within the view region 803A.

FIG. 8AR illustrates the CGR file composing user interface 801 in response to movement of the device backwards (e.g., away from the table of the physical environment). In FIG. 8AR, the perspective of the scene camera changes and, correspondingly, the perspective of a virtual camera used to render the representation of the second CGR scene (including the anchor representation 803EA, the representation of the plate CGR object 806B, and the representation of the cup CGR object 806C) is similarly changed. Thus, the representation of the second CGR scene is decreased in size (in addition to other perspective effects) within the view region 803A.

FIG. 8AR illustrates a user input 899AK directed to the object view affordance 803AE. In various embodiments, the user input 899AK corresponds to a contact (e.g., a tap) detected at the location of the object view affordance 803AE.

FIG. 8AS illustrates the CGR file composing user interface 801 in response to detecting the user input 899AK directed to the location in the object view affordance 803AE. In FIG. 8AS, the object view affordance 803AE is selected and the CGR view affordance 803AF is deselected (as indicated by their differing display styles). In FIG. 8AS, the scene camera image is no longer displayed behind the representation of the second CGR scene.

FIG. 8AS illustrates a user input 899AL directed to the representation of the cup CGR object 806C. In various embodiments, the user input 899AL corresponds to a contact (e.g., a tap) detected at the location of the cup CGR object 806C.

FIG. 8AT illustrates the CGR file composing user interface 801 in response to detecting the user input 899AL directed to the representation of the cup CGR object 806C. In FIG. 8AT, the view region 803E includes the first type of object selection indicator 807 surrounding the representation of the cup CGR object 806C. The first type of object selection indicator 807 displayed surrounding the representation of the cup CGR object 806C indicates that the cup CGR object is selected.

In FIG. 8AT, as the object settings affordance 803AI is selected (as indicated by the different display of the object settings affordance 803AI as compared to the other settings affordances 803AG, 803AH, and 803AJ), the settings region 803D includes a plurality of object setting manipulation affordances presented via collapsible/expandable object setting menus 813DA-813DD (of which the object name manipulation affordance 813DAA, the configurator affordance 813DBA, the style affordance 813DBB, and the pattern affordance 813DBC are shown in FIG. 8AT). Like the first type of object selection indicator 807 displayed surrounding the representation of the cup CGR object 806C, the object name manipulation affordance 813DAA displaying the name of the cup CGR object (e.g., "Cup01") indicates that the cup CGR object is selected.

FIG. 8AT illustrates a user input 899AM directed to the pattern affordance 813DBC. In various embodiments, the user input 899AM corresponds to a contact (e.g., a tap) detected at the location of the representation of the pattern affordance 813DBC.

FIG. 8AU illustrates the CGR file composing user interface 801 in response to detecting the user input 899AM directed to the pattern affordance 813DBC. In FIG. 8AU, the CGR file composing user interface 801 includes a live view user interface 811 in the form of a pop-up window.

The live view user interface 811 includes a plurality of view windows 811DA-811DC respectively including a plurality of representations of the currently selected CGR object 811EA-811EC, each with a different pattern. In particular, the live view user interface 811 includes a first view window 811DA including a representation of the cup CGR object with a white pattern 811EA, a second view window 811DB including a representation of the cup CGR object with a stars pattern 811EB, and a third view window 811DC including a representation of the cup CGR object with an ivy pattern 811EC. In FIG. 8AU, the second view window 811DB is displayed in a different manner (e.g., with a thicker border) than the other view windows 811DA and 811DC indicating that the stars pattern is the currently selected pattern.

The live view user interface 811 includes a text description 811C of the currently selected CGR object (e.g., "Cup01") and the CGR object setting being manipulated via the live view user interface 811 (e.g., the pattern).

The live view user interface 811 includes a plurality of view affordances 811A-811B including an object view affordance 811A for viewing the plurality of representations of the currently selected CGR object 811EA-811EC in their respective view windows 811DA-811DC in a scene mode (in which the user inputs directed to any of the plurality of view window 811DA-811DC changes the perspective of the view of all of the plurality of representations of the currently selected CGR object 811EA-811EC) and a CGR view affordance 811B for viewing the plurality of representations of the currently selected CGR object 811EA-811EC in their respective view windows 811DA-811DC in a CGR mode (in which movement of the device 100 changes the perspective of the view of all of the plurality of representations of the currently selected CGR object 811EA-811EC).

The live view user interface 811 includes an OK affordance 811F for changing the pattern of the currently selected CGR object to the currently selected style and dismissing (ceasing to display) the live view interface 811. The live view user interface 811 includes a cancel affordance 811G for dismissing (ceasing to display) the live view user interface 811, returning the CGR file composing user interface 801 to the state illustrated in FIG. 8AT without changing the pattern of the currently selected CGR object.

FIG. 8AU illustrates a user input 899AN directed to the first view window 811DA. In various embodiments, the user input 899AN corresponds to two contacts moving around a common center (e.g., a rotate gesture) detected at the location of the first view window 811DA.

FIG. 8AV illustrates the CGR file composing user interface 801 in response to detecting the user input 899AN directed to the first view window 811DA. In FIG. 8AV, the perspective of a virtual camera for rendering each of the plurality of representations of the currently selected CGR object 811EA-811EC in their respective view windows 811DA-811DC has changed, rotated around a z-axis. Accordingly, the differences in the respective patterns can be easily seen and discerned.

FIG. 8AV illustrates a user input 899AO directed to the first view window 811DA. In various embodiments, the user input 899AO corresponds to two contacts moving closer to or further away from each other (e.g., a pinch or de-pinch gesture) detected at the location of the first view window 811DA.

FIG. 8AW illustrates the CGR file composing user interface 801 in response to detecting the user input 899AO directed to the first view window 811DA. In FIG. 8AW, the perspective of a virtual camera for rendering each of the plurality of representations of the currently selected CGR object 811EA-811EC in their respective view windows 811DA-811DC has changed, moved closer to the representations, zooming in and increasing their size.

FIG. 8AW illustrates a user input 899AP directed to the third view window 811DC. In various embodiments, the user input 899AP corresponds to a contact (e.g., a tap) detected at the location of the third view window 811DC.

FIG. 8AX illustrates the CGR file composing user interface 801 in response to detecting the user input 899AP directed to the third view window 811DC. In FIG. 8AX, the third view window 811DC is displayed in a different manner (e.g., with a thicker border) than the other view windows 811DA-811DB indicating that the ivy pattern is the currently selected pattern.

FIG. 8AX illustrates a user input 899AQ directed to the OK affordance 811F. In various embodiments, the user input 899AQ corresponds to a contact (e.g., a tap) detected at the location of the OK affordance 811F.

FIG. 8AY illustrates the CGR file composing user interface 801 in response to detecting the user input 899AQ directed to the OK affordance 811F. In FIG. 8AY, the live view user interface 811 is dismissed and the pattern of the currently selected CGR object is changed to the ivy pattern as indicated by the change in appearance of the representation of the cup CGR object 806C (and, more easily seen in FIG. 8AY, the corresponding change in the second CGR scene affordance 803BB) and the change in the pattern affordance 813DBC.

FIG. 8AY illustrates a user input 899AR directed to the CGR object addition affordance 803AB. In various embodiments, the user input 899AR corresponds to a contact (e.g., a tap) detected at the location of the CGR object addition affordance 803AB.

FIG. 8AZ illustrates the CGR file composing user interface 801 in response to detecting the user input 899AY directed to the CGR object addition affordance 803AB. In FIG. 8AZ, the CGR file composing user interface 801 includes the media library user interface 804 in the form of a pop-up window.

FIG. 8AZ illustrates a user input 899AS directed to the sphere addition affordance 805C. In various embodiments, the user input 899AC corresponds to a contact (e.g., a tap) detected at the location of the sphere addition affordance 805C.

FIG. 8BA illustrates the CGR file composing user interface 801 in response to detecting the user input 899AS directed to the sphere addition affordance 805B. In FIG. 8BA, the media library user interface 804 ceases to be displayed and the view region 803E includes a representation of a sphere CGR object 806D displayed at a particular location over the representation of the anchor 803EA. Relatedly, the second CGR scene affordance 803BB has changed to indicate that the second CGR scene includes a sphere CGR object.

In FIG. 8BA, the view region 803E further includes the first type of object selection indicator 807 surrounding the representation of the sphere CGR object 806D. The first type of object selection indicator 807 displayed surrounding the representation of the sphere CGR object 806D indicates that the sphere CGR object is selected.

In FIG. 8BA, the settings region 803D is changed to display object setting manipulation affordances for changing the object settings to the currently selected CGR object, the sphere CGR object (including the object name manipulation affordance 813DAA indicating "Sphere01", the style affordance 813DBB indicating a sphere style, and the pattern affordance 813DBC indicating a white pattern).

FIG. 8BA illustrates a user input 899AT directed to the style affordance 813DBB. In various embodiments, the user input 899AT corresponds to a contact (e.g., a tap) detected at the location of the style affordance 813DBB.

FIG. 8BB illustrates the CGR file composing user interface 801 in response to detecting the user input 899AT directed to the style affordance 813DBB. In FIG. 8BB, the CGR file composing user interface 801 includes the live view user interface 811 in the form of a pop-up window.

In FIG. 8BB, the text description 811C of the live view user interface 811 indicates that the currently selected CGR object is "Sphere01" and the CGR object setting being manipulated via the live view user interface 811 is the style.

In FIG. 8BB, the live view user interface 811 includes a plurality of view windows 821DA-821DF respectively including a plurality of representations of the currently selected CGR object 821EA-821EF, each with a different style. In particular, the live view user interface 811 includes a first view window 821DA including a representation of the sphere CGR object with a sphere style 821EA, a second view window 821DB including a representation of the sphere CGR object with a golf ball style 821EB, a third view window 821DC including a representation of the sphere CGR object with a baseball style 821EC, a fourth view window 821DD including a representation of the sphere CGR object with a basketball style 821ED, a fifth view window 821DE including a representation of the sphere CGR object with a tennis ball style 821EE, and a sixth view window 821DF including a representation of the sphere CGR object with a bowling ball style 821EF.

In various embodiments, while in an object view mode, appropriate user inputs directed to any of the plurality of representations of view windows 821DA-821DF or, while in a CGR view mode, movement of the device 100, would advantageously reveal the difference between the representation of the sphere CGR object with the sphere style 821EA and the representation of the sphere CGR object with the bowling ball style 821EF (which includes holes that are not visible in the perspective of FIG. 8BB).

In FIG. 8BB, the first view window 821DA is displayed in a different manner (e.g., with a thicker border) than the other view windows 821DB-821DF indicating that the sphere style is the currently selected style.

FIG. 8BB illustrates a user input 899AU directed to the second view window 821DB. In various embodiments, the user input 899AU corresponds to a contact (e.g., a tap) detected at the location of the second view window 821DB.

FIG. 8BC illustrates the CGR file composing user interface 801 in response to detecting the user input 899AU directed to the second view window 821DB. In FIG. 8BC, the second view window 821DB is displayed in a different manner (e.g., with a thicker border) than the other view windows 821DA and 821DC-821DF indicating that the golf ball style is the currently selected style.

FIG. 8BC illustrates a user input 899AV directed to the OK affordance 811F. In various embodiments, the user input 899AV corresponds to a contact (e.g., a tap) detected at the location of the OK affordance 811F.

FIG. 8BD illustrates the CGR file composing user interface 801 in response to detecting the user input 899AV directed to the OK affordance 811F. In FIG. 8AY, the live view user interface 811 is dismissed and the style of the currently selected CGR object is changed to the golf ball style as indicated by the change in appearance of the representation of the sphere CGR object 806D (and the corresponding change in the second CGR scene affordance 803BB) and the change in the style affordance 813DBC.

FIG. 8BD illustrates a user input 899AW directed to the physics properties menu 813DC. In various embodiments, the user input 899AW corresponds to a contact (e.g., a tap) detected at the location of the physics properties menu 813DC.

FIG. 8BE illustrates the CGR file composing user interface 801 in response to detecting the user input 899AW directed to the physics properties menu 813DC. In FIG. 8BE, the physics properties menu 813DC is expanded (within the settings region 803D) to present a physics mesh affordance 813DCA for changing a physics mesh of the currently selected CGR object (described below), a reflectivity affordance 813DCB for changing a reflectivity of the currently selected CGR object via a slider, and an elasticity affordance 813DCC for changing an elasticity of the currently selected CGR object.

FIG. 8BE illustrates a user input 899AX directed to the physics mesh affordance 813DCA. In various embodiments, the user input 899AX corresponds to a contact (e.g., a tap) detected at the location of the physics mesh affordance 813DCA.

FIG. 8BF illustrates the CGR file composing user interface 801 in response to detecting the user input 899AX directed to the physics mesh affordance 813DCA. In FIG. 8BF, the CGR file composing user interface 801 includes a setting value selection user interface 812 in the form of a pop-up window.

The setting value selection user interface 812 includes a text description 812A of the currently selected CGR object (e.g., "Sphere01") and the CGR object setting being manipulated via the setting value selection user interface 812 (e.g., the physics mesh).

The setting value selection user interface 812 includes a plurality of setting value selection affordances 812BA-812BC for selecting a setting value. The setting value selection user interface 812 includes a sphere affordance 812BA for selecting a sphere mesh as the currently selected setting value, a golf ball affordance 812BB for selecting a golf ball mesh as the currently selected setting value, and a load affordance 812BC for loading a custom mesh as the currently selected setting value.

The golf ball affordance 812BB includes a selection indicator 812C indicating that the golf ball mesh is the currently selected setting value.

The setting value selection user interface 812 includes an OK affordance 812D for changing the value of the CGR object setting of the currently selected CGR object to the currently selected setting value and dismissing (ceasing to display) the setting value selection user interface 812. The setting value selection user interface 812 includes a cancel affordance 812E for dismissing (ceasing to display) the setting value selection user interface 812, returning the CGR file composing user interface 801 to the state illustrated in FIG. 8BE without changing the value of the CGR object setting of the currently selected CGR object.

In various circumstances, it may be desirable that the physics mesh of a CGR object (which is used to determine interactions of the CGR object with other CGR objects) be different than a display mesh of a CGR object (which is used to render the CGR object on a display). For example, in the case of the golf ball CGR object, display of the CGR golf ball object may be based on a complicated display mesh including a large number of dimples and, therefore, a large number of polygons. However, using such a mesh as a physics mesh to calculate physical interactions of the golf ball CGR object may be computationally intensive and time-consuming (potentially precluding real-time calculation). By selecting a simpler physics mesh, such as a sphere mesh, with fewer polygons, the results of physical interactions can be more efficiently and quickly calculated.

FIG. 8BF illustrates a user input 899AY directed to the sphere affordance 812BA. In various embodiments, the user input 899AY corresponds to a contact (e.g., a tap) detected at the location of the sphere affordance 812BA.

FIG. 8BG illustrates the CGR file composing user interface 801 in response to detecting the user input 899AY directed to the sphere affordance 812BA. In FIG. 8BG, the selection indicator 812C is displayed in association with the sphere affordance 812BA (rather than the golf ball affordance 812BB).

FIG. 8BG illustrates a user input 899AZ directed to the OK affordance 812D. In various embodiments, the user input 899AZ corresponds to a contact (e.g., a tap) detected at the location of the OK affordance 812D.

FIG. 8BH illustrates the CGR file composing user interface 801 in response to detecting the user input 899AZ directed to the OK affordance 812D. In FIG. 8BH, the physics mesh affordance 813DCA is updated to indicate that the physics mesh of the sphere CGR object is the sphere mesh.

FIG. 8BH illustrates a user input 899BA directed to the CGR scene addition affordance 803AA. In various embodiments, the user input 899BA corresponds to a contact (e.g., a tap) detected at the location of the CGR scene addition affordance 803AA.

FIG. 8BI illustrates the CGR file composing user interface 801 in response to detecting the user input 899BA directed to the CGR scene addition affordance 803AA and further user input to, among other things, select an anchor for the third CGR scene created by the user input 899BA, rename the third CGR scene (e.g., to "Tea Time 2"), populate the third CGR scene with a number of CGR objects, manipulate CGR object settings of the number of CGR objects, and reselect the second CGR scene as the currently selected CGR scene.

Accordingly, in FIG. 8BI, the CGR file composing user interface includes a third CGR scene affordance 803BC representing a third CGR scene.

FIG. 8BI illustrates a user input 899BB directed to the behavior addition affordance 803AC. In various embodiments, the user input 899BB corresponds to a contact (e.g., a tap) detected at the location of the behavior addition affordance 803AC.

FIG. 8BJ illustrates the CGR file composing user interface 801 in response to detecting the user input 899BB directed to the behavior addition affordance 803AC. In FIG. 8BJ, the CGR file composing user interface 801 includes a behavior editor user interface 831 in the form of a pop-up window.

In various embodiments, the behavior editor user interface 831 is used to create and/or edit a behavior associated with the CGR scene. Each behavior is associated with one or more triggers and one or more actions. When a CGR application corresponding to the project is presented and any of the one or more triggers is detected, the one or more actions are performed.

The behavior editor user interface 831 includes a view window 831D presenting a representation of the currently selected CGR scene (including a representation of the cup CGR object 831DA, a representation of the plate CGR object 831DB, and a representation of the sphere CGR object 831DC). The behavior editor user interface 831 includes a name 831C (e.g., "Behavior01") of the behavior being edited (or created) (e.g., a first behavior) displayed above the view window 831D.

The behavior editor user interface 831 includes a plurality of view affordances 831A-831B including an object view affordance 831A for viewing the representation of the currently selected CGR scene in the view window 831D in a scene mode (in which the user inputs directed to the view window 831D change the perspective of the view of the currently selected CGR scene) and a CGR view affordance 831B for viewing the currently selected CGR scene in the view window 831D in a CGR mode (in which movement of the device 100 changes the perspective of the view of the currently selected CGR object).

The behavior editor user interface 831 includes an OK affordance 831E for creating (and/or accepting changes to) the behavior and dismissing (ceasing to display) the behavior editor user interface 831. The behavior editor user interface 831 includes a cancel affordance 831F for dismissing (ceasing to display) the behavior editor user interface 831, returning the CGR file composing user interface 801 to the state illustrated in FIG. 8BI without creating (or without changing) the behavior.

The behavior editor user interface 831 includes an overview region 832 and a details region 837. The overview region 832 includes a trigger region 833 and an action region 835 separated by a separator 834. The trigger region 833 includes a new trigger affordance 833A for adding a trigger to the behavior and the action region 835 includes a new action affordance 835A for adding a new action to the behavior.

The details region 837 includes a plurality of behavior setting affordances 836A-836C for changing settings of the behavior. The details region 837 includes a name affordance 836A for changing a name of the behavior, a color affordance 836B for changing a color of the behavior, and an enable/disable affordance 836C for toggling between enabling and disabling the behavior.

FIG. 8BJ illustrates a user input 899BC directed to the name affordance 836A. In various embodiments, the user input 899BC corresponds to a contact (e.g., a tap) detected at the location of the name affordance 836A.

FIG. 8BK illustrates the CGR file composing user interface 801 in response to detecting the user input 899BC directed to the name affordance 836A (and, possibly, additional user input defining a new name for the first behavior). In FIG. 8BK, the name affordance 836A is updated to indicate the new name for the first behavior (e.g., "Move Ball").

FIG. 8BK illustrates a user input 899BD directed to the new trigger affordance 833A. In various embodiments, the user input 899BD corresponds to a contact (e.g., a tap) detected at the location of the new trigger affordance 833A.

FIG. 8BL illustrates the CGR file composing user interface 801 in response to detecting the user input 899BD directed to the new trigger affordance 833A. In FIG. 8BL, the new trigger affordance 833A is displayed in a second manner different than a first manner of FIG. 8BK (e.g., black instead of white) to indicate that the details region 837 includes affordances for creating a new trigger for the behavior.

For example, in FIG. 8BL, the details region 837 includes a tap trigger affordance 838A for creating a tap trigger such that, when a CGR application corresponding to the project is presented and a tap on a CGR object (or any of a plurality of CGR objects) defined by the tap trigger is detected, the one or more actions of the behavior are performed. The details region 837 includes a proximity/collision trigger affordance 838B for creating a proximity/collision trigger such that, when a CGR application corresponding to the project is presented and a CGR object (or any of a plurality of CGR objects) defined as a primary target by the trigger is detected within a threshold distance (also defined by the trigger, which may be 0) of a CGR object (or any of a plurality of CGR objects) defined as secondary target by the trigger, the one or more actions of the behavior are performed. The details region 837 includes a face-tracking trigger affordance 838C for creating a face-tracking trigger such that, when a CGR application corresponding to the project is presented and a facial function of a user (e.g, blinking, chewing, blowing, smiling, etc.) is detected, the one or more actions of the behavior are performed. The details region 837 includes an other trigger affordance 838D for creating other types of triggers.

FIG. 8BL illustrates a user input 899BE directed to the tap trigger affordance 838A. In various embodiments, the user input 899BE corresponds to a contact (e.g., a tap) detected at the location of the tap trigger affordance 838A.

FIG. 8BM illustrates the CGR file composing user interface 801 in response to detecting the user input 899BE directed to the tap trigger affordance 838A. In FIG. 8BL, the trigger region 833 includes a tap trigger affordance 833B displayed in the second manner to indicate that the details region 837 includes affordances for creating a new tap trigger for the behavior.

For example, in FIG. 8BM, the details region 837 includes a done affordance 838AA for creating a tap trigger such that, when a CGR application corresponding to the project is presented and a tap on a CGR object (or any of a plurality of CGR objects) selected in the view window 831D is detected, the one or more actions of the behavior are performed.

FIG. 8BM illustrates a user input 899BF directed to the representation of the sphere CGR object 831DC. In various embodiments, the user input 899BF corresponds to a contact (e.g., a tap) detected at the location of the representation of the sphere CGR object 831DC.

FIG. 8BN illustrates the CGR file composing user interface 801 in response to detecting the user input 899BF directed to the representations of the sphere CGR object 831DC. In FIG. 8BN, the representation of the sphere CGR object 831DC is highlighted, indicating that the sphere CGR object is selected for definition as the target of the tap trigger.

FIG. 8BN illustrates a user input 899BG directed to the done affordance 838AA. In various embodiments, the user input 899BG corresponds to a contact (e.g., a tap) detected at the location of the done affordance 838AA. In response, the first behavior is associated with a tap trigger such that, when a CGR application corresponding to the project is presented and a tap on the sphere CGR object is detected, the one or more actions of the first behavior are performed.

FIG. 8BO illustrates the CGR file composing user interface 801 in response to detecting the user input 899BG directed to the done affordance 838AA. In FIG. 8BO, the new trigger affordance 833A (and the tap trigger affordance 833B) are displayed in the first manner to indicate that the details region 837 includes the plurality of behavior setting affordances 836A-836C.

FIG. 8BO illustrates a user input 899BH directed to the new trigger affordance 833A. In various embodiments, the user input 899BH corresponds to a contact (e.g., a tap) detected at the location of the new trigger affordance 833A.

FIG. 8BP illustrates the CGR file composing user interface 801 in response to detecting the user input 899BH directed to the new trigger affordance 833A. In FIG. 8BP, the new trigger affordance 833A is displayed in a second manner different than a first manner of FIG. 8BO (e.g., black instead of white) to indicate that the details region 837 includes affordances for creating a new trigger for the behavior. For example, in FIG. 8BL, the details region 837 includes, among others, the face-tracking trigger affordance 838C.

FIG. 8BP illustrates a user input 899BI directed to the face-tracking trigger affordance 838C. In various embodiments, the user input 899BI corresponds to a contact (e.g., a tap) detected at the location of the face-tracking trigger affordance 838C.

FIG. 8BQ illustrates the CGR file composing user interface 801 in response to detecting the user input 899BI directed to the face-tracking trigger affordance 838C. In FIG. 8BQ, the trigger region 833 includes a face-tracking trigger affordance 833C displayed in the second manner to indicate that the details region 837 includes affordances for creating a new face-tracking trigger for the behavior.

For example, in FIG. 8BQ, the details region 837 includes a blinking trigger affordance 838CA for creating a blinking trigger such that, when a CGR application corresponding to the project is presented and a user is detected blinking, the one or more actions of the behavior are performed. The details region 837 includes a chewing trigger affordance 838CB for creating a chewing trigger such that, when a CGR application corresponding to the project is presented and a user is detected chewing, the one or more actions of the behavior are performed. The details region 837 includes a blowing trigger affordance 838CC for creating a blowing trigger such that, when a CGR application corresponding to the project is presented and a user is detected blowing, the one or more actions of the behavior are performed. The details region 837 includes an other face-tracking trigger affordance 838CD for creating other face-tracking triggers.

FIG. 8BQ illustrates a user input 899BJ directed to the blowing trigger affordance 838CC. In various embodiments, the user input 899BJ corresponds to a contact (e.g., a tap) detected at the location of the blowing trigger affordance 838CC. In response, the first behavior is associated with a blowing trigger such that, when a CGR application corresponding to the project is presented and a user is detected performing a blowing action (e.g., as blowing out birthday candles), the one or more actions of the first behavior are performed.

FIG. 8BR illustrates the CGR file composing user interface 801 in response to detecting the user input 899BJ directed to the blowing trigger affordance 838CC. In FIG. 8BR, the new trigger affordance 833A (and the face-tracking trigger affordance 833C) are displayed in the first manner to indicate that the details region 837 includes the plurality of behavior setting affordances 836A-836C.

FIG. 8BR illustrates a user input 899BK directed to the new action affordance 835A. In various embodiments, the user input 899BK corresponds to a contact (e.g., a tap) detected at the location of the new action affordance 835A.

FIG. 8BS illustrates the CGR file composing user interface 801 in response to detecting the user input 899BK directed to the new action affordance 835A. In FIG. 8BS, the trigger region 833 is collapsed to include a single grouped trigger affordance 833X representative of the new trigger affordance 833A and any defined triggers (e.g., the tap trigger affordance 833B and the face-tracking trigger affordance 833C). In FIG. 8BS, the new action affordance 835A is displayed in the second manner to indicate that the details region 837 includes affordances for creating a new action for the behavior.

For example, in FIG. 8BS, the details region 837 includes a move action affordance 839A for creating a move action such that, when a CGR application corresponding to the project is presented and a trigger for a behavior including the move action is detected, a CGR target moves in the CGR environment. The details region 837 includes an audio action affordance 839B for creating an audio action such that, when a CGR application corresponding to the project is presented and a trigger for a behavior including the audio action is detected, an audio file is played in the CGR environment. The details region 837 includes a scene change action affordance 839C for creating a scene change action such that, when a CGR application corresponding to the project is presented and a trigger for a behavior including the scene change action is detected, a new CGR scene is presented in the CGR environment (either replacing or supplementing a current CGR scene). The details region 837 includes an other action affordance 839D for creating other types of actions.

FIG. 8BS illustrates a user input 899BL directed to the move action affordance 839A. In various embodiments, the user input 899BL corresponds to a contact (e.g., a tap) detected at the location of the move action affordance 839A.

FIG. 8BT illustrates the CGR file composing user interface 801 in response to detecting the user input 899BL directed to the move action affordance 839A. In FIG. 8BT, the action region 835 includes a move action affordance 835B displayed in the second manner to indicate that the details region 837 includes affordances for creating a new move action for the behavior.

For example, in FIG. 8BT, the details region 837 includes a move-to action affordance 839AA for creating a move-to action such that, when a CGR application corresponding to the project is presented and a trigger for a behavior including the move-to action is detected, a CGR target moves to a position in the CGR environment defined by the action. The details region 837 includes a move-from action affordance 839AB for creating a move-from action such that, when a CGR application corresponding to the project is presented and a trigger for a behavior including the move-from action is detected, a CGR target moves from its a position in the CGR environment in a way defined by the action. The details region 837 includes a spin action affordance 839AC for creating a spin action such that, when a CGR application corresponding to the project is presented and a trigger for a behavior including the spin action is detected, a CGR target spins at its position in the CGR environment. The details region 837 includes an other move action affordance 839AD for creating other types of move actions.

FIG. 8BT illustrates a user input 899BM directed to the move-from action affordance 839AB. In various embodiments, the user input 899BM corresponds to a contact (e.g., a tap) detected at the location of the move-from action affordance 839AB.

FIG. 8BU illustrates the CGR file composing user interface 801 in response to detecting the user input 899BM directed to the move-from action affordance 838AB. In FIG. 8BU, the details region 837 includes affordances for creating a new move-from action for the behavior.

For example, in FIG. 8BU, the details region 837 includes a move forward action affordance 839ABA for creating a move forward action such that, when a CGR application corresponding to the project is presented and a trigger for a behavior including the move forward action is detected, a CGR target moves forward in the CGR environment. The details region 837 includes a bounce action affordance 839ABB for creating a bounce action such that, when a CGR application corresponding to the project is presented and a trigger for a behavior including the bounce action is detected, a CGR target moves upwards from its a position in the CGR environment. The details region 837 includes a drop action affordance 839ABC for creating a drop action such that, when a CGR application corresponding to the project is presented and a trigger for a behavior including the drop action is detected, a CGR target drops from its position in the CGR environment. The details region 837 includes an other move-from action affordance 839ABD for creating other types of move-from actions.

FIG. 8BU illustrates a user input 899BN directed to the move forward action affordance 839ABA. In various embodiments, the user input 899BN corresponds to a contact (e.g., a tap) detected at the location of the move forward action affordance 839ABA.

FIG. 8BV illustrates the CGR file composing user interface 801 in response to detecting the user input 899BN directed to the move forward action affordance 838ABA. In FIG. 8BV, the details region 837 includes a speed setting affordance 839ABAA for setting a speed at which the CGR object moves forward and an interaction setting affordance 839ABAB for enabling or disabling interaction with other CGR objects as the CGR object moves forward. The details region 837 includes a save affordance 839ABAC for saving the move forward action to the first behavior (or saving changes to the move forward action) and a dismiss affordance 839ABAD for dismissing the move forward action (or dismissing changes to the move forward action).

In FIG. 8BV, the representation of the sphere CGR object 831DC is highlighted indicating that the sphere CGR object is the CGR object moved during the action. By directing a user input to representations of other CGR objects, the CGR object moved during the action can be changed.

FIG. 8BV illustrates a user input 899BO directed to the save affordance 839ABAC. In various embodiments, the user input 899BO corresponds to a contact (e.g., a tap) detected at the location of the save affordance 839ABAC.

FIG. 8BW illustrates the CGR file composing user interface 801 in response to detecting the user input 899BO directed to the save affordance 839ABAC. In FIG. 8BW, the new action affordance 835A and the move action affordance 835B are displayed in the first manner indicating that the details region 837 includes the plurality of behavior setting affordances 836A-836C for changing settings of the behavior.

FIG. 8BW illustrates a user input 899BP directed to the OK affordance 831E. In various embodiments, the user input 899BP corresponds to a contact (e.g., a tap) detected at the location of the OK affordance 831E.

FIG. 8BX illustrates the CGR file composing user interface 801 in response to detecting the user input 899BP directed to the OK affordance 831E. In FIG. 8BX, the behavior editor user interface 831 is dismissed and a first behavior affordance 803CA (with the color indicated by the first behavior) is displayed in the behavior region 803C.

In FIG. 8BX, the first behavior is selected, as indicated by the first behavior affordance 803CA displayed in a selected manner (e.g., with a thicker border than in an unselected manner). Because the first behavior is selected, the representation of the second CGR scene in the view region 803E indicates the CGR objects associated with the triggers of the first behavior using a first highlighting (e.g., a glow) and the CGR objects associated with the actions of the first behavior using a second highlighting (e.g., diagonal hashing). Accordingly, the representation of the sphere CGR object 806D is displayed with both the first highlighting (as tapping the sphere CGR object is a trigger of the first behavior) and the second highlighting (as moving the sphere CGR object is an action of the first behavior).

FIG. 8BX illustrates a user input 899BQ directed to the behavior addition affordance 803AC. In various embodiments, the user input 899BQ corresponds to a contact (e.g., a tap) detected at the location of the behavior addition affordance 831AC.

FIG. 8BY illustrates the CGR file composing user interface 801 in response to detecting the user input 899BQ directed to the behavior addition affordance 803AC. In FIG. 8BY, the CGR file composing user interface 801 includes the behavior editor user interface 831 in the form of a pop-up window. The behavior editor user interface 831 includes a name 831C (e.g., "Behavior02") of the behavior being edited (or created) (e.g., a second behavior) displayed above the view window 831D.

FIG. 8BY illustrates a user input 899BR directed to the name affordance 836A. In various embodiments, the user input 899BR corresponds to a contact (e.g., a tap) detected at the location of the name affordance 836A.

FIG. 8BZ illustrates the CGR file composing user interface 801 in response to detecting the user input 899BR directed to the name affordance 836A (and, possibly, additional user input defining a new name for the second behavior). In FIG. 8BZ, the name affordance 836A is updated to indicate the new name for the second behavior (e.g., "Ball in Cup").

FIG. 8BZ illustrates a user input 899BS directed to the color affordance 836B. In various embodiments, the user input 899BS corresponds to a contact (e.g., a tap) detected at the location of the color affordance 836B.

FIG. 8CA illustrates the CGR file composing user interface 801 in response to detecting the user input 899BS directed to the color affordance 836B (and, possibly, additional user input selecting a new color for the second behavior). In FIG. 8CA, the color affordance 836B is updated to indicate the new color for the second behavior (e.g., "Ball in Cup").

FIG. 8CA illustrates a user input 899BT directed to the new trigger affordance 833A. In various embodiments, the user input 899BT corresponds to a contact (e.g., a tap) detected at the location of the new trigger affordance 833A.

FIG. 8CB illustrates the CGR file composing user interface 801 in response to detecting the user input 899BD directed to the new trigger affordance 833A. In FIG. 8CB, the new trigger affordance 833A is displayed in the second manner (e.g., black) to indicate that the details region 837 includes affordances for creating a new trigger for the behavior. For example, in FIG. 8CB, the details region 837 includes the tap trigger affordance 838A for creating a tap trigger, the proximity/collision trigger affordance 838B, the face-tracking trigger affordance 838C, and the other trigger affordance 838D for creating other types of triggers.

FIG. 8CB illustrates a user input 899BU directed to the proximity/collision trigger affordance 838B. In various embodiments, the user input 899BE corresponds to a contact (e.g., a tap) detected at the location of the proximity/collision trigger affordance 838B.

FIG. 8CC illustrates the CGR file composing user interface 801 in response to detecting the user input 899BU directed to the proximity/collision trigger affordance 838B. In FIG. 8CC, the trigger region 833 includes a proximity/collision trigger affordance 833D displayed in the second manner to indicate that the details region 837 includes affordances for creating a new proximity/collision trigger for the behavior.

For example, in FIG. 8CC, the details region 837 includes a distance-from-mesh trigger affordance 838BA for creating a distance-from-mesh trigger such that, when a CGR application corresponding to the project is presented and any point of the mesh of a CGR object (or any of a plurality of CGR objects) defined as a primary target by the trigger is detected within a threshold distance (also defined by the trigger, which may be 0) of any point of the mesh of a CGR object (or any of a plurality of CGR objects) defined as a secondary target by the trigger, the one or more actions of the behavior are performed.

The details region 837 includes a distance-from-center trigger affordance 838BB for creating a distance-from-center trigger such that, when a CGR application corresponding to the project is presented and a CGR object (or any of a plurality of CGR objects) defined as a primary target by the trigger is detected within a threshold distance (also defined by the trigger, which may be 0) of the center (or other spatial manipulation point) of a CGR object (or any of a plurality of CGR objects) defined as a secondary target by the trigger, the one or more actions of the behavior are performed.

The details region 837 includes a distance-from-coordinate trigger affordance 838BC for creating a distance-from-coordinate trigger such that, when a CGR application corresponding to the project is presented and a CGR object (or any of a plurality of CGR objects) defined as a primary target by the trigger is detected within a threshold distance (also defined by the trigger, which may be 0) of a coordinate defined as a secondary target by the trigger, the one or more actions of the behavior are performed.

The details region 837 includes an other proximity/collision trigger affordance 838BD for creating other types of proximity/collision triggers.

FIG. 8CC illustrates a user input 899BV directed to the distance-from-center affordance 838BB. In various embodiments, the user input 899BV corresponds to a contact (e.g., a tap) detected at the location of the distance-from-center trigger affordance 838BB.

FIG. 8CD illustrates the CGR file composing user interface 801 in response to detecting the user input 899BV directed to the distance-from-center trigger affordance 838BB. For example, in FIG. 8CD, the details region 837 includes a done affordance 838BBA for completing a selection of primary targets such that, when a CGR application corresponding to the project is presented and of a CGR object (or any of a plurality of CGR objects) selected in the view window 831D is detected within a threshold distance (also defined by the trigger, which may be 0) of a CGR object (or any of a plurality of CGR objects) defined as a secondary target by the trigger, the one or more actions of the behavior are performed FIG. 8CD illustrates a user input 899BW directed to the representation of the sphere CGR object 831DC. In various embodiments, the user input 899BW corresponds to a contact (e.g., a tap) detected at the location of the representation of the sphere CGR object 831DC.

FIG. 8CE illustrates the CGR file composing user interface 801 in response to detecting the user input 899BW directed to the representations of the sphere CGR object 831DC. In FIG. 8CE, the representation of the sphere CGR object 831DC is highlighted, indicating that the sphere CGR object is selected for definition as the primary target of the proximity/collision trigger.

FIG. 8CE illustrates a user input 899BX directed to the done affordance 838BBA. In various embodiments, the user input 899BX corresponds to a contact (e.g., a tap) detected at the location of the done affordance 838BBA.

FIG. 8CF illustrates the CGR file composing user interface 801 in response to detecting the user input 899BX directed to the done affordance 838BBA. In FIG. 8CF, the details region 837 includes a done affordance 838BBB for completing a selection of secondary targets such that, when a CGR application corresponding to the project is presented and a CGR object (or any of a plurality of CGR objects) defined as a primary target by the trigger is detected within a threshold distance (also defined by the trigger, which may be 0) of a CGR object (or any of a plurality of CGR objects) selected in the view window 831D, the one or more actions of the behavior are performed.

FIG. 8CF illustrates a user input 899BY directed to the representation of the cup CGR object 831DA. In various embodiments, the user input 899BY corresponds to a contact (e.g., a tap) detected at the location of the representation of the cup CGR object 831DA.

FIG. 8CG illustrates the CGR file composing user interface 801 in response to detecting the user input 899BY directed to the representation of the cup CGR object 831DA. In FIG. 8CG, the representation of the cup CGR object 831DA is highlighted, indicating that the cup CGR object is selected for definition as the secondary target of the proximity/collision trigger.

FIG. 8CG illustrates a user input 899BZ directed to the done affordance 838BBB. In various embodiments, the user input 899BZ corresponds to a contact (e.g., a tap) detected at the location of the done affordance 838BBB. In FIG. 8CG, the details region 837 includes a distance setting affordance 838BBC for setting the threshold distance of the proximity/collision trigger. By setting the threshold distance to a number greater than zero, a proximity trigger is created. By setting the threshold distance to zero, a collision trigger is created. The details region 837 includes a volumetric trigger setting affordance 838BBD for enabling or disabling a volumetric trigger setting of the proximity/collision trigger. When the volumetric trigger setting is enabled, when a CGR application corresponding to the project is presented and any point on the mesh of a CGR object (or any of a plurality of CGR objects) defined as a primary target by the trigger is detected within a threshold distance (also defined by the trigger) of the center (or other spatial manipulation point) of a CGR object (or any of a plurality of CGR objects) defined as a secondary target, the one or more actions of the behavior are performed. When the volumetric trigger setting is disabled, when a CGR application corresponding to the project is presented and a center (or other spatial manipulation point) of a CGR object (or any of a plurality of CGR objects) defined as a primary target by the trigger is detected within a threshold distance (also defined by the trigger) of the center (or other spatial manipulation point) of a CGR object (or any of a plurality of CGR objects) defined as a secondary target, the one or more actions of the behavior are performed.

The details region 837 includes a save affordance 838BBE for saving the proximity/collision trigger to the second behavior (or saving changes to the proximity/collision trigger) and a dismiss affordance 838BBF for dismissing the proximity/collision trigger (or dismissing changes to the proximity/collision trigger).

FIG. 8CH illustrates a user input 899CA directed to the distance setting affordance 838BBC. In various embodiments, the user input 899CA corresponds to a contact (e.g., a tap) detected at the location of the representation of the distance setting affordance 838BBC.

FIG. 8CI illustrates the CGR file composing user interface 801 in response to detecting the user input 899CA directed to the distance setting affordance 838BBC (and, possibly, additional user input to set the distance setting to zero). In FIG. 8CI, the distance setting affordance 838BBC indicates that the distance setting has been set to zero.

FIG. 8CI illustrates a user input 899CB directed to the save affordance 838BBE. In various embodiments, the user input 899CB corresponds to a contact (e.g., a tap) detected at the location of the save affordance 838BBE. In response, the second behavior is associated with a collision trigger such that, when a CGR application corresponding to the project is presented and any point of the mesh of the sphere CGR object is detected at the location of the center of the cup CGR object, the one or more actions of the second behavior are performed.

FIG. 8CJ illustrates the CGR file composing user interface 801 in response to detecting the user input 899CB directed to the save affordance 838BBE. In FIG. 8CJ, the new trigger affordance 833A (and the proximity/collision trigger affordance 833D) are displayed in the first manner indicating that the details region 837 includes the plurality of behavior setting affordances 836A-836C for changing settings of the behavior.

FIG. 8CJ illustrates a user input 899CC directed to the new action affordance 835A. In various embodiments, the user input 899CC corresponds to a contact (e.g., a tap) detected at the location of the representation of the new action affordance 835A.

FIG. 8CK illustrates the CGR file composing user interface 801 in response to detecting the user input 899CC directed to the new action affordance 835A. In FIG. 8CK, the new action affordance 835A is displayed in the second manner to indicate that the details region 837 includes affordances for creating a new action for the behavior.

For example, in FIG. 8CK, the details region 837 includes the move action affordance 839A, the audio action affordance 839B, the scene change action affordance 839C, and the other action affordance 839D for creating other types of actions.

FIG. 8CK illustrates a user input 899CD directed to the audio action affordance 839B. In various embodiments, the user input 899CD corresponds to a contact (e.g., a tap) detected at the location of the audio action affordance 839B.

FIG. 8CL illustrates the CGR file composing user interface 801 in response to detecting the user input 899CD directed to the audio action affordance 839B. In FIG. 8CK, the new action affordance 835A is displayed in the first manner and the action region 835 includes an audio action affordance 835C displayed in the second manner to indicate that the details region 837 includes affordances for creating an audio action.

For example, the details region 837 includes an ambient audio action affordance 839BA for creating an ambient audio action such that, when a CGR application corresponding to the project is presented and a trigger of the behavior is detected, an audio file is played omnidirectionally. The details region 837 includes a directional audio action affordance 839BB for creating a directional audio action such that, when a CGR application corresponding to the project is presented and a trigger of the behavior is detected, an audio file is played from a particular point in the CGR environment. The details region 837 includes an other audio action affordance 839BC for creating other types of audio actions.

FIG. 8CL illustrates a user input 899CE directed to the ambient audio action affordance 839BB. In various embodiments, the user input 899CK corresponds to a contact (e.g., a tap) detected at the location of the ambient audio action affordance 839BB.

FIG. 8CM illustrates the CGR file composing user interface 801 in response to detecting the user input 899CE directed to the ambient audio action affordance 839BA. In FIG. 8CM, the details region 837 includes an audio file setting affordance 839BAA for setting the audio file to be played and a volume setting affordance 839BAB for setting a volume of the audio file to be played. The details region 837 includes a save affordance 839BAC for saving the ambient audio action to the second behavior (or saving changes to the ambient audio action) and a dismiss affordance 839BAD for dismissing the ambient audio action (or dismissing changes to the ambient audio action).

FIG. 8CM illustrates a user input 899CF directed to the save affordance 839BAC. In various embodiments, the user input 899CF corresponds to a contact (e.g., a tap) detected at the location of the save affordance 839BAC.

FIG. 8CN illustrates the CGR file composing user interface 801 in response to detecting the user input 899CF directed to the save affordance 839BAC. In FIG. 8CN, the new action affordance 835A and the audio action affordance 835C are displayed in the first manner indicating that the details region 837 includes the plurality of behavior setting affordances 836A-836C for changing settings of the behavior.

FIG. 8CN illustrates a user input 899CG directed to the new action affordance 835A. In various embodiments, the user input 899CG corresponds to a contact (e.g., a tap) detected at the location of the new action affordance 835A.

FIG. 8CO illustrates the CGR file composing user interface 801 in response to detecting the user input 899CG directed to the new action affordance 835A. In FIG. 8CO, the new action affordance 835A is displayed in the second manner to indicate that the details region 837 includes affordances for creating a new action for the behavior.

For example, in FIG. 8CO, the details region 837 includes the move action affordance 839A, the audio action affordance 839B, the scene change action affordance 839C, and the other action affordance 839D for creating other types of actions.

FIG. 8CO illustrates a user input 899CH directed to the move action affordance 839A. In various embodiments, the user input 899CH corresponds to a contact (e.g., a tap) detected at the location of the move action affordance 839A.

FIG. 8CP illustrates the CGR file composing user interface 801 in response to detecting the user input 899CH directed to the move action affordance 839A. In FIG. 8CP, the new action affordance 835A is displayed in the first manner and the action region 835 includes a move action affordance 835D displayed in the second manner to indicate that the details region 837 includes affordances for creating a move action.

For example, in FIG. 8CP, the details region 837 includes the move-to action affordance 839AA, the move-from action affordance 839AB, the spin action affordance 839AC, and the other move action affordance 839AD for creating other types of move actions.

FIG. 8CP illustrates a user input 899CI directed to the spin action affordance 839AC. In various embodiments, the user input 899CI corresponds to a contact (e.g., a tap) detected at the location of the spin action affordance 839CI.

FIG. 8CQ illustrates the CGR file composing user interface 801 in response to detecting the user input 899CI directed to the move action affordance 839AC. In FIG. 8CQ, the details region 837 includes a spin speed setting affordance 839ACA for setting the speed at which the CGR object spins, a spin time setting affordance 839ACB for setting a time for which the CGR object spins, and a spin axis setting affordance 839ACC for setting an axis around which the CGR object spins. The details region 837 includes a save affordance 839ACD for saving the spin action to the second behavior (or saving changes to the spin action) and a dismiss affordance 839ACE for dismissing the spin action (or dismissing changes to the spin action).

In FIG. 8CQ, the representation of the sphere CGR object 831DC is highlighted indicating that the sphere CGR object is the CGR object spun during the action. By directing a user input to representations of other CGR objects, the CGR object spun during the action can be changed.

FIG. 8CQ illustrates a user input 899CJ directed to the save affordance 839ACD. In various embodiments, the user input 899CJ corresponds to a contact (e.g., a tap) detected at the location of the save affordance 839ACD.

FIG. 8CR illustrates the CGR file composing user interface 801 in response to detecting the user input 899CJ directed to the save affordance 839ACD. In FIG. 8CR, the new action affordance 835A and the move action affordance 835D are displayed in the first manner indicating that the details region 837 includes the plurality of behavior setting affordances 836A-836C for changing settings of the behavior.

FIG. 8CR illustrates a user input 899CK directed to the new action affordance 835A. In various embodiments, the user input 899CK corresponds to a contact (e.g., a tap) detected at the location of the new action affordance 835A.

FIG. 8CS illustrates the CGR file composing user interface 801 in response to detecting the user input 899CK directed to the new action affordance 835A. In FIG. 8CS, the new action affordance 835A is displayed in the second manner to indicate that the details region 837 includes affordances for creating a new action for the behavior.

For example, in FIG. 8CS, the details region 837 includes the move action affordance 839A, the audio action affordance 839B, the scene change action affordance 839C, and the other action affordance 839D for creating other types of actions.

FIG. 8CS illustrates a user input 899CL directed to the scene change action affordance 839C. In various embodiments, the user input 899CL corresponds to a contact (e.g., a tap) detected at the location of the scene change action affordance 839C.

FIG. 8CT illustrates the CGR file composing user interface 801 in response to detecting the user input 899CL directed to the scene change action affordance 839C. In FIG. 8CT, the new action affordance 835A is displayed in the first manner and the action region 835 includes a scene change action affordance 835E displayed in the second manner to indicate that the details region 837 includes affordances for creating a scene change action.

For example, in FIG. 8CT, the details region 837 includes a target scene setting affordance 839CA for setting the CGR to be changed to. The details region 837 includes a save affordance 839CB for saving the scene change action to the second behavior (or saving changes to the scene change action) and a dismiss affordance 839CC for dismissing the scene change action (or dismissing changes to the scene change action).

FIG. 8CT illustrates a user input 899CM directed to the save affordance 839CB. In various embodiments, the user input 899CM corresponds to a contact (e.g., a tap) detected at the location of the save affordance 839CB.

FIG. 8CU illustrates the CGR file composing user interface 801 in response to detecting the user input 899CM directed to the save affordance 839CB. In FIG. 8CU, the new action affordance 835A and the scene change action affordance 835E are displayed in the first manner indicating that the details region 837 includes the plurality of behavior setting affordances 836A-836C for changing settings of the behavior.

When a CGR application corresponding to the project is presented and a trigger of a behavior is detected, each action of the behavior is performed in the order displayed in the action region 835. Thus, for the second behavior as illustrated in FIG. 8CU, when the proximity/collision trigger is detected, the device 100 plays the audio file, then, once the audio file has completed, spins the sphere CGR object, then, once the spin time defined by the spin time setting has elapsed, changes the CGR scene. However, as described below, the actions for the behavior can be reordered and grouped to change the timing of the actions.

FIG. 8CU illustrates a user input 899CN directed to the move action affordance 835D. In various embodiments, the user input 899CN corresponds to a moving contact (e.g., a drag or touch-and-drag) detected with a start location at the location of the move action affordance 835D and an end location to the left of the audio action affordance 835C.

FIG. 8CV illustrates the CGR file composing user interface 801 in response to detecting the user input 899CN directed to the move action affordance 835D. Within the action region 835, the action affordances are reordered such that the move action affordance 835D is to the left of the audio action affordance 835C. Accordingly, for the second behavior as illustrated in FIG. 8CV, when the proximity/collision trigger is detected, the device 100 spins the sphere CGR object, then, once the spin time defined by the spin time setting has elapsed, plays the audio file, then, once the audio file has completed, changes the CGR scene.

FIG. 8CV illustrates a user input 899CO directed to the audio action affordance 835C. In various embodiments, the user input 899CO corresponds to a moving contact (e.g., a drag or touch-and-drag) detected with a start location at the location of the audio action affordance 835C and an end location at the location of the move action affordance 835D.

FIG. 8CW illustrates the CGR file composing user interface 801 in response to detecting the user input 899CO directed to the audio action affordance 835C.

Within the action region 835, the audio action affordance 835C and the move action affordance 835D are replaced with a grouped action affordance 835X representative of the audio action affordance 835C and the move action affordance 835D. Accordingly, for the second behavior as illustrated in FIG. 8CW, when the proximity/collision trigger is detected, the device 100 simultaneously spins the sphere CGR object and plays the audio file, then, once the spin time defined by the spin time setting has elapsed and the audio file has completed, the device 100 changes the CGR scene.

FIG. 8CW illustrates a user input 899CP directed to the OK affordance 831E. In various embodiments, the user input 899CP corresponds to a contact (e.g., a tap) detected at the location of the OK affordance 831E.

FIG. 8CX illustrates the CGR file composing user interface 801 in response to detecting the user input 899CP directed to the OK affordance 831E. In FIG. 8CX, the behavior editor user interface 831 is dismissed and a second behavior affordance 803CB (with the color indicated by the second behavior) is displayed in the behavior region 803C.

In FIG. 8CX, the second behavior is selected, as indicated by the second behavior affordance 803CB displayed in a selected manner (e.g., with a thicker border than in an unselected manner of, for example, the first behavior affordance 803CA). Because the second behavior is selected, the representation of the second CGR scene in the view region 803E indicates the CGR objects associated with the triggers of the first behavior using a first highlighting (e.g., a glow) and the CGR objects associated with the actions of the first behavior using a second highlighting (e.g., diagonal hashing). Accordingly, the representation of the sphere CGR object 806D and the representation of the cup CGR object 806B are both displayed with the first highlighting (as sphere CGR object colliding with the center of the cup CGR object is a trigger of the second behavior). Further, the representation of the sphere CGR object 806D is also displayed with the second highlighting (as spinning the sphere CGR object is an action of the second behavior). The view region 803E also includes an off-screen action indicator 803EC indicating that the behavior includes one or more actions with targets that are not displayed (e.g., off-screen CGR objects or non-displayed elements, such as the audio file playing and the scene change).

FIG. 8CX illustrates a user input 899CQ directed to the preview affordance 803AD. In various embodiments, the user input 899CQ corresponds to a contact (e.g., a tap) detected at the location of the preview affordance 803AD.

FIG. 8CY illustrates the CGR file composing user interface 801 in response to detecting the user input 899CQ directed to the preview affordance 803AD. In FIG. 8CY, the CGR file composing user interface 801 includes the preview user interface 802D. The preview user interface 802D includes a representation of the table 802DBA within the preview display region 802DB.

FIG. 8CZ illustrates the CGR file composing user interface 801 in response to the device 100 detecting a portion of the scene camera image (e.g., the representation of the table 802DBA) including a horizontal plane, which is the anchor of the second CGR scene. In FIG. 8CZ, the preview display region 802DB includes the second CGR scene (including the cup CGR object 840A, the plate CGR object 840B, and the sphere CGR object 840C) displayed anchored to the representation of the table 802DBA.

FIG. 8DA illustrates the CGR file composing user interface 801 in response to moving the device 100 within the physical environment closer to the table. In FIG. 8DA, the preview display region 802DB includes the representation of the second CGR scene (including the cup CGR object 840A, the plate CGR object 840B, and the sphere CGR object 840C) and the representation of the table 802DBA displayed larger.

FIG. 8DB illustrates the CGR file composing user interface 801 in response to moving the device 100 within the physical environment around the table to a side of the table. In FIG. 8L, the perspective of the device 100 has changed (causing the representation of the table 802DBA to be seen from the different perspective) and the perspective of a virtual camera for rendering the second CGR scene is similarly changed. Accordingly, the cup CGR object 840A, the plate CGR object 840B, and the sphere CGR object 840C are displayed at different locations in the preview display region 802DB.

FIG. 8DC illustrates the CGR file composing user interface 801 in response to detecting the user blowing after a first amount of time. Because blowing is a trigger of the first behavior, the device 100 performs the action of the first behavior, moving the sphere CGR object 840C forward. Accordingly, in FIG. 8DC, the sphere CGR object 840C is moved and displayed closer to the cup CGR object 840A and the plate CGR object 840B within the preview display region 802DB.

FIG. 8DD illustrates the CGR file composing user interface 801 in response to detecting the user blowing after a second amount of time. In FIG. 8DC, the sphere CGR object 840C is moved (and displayed in the preview display region 802DB) even further forward to a point at which the mesh of the sphere CGR object 840C intersects the center of the cup CGR object 840A.

FIG. 8DE illustrates the CGR file composing user interface 801 in response to detecting the sphere CGR object 840C intersecting the center of the cup CGR object 840A. Because the sphere CGR object 840C intersecting the center of the cup CGR object 840A is a trigger of the second behavior, the device 100 performs the actions of the second behavior in their defined order. Thus, in FIG. 8DE, the sphere CGR object 840C spins within the cup CGR object 840A for a spin time while an audio file plays.

FIG. 8DF illustrates the CGR file composing user interface 801 in response to the spin time elapsing and play of the audio file completing. In FIG. 8DF, because the second behavior includes a scene change action, the second CGR scene is replaced with the third CGR scene 840D displayed in the preview display region 802DB anchored to the representation of the table 802DBA.

In various embodiments, the CGR file composing user interface 801 includes an affordance for saving the project as a project file which can be read by the CGR file composing application executed by the device 100 and presented via the CGR file composing user interface 801 as described above.

In various embodiments, the CGR file composing user interface 801 includes an affordance to compile the project as a CGR file which can be read by a CGR presenting application executed by the device 100 or another device such as the electronic device 520A or an HMD.

In various embodiments, the CGR file includes an XML (Extensible Markup Language) or JSON (JavaScript Object Notation) file that describes CGR content and refers to various data structures (e.g., display meshes, physics meshes, textures, images, audio, etc.) also included in the CGR file.

FIG. 9 is a flowchart representation of a method 900 of presenting a CGR scene using a back-up anchor in accordance with some embodiments. In various embodiments, the method 900 is performed by a device with one or more processors, non-transitory memory, a scene camera, a display, and one or more input devices (e.g., the portable multifunctional device 100 of FIG. 1A or an HMD). In some embodiments, the method 900 is performed by processing logic, including hardware, firmware, software, or a combination thereof. In some embodiments, the method 900 is performed by a processor executing instructions (e.g., code) stored in a non-transitory computer-readable medium (e.g., a memory).

The method 900 begins, at block 910, with the device receiving, via the one or more input devices, a user input to present a computer-generated reality (CGR) scene including one or more CGR objects, wherein the CGR scene is associated with a first anchor and a second anchor. For example, in FIG. 8H, the device 100 detects the user input 899H directed to the preview affordance 803AD to present the first CGR scene including the diamond CGR object, wherein the first CGR scene is associated with a primary anchor of an anchor image (as indicated by the primary anchor affordance 803DBA) and a secondary anchor of a horizontal plane (as indicated by the secondary anchor affordance 803DBC).

In various embodiments, the first anchor is an anchor image and the second anchor is a horizontal plane or vertical plane. In various embodiments, the CGR scene is associated with the anchor image by selecting an image file. In various embodiments, the CGR scene is associated with the anchor image by capturing, using the camera, the anchor image.

In various embodiments, the first anchor is a tabletop or floor and the second anchor is horizontal plane.

The method 900 continues, at block 920, with the device capturing, using the camera, an image of a physical environment. For example, in FIG. 8I, the device 100 displays the preview display region 802DB including a scene camera image taken by the device 100 of a physical environment.

The method 900 continues, at block 930, with the device determining that the image of the physical environment lacks a portion corresponding to the first anchor. For example, in FIG. 8L, the preview display region 802DB includes a scene camera image lacking a portion corresponding to primary anchor of the first CGR scene, e.g., an image of the Ace of Diamonds.

The method 900 continues, at block 940, with the device detecting a portion of the image of the physical environment corresponding to the second anchor. For example, in FIG. 8L, the preview display region 802DB includes a scene camera image including a portion corresponding to the secondary anchor of the first CGR scene, e.g., a horizontal plane, such as the representation of the table 802DBA.

The method 900 continues, at block 950, with the device, in response to determining that image of the physical environment lacks a portion corresponding to the first anchor and detecting a portion of the image of the physical environment corresponding to the second anchor, displaying, on a display, the CGR scene at a location of the display corresponding to the second anchor. For example, in FIG. 8M, the preview display region 802DB includes the first CGR scene (including the diamond CGR object 802DBD) displayed at the location of the representation of the table 802DBA.

In various embodiments, displaying the CGR scene at the location of the display corresponding to the second anchor includes displaying the image of the physical environment and displaying the CGR scene at the portion of the image of the physical environment corresponding to the second anchor.

In various embodiments, displaying the CGR scene at the location of the display corresponding to the second anchor includes displaying the CGR scene at a location of an optical passthrough display (e.g., a transparent display) at which a user can see the second anchor.

In various embodiments, displaying the CGR scene at the location of the display corresponding to the second anchor includes displaying the CGR scene anchored to the second anchor. In various embodiments, wherein, in response to a change in perspective of the camera, display of the CGR scene is corresponding changed on the display. For example, in FIG. 8DA and FIG. 8DB, the second CGR scene is displayed anchored to the top of the table and, in response to movement of the device 100, the display of the second CGR scene is correspondingly changed.

In various embodiments, the portion of the image of the physical environment corresponds to a physical object and, in response to a movement of the physical object, display of the CGR scene is correspondingly moved on the display. For example, in FIG. 8J and FIG. 8K, the first CGR scene is displayed anchored to the representation of the Ace of Diamonds playing card 802DBB and, in response to movement of the Ace of Diamonds playing card, display of the first CGR scene (including the diamond CGR object) is corresponding moved on the display.

In various embodiments, displaying the CGR scene at the location of the display corresponding to the second anchor is performed in response to determining that a plurality of images of the physical environment taken over a threshold amount of time each lack a portion corresponding to the first anchor. For example, in FIG. 8M, the first CGR scene is displayed in response to detecting a representation of a horizontal plane in a portion of the scene camera image and, in various embodiments, in response to failing to detect a portion of the scene camera image matching the anchor image for at least a threshold amount of time, e.g., 3 seconds.

In various embodiments, the CGR scene is associated with a third anchor and determining that image of the physical environment lacks a portion corresponding to the first anchor is performed in response to determining that the image of the physical environment lacks a portion corresponding to the third anchor. For example, FIG. 8F illustrates a tertiary anchor affordance 803DBD for defining a tertiary anchor. In various embodiments with a tertiary anchor defined for the CGR scene, the primary anchor corresponds to the third anchor of the method 900, the secondary anchor corresponds to the first anchor of the method 900, and the tertiary anchor corresponds to the second anchor of the method 900. In various embodiments without a tertiary anchor defined for the CGR scene, the primary anchor corresponds to the first anchor of the method 900 and the secondary anchor corresponds to the second anchor of the method 900.

FIG. 10 is a flowchart representation of a method 1000 of configuring a CGR object in accordance with some embodiments. In various embodiments, the method 1000 is performed by a device with one or more processors, non-transitory memory, a display, and one or more input devices (e.g., the portable multifunctional device 100 of FIG. 1A or an HMD). In some embodiments, the method 1000 is performed by processing logic, including hardware, firmware, software, or a combination thereof. In some embodiments, the method 1000 is performed by a processor executing instructions (e.g., code) stored in a non-transitory computer-readable medium (e.g., a memory).

The method 1000 begins, at block 1010, with the device displaying, on a display, a representation of a computer-generated reality (CGR) object associated with a first parameter and a second parameter, wherein the first parameter has a first one of a plurality of first parameter values and the second parameter has a first one of a plurality of second parameter values. For example, in FIG. 8X, the device 100 displays the representation of the currently selected CGR object 808DA, e.g., the cup CGR object, wherein the cup CGR object is associated with a first parameter (e.g., style) and a second parameter (e.g., pattern). The first parameter has a first one of plurality of first parameter values (e.g., the "Mug" value out of those listed in the style bar 808E) and a first one of the plurality of second parameter values (e.g., the "White" value out of those listed in the pattern bar 808F.

The method 1000 continues, in block 1020, with the device displaying, on the display, a first user interface element for selection of a second one of the plurality of first parameter values. For example, in FIG. 8X, the device 100 displays the style bar 808E including a plurality of style affordances 808EA-808ED for changing a currently selected style of the style bar 808E.

The method 1000 continues, in block 1030, with the device displaying, on the display, a second user interface element for selection of a second one of the plurality of second parameter values, wherein, based on the first one of the plurality of first parameter values and one or more selection rules, a subset of the plurality of second parameters values are presented for selection via the second user interface element. For example, in FIG. 8X, the device 100 displays the pattern bar 808F including a plurality of pattern affordances 808FA-808FD for changing a currently selected pattern of the pattern bar 808F. In FIG. 8X, the mug style is the currently selected style of the style bar 808E and the white pattern is the currently selected pattern of the pattern bar 808F. Based on the currently selected style being the mug style, a subset of the pattern affordances 808FA-808FD are presented for selection. In particular, the stars affordance 808FC and the ivy affordance 808FD are presented for selection as indicated by the second display style, whereas the glass affordance 808FB is not presented for selection as it is grayed out.

In various embodiments, the second user interface element includes a set of selectable affordances corresponding to the subset of the plurality of second parameters and a set of non-selectable affordances corresponding to the others of the plurality of second parameters. For example, in FIG. 8X, the pattern bar 808F includes a set of selectable affordances (e.g., the stars affordance 808FC and the ivy affordance 808FD) and a set of non-selectable affordances (e.g., the glass affordance 808FB).

In various embodiments, the set of selectable affordances are displayed in a first manner and the set of non-selectable affordances are displayed in a second manner different than the first manner. For example, in FIG. 8X, the stars affordance 808FC and the ivy affordance 808FD are displayed in white, whereas the glass affordance 808FB is displayed in gray.

In various embodiments, the method 1000 further includes receiving, via one or more input devices, a user input selecting a second one of the plurality of first parameter values and updating display of the second user interface element, wherein, based on the second one of the plurality of first parameter values and the one or more selection rules, a second subset of the plurality of second parameters is presented for selection via the second user interface element. For example, in FIG. 8X, the device 100 detects the user input 899T directed to the espresso affordance 808EC. Further, in FIG. 8Y, the device 100 displays the pattern bar 808F with the glass affordance 808FB available for selection and the stars affordance 808FC and ivy affordance 808FD unavailable for selection.

In various embodiments, the method 1000 further includes updating the display of the representation of the CGR object. For example, in FIG. 8Y, the device 100 displays the representation of the currently selected CGR object 808A, e.g., the cup CGR object, with a different shape (e.g., as an espresso cup rather than a mug).

In various embodiments, the method 1000 includes receiving a user input updating the first parameter of the CGR object to the second one of the plurality of first parameter values. For example, in FIG. 8AA, the device 100 detects the user input 899W directed to the OK affordance 808G, updating the style parameter of the cup CGR object from the "Mug" value to the "Teacup" value, as shown in FIG. 8AB.

In various embodiments, the method 1000 further includes displaying, on the display, a plurality of view affordances including an object view affordance for entering an object view mode in which user inputs directed to the CGR object change a perspective of the display of the representation of the CGR object and a CGR view affordance for entering a CGR view mode in which movement of display changes a perspective of the display of the representation of the CGR object. For example, in FIG. 8X, the device 100 displays the object view affordance 808A and the CGR view affordance 808B.

In various embodiments, the CGR object is further associated with a third parameter, wherein the third parameter has a first one of a plurality of third parameter values, further comprising displaying, on the display, a third user interface element for selection of a second one of the plurality of third parameter values, wherein, based on the first one of the plurality of first parameter values, the first one of the plurality of second parameter values and the one or more selection rules, a subset of the plurality of third parameters values are presented for selection via the third user interface element.

FIG. 11 is a flowchart representation of a method 1100 of resolving overlap of two CGR objects in accordance with some embodiments. In various embodiments, the method 1100 is performed by a device with one or more processors, non-transitory memory, a display, and one or more input devices (e.g., the portable multifunctional device 100 of FIG. 1A or an HMD). In some embodiments, the method 1100 is performed by processing logic, including hardware, firmware, software, or a combination thereof. In some embodiments, the method 1100 is performed by a processor executing instructions (e.g., code) stored in a non-transitory computer-readable medium (e.g., a memory).

The method 1100 begins, at block 1110, with the device displaying, on a display, a representation of a CGR scene including displaying respective representations of a plurality of CGR objects of the CGR scene. For example, in FIG. 8AF, the device 100 display a representation of the second CGR scene including displaying the representation of the plate CGR object 806B and the representation of the cup CGR object 806C.

The method 1100 continues, at block 1120, with the device determining that two of the plurality of CGR objects overlap in the CGR scene. In various embodiments, determining that the two of the plurality of CGR objects overlap in the CGR scene is performed periodically. In various embodiments, determining that the two of the plurality of CGR objects overlap in the CGR scene is performed in response to a user input spatially manipulating one of the plurality of CGR objects. For example, in FIG. 8AF as compared to FIG. 8AD, the location of the cup CGR object is changed (e.g., the cup CGR object is moved) in response to the user input 899Z directed to the representation of the cup CGR object 806C). In various embodiments, determining that the two of the plurality of CGR objects overlap in the CGR scene is performed in response to a user input requesting an overlap check.

The method 1100 continues, at block 1130, with the device displaying, on the display in association with at least one respective representation of the two of the plurality of CGR objects, an indicator that the two of the plurality of CGR objects overlap in the CGR scene. For example, in FIG. 8AF, the device 100 displays the first overlap indicator 809A in the form of a notification bubble coupled to the representation of the cup CGR object 806C and the second overlap indicator 809B in the form of a shading, glowing, hatching, or other highlighting overlaid over the representation of the cup CGR object 806C and the representation of the plate CGR object 806B.

In various embodiments, the overlap indication is displayed in association with both of the respective representations of the two of the plurality of CGR objects. For example, in FIG. 8AF, the second overlap indicator 809B is displayed over both the representation of the cup CGR object 806C and the representation of the plate CGR object 806B.

In various embodiments, the overlap indication is displayed in association with a location at which the two of the plurality of CGR objects overlap in the CGR scene. For example, in FIG. 8AF, the second overlap indicator 809B is displayed over the location at which the representation of the cup CGR object 806C and the representation of the plate CGR object 806B overlap.

In various embodiments, the overlap indication includes a highlighting displayed over the at least one respective representation of the two of the plurality of CGR objects. For example, in FIG. 8AF, the second overlap indicator 809B is displayed over both the representation of the cup CGR object 806C and the representation of the plate CGR object 806B.

In various embodiments, the overlap indication includes a notification user element displayed proximate to the at least one respective representation of the two of the plurality of CGR objects. For example, in FIG. 8AF, the device 100 displays the first overlap indicator 809A in the form of a notification bubble proximate to and coupled to the representation of the cup CGR object 806C.

In various embodiments, the method 1100 further includes receiving, via one or more input devices, a user input directed to the overlap indication. For example, in FIG. 8AF, the device 100 detects the user input 899AA directed to the first overlap indicator 809A. The method 1100 further includes, in response to receiving the user input directed to the overlap indication, displaying an ignore affordance. For example, in FIG. 8AG, the device 100 displays the ignore affordance 810D. The method 1100 further includes receiving, via the one or more input devices, a user input directed to the ignore affordance and, in response to receiving the user input directed to the ignore affordance, ceasing display of the overlap indication.

In various embodiments, the method 1100 further includes receiving, via one or more input devices, a user input directed to the overlap indication. For example, in FIG. 8AF, the device 100 detects the user input 899AA directed to the first overlap indicator 809A. The method 1100 further includes, in response to receiving the user input directed to the overlap indication, displaying a fix affordance. For example, in FIG. 8AB, the device 100 displays the fix affordance 810E. The method 1100 further includes receiving, via the one or more input devices, a user input directed to the fix affordance. For example, in FIG. 8AG, the device 100 detects the user input 899AB directed to the fix affordance 810E. The method 1100 further includes, in response to receiving the user input directed to the fix affordance, changing a location of at least one of the two of the plurality of CGR objects such that the two of the plurality of CGR objects do not overlap in the CGR scene. For example, in FIG. 8AH, the location of the cup CGR object is changed (as indicated by the different location of the representation of the cup CGR object 806C) such that the cup CGR object and the plate CGR object no longer overlap.

FIG. 12 is a flowchart representation of a method 1200 of spatially manipulating a CGR object in different spatial manipulation modes in accordance with some embodiments. In various embodiments, the method 1200 is performed by a device with one or more processors, non-transitory memory, a display, and one or more input devices (e.g., the portable multifunctional device 100 of FIG. 1A or an HMD). In some embodiments, the method 1200 is performed by processing logic, including hardware, firmware, software, or a combination thereof. In some embodiments, the method 1200 is performed by a processor executing instructions (e.g., code) stored in a non-transitory computer-readable medium (e.g., a memory).

The method 1200 begins, at block 1210, with the device displaying, on a display, a representation of a CGR scene including displaying respective representations of one or more CGR objects of the CGR scene. For example, in FIG. 8U, the device 100 displays a representation of the second CGR scene including displaying the representation of the plate CGR object 806B and the representation of the cup CGR object 806C.

The method 1200 continues, at block 1220, with the device receiving, via one or more input devices, a user input directed to a particular representation of the one or more CGR objects. For example, in FIG. 8U, the device 100 detects the user input 899Q directed to the representation of the cup CGR object 806C.

The method 1200 continues, at block 1230, with the device, in response to receiving the user input directed to the particular representation of the one or more CGR objects, providing a first manipulation mode associated with a first set of shape-preserving spatial manipulations of the corresponding CGR object. In various embodiments, the method 1200 includes in response to receiving the user input directed to the particular representation of the one or more CGR objects, displaying a first type of object selection indicator in association with the corresponding CGR object. For example, in FIG. 8V, the device 100, in response to the user input 899Q, displays the first type of object selection indicator 807 surrounding the representation of the cup CGR object 806C.

For example, while a CGR object is selected (and the first type of object selection indicator 807 is displayed), different types of user input directed to the representation of the CGR object results in different changes to spatial properties of the CGR object. For example, in FIGS. 8AB and 8AC, the user input 899X of a first type (e.g., a pinch) directed to the representation of the cup CGR object 806C changes a size of the cup CGR object. As another example, in FIGS. 8AC and 8AD, the user input 899Y of a second type (e.g., a rotate) directed to the representation of the cup CGR object 806C changes an orientation around a z-axis of the cup CGR object. As another example, in FIGS. 8AD and 8AF, the user input 899Z of a third type (e.g., a drag) directed to the representation of the cup CGR object 806C changes a location in an xy-plane of the cup CGR object.

The method 1200 continues, in block 1240, with the device receiving, via the one or more input devices, a user input switching from the first manipulation mode to a second manipulation mode associated with a second set of shape-preserving spatial manipulations of the corresponding CGR object. For example, in FIG. 8AH, the device 100 detects the user input 899AB directed to the representation of the cup CGR object 806C, changing the first type of object selection indicator 807 to a second type of object selection indicator 817 (as shown in FIG. 8AI).

In various embodiments, the user input directed to the particular representation of the one or more CGR objects and the user input switching from the first manipulation mode to the second manipulation mode is the same type of user input. In various embodiments, the same type of user input is a tap at a location of the particular representation of the one or more CGR objects. For example, in FIG. 8U and FIG. 8AH, the user inputs 899Q and 899AB are both taps at the location of the representation of the cup CGR object 806C.

The method 1200 continues, in block 1250, with the device, in response to receiving the user input switching from the first manipulation mode to a second manipulation mode, providing the second manipulation mode. In various embodiments, the method 1200 includes, in response to receiving the user input switching from the first manipulation mode to a second manipulation mode, displaying a second type of object selection indicator in association with the corresponding CGR object. For example, while a CGR object is selected (and the second type of object selection indicator 807 is displayed), user inputs directed to different portions of the second type of object selector results in different changes to spatial properties of the CGR object. For example, in FIGS. 8AI and 8AJ, the user input 899AD directed to the third rotation affordance 817F rotates the cup CGR object about a third axis. As another example, in FIGS. 8AJ and 8AK, the user input 899AE directed to the first translation affordance 817A moves the cup CGR object along the z-axis of the cup CGR object.

In various embodiments, wherein the second set of shape-preserving spatial manipulations of the corresponding CGR object includes at least one of the first set of shape-preserving spatial manipulations of the corresponding CGR object. In various embodiments, the second set of shape-preserving spatial manipulations of the corresponding CGR object includes all of the first set of shape-preserving spatial manipulations of the corresponding CGR object. In various embodiments, the first set of shape-preserving spatial manipulations of the corresponding CGR object includes translation of the corresponding CGR object in a plane without including translation of the corresponding CGR object perpendicular to the plane, wherein the second set of shape-preserving spatial manipulations of the corresponding CGR object includes translation of the corresponding CGR object perpendicular to the plane. In various embodiments, the first set of shape-preserving spatial manipulations of the corresponding CGR object includes rotation of the corresponding CGR object about an axis without including translation of the corresponding CGR object about other axes, wherein the second set of shape-preserving spatial manipulations of the corresponding CGR object includes translation of the corresponding CGR object about other axes. In various embodiments, the first set of shape-preserving spatial manipulations of the corresponding CGR object includes resizing the corresponding CGR object.

FIG. 13 is a flowchart representation of a method 1300 of spatially manipulating a CGR object using an intuitive spatial manipulation point in accordance with some embodiments. In various embodiments, the method 1300 is performed by a device with one or more processors, non-transitory memory, a display, and one or more input devices (e.g., the portable multifunctional device 100 of FIG. 1A or an HMD). In some embodiments, the method 1300 is performed by processing logic, including hardware, firmware, software, or a combination thereof. In some embodiments, the method 1300 is performed by a processor executing instructions (e.g., code) stored in a non-transitory computer-readable medium (e.g., a memory).

The method 1300 begins, in block 1310, with the device displaying, on a display, a representation of a computer-generated reality (CGR) scene including displaying respective representations of one or more CGR objects of the CGR scene. For example, in FIG. 8AC, the device 100 displays a representation of the second CGR scene including displaying the representation of the plate CGR object 806B and the representation of the cup CGR object 806B.

The method 1300 continues, in block 1310, with the device receiving, via one or more input devices, a user input spatially manipulating a particular CGR object of the one or more CGR objects, wherein the particular CGR object is associated with an intuitive spatial manipulation point. For example, in FIG. 8AC, the device 100 receives the user input 899Y directed to the representation of the cup CGR object 806C to rotate the cup CGR object. As another example, in FIG. 8AD, the device 100 receives the user input 899Z directed to the representation of the cup CGR object 806C to move the cup CGR object. As illustrated in FIGS. 8AE1 and 8AE2, in various embodiments, the cup CGR object is associated with an intuitive spatial manipulation point 885.

In various embodiments, the intuitive spatial manipulation point is neither an edge of the particular CGR object, a midpoint of a bounding box surrounding the particular CGR object, nor an unweighted center-of-mass of the particular CGR object. For example, in FIGS. 8AE1 and 8AE2, the intuitive spatial manipulation point 885 is different than the first spatial manipulation point 883, the midpoint of the bounding box 882 surrounding the cup CGR object 880, and is different than the second spatial manipulation point 884, the unweighted center-of-mass of the cup CGR object 880.

In various embodiments, the intuitive spatial manipulation point is stored with a CGR object file defining the particular CGR object. In various embodiments, the method 1300 includes receiving, via the one or more input devices, a user input defining the intuitive spatial manipulation point.

In various embodiments, the method 1300 includes, prior to receiving the user input spatially manipulating the particular CGR object, determining the intuitive spatial manipulation point. For example, in various embodiments, determining the intuitive spatial manipulation point includes determining a plurality of segments of the particular CGR object and determining the intuitive spatial manipulation point based on a weighting of the plurality of segments of the particular CGR object. For example, in FIGS. 8AE1 and 8AE2, the intuitive spatial manipulation point 885 is determined as a center-of-mass of the cup CGR object 880 ignoring the foot 881B and the handle 881C.

The method 1300 continues, in block 1330, with the device changing a spatial property of the particular CGR object based on the user input and the intuitive spatial manipulation point. In various embodiments, changing the spatial property of the particular CGR object based on the user input and the intuitive spatial manipulation point includes rotating the particular CGR object about an axis passing through the intuitive spatial manipulation point. For example, in FIG. 8AD, the representation of the cup CGR object 806C is rotated about a z-axis passing through the intuitive spatial manipulation point. In various embodiments, changing the spatial property of the particular CGR object based on the user input and the intuitive spatial manipulation point includes moving the particular CGR object, wherein the intuitive spatial manipulation is aligned with a target point. In various embodiments, changing the spatial property of the particular CGR object based on the user input and the intuitive spatial manipulation point includes moving the particular CGR object, wherein the intuitive spatial manipulation point is snapped to a target point. For example, in FIG. 8AF, the representation of the cup CGR object 806C is moved, snapped to and aligned with the center of the representation of the plate CGR object 806B (and the grid point with which the center of the representation of the plate CGR object 806B is aligned).

FIG. 14 is a flowchart representation of a method 1400 of configuring a CGR object in accordance with some embodiments. In various embodiments, the method 1400 is performed by a device with one or more processors, non-transitory memory, a display, and one or more input devices (e.g., the portable multifunctional device 100 of FIG. 1A or an HMD). In some embodiments, the method 1400 is performed by processing logic, including hardware, firmware, software, or a combination thereof. In some embodiments, the method 1400 is performed by a processor executing instructions (e.g., code) stored in a non-transitory computer-readable medium (e.g., a memory).

The method 1400 begins, at block 1410, with the device displaying, on the display, a representation of a CGR scene including displaying respective representations of one or more CGR objects of the CGR scene. For example, in FIG. 8AS, the device 100 displays a representation of the second CGR scene including displaying the representation of the plate CGR object 806B and the representation of the cup CGR object 806C.

The method 1400 continues, at block 1420, with the device receiving, via the one or more input devices, a user input directed to a representation of a particular CGR object of the one or more CGR objects, the particular CGR object associated with a parameter. For example, in FIG. 8AS, the device 100 detects the user input 899AL directed to the representation of the cup CGR object 806C, the cup CGR object being associated with the style setting and the pattern setting.

The method 1400 continues, at block 1430, with the device displaying, on the display from a first perspective, a plurality of representations of the particular CGR object, wherein each of the plurality of representations of the particular CGR object is associated with a different respective value of the parameter. For example, in FIG. 8AU, the device 100 displays the live view user interface 811 including the plurality of view windows 811DA-811DC respectively including a plurality of representations of the cup CGR object 811EA-811EC, each with a different pattern.

In various embodiments, the method 1400 further includes displaying a text indication of the particular CGR object and the parameter. For example, in FIG. 8AU, the live view user interface 811 includes the text description 811C of the cup CGR object and the CGR object setting being manipulated via the live view user interface 811 (e.g., the pattern).

In various embodiments, the particular CGR object is associated with a second parameter and the method 1400 further includes, while displaying, from the first perspective, the plurality of representations of the particular CGR object, displaying, from the first perspective, a second plurality of representations of the particular CGR object, wherein each of the second plurality of representations of the particular CGR object is associated with a different respective value of the second parameter.

The method 1400 continues, at block 1440, with the device receiving, via the one or more input devices, a user input changing the first perspective to a second perspective. In various embodiments, the user input changing the first perspective to the second perspective includes a user input directed to any of the plurality of representations of the particular CGR object. For example, in FIG. 8AU, the device 100 detects the user input 899AN directed to the first view window 811DA changing the perspective of the view windows 811DA-811DC. In various embodiments, the user input changing the first perspective to the second perspective includes moving the display. For example, in FIG. 8AU, when the CGR view mode is active (e.g., by selecting the CGR view affordance 811B), moving the device 100 changes the perspective of the view windows 811DA-811DC.

In various embodiments, the method 1400 includes displaying, on the display, a plurality of view affordances including an object view affordance for entering an object view mode in which the user input changing the first perspective to a second perspective includes a user input directed to any of the plurality of representations of the particular CGR object and a CGR view affordance for entering a CGR view mode in which the user input changing the first perspective to the second perspective includes moving the display. For example, in FIG. 8AU, the device 100 displays the object view affordance 811A and the CGR view affordance 811B.

The method 1400 continues, at block 1450, with the device, in response to receiving the user input changing the first perspective to a second perspective, displaying, on the display, the plurality of representations of the particular CGR object from the second perspective. For example, in FIG. 8AV, the device displays the plurality of representations of the cup CGR object 811EA-811EC from a different perspective than in FIG. 8AU.

In various embodiments, a difference between a first representation of the plurality of representations of the particular CGR object and a second representation of the plurality of representations of the particular CGR object is not visible displayed from a first perspective and the difference is displayed from the second perspective. For example, in FIG. 8AU, the difference between the stars pattern and the ivy pattern of the CGR cup object is not visible in the first perspective, but is displayed in FIG. 8AV when viewed from the second perspective.

In various embodiments, the method 1400 includes receiving a user input selecting a particular representation of the plurality of representations of the particular CGR object and setting the parameter of the particular CGR object to the respective value of the parameter of the particular representation. For example, in FIG. 8AW, the device 100 detects the user input 899AP directed to the third view window 811DC and, in response to detecting the user input 899AQ directed to the OK affordance 811F in FIG. 8AX, sets the pattern setting of the cup CGR object to the "Ivy" value, as indicated by the pattern affordance 813DBC in FIG. 8AY.

FIG. 15 is a flowchart representation of a method 1500 of presenting a CGR scene in accordance with some embodiments. In various embodiments, the method 1500 is performed by a device with one or more processors, non-transitory memory, a display, and one or more input devices (e.g., the portable multifunctional device 100 of FIG. 1A or an HMD). In some embodiments, the method 1500 is performed by processing logic, including hardware, firmware, software, or a combination thereof. In some embodiments, the method 1500 is performed by a processor executing instructions (e.g., code) stored in a non-transitory computer-readable medium (e.g., a memory).

The method 1500 begins, at block 1510, with the device displaying, on the display, a representation of CGR scene including displaying a representation of a first CGR object of the CGR scene, wherein displaying the representation of the first CGR object is based on a display mesh associated with the first CGR object. For example, in FIG. 8DB, the device 100 displays a representation of the second CGR scene including the representation of the sphere CGR object 840C, the representation of the plate CGR object 840B, and the representation of the cup CGR object 840A. Displaying the representation of the sphere CGR object 840C is based on a display mesh defined by the golf ball style.

In various embodiments, displaying the representation of the first CGR object is further based on a texture associated with the first CGR object. For example, in FIG. 8DB, display of the representation of the sphere CGR object 840C is based on texture defined by the white pattern.

The method 1500 continues, at block 1520, with the device determining an interaction of the first CGR object with a second CGR object of the CGR scene based on a physics mesh associated with the first CGR object, wherein the physics mesh associated with the first CGR object is different than the display mesh associated with the first CGR object. In various embodiments, the second CGR object corresponds to a physical object. For example, in FIG. 8DC, the device 100 determines an interaction of the sphere CGR object with a CGR object corresponding to the table. In various embodiments, the second CGR object is a virtual object. For example, in FIG. 8DD, the device 100 determines an interaction of the sphere CGR object with the plate CGR object and/or the cup CGR object. In both cases, the interaction is determined based on physics mesh (e.g., a sphere mesh) different than the display mesh defined by the golf ball style.

In various embodiments, the physics mesh includes fewer polygons than the display mesh. For example, in FIGS. 8DB-8DD, the sphere mesh includes fewer polygons than the golf ball mesh. In various embodiments, the physics mesh is smoother than the display mesh. For example, in FIGS. 8DB-8DD, the sphere mesh is smoother than the golf ball mesh (lacking dimples).

In various embodiments, the method 1500 includes, prior to determining the interaction, receiving a user input changing the physics mesh from a first mesh that is the same as the display mesh associated with the first CGR object to a second mesh that is different than the display mesh associated with the first CGR object and, in response to receiving the user input changing the physics mesh, associating the second mesh with the first CGR object as the physics mesh. For example, in FIG. 8BE, the physics mesh affordance 813DCA indicates that the physics mesh of the sphere CGR object is the same as the display mesh (as indicated by the style affordance 813DBB). In response to the user input 899AX of FIG. 8BE, the user input 899AY of FIG. 8BF, and the user input 899AZ of FIG. 8BG, the physics mesh of the sphere CGR object is changed to the sphere mesh as indicated by the physics mesh affordance 813DCA in FIG. 8BH.

In various embodiments, the first CGR object is described by a CGR object file including a plurality of meshes including the first mesh and the second mesh. For example, in FIG. 8BF, the device 100 displays the setting value selection user interface 812 including the plurality of setting value selection affordances 812BA-812BC corresponding to meshes of a sphere CGR object file.

In various embodiments, the method 1500 includes receiving a user input to import a mesh into the CGR object file and, in response to receiving the user input to import a mesh into the CGR object file, importing a third mesh into the CGR object file. For example, in FIG. 8BH, the device 100 displays the load affordance 812BC for loading a custom mesh into the sphere CGR object file.

FIG. 16 is a flowchart representation of a method 1600 of associating a behavior with a CGR scene in accordance with some embodiments. In various embodiments, the method 1600 is performed by a device with one or more processors, non-transitory memory, a display, and one or more input devices (e.g., the portable multifunctional device 100 of FIG. 1A or an HMD). In some embodiments, the method 1600 is performed by processing logic, including hardware, firmware, software, or a combination thereof. In some embodiments, the method 1600 is performed by a processor executing instructions (e.g., code) stored in a non-transitory computer-readable medium (e.g., a memory).

The method 1600 begins, in block 1610, with the device displaying, on a display, a representation of a computer-generated reality (CGR) scene including displaying respective representations of one or more CGR objects of the CGR scene. For example, in FIG. 8BI, the device 100 displays the representation of the second CGR scene, including the representation of the plate CGR object 806B, the representation of the cup CGR object 806C, and the representation of the sphere CGR object 806D.

The method 1600 continues, at block 1620, with the device receiving, via the one or more input devices, a user input adding a behavior to the CGR scene. For example, in FIG. 8BI, the device 100 detects the user input 899BB directed to the behavior addition affordance 803AC.

The method 1600 continues, at block 1630, with the device receiving, via the one or more input devices, a user input defining a first trigger for the behavior. For example, the user input 899BD directed to the new trigger affordance 833A in FIG. 8BK, the user input 899BE directed to the tap trigger affordance 838A in FIG. 8BL, the user input 899BF directed to the representation of the sphere CGR object 831DC in FIG. 8BM, and the user input 899BG directed to the done affordance 838AA in FIG. 8BN define a tap trigger for the first behavior.

In various embodiments, the first trigger is a user action. For example, in various embodiments, the user action is at least one of a tap by a user of a particular CGR object of the one or more CGR objects, a gaze of the user at the particular CGR object, or a facial action of the user.

In various embodiments, the first trigger is a CGR scene condition. For example, in various embodiments, the CGR scene condition is at least one of a proximity of a particular CGR object of the one or more CGR objects to a location in the CGR scene (e.g., a coordinate or the location of another CGR object) or a CGR scene time elapsing (e.g., after the CGR scene has been presented for a threshold amount of time).

The method 1600 continues, in block 1630, with the device receiving, via the one or more input devices, a user input defining a first action for the behavior, wherein, while presenting the CGR scene, the first action is performed in response to detecting the first trigger. For example, the user input 899BK directed to the new action affordance 835A in FIG. 8BR, the user input 899BL directed to the move affordance 839A in FIG. 8BS, the user input 899BM directed to the move-from action affordance 839AB in FIG. 8BT, the user input 899BN directed to the move forward action affordance 839ABA in FIG. 8BU, and the user input 899BO directed to the save affordance 839ABAC in FIG. 8BV define a move action for the first behavior.

In various embodiments, the first action is at least one of a spatial manipulation of a particular CGR object of the one or more CGR objects, playing an audio file, or presenting a new CGR scene.

In various embodiments, the method 1600 further includes receiving, via the one or more input devices, a user input defining a second trigger for the behavior, wherein, while presenting the CGR scene, the first action is performed in response to detecting the second trigger. For example, the user input 899BH directed to the new trigger affordance 833A in FIG. 8BO, the user input 899BI directed to the face-tracking trigger affordance 838C in FIG. 8BP, and the user input 899BJ directed to the blowing trigger affordance 838CC in FIG. 8BQ define a face-tracking trigger for the first behavior.

In various embodiments, the method 1600 further includes receiving, via the one or more input devices, a user input defining a second action for the behavior, wherein, while presenting the CGR scene, the second action is performed in response to detecting the first trigger. For example, after the audio action is defined for the second behavior, the user input 899CG directed to the new action affordance 835A in FIG. 8CN, the user input 899CH directed to the move action affordance 839A in FIG. 8CO, the user input 899CI directed to the spin action affordance 839AC in FIG. 8CP, and the user input 899CJ directed to the save affordance 839ACD in FIG. 8CQ define a move action for the second behavior.

In various embodiments, the second action is performed after performance of the first action. For example, as configured in FIG. 8CU, the move action is performed after the audio action. In various embodiments, the second action is performed simultaneously with performance of the first action. For example, as configured in FIG. 8CW, the move action and the audio action are performed simultaneously.

In various embodiments, receiving, via the one or more input devices, the user input defining the first trigger for the behavior (in block 1630) includes receiving a user input directed to a representation of a first CGR object of the one or more CGR objects. For example, in FIG. 8BM, the user input 899BF directed to the representation of the sphere CGR object 831DC selects the sphere CGR object as the target of the tap trigger. In various embodiments, receiving, via the one or more input devices, the user input defining the first action for the behavior (in block 1640) includes receiving a user input directed to a representation of a second CGR object of the one or more CGR objects. For example, in FIG. 8BV, the device 100 has received a user input directed to the representation of the sphere CGR object 831DC selecting the sphere CGR object as the target of the move action.

In various embodiments, the method 1600 further includes displaying the representation of the first CGR object with a first highlighting and displaying the representation of the second CGR object with a second highlighting, different than the first highlighting. For example, in FIG. 8BX, the first CGR object and the second CGR object are the same CGR object, e.g., the sphere CGR object. Accordingly, in FIG. 8BX, the representation of the sphere CGR object 806D is displayed with both a first highlighting (e.g., a glow) and a second highlighting (e.g., diagonal hashing). As another example, in FIG. 8CX, the first CGR object is the cup CGR object and the second CGR object is the sphere CGR object. Accordingly, in FIG. 8CX, the representation of the cup CGR object 806B is displayed with the first highlighting and the representation of the sphere CGR object 806D is displayed with the second highlighting.

FIG. 17 is a flowchart representation of a method 1700 of creating a CGR file in accordance with some embodiments. In various embodiments, the method 1700 is performed by a device with one or more processors, non-transitory memory, a display, and one or more input devices (e.g., the portable multifunctional device 100 of FIG. 1A or an HMD). In some embodiments, the method 1700 is performed by processing logic, including hardware, firmware, software, or a combination thereof. In some embodiments, the method 1700 is performed by a processor executing instructions (e.g., code) stored in a non-transitory computer-readable medium (e.g., a memory).

The method 1700 begins, in block 1710, with the device receiving, via one or more input devices, a user input generating a computer-generated reality (CGR) scene. For example, in FIG. 8A, the device 100 detects the user input 899A directed to the new-project affordance 802AA. In response, the device 100 generates the first CGR scene. As another example, in FIG. 8N, the device 100 detects the user input 899J directed to the scene addition affordance 803AA. In response, the device 100 generates the second CGR scene.

The method 1700 continues, in block 1720, with the device receiving, via the one or more input devices, a user input associating an anchor with the CGR scene. For example, in FIG. 8B, the device 100 receives the user input 899B directed to the image anchor selection affordance 802BB and, in response, associates an image anchor with the first CGR scene. As another example, in FIG. 8E, the device 100 receives the user input 899E directed to the secondary anchor affordance 803DBC and, in response, associates a secondary anchor with the first CGR scene. As another example, in FIG. 8O, the device 100 receives the user input 899K directed to the horizontal plane anchor selection affordance 802BA and, in response, associates a horizontal plane anchor with the second CGR scene.

In various embodiments, the anchor is an anchor image. For example, in FIG. 8E, the primary anchor of the first CGR scene is an anchor image, e.g., "AofD.jpg". In various embodiments, the anchor includes a first anchor and a second anchor, wherein the one or more CGR objects are to be displayed in association with the second anchor in response to determining that an image of a physical environment lacks a portion corresponding to the first anchor. For example, in FIG. 8F, the first CGR scene is associated with a primary anchor (e.g., an anchor image) and a secondary anchor (e.g., a horizontal plane).

The method 1700 continues, in block 1730, with the device receiving, via the one or more input devices, a user input associating one or more CGR objects with the CGR scene, wherein the one or more CGR objects are to be displayed in association with the anchor. For example, in FIG. 8F, the device 100 detects the user input 899F directed to the object addition affordance 803AB. In response to the user input 899G directed to the diamond addition 805B in FIG. 8G, the device 100 associates a diamond CGR object with the first CGR scene.

In various embodiments, receiving the user input associating one or more CGR objects with the CGR scene includes receiving, via the one or more input devices, a user input associating one or more CGR objects with the CGR scene includes displaying, on a display, a representation of a CGR object associated with a first parameter and a second parameter, wherein the first parameter has a first one of a plurality of first parameter values and the second parameter has a first one of a plurality of second parameter values.

For example, in FIG. 8X, the device 100 displays the representation of the currently selected CGR object 808DA (e.g., the cup CGR object), wherein the cup CGR object is associated with a first parameter (e.g., style) and a second parameter (e.g., pattern). The first parameter has a first one of plurality of first parameter values (e.g., the "Mug" value out of those listed in the style bar 808E) and a first one of the plurality of second parameter values (e.g., the "White" value out of those listed in the pattern bar 808F).

Receiving the user input associating one or more CGR objects with the CGR scene further includes displaying, on the display, a first user interface element for selection of a second one of the plurality of first parameter values and displaying, on the display, a second user interface element for selection of a second one of the plurality of second parameter values, wherein, based on the first one of the plurality of first parameter values and one or more selection rules, a subset of the plurality of second parameters values are presented for selection via the second user interface element.

For example, in FIG. 8X, the device 100 displays the style bar 808E including a plurality of style affordances 808EA-808ED for changing a currently selected style of the style bar 808E. In FIG. 8X, the device 100 displays the pattern bar 808F including a plurality of pattern affordances 808FA-808FD for changing a currently selected pattern of the pattern bar 808F. In FIG. 8X, the mug style is the currently selected style of the style bar 808E and the white pattern is the currently selected pattern of the pattern bar 808F. Based on the currently selected style being the mug style, a subset of the pattern affordances 808FA-808FD are presented for selection. In particular, the stars affordance 808FC and the ivy affordance 808FD are presented for selection as indicated by the second display style, whereas the glass affordance 808FB is not presented for selection as it is grayed out.

In various embodiments, the second user interface element includes a set of selectable affordances corresponding to the subset of the plurality of second parameters and a set of non-selectable affordances corresponding to the others of the plurality of second parameters. For example, in FIG. 8X, the pattern bar 808F includes a set of selectable affordances (e.g., the stars affordance 808FC and the ivy affordance 808FD) and a set of non-selectable affordances (e.g., the glass affordance 808FB).

In various embodiments, receiving, via the one or more input devices, a user input associating one or more CGR objects with the CGR scene includes displaying, on a display, a particular representation of a CGR object associated with the CGR scene. For example, in FIG. 8U, the device 100 displays a representation of the second CGR scene including displaying the representation of the plate CGR object 806B and the representation of the cup CGR object 806C.

Receiving, via the one or more input devices, a user input associating one or more CGR objects with the CGR scene further includes receiving, via one or more input devices, a user input directed to the particular representation of the CGR object. For example, in FIG. 8U, the device 100 detects the user input 899Q directed to the representation of the cup CGR object 806C.

Receiving, via the one or more input devices, a user input associating one or more CGR objects with the CGR scene further includes, in response to receiving the user input directed to the particular representation of the CGR object, providing a first manipulation mode associated with a first set of shape-preserving spatial manipulations of the corresponding CGR object. For example, in FIG. 8V, the device 100, in response to the user input 899Q, displays the first type of object selection indicator 807 surrounding the representation of the cup CGR object 806C. While a CGR object is selected (and the first type of object selection indicator 807 is displayed), different types of user input directed to the representation of the CGR object results in different changes to spatial properties of the CGR object. For example, in FIGS. 8AB and 8AC, the user input 899X of a first type (e.g., a pinch) directed to the representation of the cup CGR object 806C changes a size of the cup CGR object. As another example, in FIGS. 8AC and 8AD, the user input 899Y of a second type (e.g., a rotate) directed to the representation of the cup CGR object 806C changes an orientation around a z-axis of the cup CGR object. As another example, in FIGS. 8AD and 8AF, the user input 899Z of a third type (e.g., a drag) directed to the representation of the cup CGR object 806C changes a location in an xy-plane of the cup CGR object.

Receiving, via the one or more input devices, a user input associating one or more CGR objects with the CGR scene further includes receiving, via the one or more input devices, a user input switching from the first manipulation mode to a second manipulation mode associated with a second set of shape-preserving spatial manipulations of the corresponding CGR object. For example, in FIG. 8AH, the device 100 detects the user input 899AB directed to the representation of the cup CGR object 806C, changing the first type of object selection indicator 807 to a second type of object selection indicator 817 (as shown in FIG. 8AI).

Receiving, via the one or more input devices, a user input associating one or more CGR objects with the CGR scene further includes, in response to receiving the user input switching from the first manipulation mode to a second manipulation mode, providing the second manipulation mode. For example, while a CGR object is selected (and the second type of object selection indicator 807 is displayed), user input directed to different portions of the second type of object selector results in different changes to spatial properties of the CGR object. For example, in FIGS. 8AI and 8AJ, the user input 899AD directed to the third rotation affordance 817F rotates the cup CGR object about a third axis. As another example, in FIGS. 8AJ and 8AK, the user input 899AE directed to the first translation affordance 817A moves the cup CGR object along the z-axis of the cup CGR object.

In various embodiments, the first set of shape-preserving spatial manipulations of the corresponding CGR object includes translation of the corresponding CGR object in a plane without including translation of the corresponding CGR object perpendicular to the plane, wherein the second set of shape-preserving spatial manipulations of the corresponding CGR object includes translation of the corresponding CGR object perpendicular to the plane. In various embodiments, the first set of shape-preserving spatial manipulations of the corresponding CGR object includes rotation of the corresponding CGR object about an axis without including translation of the corresponding CGR object about other axes, wherein the second set of shape-preserving spatial manipulations of the corresponding CGR object includes translation of the corresponding CGR object about other axes.

In various embodiments, receiving, via the one or more input devices, a user input associating one or more CGR objects with the CGR scene includes displaying, on a display, a representation of a particular CGR object associated with the CGR scene. For example, in FIG. 8AC, the device 100 displays a representation of the second CGR scene including displaying the representation of the plate CGR object 806B and the representation of the cup CGR object 806B.

Receiving, via the one or more input devices, a user input associating one or more CGR objects with the CGR scene further includes receiving, via one or more input devices, a user input spatially manipulating the particular CGR object, wherein the particular CGR object is associated with a spatial manipulation point. For example, in FIG. 8AC, the device 100 receives the user input 899Y directed to the representation of the cup CGR object 806C to rotate the cup CGR object. As another example, in FIG. 8AD, the device 100 receives the user input 899Z directed to the representation of the cup CGR object 806C to move the cup CGR object. As illustrated in FIGS. 8AE1 and 8AE2, in various embodiments, the cup CGR object is associated with an intuitive spatial manipulation point 885.

Receiving, via the one or more input devices, a user input associating one or more CGR objects with the CGR scene further includes changing a spatial property of the particular CGR object based on the user input and the spatial manipulation point. In various embodiments, changing the spatial property of the particular CGR object based on the user input and the intuitive spatial manipulation point includes rotating the particular CGR object about an axis passing through the intuitive spatial manipulation point. For example, in FIG. 8AD, the representation of the cup CGR object 806C is rotated about a z-axis passing through the intuitive spatial manipulation point. In various embodiments, changing the spatial property of the particular CGR object based on the user input and the intuitive spatial manipulation point includes moving the particular CGR object, wherein the intuitive spatial manipulation is aligned with a target point. In various embodiments, changing the spatial property of the particular CGR object based on the user input and the intuitive spatial manipulation point includes moving the particular CGR object, wherein the intuitive spatial manipulation point is snapped to a target point. For example, in FIG. 8AF, the representation of the cup CGR object 806C is moved, snapped to and aligned with the center of the representation of the plate CGR object 806B (and the grid point with which the center of the representation of the plate CGR object 806B is aligned).

In various embodiments, the spatial manipulation point is neither an edge of the particular CGR object, a midpoint of a bounding box surrounding the particular CGR object, nor an unweighted center-of-mass of the particular CGR object. For example, in FIGS. 8AE1 and 8AE2, the intuitive spatial manipulation point 885 is different than the first spatial manipulation point 883, the midpoint of the bounding box 882 surrounding the cup CGR object 880, and is different than the second spatial manipulation point 884, the unweighted center-of-mass of the cup CGR object 880.

In various embodiments, receiving the user input associating one or more CGR objects with the CGR scene includes displaying, on a display, a representation of a particular CGR object associated with the CGR scene. For example, in FIG. 8AS, the device 100 displays a representation of the second CGR scene including displaying the representation of the plate CGR object 806B and the representation of the cup CGR object 806C.

Receiving the user input associating one or more CGR objects with the CGR scene further includes receiving, via the one or more input devices, a user input directed to the representation of a particular CGR object, the particular CGR object associated with a parameter. For example, in FIG. 8AS, the device 100 detects the user input 899AL directed to the representation of the cup CGR object 806C, the cup CGR object being associated with the style setting and the pattern setting.

Receiving the user input associating one or more CGR objects with the CGR scene further includes displaying, on the display from a first perspective, a plurality of representations of the particular CGR object, wherein each of the plurality of representations of the particular CGR object is associated with a different respective value of the parameter. For example, in FIG. 8AU, the device 100 displays the live view user interface 811 including the plurality of view windows 811DA-811DC respectively including a plurality of representations of the cup CGR object 811EA-811EC, each with a different pattern.

Receiving the user input associating one or more CGR objects with the CGR scene further includes receiving, via the one or more input devices, a user input changing the first perspective to a second perspective. For example, in FIG. 8AU, the device 100 detects the user input 899AN directed to the first view window 811DA changing the perspective of the view windows 811DA-811DC.

Receiving the user input associating one or more CGR objects with the CGR scene further includes, in response to receiving the user input changing the first perspective to a second perspective, displaying, on the display, the plurality of representations of the particular CGR object from the second perspective. For example, in FIG. 8AV, the device displays the plurality of representations of the cup CGR object 811EA-811EC from a different perspective than in FIG. 8AU.

In various embodiments, receiving the user input associating one or more CGR objects with the CGR scene further includes receiving a user input selecting a particular representation of the plurality of representations of the particular CGR object; and setting the parameter of the particular CGR object to the respective value of the parameter of particular representation. For example, in FIG. 8AW, the device 100 detects the user input 899AP directed to the third view window 811DC and, in response to detecting the user input 899AQ directed to the OK affordance 811F in FIG. 8AX, sets the pattern setting of the cup CGR object to the "Ivy" value, as indicated by the pattern affordance 813DBC in FIG. 8AY.

In various embodiments, a first CGR object of the one or more CGR objects is associated with a display mesh and a physics mesh different than the display mesh, wherein the first CGR object is to be displayed based on the display mesh and an interaction of the first CGR object with a second CGR object of the one or more CGR objects is to be determined based on the physics mesh.

For example, in FIG. 8DB, the device 100 displays a representation of the second CGR scene including the representation of the sphere CGR object 840C, the representation of the plate CGR object 840B, and the representation of the cup CGR object 840A. Displaying the representation of the sphere CGR object 840C is based on a display mesh defined by the golf ball style. In FIG. 8DC, the device 100 determines an interaction of the sphere CGR object with a CGR object corresponding to the table. In various embodiments, the second CGR object is a virtual object. In FIG. 8DD, the device 100 determines an interaction of the sphere CGR object with the plate CGR object and/or the cup CGR object. In both cases, the interaction is determined based on physics mesh (e.g., a sphere mesh) different than the display mesh defined by the golf ball style.

In various embodiments, the physics mesh includes fewer polygons than the display mesh.

The method 1700 continues, in block 1740, with the device receiving, via the one or more input devices, a user input associating a behavior with the CGR scene, wherein the behavior includes one or more triggers and one or more actions and wherein the one or more actions are to be performed in response to detecting any of the one or more triggers. For example, in FIG. 8BI, the device 100 detects the user input 899BB directed to the behavior addition affordance 803AC.

In various embodiments, the behavior includes a trigger associated with a first CGR object of the one or more CGR objects, wherein the behavior includes an action associated with a second CGR object of the one or more CGR objects, the method further comprising displaying a representation of the first CGR object with a first highlighting and displaying the representation of the second CGR object with a second highlighting, different than the first highlighting. For example, in FIG. 8BX, the first CGR object and the second CGR object are the same CGR object, e.g., the sphere CGR object. Accordingly, in FIG. 8BX, the representation of the sphere CGR object 806D is displayed with both a first highlighting (e.g., a glow) and a second highlighting (e.g., diagonal hashing). As another example, in FIG. 8CX, the first CGR object is the cup CGR object and the second CGR object is the sphere CGR object. Accordingly, in FIG. 8CX, the representation of the cup CGR object 806B is displayed with the first highlighting and the representation of the sphere CGR object 806D is displayed with the second highlighting.

The method 1700 continues, in block 1750, with the device generating a CGR file including data regarding the CGR scene, wherein the CGR file includes data regarding the anchor, the one or more CGR objects, and the behavior. In various embodiments, the CGR file can be read by a CGR application to present the CGR scene such that the one or more CGR objects are displayed in association with the anchor and the one or more actions are performed in response to detecting any of the one or more triggers. In various embodiments, the CGR file is an executable file that can be executed by an operating system to provide a CGR application that presents the CGR scene such that the one or more CGR objects are displayed in association with the anchor and the one or more actions are performed in response to detecting any of the one or more triggers.

In various embodiments, the CGR file includes an XML (Extensible Markup Language) or JSON (JavaScript Object Notation) file that describes the regarding the anchor, the one or more CGR objects, and the behavior. In various embodiments, the CGR file includes various data structures (e.g., display meshes, physics meshes, textures, images, audio, etc.) associated with the anchor, the one or more CGR objects, and/or the behavior.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 9-17, optionally, implemented by components depicted in FIGS. 1A-1B. For example, the user inputs and user interface elements are, optionally, implemented by event sorter 170, event recognizer 180, and event handler 190. Event monitor 171 in event sorter 170 detects a contact on a touch-sensitive surface, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

A first embodiment is a method comprising receiving, via one or more input devices, a user input to present a computer-generated reality (CGR) scene including one or more CGR objects, wherein the CGR scene is associated with a first anchor and a second anchor; capturing, using a camera, an image of a physical environment; determining that the image of the physical environment lacks a portion corresponding to the first anchor; detecting a portion of the image of the physical environment corresponding to the second anchor; and in response to determining that image of the physical environment lacks a portion corresponding to the first anchor and detecting a portion of the image of the physical environment corresponding to the second anchor, displaying, on a display, the CGR scene at a location of the display corresponding to the second anchor.

A second embodiment is a method substantially similar to the first embodiment, wherein displaying the CGR scene at the location of the display corresponding to the second anchor includes displaying the CGR scene anchored to the second anchor.

A third embodiment is a method substantially similar to the first embodiment or second embodiment, wherein, in response to a change in perspective of the camera, display of the CGR scene is corresponding changed on the display.

A fourth embodiment is a method substantially similar to any of the first through third embodiments, wherein the portion of the image of the physical environment corresponds to a physical object and, in response to a movement of the physical object, display of the CGR scene is correspondingly moved on the display.

A fifth embodiment is a method substantially similar to any of first through fourth embodiments, wherein displaying the CGR scene at the location of the display corresponding to the second anchor is performed in response to determining that a plurality of images of the physical environment taken over a threshold amount of time each lack a portion corresponding to the first anchor.

A sixth embodiment is a method substantially similar to any of the first through fifth embodiments, wherein the first anchor is an anchor image and the second anchor is a horizontal plane or vertical plane.

A seventh embodiment is a method substantially similar to the sixth embodiment, wherein the CGR scene is associated with the anchor image by selecting an image file.

An eighth embodiment is a method substantially similar to the sixth embodiment, wherein the CGR scene is associated with the anchor image by capturing, using the camera, the anchor image.

A ninth embodiment is a method substantially similar to any of first through fifth embodiments, wherein the first anchor is a tabletop or floor and the second anchor is horizontal plane.

A tenth embodiment is a method substantially similar to any of the first through ninth embodiments, wherein the CGR scene is associated with a third anchor and determining that image of the physical environment lacks a portion corresponding to the first anchor is performed in response to determining that the image of the physical environment lacks a portion corresponding to the third anchor.

Another first embodiment is a method a comprising displaying, on a display, a representation of a computer-generated reality (CGR) object associated with a first parameter and a second parameter, wherein the first parameter has a first one of a plurality of first parameter values and the second parameter has a first one of a plurality of second parameter values; displaying, on the display, a first user interface element for selection of a second one of the plurality of first parameter values; and displaying, on the display, a second user interface element for selection of a second one of the plurality of second parameter values, wherein, based on the first one of the plurality of first parameter values and one or more selection rules, a subset of the plurality of second parameters values are presented for selection via the second user interface element.

A second embodiment is a method substantially similar to the first embodiment, wherein the second user interface element includes a set of selectable affordances corresponding to the subset of the plurality of second parameters and a set of non-selectable affordances corresponding to the others of the plurality of second parameters.

A third embodiment is a method substantially similar to the second embodiment, wherein the set of selectable affordances are displayed in a first manner and the set of non-selectable affordances are displayed in a second manner different than the first manner.

A fourth embodiment is a method substantially similar to any of the first through third embodiments, the method further comprising receiving, via one or more input devices, a user input selecting a second one of the plurality of first parameter values; and updating display of the second user interface element, wherein, based on the second one of the plurality of first parameter values and the one or more selection rules, a second subset of the plurality of second parameters is presented for selection via the second user interface element.

A fifth embodiment is a method substantially similar to the fourth embodiment, the method further comprising updating display of the representation of the CGR object.

A sixth embodiment is a method substantially similar to the fourth embodiment or fifth embodiment, the method further comprising receiving a user input updating the first parameter of the CGR object to the second one of the plurality of first parameter values.

A seventh embodiment is a method substantially similar to any of the first through sixth embodiments, the method further comprising displaying, on the display, a plurality of view affordances including an object view affordance for entering an object view mode in which user inputs directed to the CGR object change a perspective of the display of the representation of the CGR object and a CGR view affordance for entering a CGR view mode in which movement of display changes a perspective of the display of the representation of the CGR object.

An eighth embodiment is a method substantially similar to any of the first through seventh embodiment, wherein the CGR object is further associated a third parameter, wherein the third parameter has a first one of a plurality of third parameter values, further comprising displaying, on the display, a third user interface element for selection of a second one of the plurality of third parameter values, wherein, based on the first one of the plurality of first parameter values, the first one of the plurality of second parameter values and the one or more selection rules, a subset of the plurality of third parameters values are presented for selection via the third user interface element.

Another first embodiment is a method comprising displaying, on a display, a representation of CGR scene including displaying a representation of a first CGR object of the CGR scene, wherein displaying the representation of the first CGR object is based on a display mesh associated with the first CGR object; and determining an interaction of the first CGR object with a second CGR object of the CGR scene based on a physics mesh associated with the first CGR object, wherein the physics mesh associated with the first CGR object is different than the display mesh associated with the first CGR object.

A second embodiment is a method substantially similar to the first embodiment, wherein displaying the representation of the first CGR object is further based on a texture associated with the first CGR object.

A third embodiment is a method substantially similar to the first embodiment or the second embodiment, wherein the physics mesh includes fewer polygons than the display mesh.

A fourth embodiment is a method substantially similar to any of the first through third embodiments, wherein the physics mess is smoother than the display mesh.

A fifth embodiment is a method substantially similar to any of the first through fourth embodiments, wherein the second CGR object corresponds to a physical object.

A sixth embodiment is a method substantially similar to any of the first through fifth embodiments, wherein the second CGR object is a virtual object.

A seventh embodiment is a method substantially similar to any of the first through sixth embodiments, the method further comprising, prior to determining the interaction, receiving a user input changing the physics mesh from a first mesh that is the same as the display mesh associated with the first CGR object to a second mesh that is different than the display mesh associated with the first CGR object; and in response to receiving the user input changing the physics mesh, associating the second mesh with the first CGR object as the physics mesh.

An eighth embodiment is a method substantially similar to the seventh embodiment, wherein the first CGR object is described by a CGR object file including a plurality of meshes including the first mesh and the second mesh.

A ninth embodiment is a method substantially similar to the eighth embodiment, the method further comprising receiving a user input to import a mesh into the CGR object file; and in response to receiving the user input to import a mesh into the CGR object file, importing a third mesh into the CGR object file.

What is claimed is:
1. A method comprising:
at an electronic device including one or more processors, a non-transitory memory, one or more input devices, and a display:
displaying, on the display, a user interface that includes a first anchor selection affordance and a second anchor selection affordance, wherein the first anchor selection affordance is associated with a first anchor, and wherein the second anchor selection affordance is associated with a second anchor;
while displaying the user interface:
receiving, via the one or more input devices, a user input directed to the first anchor selection affordance and the second anchor selection affordance within the user interface to respectively select the first anchor and the second anchor, wherein the first anchor corresponds to a first computer-generated object, and wherein the second anchor corresponds to a second computer-generated object; and
receiving, via the one or more input devices, a user input to present a computer-generated reality (CGR) scene including one or more CGR objects, wherein the CGR scene is associated with the first anchor and the second anchor;
capturing, using a camera, an image of a physical environment;
determining that the image of the physical environment lacks a portion corresponding to the first anchor;
detecting a portion of the image of the physical environment corresponding to the second anchor; and
in response to determining that image of the physical environment lacks the portion corresponding to the first anchor and detecting a portion of the image of the physical environment corresponding to the second anchor, displaying, on the display, the CGR scene at a location of the display corresponding to the portion of the image of the physical environment corresponding to the second anchor.

2. The method of claim 1, wherein displaying the CGR scene at the location of the display corresponding to the second anchor includes displaying the CGR scene anchored to the second anchor.

3. The method of claim 1, further comprising, in response to a change in perspective of the camera, correspondingly changing display of the CGR scene on the display.

4. The method of claim 1, wherein the portion of the image of the physical environment corresponds to a physical object and, the method further comprising, in response to a movement of the physical object, correspondingly moving display of the CGR scene on the display.

5. The method of claim 1, wherein displaying the CGR scene at the location of the display corresponding to the second anchor is performed in response to determining that a plurality of images of the physical environment taken over a threshold amount of time each lacks a portion corresponding to the first anchor.

6. The method of claim 1, wherein the first anchor is an anchor image, and the second anchor is a horizontal plane or a vertical plane.

7. The method of claim 6, wherein the CGR scene is associated with the anchor image by selecting an image file.

8. The method of claim 6, wherein the CGR scene is associated with the anchor image by capturing, using the camera, the anchor image.

9. The method of claim 1, wherein the first anchor is a tabletop or a floor, and the second anchor is a horizontal plane.

10. The method of claim 1, wherein the CGR scene is associated with a third anchor, and determining that the image of the physical environment lacks a portion corresponding to the first anchor is performed in response to determining that the image of the physical environment lacks a portion corresponding to the third anchor.

11. An electronic device comprising:
a camera;
a display;
one or more input devices;
a non-transitory memory; and
one or more processors to:
  display, on the display, a user interface that includes a first anchor selection affordance and a second anchor selection affordance, wherein the first anchor selection affordance is associated with a first anchor, and wherein the second anchor selection affordance is associated with a second anchor;
  while displaying the user interface:
    receive, via the one or more input devices, a user input directed to the first anchor selection affordance and the second anchor selection affordance within the user interface to respectively select the first anchor and the second anchor, wherein the first anchor corresponds to a first computer-generated object, and wherein the second anchor corresponds to a second computer-generated object; and
    receive, via the one or more input devices, a user input to present a computer-generated reality (CGR) scene including one or more CGR objects, wherein the CGR scene is associated with the first anchor and the second anchor;
  capture, using the camera, an image of a physical environment;
  determine that the image of the physical environment lacks a portion corresponding to the first anchor;
  detect a portion of the image of the physical environment corresponding to the second anchor; and
  in response to determining that image of the physical environment lacks the portion corresponding to the first anchor and detecting a portion of the image of the physical environment corresponding to the second anchor, display, on the display, the CGR scene at a location of the display corresponding to the portion of the image of the physical environment corresponding to the second anchor.

12. The electronic device of claim 11, wherein the one or more processors are further configured to, in response to a change in perspective of the camera, correspondingly change display of the CGR scene on the display.

13. The electronic device of claim 11, wherein the portion of the image of the physical environment corresponds to a physical object and, in response to a movement of the physical object, the one or more processors are further configured to correspondingly move display of the CGR scene on the display.

14. The electronic device of claim 11, wherein the one or more processors are to display the CGR scene at the location of the display corresponding to the second anchor in response to determining that a plurality of images of the physical environment taken over a threshold amount of time each lacks a portion corresponding to the first anchor.

15. The electronic device of claim 11, wherein the first anchor is an anchor image, and the second anchor is a horizontal plane or a vertical plane.

16. The electronic device of claim 11, wherein the first anchor is a tabletop or a floor, and the second anchor is a horizontal plane.

17. A non-transitory computer-readable medium having instructions encoded thereon which, when executed by an electronic device including a camera, a display, one or more input devices, and one or more processors, cause the electronic device to:
display, on the display, a user interface that includes a first anchor selection affordance and a second anchor selection affordance, wherein the first anchor selection affordance is associated with a first anchor, and wherein the second anchor selection affordance is associated with a second anchor;
while displaying the user interface:
  receive, via the one or more input devices, a user input directed to the first anchor selection affordance and the second anchor selection affordance within the user interface to respectively select the first anchor and the second anchor, wherein the first anchor corresponds to a first computer-generated object, and wherein the second anchor corresponds to a second computer-generated object;
  receive, via the one or more input devices, a user input to present a computer-generated reality (CGR) scene including one or more CGR objects, wherein the CGR scene is associated with the first anchor and the second anchor;
capture, using the camera, an image of a physical environment;
determine that the image of the physical environment lacks a portion corresponding to the first anchor;
detect a portion of the image of the physical environment corresponding to the second anchor; and
in response to determining that image of the physical environment lacks the portion corresponding to the first anchor and detecting a portion of the image of the physical environment corresponding to the second anchor, display, on the display, the CGR scene at a location of the display corresponding to the portion of the image of the physical environment corresponding to the second anchor.

18. The non-transitory computer-readable medium of claim 17, wherein the portion of the image of the physical environment corresponds to a physical object and wherein the instructions, when executed by the electronic device, cause the electronic device to, in response to a movement of the physical object, correspondingly move display of the CGR scene on the display.

19. The non-transitory computer-readable medium of claim 17, wherein the instructions, when executed by the electronic device, cause the device to display the CGR scene at the location of the display corresponding to the second anchor in response to determining that a plurality of images of the physical environment taken over a threshold amount of time each lacks a portion corresponding to the first anchor.

20. The non-transitory computer-readable medium of claim 17, wherein the first anchor is an anchor image, and the second anchor is a horizontal plane or a vertical plane.

\* \* \* \* \*